(12) United States Patent
Yin et al.

(10) Patent No.: US 7,366,807 B1
(45) Date of Patent: Apr. 29, 2008

(54) NETWORK MEDIA ACCESS CONTROLLER EMBEDDED IN A PROGRAMMABLE LOGIC DEVICE—STATISTICS INTERFACE

(75) Inventors: Robert Yin, Castro Valley, CA (US); Hamish T. Fallside, Los Gatos, CA (US); Richard P. Burnley, Mountain View, CA (US); Nicholas McKay, Edinburgh (GB); Martin B. Rhodes, Edinburgh (GB); Douglas M. Grant, Edinburgh (GB); Stuart A. Nisbet, Edinburgh (GB); Gareth D. Edwards, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 560 days.

(21) Appl. No.: 11/040,567

(22) Filed: Jan. 21, 2005

Related U.S. Application Data

(62) Division of application No. 10/985,493, filed on Nov. 10, 2004.

(60) Provisional application No. 60/604,855, filed on Aug. 27, 2004.

(51) Int. Cl.
  G06F 13/00 (2006.01)
  H04L 12/00 (2006.01)

(52) U.S. Cl. ...................... 710/104; 370/463

(58) Field of Classification Search ............... 370/279, 370/315, 401, 402, 463; 709/220, 221, 250; 710/104
See application file for complete search history.

(56) References Cited

U.S. PATENT DOCUMENTS

| | | | |
|---|---|---|---|
| 5,414,704 A | 5/1995 | Spinney | |
| 5,530,703 A | 6/1996 | Liu et al. | |
| 5,651,002 A | 7/1997 | Van Seters et al. | |
| 5,754,540 A | 5/1998 | Liu et al. | |
| 5,784,573 A | 7/1998 | Szczepanek et al. | |
| 5,835,746 A | 11/1998 | Girardeau et al. | |
| 5,914,616 A | 6/1999 | Young et al. | |
| 5,920,698 A | 7/1999 | Ben-Michael et al. | |
| 5,983,275 A | 11/1999 | Ecclesine | |
| 5,991,303 A | 11/1999 | Mills | |
| 6,108,726 A | 8/2000 | Runaldue et al. | |
| 6,373,841 B1 | 4/2002 | Goh et al. | |
| 6,411,616 B1 | 6/2002 | Donahue et al. | |
| 6,442,170 B1 | 8/2002 | Perlman et al. | |
| 6,504,842 B1 | 1/2003 | Bergenfeld | |
| 6,604,206 B2 | 8/2003 | Chadha et al. | |
| 6,606,317 B1 | 8/2003 | Beadle et al. | |

(Continued)

OTHER PUBLICATIONS

U.S. Appl. No. 10/919,901, filed Aug. 17, 2004, Sasaki et al.

(Continued)

*Primary Examiner*—Christopher E. Lee
*Assistant Examiner*—Trisha Vu
(74) *Attorney, Agent, or Firm*—W. Eric Webostad

(57) ABSTRACT

A statistics interface for a media access controller is described. The media access controller core includes a receive engine configured to provide a receive statistics vector associated with receive traffic. The receive engine is configured to output the receive statistics vector within an inter-frame gap over a number of receive clock cycles, where a portion of the receive statistics vector is provided with each clock cycle of the receive clock cycles.

17 Claims, 68 Drawing Sheets

U.S. PATENT DOCUMENTS

| | | |
|---|---|---|
| 6,617,877 B1 | 9/2003 | Cory et al. |
| 6,704,296 B1 | 3/2004 | Crayford et al. |
| 6,707,814 B1 | 3/2004 | Ohgane |
| 6,718,491 B1 | 4/2004 | Walker et al. |
| 6,754,211 B1 | 6/2004 | Brown |
| 6,775,287 B1 | 8/2004 | Fukano et al. |
| 6,778,532 B1 | 8/2004 | Akahane et al. |
| 6,879,272 B1 | 4/2005 | Stenfort |
| 6,879,598 B2 | 4/2005 | Zancan et al. |
| 6,891,397 B1 | 5/2005 | Brebner |
| 6,909,713 B2 | 6/2005 | Magnussen et al. |
| 6,911,840 B1 | 6/2005 | Milne et al. |
| 6,937,608 B1 | 8/2005 | Deng |
| 6,957,283 B2 | 10/2005 | Dhir et al. |
| 6,959,007 B1 | 10/2005 | Vogel et al. |
| 6,976,160 B1 | 12/2005 | Yin et al. |
| 7,020,729 B2 | 3/2006 | Taborek et al. |
| 7,024,489 B2 | 4/2006 | Aviles |
| 7,042,893 B1 | 5/2006 | Lo et al. |
| 7,042,899 B1 | 5/2006 | Vaida et al. |
| 7,065,095 B2 | 6/2006 | Coden |
| 7,091,890 B1 | 8/2006 | Sasaki et al. |
| 7,143,218 B1 | 11/2006 | Yin et al. |
| 7,146,451 B2 | 12/2006 | Boily |
| 2002/0188875 A1 | 12/2002 | Hwang et al. |
| 2003/0023762 A1 | 1/2003 | Dhir et al. |
| 2003/0055900 A1 | 3/2003 | Glas et al. |
| 2003/0061341 A1 | 3/2003 | Loh et al. |
| 2003/0081606 A1 | 5/2003 | Tamura et al. |
| 2003/0084195 A1 | 5/2003 | Dove |
| 2003/0110306 A1 | 6/2003 | Bailis et al. |
| 2003/0179711 A1 | 9/2003 | Huff |
| 2003/0198224 A1 | 10/2003 | Lee et al. |
| 2003/0227928 A1 | 12/2003 | Hsu et al. |
| 2004/0001435 A1 | 1/2004 | Wong |
| 2004/0004239 A1* | 1/2004 | Madurawe ................ 257/298 |
| 2004/0004974 A1 | 1/2004 | Gaspar |
| 2004/0062136 A1 | 4/2004 | Partsch et al. |
| 2004/0062267 A1 | 4/2004 | Minami et al. |
| 2004/0100962 A1 | 5/2004 | Kim et al. |
| 2004/0123173 A1 | 6/2004 | Emberling et al. |
| 2004/0183564 A1 | 9/2004 | Schadt et al. |
| 2004/0193852 A1 | 9/2004 | Johnson |
| 2005/0025080 A1 | 2/2005 | Liu |
| 2005/0216726 A1 | 9/2005 | Dellmo et al. |
| 2005/0256969 A1 | 11/2005 | Yancey et al. |
| 2006/0146914 A1 | 7/2006 | Horvath et al. |

OTHER PUBLICATIONS

Xilinx, Inc.; "1-Gigabit Ethernet MAC Core with PCS/PMA Sublayers (1000BASE-X) or GMII v4.0"; available from Xilinx, Inc. [online] (Aug. 25, 2004) <URL:http://www.xilinx.com/ipcenter/catalog/logicore/docs/gig_eth_mac.pdf>.

Xilinx, Inc.; "Programmable Logic Data Book 2000"; Apr. 2000; available from Xilinx, Inc., 2100 Logic Drive, San Jose, California 95124; pp. 3-75 through 3-96.

Xilinx, Inc.; "Virtex II Pro Platform FPGA Handbook"; Oct. 14, 2002; available from Xilinx, Inc., 2100 Logic Drive, San Jose, California 95124; pp. 19-71.

Xilinx, Inc.; "Virtex II Pro Platform FPGA Handbook"; Dec. 2000; available from Xilinx, Inc., 2100 Logic Drive, San Jose, California 95124; pp. 33-75.

U.S. Appl. No. 10/985,493, filed Nov. 10, 2004, Kao, Ting Yun et al., "An Embedded Network Media Access Controller", 188 pages, available from Xilinx, Inc., 2100 Logic Drive, San Jose, CA 95124.

Xilinx, Inc.; "1-Gigabit Ethernet MAC Cosre with PCS/PMA Sublayers (1000BASE-X) or GMII v4.0"; DS200 Product Specification; Dec. 11, 2003; available from Xilinx, Inc., 2100 Logic Drive, San Jose, California 95124; pp. 1-54.

Xilinx, Inc.; U.S. Appl. No. 11/041,125 by Kao et al. filed Jan. 21, 2005.

Xilinx, Inc.; U.S. Appl. No. 11/040,973 by Yin et al. filed Jan. 21, 2005.

Xilinx, Inc.; U.S. Appl. No. 11/040,248 by Yin et al. filed Jan. 21, 2005.

Xilinx, Inc.; U.S. Appl. No. 11/041,126 by Yin et al. filed Jan. 21, 2005.

Xilinx, Inc.; U.S. Appl. No. 11/040,568 by Kao et al. filed Jan. 21, 2005.

Xilinx, Inc.; U.S. Appl. No. 11/040,136 by Yin et al. filed Jan. 21, 2005.

* cited by examiner

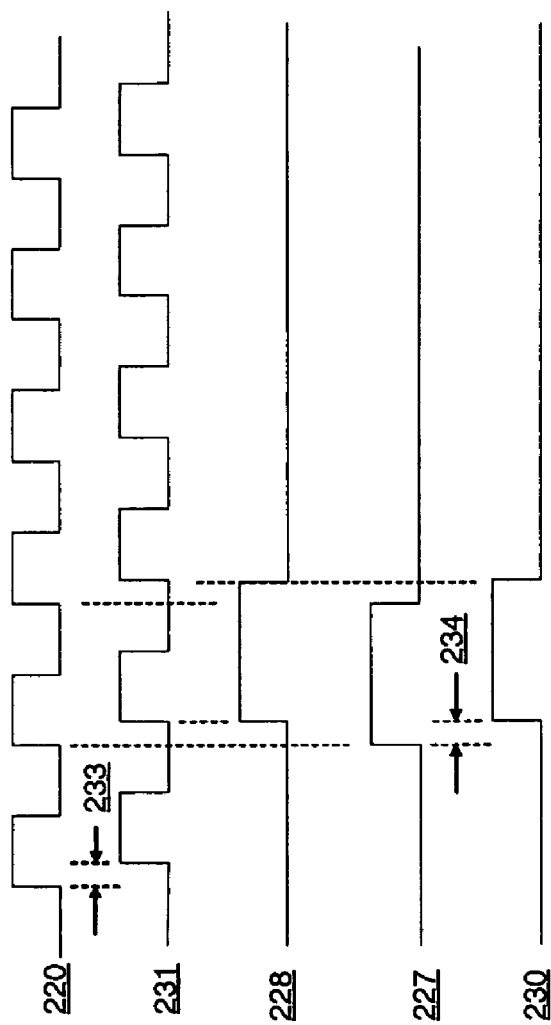

| REGISTER NAME 497, 498, 499, 500 | DCR ADDRESS 523 | BIT ASSIGNMENT 522 | DEFAULT VALUE 521 | R/W 524 |
|---|---|---|---|---|
| dataRegMSW | __00 | [0:15] = 16'h0000<br>[16:31] = read data | undefined | R/W |
| dataRegLSW | __01 | [0:31] = read/write data | undefined | R/W |
| cntlReg | __10 | [0:15] = 16'h0000<br>[16] = write enable (0 = read, 1 = write)<br>[17:20] = reserved<br>[21] = emac1Sel<br>[22:31] = generic host address | 16'h0000<br>1'b0<br>4'b0000<br>1'b0<br>10'h000 | R/W |
| RDYstatus | __11 | [0:15] = 16'h0000<br>[16] = reserved<br>[17] = EMAC1 configuration register write ready<br>[18] = EMAC1 configuration register read ready<br>[19] = EMAC1 address filter register write ready<br>[20] = EMAC1 address filter register ready ready<br>[21] = EMAC1 MIIM register write ready<br>[22] = EMAC1 MIIM register read ready<br>[23] = EMAC1 statistics register read ready<br>[24] = reserved<br>[25] = EMAC0 configuration register write ready<br>[26] = EMAC0 configuration register read ready<br>[27] = EMAC0 address filter register write ready<br>[28] = EMAC0 address filter register read ready<br>[29] = EMAC0 MIIM register write ready<br>[30] = EMAC0 MIIM register ready ready<br>[31] = EMAC0 statistics register read ready | 16'h0000<br>1'b0<br>1'b1<br>1'b1<br>1'b1<br>1'b1<br>1'b1<br>1'b1<br>1'b1<br>1'b0<br>1'b1<br>1'b1<br>1'b1<br>1'b1<br>1'b1<br>1'b1<br>1'b1 | R |

FIG. 4-5B

| REGISTER NAME 536, 537, 541 | BIT ASSIGNMENT 505 | DEFAULT VALUE 503 | R/W 504 |
|---|---|---|---|
| IRstatus | [31:16] = reserved<br>[15] = reserved<br>[14] = EMAC1 configuration register write done interrupt request<br>[13] = EMAC1 configuration register read done interrupt request<br>[12] = EMAC1 address filter register write done interrupt request<br>[11] = EMAC1 address filter register read done interrupt request<br>[10] = EMAC1 MIIM register write done interrupt request<br>[9] = EMAC1 MIIM register read done interrupt request<br>[8] = EMAC1 statistics register read done interrupt request<br>[7] = reserved<br>[6] = EMAC0 configuration register write done interrupt request<br>[5] = EMAC0 configuration register read done interrupt request<br>[4] = EMAC0 address filter register write done interrupt request<br>[3] = EMAC0 address filter register read done interrupt request<br>[2] = EMAC0 MIIM register write done interrupt request<br>[1] = EMAC0 MIIM register read done interrupt request<br>[0] = EMAC0 statistics register read done interrupt request | 16'h0000<br>1'b0<br>1'b0<br>1'b0<br>1'b0<br>1'b0<br>1'b0<br>1'b0<br>1'b0<br>1'b0<br>1'b0<br>1'b0<br>1'b0<br>1'b0<br>1'b0<br>1'b0<br>1'b0 | R/W |
| IRenable | [31:16] = reserved<br>[15] = reserved<br>[14] = EMAC1 configuration register write done interrupt enable<br>[13] = EMAC1 configuration register read done interrupt enable<br>[12] = EMAC1 address filter register write done interrupt enable<br>[11] = EMAC1 address filter register read done interrupt enable<br>[10] = EMAC1 MIIM register write done interrupt enable<br>[9] = EMAC1 MIIM register read done interrupt enable<br>[8] = EMAC1 statistics register read done interrupt request<br>[7] = reserved<br>[6] = EMAC0 configuration register write done interrupt enable<br>[5] = EMAC0 configuration register read done interrupt enable<br>[4] = EMAC0 address filter register write done interrupt enable<br>[3] = EMAC0 address filter register read done interrupt enable<br>[2] = EMAC0 MIIM register write done interrupt enable<br>[1] = EMAC0 MIIM register read done interrupt enable<br>[0] = EMAC0 statistics register read done interrupt enable | 16'h0000<br>1'b0<br>1'b0<br>1'b0<br>1'b0<br>1'b0<br>1'b0<br>1'b0<br>1'b0<br>1'b0<br>1'b0<br>1'b0<br>1'b0<br>1'b0<br>1'b0<br>1'b0<br>1'b0 | R/W |
| MIIMwrData | [31:16] = reserved<br>[15:0] = MIIM register write data | 16'h0000<br>undefined | R/W |

FIG. 4-5C

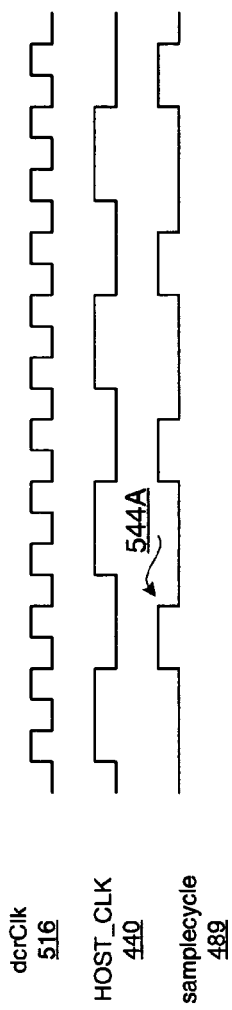
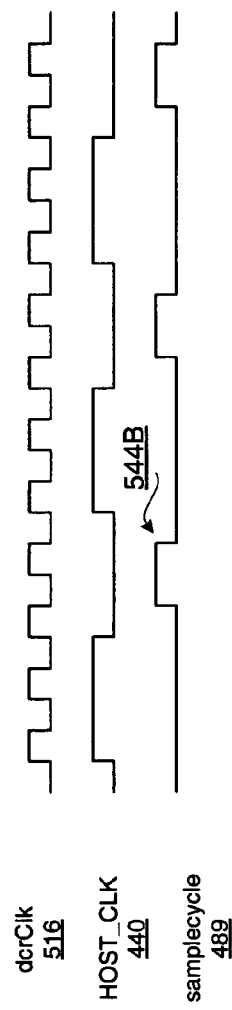
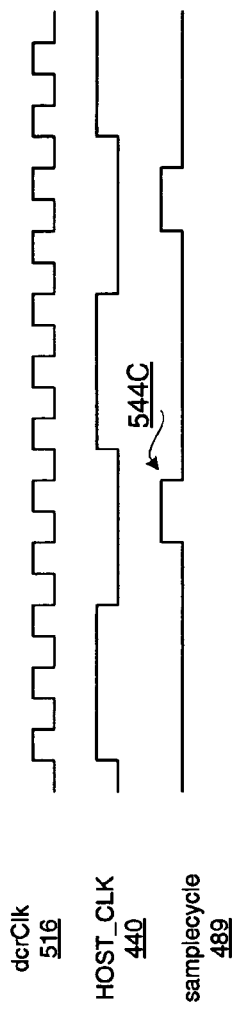

```
// EMAC0 registers
assign StatsRegE0 = (cntlReg[9:4] == 6'b00_0000) | (cntlReg[9:4] == 6'b00_0001)
       | (cntlReg[9:4] == 6'b00_0010) | (cntlReg[9:4] == 6'b00_0100);
assign configRegE0 = (cntlReg[9:8] == 2'b10) | (cntlReg[9:6] == 4'b11_01);
assign AddrFilRegE0 = (cntlReg[9:4] == 6'b11_1000) | (cntlReg[9:4] == 6'b11_1001);
assign CAMrwE0 = (cntlReg[10:2] == 9'b011_1000_11);
// host interface registers
assign IRreg = (cntlReg[9:4] == 6'b11_1010);
assign MIMreg = (cntlReg[9:4] == 6'b11_1011);
assign MIMcnt1 = (cntlReg[9:2] == 8'b11_1011_01);
// EMAC1 registers
assign StatsRegE1 = (cntlReg[10:4] == 7'b100_0000) | (cntlReg[10:4] == 7'b100_0001)
       | (cntlReg[10:4] == 7'b100_0010) | (cntlReg[10:4] == 7'b100_0100);
assign configRegE1 = (cntlReg[10:8] == 3'b110) | (cntlReg[10:6] == 5'b111_01);
assign AddrFilRegE1 = (cntlReg[10:4] == 7'b111_1000) | (cntlReg[10:4] == 7'b111_1001);
assign CAMrwE1 = (cntlReg[10:2] == 9'b111_1000_11);

assign dcr_emacisel = cntlReg[10];
assign hostRegWNR = cntlReg[15];
assign camRNW = dataRegLSW[23];
assign camAddr = dataRegLSW[19:16];
// for output to generic bus
assign dcr_hostOpCode[1:0] = Opcode_cfg[1:0] | Opcode_miim[1:0] | Opcode_stats[1:0];
assign dcr_hostReq = Req_cfg | Req_miim | Req_Stats;
assign dcr_hostMIMsel = MIMsel_cfg | MIMsel_miim | MIMsel_Stats;

assign dcrAddrEn = dcrAddrEn_cfg | dcrAddrEn_Stats | dcrAddrEn_AF | dcrAddrEn_AFcam;
assign dcr_hostAddr_noMIM[9:0] = {9{dcrAddrEn}} & cntlReg[9:0];
assign dcr_hostAddr[9:0] = dcrAddrEn_miim ? dataRegLSW[9:0] : dcr_hostAddr_noMIM[9:0];
```

FIG. 4-33A

```
// latch the signals for use in read control signal generation
always @(posedge hostClk)
    if (Reset)
        begin
            MIIMrdReg <= 1'b0; MIIMwrReg <= 1'b0; StatsRdReg <= 1'b0; configRdReg <= 1'b0; configWrReg <= 1'b0;
            AddrFilRdReg <= 1'b0;
            AddrFilWrReg <= 1'b0; camRdReg <= 1'b0; camWrReg <= 1'b0;
        end
    else
        begin
            MIIMrdReg <= MIIMrd; MIIMwrReg <= MIIMwr; StatsRdReg <= StatsRd; configRdReg <= configRd;
            configWrReg <= configWr;
            AddrFilRdReg <= AddrFilRd; AddrFilWrReg <= AddrFilWr; camRdReg <= camRd; camWrReg <= camWr;
        end // generate read or write enable signals
assign dataRegMSWwe = dRegMSWwe_cfg | dRegMSWwe_Stats | dRegMSWwe_miim | dRegMSWwe_AF | dRegMSWwe_AFcam;
assign dataRegLSWwe = dRegLSWwe_cfg | dRegLSWwe_Stats | dRegLSWwe_miim | dRegLSWwe_AF | dRegLSWwe_AFcam;

always @(posedge dcrClk)           // delay until next clock cycle to allow address latch into cntlReg
    if (Reset)
        cntlRegWrEnReg <= 1'b0;
    else
        cntlRegWrEnReg <= cntlRegWrEn;

assign IRstatusReg  = IRreg & ~cntlReg[3] & ~cntlReg[2];
assign IRenableReg  = IRreg & ~cntlReg[3] & cntlReg[2];
assign MIIMwrDataReg = MIMreg & ~cntlReg[3] & ~cntlReg[2];
assign IRstatusRE   = IRstatusReg & ~hostRegWNR & cntlRegWrEnReg;
assign IRenableRE   = IRenableReg & ~hostRegWNR & cntlRegWrEnReg;
assign MIIMwrDataRE = MIIMwrDataReg & ~hostRegWNR & cntlRegWrEnReg;
assign IRstatusWE   = IRstatusReg & hostRegWNR & cntlRegWrEnReg;
assign IRenableWE   = IRenableReg & hostRegWNR & cntlRegWrEnReg;
assign MIIMwrDataWE = MIIMwrDataReg & hostRegWNR & cntlRegWrEnReg;
```

FIG. 4-33B

```
// to extend the cntlRegWrEn signal for hostClk
always @(posedge dcrClk)
  if (Reset)        sigGenEnReg <= 1'b0;
  else if (cntlRegWrEn)     sigGenEnReg <= 1'b1;
       else if (sigGenEn_negReg)  sigGenEnReg <= 1'b0;
            else             sigGenEnReg <= sigGenEnReg;

assign sigGenEn_negIn = samplecycle & sigGenEnReg;

// signal to negate sigGenEnReg
always @(posedge dcrClk)
  if (Reset)  sigGenEn_negReg <= 1'b0;
  else sigGenEn_negReg <= sigGenEn_negIn;

assign MIIMrd    = sigGenEnReg & MIIMcntl & ~hostRegWNR;
assign MIIMwr    = sigGenEnReg & MIIMcntl & hohstRegWNR;
assign StatsRd   = sigGenEnReg & (StatsRegE0 | StatsRegE1) & ~hostRegWNR;
assign configRd  = sigGenEnReg & (configRegE0 | configRegE1) & ~hostRegWNR;
assign configWr  = sigGenEnReg & (configRegE0 | configRegE1) & hostRegWNR;
assign camRd     = sigGenEnReg & (CAMrwE0 | CAMrwE1) & hostRegWNR & camRNW;
assign camWr     = sigGenEnReg & (CAMrwE0 | CAMrwE1) & hostRegWNR & ~camRNW;
assign AddrFilRd = sigGenEnReg & (AddrFilRegE0 | AddrFilRegE1) & ~hostRegWNR;
assign AddrFilWr = sigGenEnReg & (AddrFilRegE0 | AddrFilRegE1) & hostRegWNR;
```

FIG. 4-34

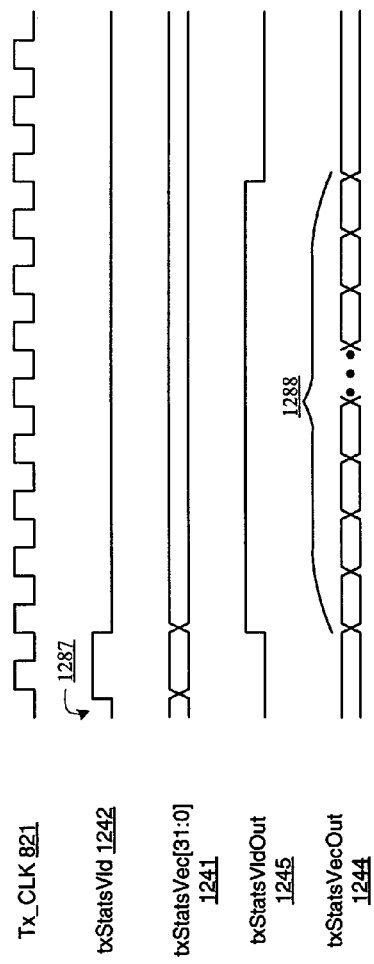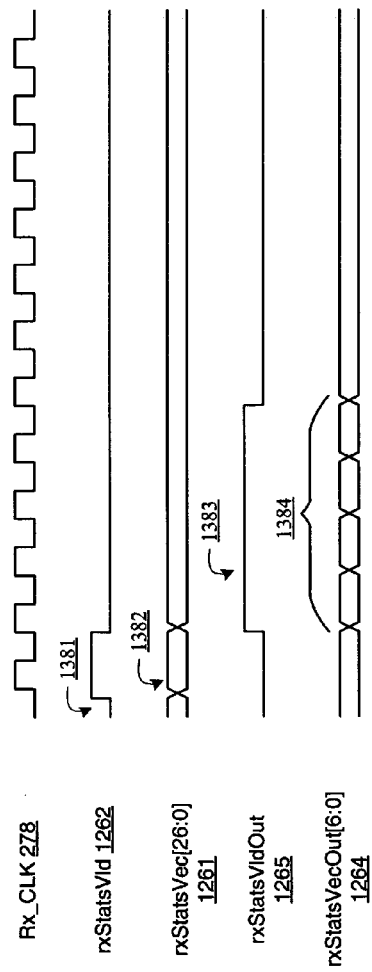

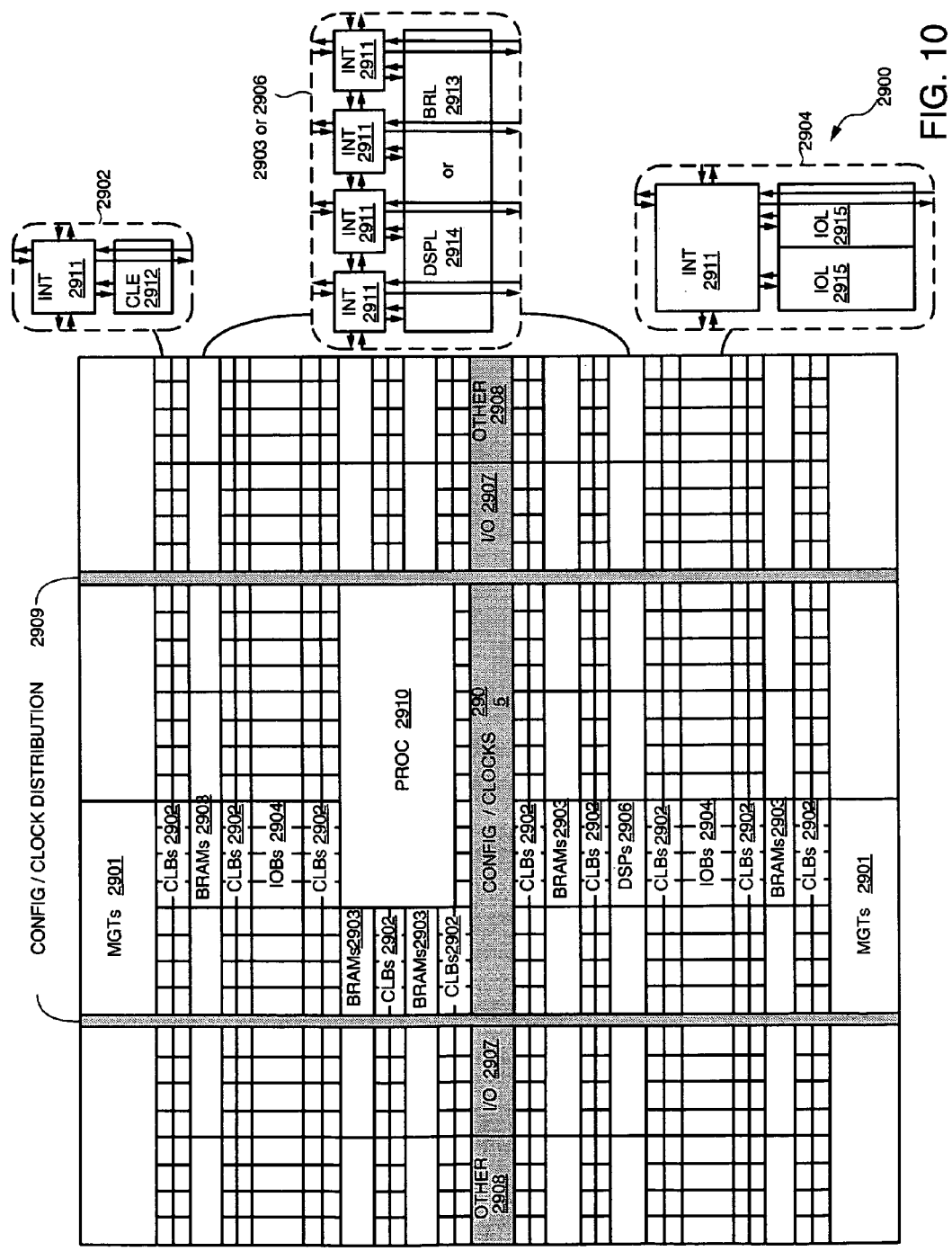

NETWORK MEDIA ACCESS CONTROLLER EMBEDDED IN A PROGRAMMABLE LOGIC DEVICE—STATISTICS INTERFACE

CROSS REFERENCE

This patent application claims priority to and incorporates by reference the U.S. provisional application Ser. No. 60/604,855, entitled "Ethernet Media Access Controller Embedded in a Programmable Logic Device", by Ting Y. Kao, et al., filed Aug. 27, 2004 and to U.S. patent application Ser. No. 10/985,493 entitled "An Embedded Network Media Access Controller", by Ting Y. Kao et al, filed Nov. 10, 2004.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD OF THE INVENTION

One or more aspects of the invention relate generally to a network interface and more particularly, to an Ethernet Media Access Controller ("EMAC") embedded in an integrated circuit (IC).

BACKGROUND OF THE INVENTION

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In some CPLDs, configuration data is stored on-chip in non-volatile memory. In other CPLDs, configuration data is stored on-chip in non-volatile memory, then downloaded to volatile memory as part of an initial configuration sequence.

For all of these programmable logic devices (PLDs), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

The terms "PLD" and "programmable logic device" include but are not limited to these exemplary devices, as well as encompassing devices that are only partially programmable.

To enhance functionality of PLDs, embedded cores have been added. For example, FPGAs may include one or more hardwired microprocessors. However, an Ethernet Media Access Controller ("EMAC") core for PLDs has only been available as a program core. For example, a program or "soft" implementation in FPGA programmable circuitry ("fabric") of an EMAC is available from Xilinx, Inc. of San Jose, Calif., which is described in additional detail in "1-Gigabit Ethernet MAC Core with PCS/PMA Sublayers (1000BASE-X) or GMII v4.0" by Xilinx, Inc. [online] (Aug. 25, 2004)<URL:http://www.xilinx.com/ipcenter/catalog/logicore/docs/gig eth mac.pdf>, which is incorporated by reference herein in its entirety (hereinafter "soft EMAC core").

Advantageously, having a soft EMAC core allows users to connect an FPGA to a network, such as an Ethernet. Unfortunately, the cost of the soft EMAC core implementation is significant with respect to use of configurable logic cells.

Accordingly, it would be desirable and useful to provide an EMAC core that uses fewer configurable logic cells than a soft EMAC core and provides the same or greater functionality of a soft EMAC core. Moreover, such an EMAC core may be substantially compatible with the Institute of Electronic and Electrical Engineers ("IEEE") specification 802.3-2002. Furthermore, as PLDs may have any user instantiated design, such an EMAC core may be independent of user design.

SUMMARY OF THE INVENTION

The invention relates generally to a statistics interface for a media access controller embedded in a programmable logic device.

An aspect of the invention is a statistics interface for a media access controller, including a media access controller core including a receive engine. The receive engine is configured to provide a receive statistics vector associated with receive traffic provided via the media access controller, to provide a receive statistics valid signal associated with the receive statistics vector, and to output the receive statistics vector within an inter-frame gap over a number of receive clock cycles, where a portion of the receive statistics vector is provided with each clock cycle of the receive clock cycles. A receive statistics multiplexer circuit is coupled to receive the receive statistics vector and the receive statistics valid signal. The receive statistics multiplexer circuit is configured to provide a receive statistics vector output and a receive statistics valid output respectively responsive thereto.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 2D, there is shown an exemplary embodiment of signal timing for signals of FIG. 2C.

FIG. 2F-1 is a schematic diagram depicting an exemplary embodiment of an on-chip global buffer multiplexer.

FIG. 2F-2 is a schematic diagram depicting an exemplary embodiment of a divider circuit.

FIG. 4-1 is a high-level block/schematic diagram depicting an exemplary embodiment of a host interface.

FIG. 4-2 is a block/schematic diagram depicting an exemplary embodiment of a host interface.

FIG. 4-3 is state diagram depicting an exemplary embodiment of a state machine for EMAC register read select logic block.

FIG. 4-4 is a state diagram depicting an exemplary embodiment of a state machine for address filter read logic block.

FIG. 4-5A is a block/schematic diagram depicting an exemplary embodiment of device control register ("DCR") bridge.

FIG. 4-5B is a table diagram depicting an exemplary embodiment of DCR address and bit assignments for a DCR bridge.

FIG. 4-5C is a table diagram listing an exemplary embodiment of definitions for memory-mapped registers.

FIG. 4-6 is a state diagram depicting an exemplary embodiment of a state machine of a DCR acknowledgement generator.

FIG. 4-7 is a state diagram depicting an exemplary embodiment of a state machine of a DCR read bypass multiplexer enable generator 552.

FIG. 4-8 is a block diagram depicting exemplary embodiments of logic blocks of a control generator block for generating control signals for reading from or writing to a DCR bridge to a host bus.

FIG. 4-9 is a block diagram depicting exemplary embodiments of logic blocks of a control generator block for generating control signals for reading or writing data from or to a host bus into a DCR bridge.

FIG. 4-10 is a state diagram depicting an exemplary embodiment of a state machine of a configuration read/write bus controller.

FIG. 4-11 is a state diagram depicting an exemplary embodiment of a state machine of a MIIM read/write bus controller.

FIG. 4-12 is a state diagram depicting an exemplary embodiment of a state machine of a statistics read bus controller.

FIG. 4-13 is a state diagram depicting an exemplary embodiment of a state machine of an address filter read/write bus controller.

FIG. 4-14 is a state diagram depicting an exemplary embodiment of a state machine of an address filter content addressable memory read/write bus controller.

FIG. 4-15 is a state diagram depicting an exemplary embodiment of a state machine of a read data received controller.

FIG. 4-16 is a state diagram depicting an exemplary embodiment of a state machine of a configuration read/write controller.

FIG. 4-17 is a state diagram depicting an exemplary embodiment of a state machine of a statistics read controller.

FIG. 4-18 is a state diagram depicting an exemplary embodiment of a state machine of a MIIM read/write controller.

FIG. 4-19 is a state diagram depicting an exemplary embodiment of a state machine of an address filter read/write controller.

FIG. 4-20 is a state diagram depicting an exemplary embodiment of a state machine of a multicast address register read/write controller.

FIGS. 4-21A through 4-21C are timing diagrams for respective exemplary instances of generation of a sample cycle pulse.

FIG. 4-22 is a flow diagram depicting an exemplary embodiment of a receive configuration word register read access flow.

FIG. 4-23 is a flow diagram depicting an exemplary embodiment of a receive configuration word register write access flow.

FIG. 4-24 is a flow diagram depicting an exemplary embodiment of a multicast frames received okay register read flow ("statistics register read flow").

FIG. 4-25 is a flow diagram depicting an exemplary embodiment of a MIIM register read flow.

FIG. 4-26 is a flow diagram depicting an exemplary embodiment of a MIIM register write flow.

FIG. 4-27 is a flow diagram depicting an exemplary embodiment of an address filter multicast address register read flow.

FIG. 4-28 is a flow diagram depicting an exemplary embodiment of an address filter multicast address register write flow.

FIG. 4-29 is a block diagram depicting another exemplary embodiment of an address filter multicast address register read flow.

FIG. 4-30 is a block diagram depicting another exemplary embodiment of an address filter multicast address register write flow.

FIG. 4-31 is a high-level block diagram depicting an exemplary embodiment of a host interface coupled to a physical layer interface for a read from a physical layer device register.

FIG. 4-32 is a high-level block diagram depicting an exemplary embodiment of interfacing between a host interface and physical layer interface for a write to a physical layer device register.

FIGS. 4-33A and 4-33B is a code listing depicting an exemplary embodiment of a logic block with logic equations in Verilog Register Transfer Level ("RTL").

FIG. 4-34 is a code listing depicting an exemplary embodiment of a main bus control block with logic equations in Verilog RTL.

FIG. 5A is a high-level block diagram depicting an exemplary embodiment of a transmit-side ("Tx") client interface.

FIG. 5B is a high-level block diagram depicting an exemplary embodiment of a receive-side ("Rx") client interface.

FIG. 5C is a schematic diagram depicting an exemplary embodiment of a Tx client interface datapath.

FIG. 5J-1 is a schematic diagram depicting an exemplary embodiment of a transmit data valid generator.

FIG. 5J-2 is a state diagram depicting an exemplary embodiment of a state machine for a data valid generator.

FIGS. 5M, 5N, 5O and 5P are respective output timing diagrams of exemplary embodiments of either even or odd receive data byte lengths for when a receive datapath is in an 16-bit mode.

FIG. 6 is a high-level block diagram depicting an exemplary embodiment of an EMAC statistics registers, which may be read via a DCR bus.

FIG. 7E is a timing diagram depicting an exemplary embodiment of timing for a Tx statistics interface.

FIG. 7H is a timing diagram depicting an exemplary embodiment of timing for a receive statistics multiplexer.

FIG. 8 is a high-level block diagram depicting an exemplary embodiment of address filter.

FIGS. 9 and 10 are simplified block diagrams depicting respective exemplary embodiments of Field Programmable Gate Array architectures in which one or more aspects of the invention may be implemented.

To facilitate understanding, identical reference numerals have been used, where possible, to designate identical elements that are common to the figures.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items, however, in alternative embodiments the items may be different. Moreover, for purposes of clarity, a single signal or multiple signals may be referred to or illustratively shown as a signal to avoid encumbering the description with multiple signal lines. Moreover, along those same lines, a multiplexer or a register, among other circuit elements, may be referred to or illustratively shown as a single multiplexer or a single register though such reference or illustration may be representing multiples thereof. Furthermore, though particular signal bit widths, data rates and frequencies are describe herein for purposes of clarity by way of example, it should be understood that the scope of the description is not limited to these particular numerical examples as other values may be used.

EMAC System

Figure 1:
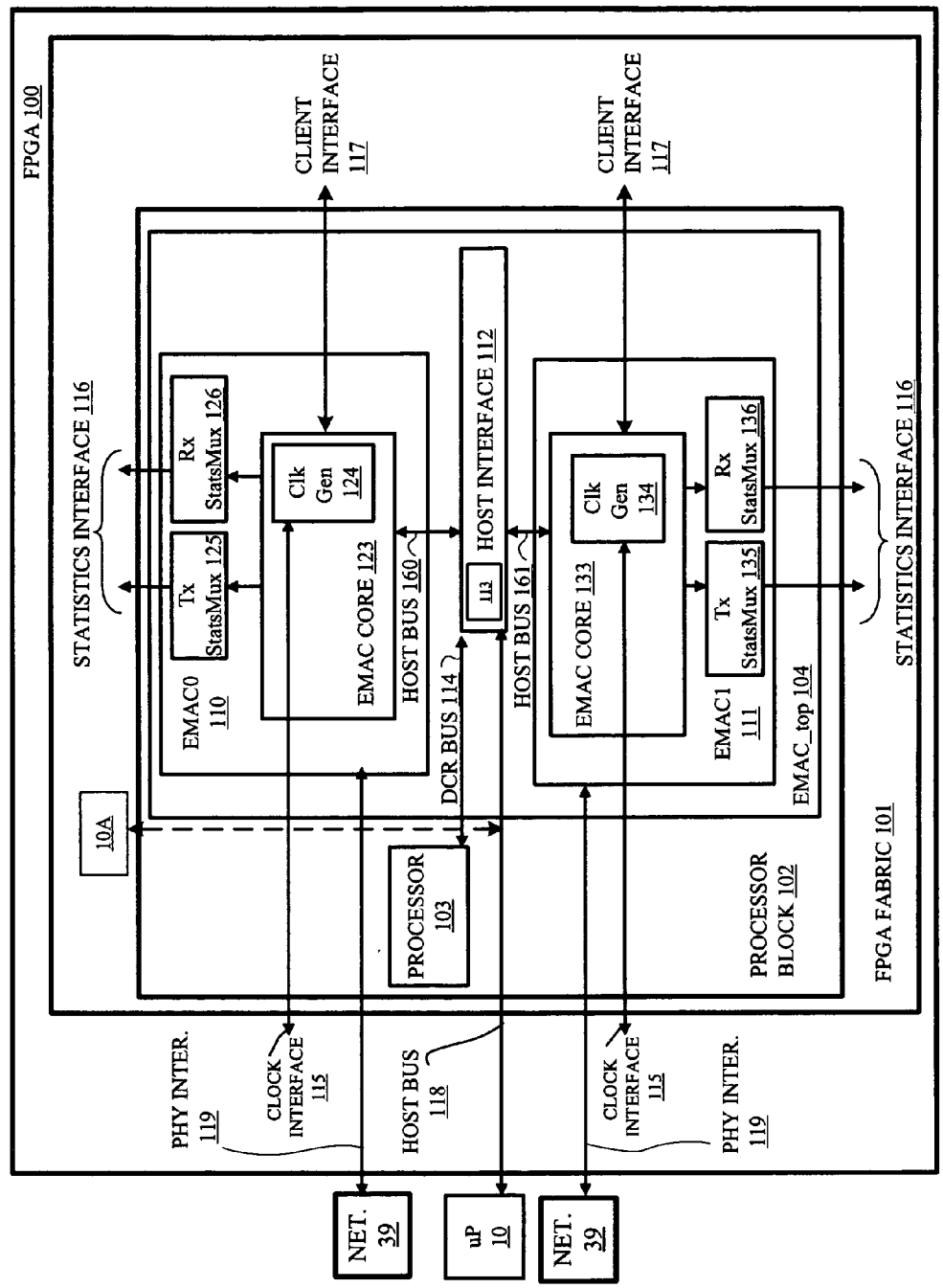
FIG. 1 is a high-level block diagram depicting an exemplary embodiment of a Field Programmable Gate Array ("FPGA").

FIG. 1 is a high-level block diagram depicting an exemplary embodiment of an FPGA 100. FPGA 100 includes FPGA programmable configurable circuitry ("FPGA fabric") 101 in which an area is reserved for an embedded processor, as well as other embedded circuitry ("hardwired"), namely, processor block 102. Notably, processor block 102 need not be for an embedded processor, but generally refers to any area on an FPGA die reserved for embedded circuitry, more generally Application Specific Integrated Circuitry ("ASIC") block 102. FPGA fabric 101 may include configurable logic configured for interfacing to one or more interfaces, such as Physical Layer ("PHY") interfaces 119, clock interface 115, host bus 118, statistics interfaces 116, and client interfaces 117, in this exemplary embodiment. Notably, the words "include" and "including", and variations thereof, as used herein shall mean including without limitation.

Processor block 102 includes the following embedded, i.e., hardwired, circuitry: processor 103, Ethernet Media Access Controller 110 ("EMAC0"), EMAC 111 ("EMAC1"), and host interface 112. Embedded processor 103 may be a PowerPC 405 core from IBM, though other known processor cores may be used. In an alternative embodiment embedded processor 103 is a the hardwired form of the MicroBlaze or PicoBlaze softcore processor from Xilinx, Inc. EMAC 110, EMAC 111 and host interface 112 are collectively referred to as the top-level EMAC ("EMAC_top") 104. EMACs 110 and 111 may be used for access to and from Ethernet 39 via PHY interface 119.

Alternatively, rather than a PHY interface 119, a transceiver, such as a Multi-Gigabit Transceiver ("MGT") or an external PHY integrated circuit may be used. Notably, though an EMAC is described herein for purposes of clarity by way of example, it should be understood that the scope is not limited to an Ethernet type of network. Accordingly, a media access controller for interfacing to any known network may be embedded in an integrated circuit having configurable logic for communication therewith.

Processor block 102 may include traces for busing. A Device Control Register ("DCR") bus 114 is described herein. DCR bus 114 is a known DCR interface for a PowerPC 405 core ("PPC core"). Though a PPC core is described herein for purposes of clarity by way of example, it should be understood that other known processor cores may be used. Furthermore, it should be appreciated that though an embedded processor is described herein, an external host processor 10 may optionally be used instead of embedded processor 103. External host processor 10 may be any of a variety of known processors. Furthermore, it should be understood that host bus 118 may optionally be coupled to an internal embedded processor, such as embedded processor 103, or a processor 10A instantiated in configurable logic of FPGA fabric 101. Notably, configurable logic may be used to instantiate a bridge between host interface 118 and processor 10A. Moreover, it should be understood that EMACs 110 and 111 may be used without any host processor, as configuration vectors may be provided via tie-off pin inputs.

EMACs 110 and 111 share a single host interface 112. Either or both of EMACs may be selected via host interface 112. Though two EMACs are shown one or more than two EMACs may be used. Host interface 112 may be used to interface to a microprocessor or other known integrated circuit external to FPGA 100. Such access to an external integrated circuit may be via host bus 118. Notably, host bus 118 is a processor platform independent host bus. In an implementation, host interface 112 may use either an EMAC host bus, such as host bus 118, or a DCR bus 114 through a DCR bridge 113, which may or may not be part of host interface 112. In other words, either host bus 118 or DCR bus 114 is used at a time.

EMAC core 123 includes clock generator/management 124. Clock generator 124 may be used to provide a transmit clock signal and a receive clock signal, among other below-described clock signals for EMAC 110. EMAC Core 133 includes clock generator 134. Clock generator 134 may be used to provide a transmit clock signal and a receive clock signal, among other below-described clock signals for EMAC 111.

As EMAC 110 and EMAC 111 are the same, only EMAC 110 will be described herein below for purposes of clarity.

Figure 1A:
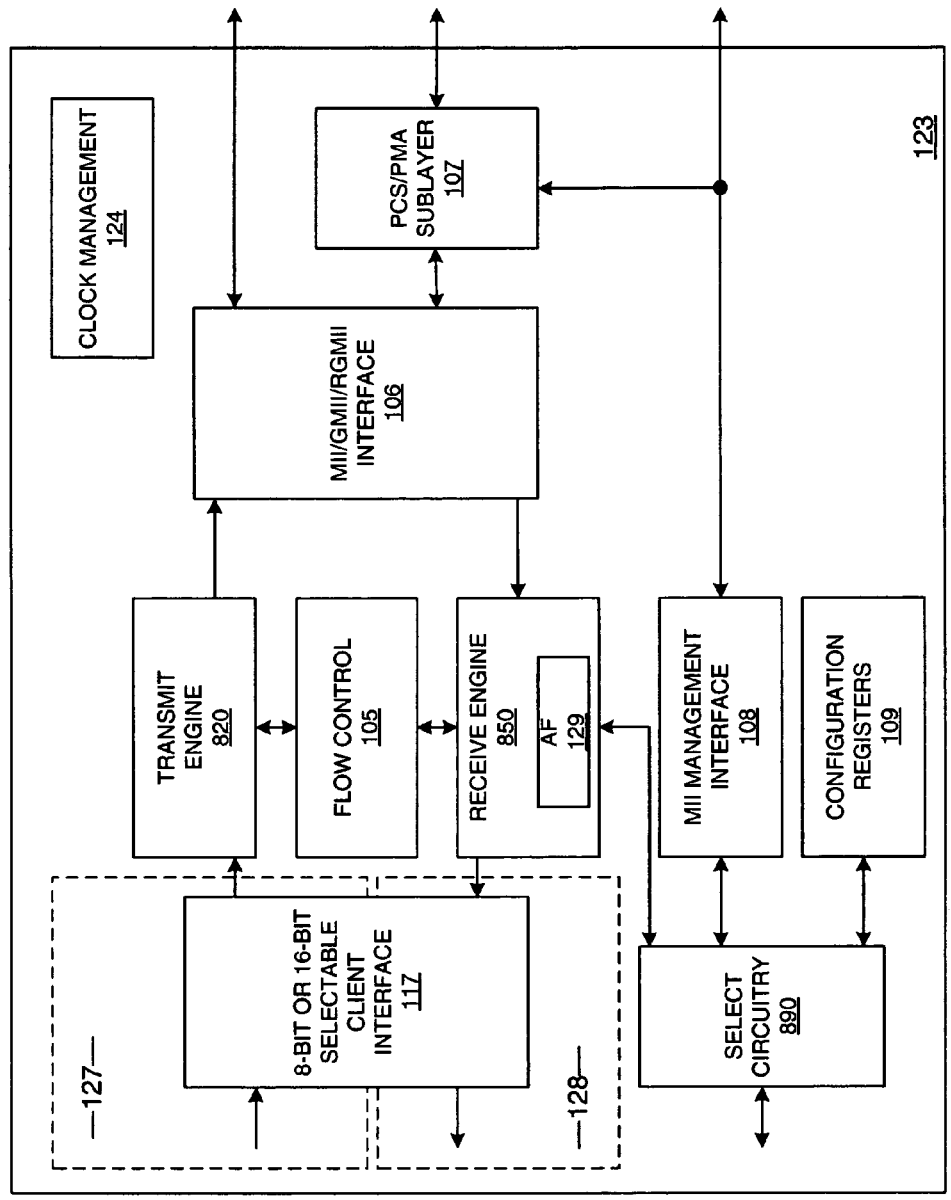
FIG. 1A is a simplified block diagram depicting an exemplary embodiment of an Ethernet Media Access Controller ("EMAC") core.

FIG. 1A is a simplified block diagram depicting an exemplary embodiment of an EMAC core 123. With simultaneous reference to FIGS. 1 and 1A, EMAC 110 is further described. Again, EMAC cores 123 and 133 are the same, so only one is described for purposes of clarity.

EMAC 110 includes EMAC core 123, transmit-side statistics multiplexer circuitry ("transmit statistics multiplexer") 125, receive-side statistics multiplexer circuitry ("receive statistics multiplexer") 126, and a client interface 117, which may be thought of as including a transmit-side client interface 127 and a receive-side client interface 128.

In an exemplary implementation of client interface 117, an 8-bit or 16-bit wide mode may be selected. Client interface 117 is coupled to transmit engine 820 and to receive engine 850. Receive engine 850 may include an address filter 129. Transmit engine 820, which may be considered part of or coupled to transmit client interface 127, is coupled to flow control 105. Receive engine 850, which may be considered part of or coupled to receive client interface 128, is coupled to flow control 105. Transmit engine 820 and receive engine 850 are coupled to MII/GMII/RGMII interface 106, which in turn may be coupled to a physical layer interface 119. MII/GMII/RGMII interface 106 may be coupled to PCS/PMA Sublayer 107, which in turn may be coupled to an MGT and may provide an MDIO interface to a physical layer interface 119 along with MII management interface 108. Receive engine 850, MII management interface 108 and configuration registers may be coupled to host interface 112 via select circuitry 890, which circuitry alternatively may be part of host interface 112.

EMAC 110 may be a multiple mode EMAC. In an exemplary implementation, EMAC 110 may support data rates of approximately 10, 100, and 1000 megabits per second and be compliant with IEEE 802.3-2002 specifications. Though EMAC 110 may operate at a single data rate, such as either approximately 10, 100, or 1000 megabits per second, it may operate as a tri-mode EMAC switching as between data rates. Notably, other data rates may be used, such as other data rates greater than 100 megabits per second.

In an exemplary implementation, EMAC 110 may support Reduced Gigabit Media Independent Interface ("RGMII") protocol for use with double data rate ("DDR") operation thereby reducing width of a data bus to an external physical layer interface, such as physical layer interface 119. A Physical Medium Attachment ("PMA") sub-layer may be used with a Multi-Gigabit Transceiver ("MGT") of FPGA 100 to provide an on-chip 1000BASE-X implementation. MGTs that may be used are shown in FIG. 10, for example.

An embedded EMAC may operate with a Media Independent Interface ("MII"), a Gigabit MII ("GMII"), or a PCS/PMA to an MGT. The input/output ("I/O") pins for these physical layer (PHY) interfaces 119 cross the ASIC-FPGA boundary to the I/O cells or MGT driver cells located in FPGA 100. Notably, EMAC 110 may use one and only one set of PHY interface pins at a time, and thus only one physical layer interface 119 interfacing, such as for MII, GMII, or MGT, is done at a time.

Meanwhile, processor block 102 has a limited number of I/O pins available for EMAC 110 due to routing channel constraints in FPGA 100. Hence, PHY interface I/O pins are re-used for the different interfaces, such as for a RGMII, an MII, a GMII, a 1000BASE-X, and a Serial Gigabit Media Independent Interface ("SGMII"). In an exemplary implementation, a total reduction of approximately 78 I/O pins on a PHY interface 119 may be achieved, along with output pin reductions in a statistics interface 116, as described below in additional detail. In this exemplary implementation, this reduction in pin count facilitated adding another embedded EMAC, namely, EMAC 111, in a processor block 102 of a pre-existing dimension. Thus, for example, EMAC 110 may have approximately 57 to 61 pins for a physical layer interface 119.

EMAC 110 may be configured to generate statistics on data traffic. For example, at the end of each transmitted or received frame, EMAC 110 may output a statistics vector for a frame to logic, which may be instantiated in FPGA fabric 101, for accumulation. However, statistics accumulation may be independent of the transmitted or received frame provided that each accumulation completes before the next statistics output so that no statistics vector is missed.

Because processor block 102 has a limited number of I/O pins as mentioned above, statistics interface 116 may output a statistics vector in a number of bits at a time, which is smaller than the length of a statistics vector. This output may be done over several cycles instead of in one cycle to reduce the number of output pins used to provide statistics interface 116. For two EMACs 110 and 111, output pins for statistics interfaces 116 may be reduced by approximately 102 pins in an exemplary implementation. Along with PHY interface I/O pins reduction, statistics interface pin reduction may facilitate integration of more than one EMAC in an ASIC block 102.

EMAC 110 includes address filter 129 to accept or reject incoming frames on a path coupled to receive client interface 128. Thus, for example, bi-directional traffic is communicated on physical interface 119 to EMAC core 123 which traffic, either transmit or receive traffic, is obtained from transmit client interface 127 or provided to receive client interface 128 and address filter 129, respectively. EMAC core 123 is configured to provide statistics vectors, whether receive statistics vectors or transmit statistics vectors, for multiplexing by transmit statistics multiplexer 125 and receive statistics multiplexer 126, respectively. Configurable logic of FPGA fabric 101 may be configured to accumulate statistics provided from EMAC 110.

On the physical layer interface side of EMAC 110, GMII and MII interfaces use standard input/outputs ("I/Os") to access data and control signals to a network connection via physical layer interface 119, in which an additional PHY integrated circuit may be disposed between PHY interface 119 and the physical medium (i.e., Ethernet lines). In addition, EMAC 110 physical layer interface 119 can be configured for a Physical Coding Sublayer (PCS) and a PMA sub-layer ("PCS/PMA") interface which may use a serializer-deserializer ("SERDES") to access a data signal serially. A SERDES may be instantiated in programmable IOBs, such as IOBs 2904 of FIG. 10. An example of a SERDES that may be instantiated is described in additional detail in a co-pending U.S. patent application entitled, "MULTI-PURPOSE SOURCE SYNCHRONOUS INTERFACE CIRCUITRY", by Paul T. Sasaki, et al., U.S. patent application Ser. No. 10/919,901, filed Aug. 17, 2004, which is incorporated by reference herein in its entirety.

Flow control module 105 may be used to avoid or reduce congestion in EMAC 110 from communication traffic. MIIM interface may allow a processor access to control and status registers in the PCS layer when configured in a 1000BASE-X or Serial Gigabit Media Independent Interface ("SGMII") mode.

Clock generator 124 facilitates EMAC 110 to operate in different modes, for example such as GMII, MII, RGMII, SGMII, and 1000BASE-X modes. Furthermore, clock generator 124 facilitates EMAC 110 to operate at one of three different speeds, for example such as 10,100, or 1000 megabits per second, or other high data rate for "overclocking."

It should be understood that in contrast to an EMAC instantiated in configurable logic, with the embedding of EMAC 110 as dedicated circuitry there is an FPGA fabric 101/EMAC 110 boundary with which to contend. Notably, this boundary is different than interfacing to an embedded processor, which conventionally has a general purpose interface, as an embedded EMAC 110 has special purpose interfacing. However, as described below, EMAC 110 interfacing is configured in part to provide a general purpose communication client-side interface to FPGA fabric 101.

For dynamically reconfigurable logic, such general purpose communication client-side interface facilitates coupling different user-design instantiations without redesign thereof to accommodate EMAC 110. In other words, the interface between EMAC 110 and a user-defined instantiated design in FPGA fabric 101 may be independent of one another.

Implementation of an embedded EMAC core 123 in processor block 102 facilitates use of processor 103 as a host processor. To accomplish this, a host interface 112, including a DCR bridge 113 and supporting logic, is provided. Notably, DCR bridge 113 may be external to host interface 112. In addition, host interface 112 allows for a host processor, embedded in or external to FPGA 100, to manage EMAC configuration registers using a host bus 118 supported by EMAC 110. This usage is in contrast to use of processor 103 via a DCR bridge 113 and DCR bus 114.

When DCR bus 114 is used as a host bus, DCR bridge 113 translates commands carried over DCR bus 114 into EMAC host bus signals. These signals are then input into at least one of EMAC 110 and 111. In an exemplary implementation, DCR bridge 113 includes four device control registers, two of which are used as data registers, such as respective 32 bit wide data registers. Another is used as a control register. The fourth device control register is used as a ready status register. A host processor, such as processor 103, polls this fourth device control register to determine access completion status. Bits in this fourth device control register are asserted when there is no access in progress. When an access is in progress, a bit corresponding to the type of access is automatically de-asserted. This bit is automatically re-asserted when the access is complete.

Alternatively, host interface 112 may provide an interrupt request to inform a host processor, such as processor 103 or an external host processor 10, of an access completion. A user may select to use either polling or interrupting to inform a host processor of access status.

Notably, transmit client interface 127 and receive client interface 128 each may operate in respective clock domains. Processor, such as processor 103, as associated with host interface 112 may operate in a separate clock domain too. Notably, by clock domain it is not meant to imply that the frequencies are different, though they may be the same or different frequencies, but rather that clocking may be asynchronous with respect to separate clock domains.

Soft EMAC

Figure 2A:
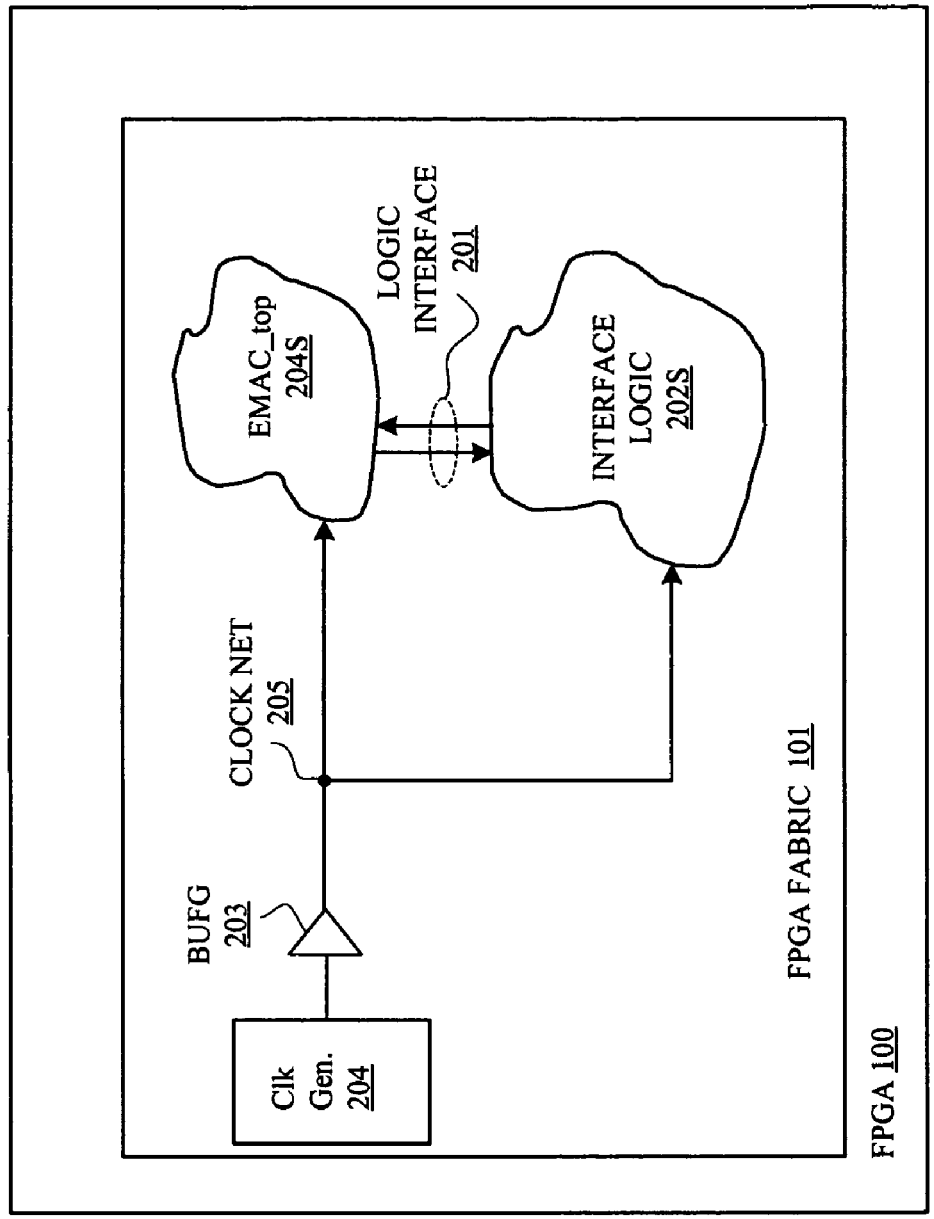
FIG. 2A is a high-level block diagram depicting an exemplary embodiment of an instantiation of an EMAC in configurable logic.

FIG. 2A is a high-level block diagram depicting an exemplary embodiment of a "soft" EMAC ("EMAC_top") 204S. EMAC_top 204S and interface logic 202S is a program core that may be instantiated in configurable logic of FPGA 100. Notably, EMAC_top 104 of FIG. 1 may be designed using a hardware description language, such as VHDL or Verilog, among others. Accordingly, EMAC_top 104 of FIG. 1 may be an ASIC conversion of hardware description language code, whereas EMAC_top 204S may be an FPGA program code conversion of part of such hardware description language code. Thus, EMAC_top 104 and interfaces thereto of FIG. 1 may be provided in part as a design listing for subsequent instantiation in configurable logic of a programmable logic device. However, EMAC_top 204S is not just a repeat of EMAC 104 though in instantiated as opposed to embedded form, as a clock generator 204 in contrast to clock generator 124, is external to an EMAC.

Logic interface 201 couples EMAC_top 204S to interface logic 202S. Interface logic 202S is instantiated in configurable logic of FPGA fabric 101. Interface logic 202S is a program core for instantiating interfaces, such as configurable logic versions of client interface 117 and physical layer interface 119 of FIG. 1, in configurable logic. In an exemplary implementation, logic 202S may be a relatively fast FIFO for hold transmit and receive data packets from a client interface of EMAC_top 204S.

A clock signal is provided from clock generator 204 to a clock distribution network ("clock tree") of FPGA fabric 101, which is generally indicated as chip-global distribution circuitry ("BUFG") 203 coupled to clock network 205, for clock signal distribution to EMAC_top 204S and interface logic 202S.

With simultaneous reference to FIGS. 1, 1A and 2A, it should be understood that because clock generator 124 is inside EMAC core 123, there is a clock buffering unknown propagation delay when the clock goes through a design instantiated in FPGA fabric 101. Thus, an unknown propagation delay of a clock signal going from an ASIC EMAC to a user instantiated design in FPGA fabric 101 may be handled by sending a clock out of such EMAC and then buffered and sent back into such EMAC, and for EMAC core 123, a clock interface is provided as described below in additional detail. In contrast, when a clock generator 204 is instantiated in FPGA fabric 101, such as along with a user design, a known clocking relationship exists by using FPGA fabric 101 clock network 205 resources. So such clock signal need not go into and out of an EMAC instantiated in configurable logic.

Clock Interface

A clock network may introduce clock skew. With respect to a clock network in FPGA fabric 101, such skew may be unknown. Handling skew from clock signal distribution in FPGA fabric 101 is described below in additional detail.

For an EMAC system instantiated in configurable logic, all of the logic for EMAC_top 204S and interface logic 202S may be in FPGA fabric 101. Clock signals are routed to EMAC_top 204S and interface logic 202S with FPGA clock networks, such as clock network 205. As a result, due to known clock buffering and routings in FPGA 100, the clock skews between EMAC_top 204S and interface logic 202S may be controlled within a tolerance range.

However, in EMAC 110 of FIG. 1, a clock network includes a balanced clock tree with known and fixed delays throughout. In contrast, a clock network in FPGA fabric includes a clock driver and clock network routings. The delay of a clock signal through an FPGA fabric clock network is dependent on FPGA design implementation. As a result, there is an uncontrolled amount of clock skew between EMAC ASIC logic and FPGA configurable logic at the "ASIC-FPGA" interface. Furthermore, in an exemplary implementation, EMAC 110, including clock generator 124, is implemented in processor block 102 with standard cells, and the same standard cells are not used to implement configurable logic in FPGA fabric 101. In other words, clock tree routing in FPGA fabric 101 and processor block 102 are different.

By feeding back an FPGA fabric clock into EMAC 110 to account for design specific clock delay in a user-instantiated design in FPGA configurable logic and to use a delay cell in the input datapath in EMAC 110 as described herein, clock skew introduced by an EMAC clock tree may be compensated.

For purposes of clarity, only ASIC versions of EMAC_top 104 embedded in an FPGA 100 are described hereinafter, as a configurable logic instantiated version of EMAC_top 104 will be apparent from description of an ASIC version thereof.

Figure 2B:
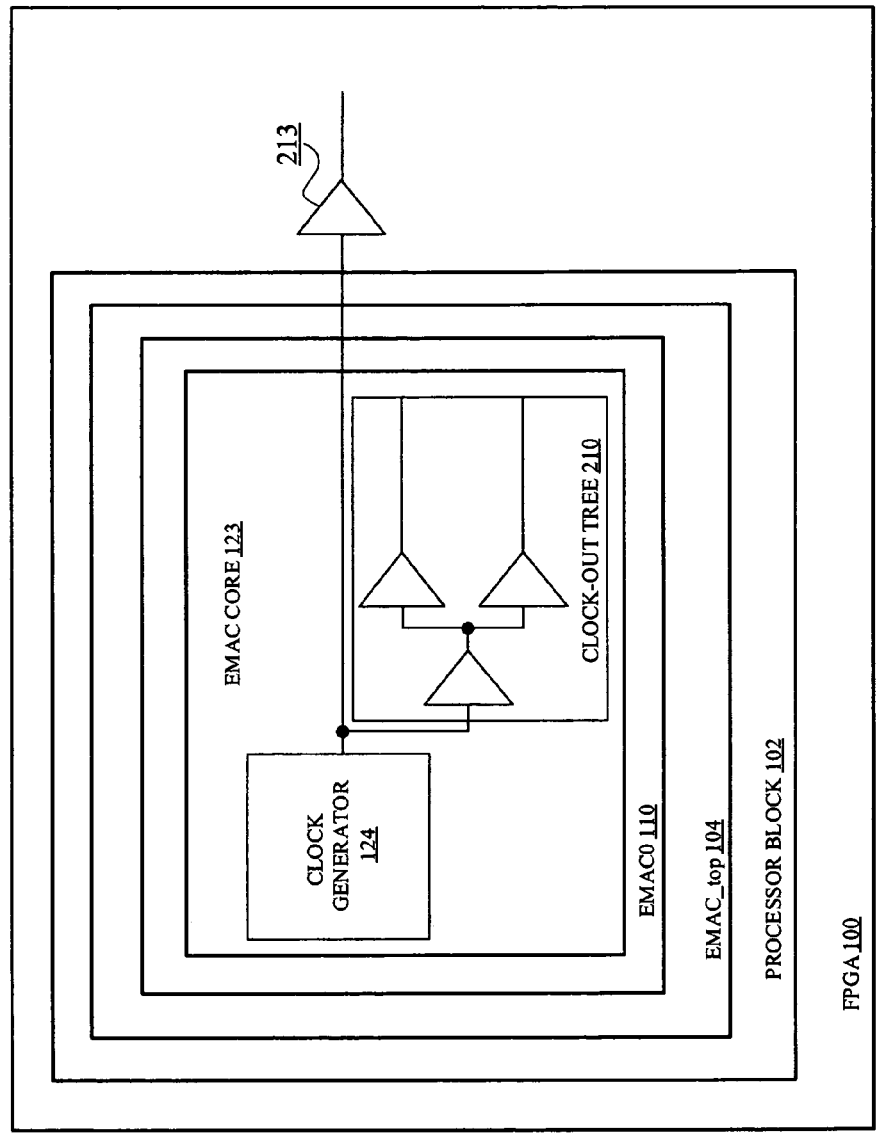
FIG. 2B is a high-level block diagram depicting an exemplary embodiment of an FPGA having an embedded EMAC system.

FIG. 2B is a high-level block diagram depicting an exemplary embodiment of an FPGA 100 having an embedded EMAC system. More particularly shown is EMAC core 123 having a clock generator 124 and a clock-output tree 210. A clock signal provided from clock generator 124 is sent to clock-output tree 210 and separately to a clock tree 213, which is generally shown as a global buffer ("BUFG") driver. Thus, the clock signal output from clock generator 124 may be provided external to processor block 102 but internal to FPGA 100 where it is driven by BUFG driver 213.

A clock signal output from BUFG driver 213 is routed through a clock network provided for in conventional FPGA clock routing, as previously described. However, in the ASIC implementation of EMAC core 123, clock-output tree 210 is used to drive a clock signal output from clock generator 124.

It should be appreciated that the output from clock-output tree 210 and the output from BUFG driver 213 may be skewed with respect to one another because a design implemented in FPGA fabric external to processor block 102 is user-dependent, and thus the amount of clock loading may not be known in advance when implementing clock-output tree 210. Though FIG. 2B only shows EMAC 110, the above description applies equally to EMAC 111.

Figure 2C:
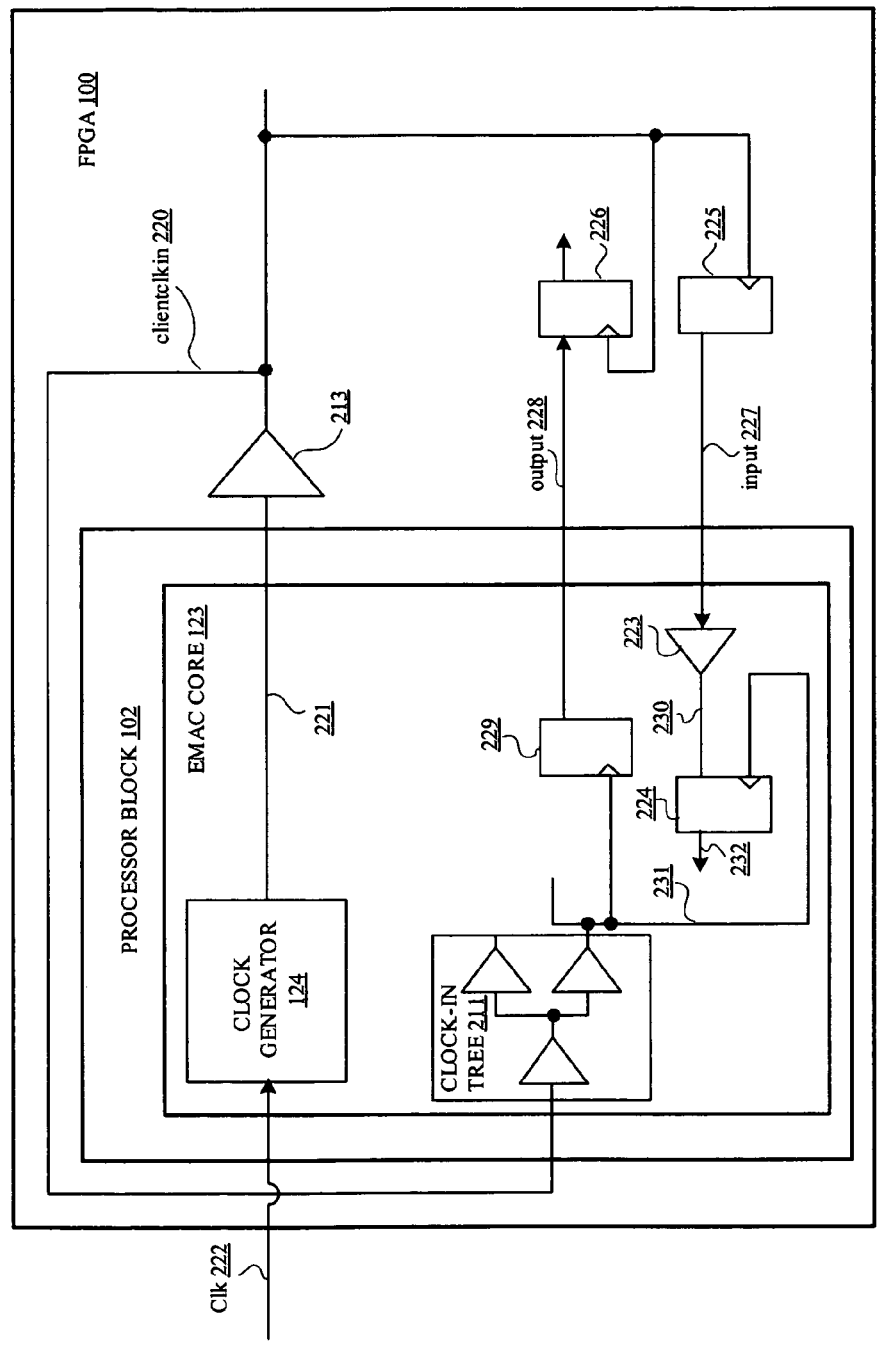
FIG. 2C is a high-level block/schematic diagram depicting an exemplary embodiment of a clock tree for an EMAC core.

FIG. 2C is a high-level block/schematic diagram depicting an exemplary embodiment of a clock tree for EMAC core 123. Clock generator 124 outputs clock signal 221 to BUFG driver 213. Output clock signal from BUFG driver 213 is provided as a feedback clock signal ("CLIENT-CLKIN") 220. Clock generator 124 generates an output clock signal 221 responsive to a reference clock signal 222, which may be provided from a clock source external to FPGA 100. Client clock input signal 220 is fed back to EMAC core 123, and more particularly to clock-input tree 211 of EMAC core 123.

Accordingly, having a clock signal go through a clock network in FPGA fabric responsive to a user-instantiated design, generally indicated as BUFG driver 213, there will be some clock loading. Thus, output signal 231 may be out of phase with respect to client clock input signal 220.

Referring to FIG. 2D, there is shown an exemplary embodiment of signal timing for signals of FIG. 2C. With simultaneous reference to FIGS. 2C and 2D, signals of FIG. 2C are further described. A phase difference 233 between signals 220 and 231 will be less than the total delay of a delay cell of EMAC core 123 used to compensate for this known phase difference 233. The total delay of the delay cell is slightly larger than the total clock tree delay 233 due at least in part to setup time which should taken into account.

Client clock input signal 220 is used to clock flip-flops 226 and 225. Clock output signal 231 from clock-input tree 211 is used to clock flip-flops 229 and 224 of EMAC core 123. Data output of flip-flop 229, namely output signal 228, thus will be active for a period equivalent to a period of clock signal 231. Output of flip-flop 225, namely EMAC core input signal 227, will have an active ("high") time equivalent to a period of clock signal 220.

Input clock signal 227 is provided to a buffer 223 of EMAC core 123 to provide a delay. Output signal 230 is a compensated delay output signal which may be used as a data input to flip-flop 224 driven by clock signal 231 to provide a data output 232 for clocking EMAC 110.

By feeding back FPGA fabric clock network loaded clock signal 220 to drive clock-input tree 211 of ASIC EMAC core 123, clock skew between ASIC EMAC core 123 and FPGA fabric 101 due to clock network loading of client clock input signal 220 may be taken into account. Output signal 231 of ASIC input-clock tree 211 is skewed by a known clock tree delay in an ASIC implementation. This clock skew is compensated by one or more delay cells, such as one or more buffers 223, for instances of data inputs from FPGA fabric 101 to EMAC core 123, such as via register ("flip-flop") 225 clocked by FPGA fabric 101 loaded clock signal 220. For instances of data outputs from EMAC core 123 to FPGA fabric 101, such as via register 226 clocked responsive to loaded clock signal 220, output data 228 may be captured by register 226. Notably, registers 224 and 229 are merely representative of circuits in EMAC 110, and are not the actual circuits, which are described below in additional detail. Accordingly, registers 224 and 229 are generally representative of how the EMAC clock domain may work. Moreover, registers 226 and 225 represent a user-instantiated design, and thus may not be the actual circuits implemented by a user.

Embedded ("hardwired") EMACs implemented in standard cells generally have more than twice the performance of supporting logic implemented FPGA fabric 101. To take advantage of this increase in performance, in an exemplary implementation, client interface 117 at the ASIC-FPGA fabric boundary is configured to run EMAC 110 at approximately twice the clock frequency of the supporting logic programmed in configurable logic. To maintain throughput, client interface 117 datapath width is doubled to compensate for the supporting logic running at half the clock frequency. Client interface 117 allows for EMAC 110 to run at the same clock frequency as the supporting logic in FPGA by using half the allocated datapath width.

Figure 2E:
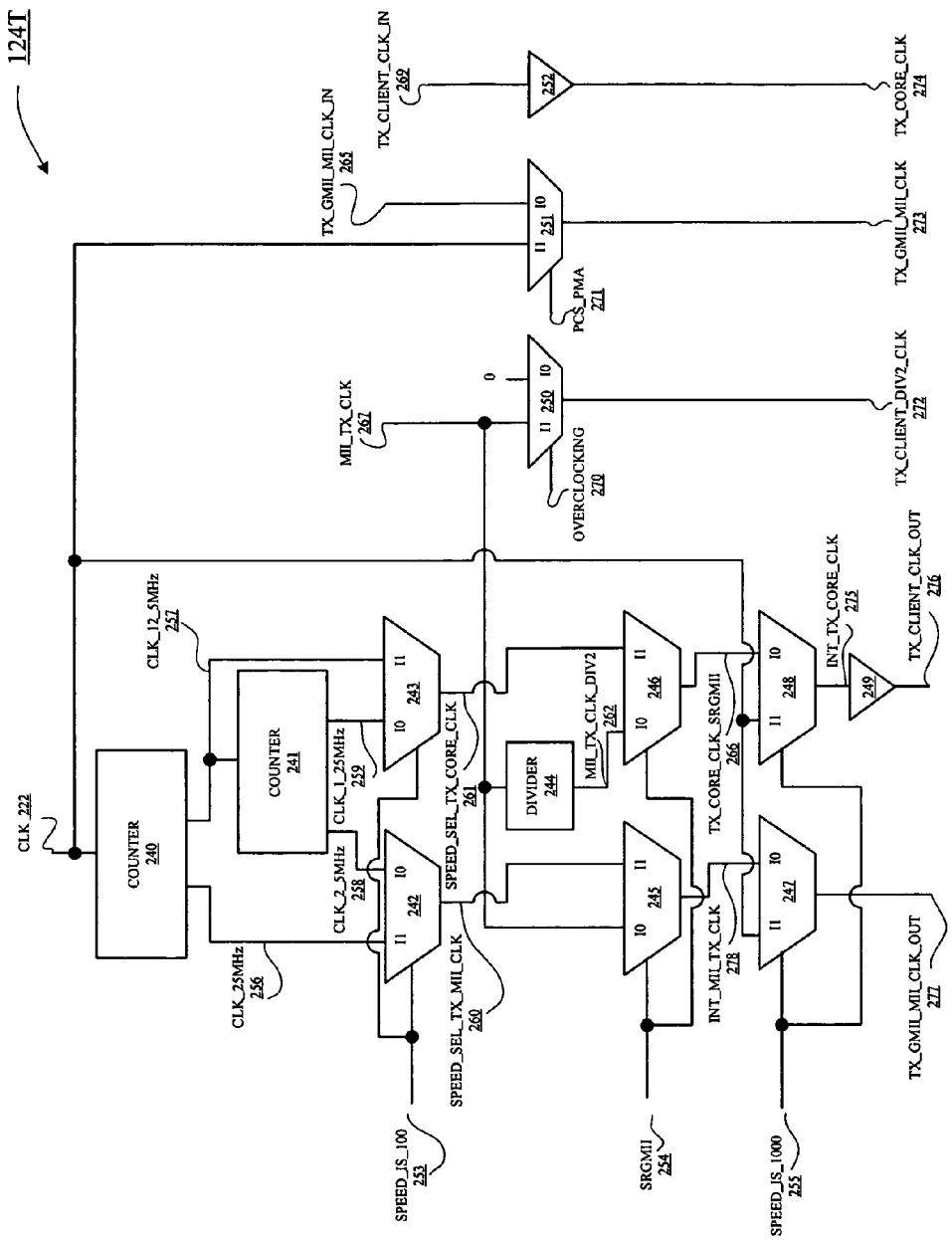
FIG. 2E is a block/schematic diagram depicting an exemplary embodiment of a transmit clock generator.

FIG. 2E is a block/schematic diagram depicting an exemplary embodiment of a transmit clock generator 124T of clock generator 124. For example client output clock ("clientclkout") signal 221 of FIG. 2C could corresponds to transmit GMII/MII output clock ("TX_GMII_MII_CLK_OUT") signal 277 and transmit client clock output ("TX_CLIENT_CLK_OUT") signal 276, and client input clock ("clientclkin") signal 220 could correspond to transmit GMII/MII input clock ("TX_GMII_MII_CLK_IN") signal 265 and transmit client input clock ("TX_CLIENT_CLK_IN") signal 269.

Responsive to EMAC 110 operating in an "overclocking" mode, such as a 16-bit overclocking mode, MII transmit clock input ("MII_TX_CLK") signal 267 is not used; hence, the input clock pin for MII_TX_CLK signal 267 may be used to bring in a divided by two clock signal from a DCM, as described below in additional detail with reference to FIG. 3.

With continuing reference to FIG. 2E, clock signal 222 is provided to a counter 240, multiplexer 247, multiplexer 248, and multiplexer 251. Counter 240, as well as counter 241, may be Johnson counters for tracking a logic one. For purposes of clarity by way of example, it will be assumed that clock signal 222 has a frequency of approximately 125 MHz. All frequencies provided herein below are approximate, and actual frequency used depends upon implementation.

Counter 240 provides a divide by 5 clock signal ("CLK_25 MHz") 256 at 25 MHz and a divided by 10 clock signal ("CLK_12_5 MHz") 257 at 12.5 MHz. Counter 240 provides signal CLK_25 MHz 256 to a multiplexer 242 as input. CLK_25 MHz 256 is provided to a logic 1 input ("input I1") of multiplexer 242. By a logic 1 ("logic high") input of a multiplexer, it is meant that to select that input for output from the multiplexer, a control signal will be a logic 1. Counter 240 provides signal CLK_12_5 MHz 257 to a counter 241 and to a multiplexer 243 as input. CLK_12_5 MHz 257 is provided to a logic 1 ("logic high") input I1 ("input I1") of multiplexer 243.

Clock signal 222 is provided to a logic 1 input of multiplexers 247, 248, and 251. Tx_GMII_MII_Clk_IN signal 265 is provided to a logic 0 input of multiplexer 251.

Counter 241 provides a divided by 5 clock ("CLK_2_5 MHz") signal 258 at 2.5 MHz and a divided by 10 clock ("CLK_1_25 MHz") signal 259 at 1.25 MHz. Counter 241 provides CLK_2_5 MHz signal 258 to a logic low input of multiplexer 242. Counter 241 provides CLK_1_25 MHz signal 259 to a logic 0 ("logic low") input of multiplexer 243 as input. By a logic 0 ("logic low") input of a multiplexer, it is meant that to select that input for output from the multiplexer, a control signal will be a logic 0.

A speed select ("Speed_Is_100") signal 253 is provided to multiplexer 242 and to multiplexer 243 as control input. When Speed_Is_100 signal 253 is logic 1, multiplexer 242 selects CLK_25 MHz signal 256, input I1, for output, and multiplexer 243 selects CLK_1_25 MHz signal 259, input I0, for output. When select Speed_Is_100 signal 253 is logic 0, multiplexer 242 selects CLK_2_5 MHz signal 258, input I0, for output, and multiplexer 243 selects CLK_12_5 MHz signal 257, input I1, for output.

Multiplexer 242 provides a transmit speed clock selected ("SPEED_SEL_TX_MII_CLK") signal 260 as output. Multiplexer 243 provides a transmit speed core clock selected ("SPEED_SEL_TX_CORE_CLK") signal 261 as output for setting transmit speed of an EMAC. Speed select signal 253 may be used for selecting an input signal 256 or 258 for a transmit speed selected for MII clock ("SPEED_SEL_TX_MII_CLK") signal 260 output of multiplexer 242 and an input signal 259 or 257 for a transmit speed selected core clock output ("SPEED_SEL_TX_CORE_CLK") signal 261 of multiplexer 243. SPEED_SEL_TX_MII_CLK signal 260 is provided to a logic high input of multiplexer 245. SPEED_SEL_TX_CORE_CLK signal 261 is provided to a logic high input of multiplexer 246.

An MII transmit clock ("MII_TX_CLK") signal 267 is provided to multiplexer 250, multiplexer 245, and divider 244. MII transmit clock signal 267 is provided to multiplexers 250 and 245 at respective logic high inputs thereof. Divider 244 provides a divided by two clock ("MII_TX_CLK_DIV2") signal 262 to a logic high input of multiplexer 246.

A Serial Gigabit or Reduced Media Independent Interface ("SRGMII") select signal 254 is provided to multiplexer 245 and to multiplexer 246 as control input. Responsive to SRGMII select signal 254 being a logic 0, multiplexer 245 selects MII_TX_CLK signal 267 for output and multiplexer 246 selects MII_TX_CLK_DIV2 signal 262 for output. Responsive to SRGMII select signal 254 being a logic 1, multiplexer 245 selects SPEED_SEL_TX_MII_CLK signal 260 for output and multiplexer 246 selects SPEED_SEL_TX_CORE_CLK signal 261 for output.

Multiplexer 245 provides an internal MII transmit clock ("INT_MII_TX_CLK") signal 278 as output. Multiplexer 246 provides an SRGMII transmit core clock ("TX_CORE_CLK_SRGMII") signal 266 as output. Internal clock signal 278 is provided to a logic low input of multiplexer 247. Transmit clock signal 266 is provided to a logic low input of multiplexer 248.

A speed select ("SPEED_IS_1000") signal 255 is provided to multiplexer 247 and to multiplexer 248 as control input. Responsive to speed select signal 255 being a logic 1, multiplexers 247 and 248 both select clock signal 222 for output. Responsive to speed select signal 255 being a logic 0, multiplexer 247 selects INT_MII_TX_CLK signal 278 for output and multiplexer 248 selects TX_CORE_CLK_SRGMII signal 266 for output. Alternatively, speed select signal 255 may be referred to as a SPEED_IS__100 with logic high and low inputs of multiplexers 247 and 248 reversed in FIG. 2E.

Multiplexer 247 provides a transmit output clock ("TX_GMII_MII_CLK_OUT") signal 277 as output. Multiplexer 248 provides an internal transmit core clock ("INT_TX_CORE_CLK") signal 275 as output. Internal core clock signal 275 is provided to a buffer 249 as input. Buffer 249 provides a transmit client output clock ("TX_CLIENT_CLK_OUT") signal 276 as output.

An overclocking mode select signal 270 is provided to multiplexer 250 as a control input. Responsive to overclocking mode select signal 270 being a logic 1, multiplexer 250 selects an MII transmit clock ("MII_TX_Clk") signal 267 for output therefrom. Responsive to overclocking mode select signal 270 being a logic 0, multiplexer 250 selects a logic 0, tied to a logic low input of multiplexer 250, for output. Output of multiplexer 250 is a divided by two transmit client clock ("TX_CLIENT_DIV2_CLK") signal 272, which may be disabled by selecting an input of multiplexer 250 tied to ground.

A PCS/PMA mode select ("PCS_PMA") signal 271 is provided to multiplexer 251 as a control input. Responsive to PCS/PMA select signal 271 being a logic 1, multiplexer 251 selects clock signal 222 for output. Responsive to PCS/PMA 271 select signal being a logic 0, multiplexer 251 selects TX_GMII_MII_CLK_IN signal 265 for output. Multiplexer 251 provides a GMII/MII transmit clock ("TX_GMII_MII_CLK") signal 273 as output.

A transmit client clock ("TX_CLIENT_CLK_IN") signal 269 is provided to a buffer 252. Buffer 252 provides a transmit core clock ("TX_CORE_CLK") signal 274 as output.

Notably, in an implementation of EMAC 110, EMAC 110 is a tri-mode MAC, namely, frequency of operation may be switched on the medium from approximately 1000, to 100, to 10 Mb/s. This translates into switching the system clock. Host interface 112 handles this switching. To control switching of clocks to avoid creating an unwanted pulse, clocks are only switched during a low period of the clocks. For this switching in an exemplary implementation, multiplexers 242, 243, 245, 246, 247, 248, 250, and 251 may be what is known as on-chip global buffer multiplexers, an example of which is described with reference to FIG. 2F-1.

Figures 1, 2F:
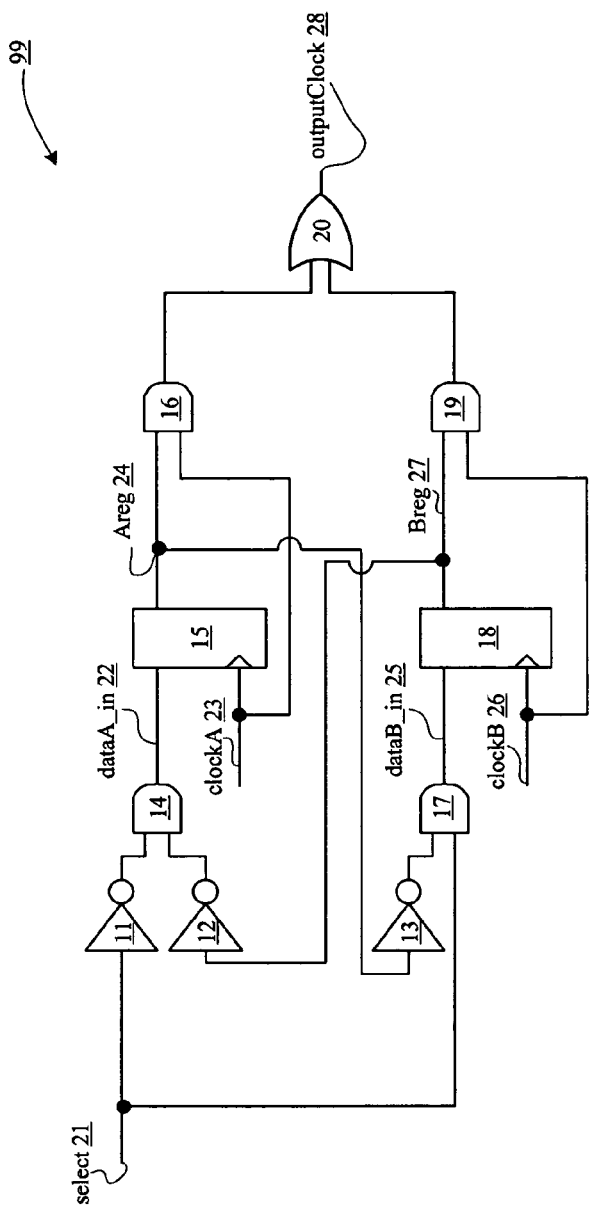

FIG. 2F-1 is a schematic diagram depicting an exemplary embodiment of an on-chip global buffer multiplexer 99. A select signal 21 is provided to inverter 11 and to an input of an AND gate 17. Inverter 11 provides an inverted version of signal 21 to an input of an AND gate 14. Another input to AND gate 14 is provided by an inverter 12. Another input to AND gate 17 is provided by an inverter 13.

AND gate 14 provides an input data A signal ("dataA_in") 22 as output. AND gate 17 provides an input data B signal ("dataB_in") 25 as output. Input data A signal 22 is provided to a data input of a register 15. Input data B signal 25 is provided to a data input of a register 18.

A clock A signal ("clockA") 23 is provided to a clock input of register 15 and to an input of an AND gate 16. A clock B signal ("clockB") 26 is provided to a clock input of register 18 and to an input of an AND gate 19. Register 15 provides a register A signal ("Areg") 24 as output. Register 18 provides a register B signal ("Breg") 27 as output. Areg signal 24 is provided to another input of AND gate 16. Breg signal 27 is provided to another input of AND gate 19.

AND gate 16 provides ANDed Areg signal 24 and clockA signal 23 to an input of an OR gate 20. AND gate 19 provides ANDed Breg 27 signal and clockB signal 26 to another input of OR gate 20. OR gate 20 provides an output clock signal ("outputClock") 28 as output of on-chip global buffer multiplexers 99.

Figures 2, 2F:
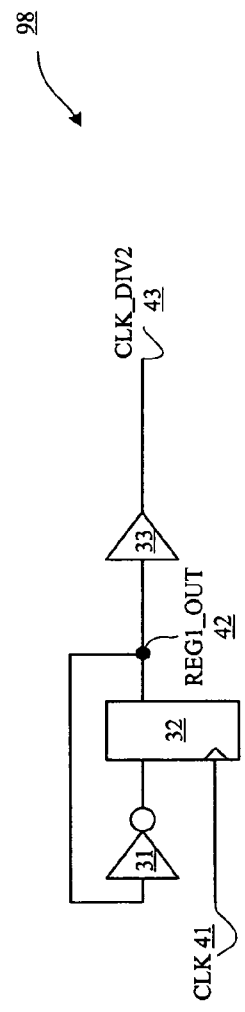

FIG. 2F-2 is a schematic diagram depicting an exemplary embodiment of a divider circuit 98, which may be used in an implementation for divider 244 of FIG. 2E. A clock signal 41 is provided to a clock input of a register 32. A data input to register 32 is provided by an inverter 31. Register 32 provides a register output signal ("Reg1_Out") 42 as output. Register output signal 42 is provided to buffers 31 and 33 as input. Buffer 33 provides a divided by 2 clock signal ("CLK_DIV2") 43 as output of divider 98.

Figure 2G:
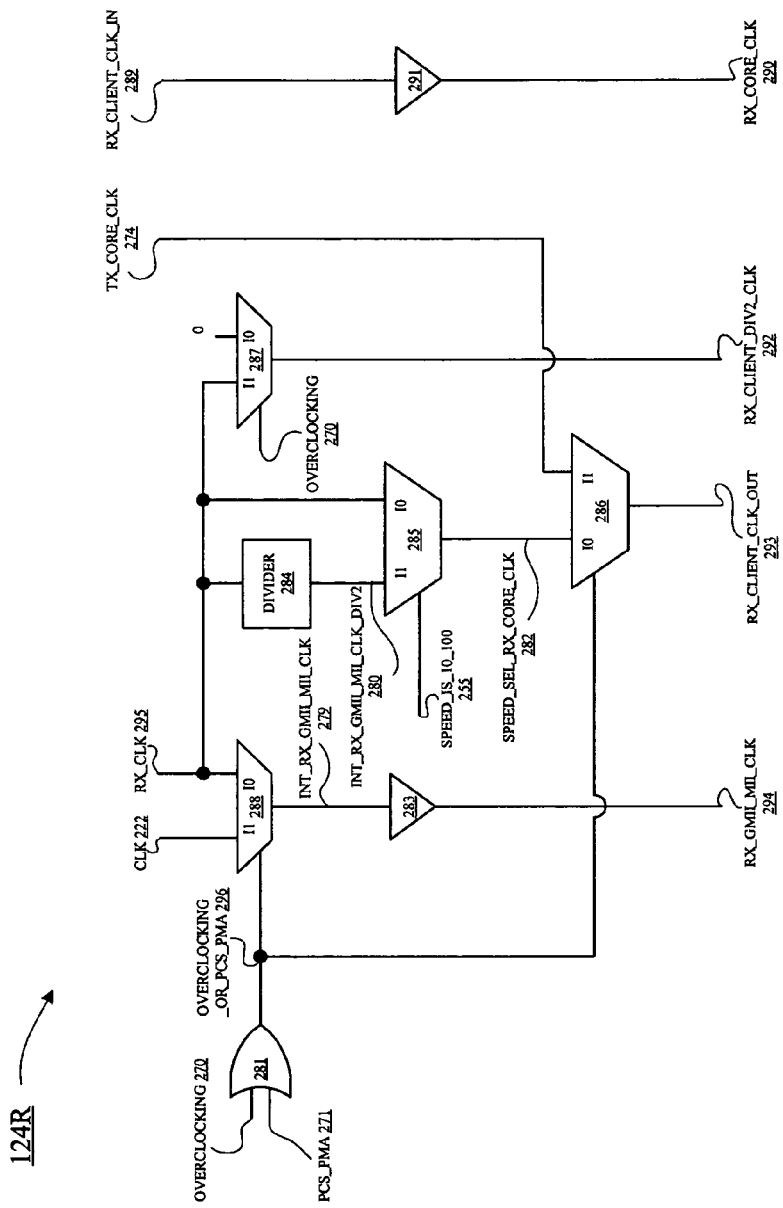
FIG. 2G is a block/schematic diagram depicting an exemplary embodiment of a receive clock generator.

FIG. 2G is a block/schematic diagram depicting an exemplary embodiment of a receive clock generator 124R. Receive clock generator 124R is a part of clock generator 124. Receive clock generator 124R includes multiplexers 285, 286, 287 and 288, divider 284, buffers 283 and 291, and OR gate 281. In an exemplary implementation, multiplexers 285, 286, 287, and 288 are on-chip global buffer multiplexers, an example of which is illustratively shown in FIG. 2F-1, and divider 284 may be a divider as illustratively shown in FIG. 2F-2.

Overclocking mode signal 270 is provided as an input to an OR gate 281. PCS/PMA mode signal 271 is provided as another input to OR gate 281. OR gate 281 outputs ORed overclocking mode signal 270 and PCS/PMA mode signal 271 as a mode select ("OVERCLOCKIN_OR_PCS_PMA") signal 296. Select signal 296 is provided to a multiplexer 288 and to a multiplexer 286 as control input.

Clock signal 222 is provided to multiplexer 288 at a logic 1 input thereof. A receive clock ("RX_CLK") signal 295 is provided to multiplexer 288, divider 284, multiplexer 285, and multiplexer 287 as an input.

Receive clock signal 295 is provided to multiplexers 285 and 288 at respective logic 0 inputs and to multiplexer 287 at a logic 1 input. Responsive to select signal 296 being in a logic 1 state, multiplexer 288 selects clock signal 222 for output. Responsive to select signal 296 being in a logic 0 state, multiplexer 288 selects receive clock signal 295 for output. Multiplexer 288 provides an internal receive GMII/MII clock ("INT_RX_GMII_MII_CLK") signal 279 as output.

Internal receive GMII/MII clock signal 279 is provided to a buffer 283 as input. Buffer 283 provides a receive GMII/MII clock ("RX_GMII_MII_CLK") signal 294 as output.

Divider 284 provides a divided by two internal receive GMII/MII clock ("INT_RX_GMII_MII_CLK_DIV2") signal 280 to a logic 1 input of multiplexer 285. Recall, the other input to multiplexer 285 is receive clock signal 295.

A speed select ("SPEED_IS_10_100") signal 255 is provided to multiplexer 285 as control input. Responsive to select signal 255 being a logic 1, multiplexer 285 selects divided by two internal receive GMII/MII clock signal 280 for output. Responsive to select signal 255 being a logic 0, multiplexer 285 selects receive clock signal 295 for output. Multiplexer 285 provides a speed select receive core clock signal ("SPEED_SEL_RX_CORE_CLK") 282 as output.

Overclocking mode select signal 270 is provided to multiplexer 287 as control input. Responsive to overclocking mode select signal 270 being a logic 1, multiplexer 287 selects receive clock signal 295 for output. Responsive to overclocking mode select signal 270 being a logic 0, multiplexer 287 selects an input of multiplexer 287 tied to ground for output of a logic 0 (i.e., to disable overclocking).

Multiplexer 287 provides a divided by two receive client clock ("RX_CLIENT_DIV2_CLK") signal 292 as output.

A speed select receive core clock signal 282 is provided from multiplexer 285 to a logic 0 input of multiplexer 286. A transmit core clock signal 274 is provided to a logic 1 input of multiplexer 286.

Responsive to select signal 296 being in a logic 0 state, multiplexer 286 selects speed select receive core clock signal 282 for output. Responsive to select signal 296 being in a logic 1 state, multiplexer 286 selects transmit core clock signal 274 for output. Multiplexer 286 provides a receive client output clock ("RX_CLIENT_CLK_OUT") signal 293 as output.

A receive client clock input ("RX_CLIENT_CLK_IN") signal 289 is provided to a buffer 291. Buffer 291 provides a receive core clock ("RX_CORE_CLK") signal 290 as output.

Accordingly, it should be appreciated that EMAC core 123 includes a clock generator 124 from which a clock signal is generated and a version of which generated clock signal is fed back to EMAC core 123 to account for clock signal distribution through FPGA fabric 101. Secondly, it should be appreciated that any of several modes, such as MII, GMII, SGMII, RGMII, and 1000BASE-X PCS/PMA, may be used where transmit clock generator 124T and a receive clock generator 124R portions of clock generator 124 are used for providing clock signals for transmission and reception for communicating via a network. Furthermore, clock signals for a PCS/PMA sublayer mode or an overclocking mode may be selected. Along these lines, clock generator 124 provides both EMAC core and client interface clock signals.

In an implementation, when EMAC 110 is configured for tri-mode operation or non-tri-mode operation, transmit clock speed is approximately 2.5, 25, and 125 MHz for 10,100 and 1000 Mb/s approximate data rates, respectively. In an implementation, when EMAC 110 is configured for tri-mode operation or non-tri-mode operation, receive clock speed is approximately 2.5, 25, and 125 MHz for 10,100 and 1000 Mb/s approximate data rates, respectively. It should be understood that embedded EMAC 110 may be capable of operating at a faster frequency than FPGA fabric 101.

Figure 3:
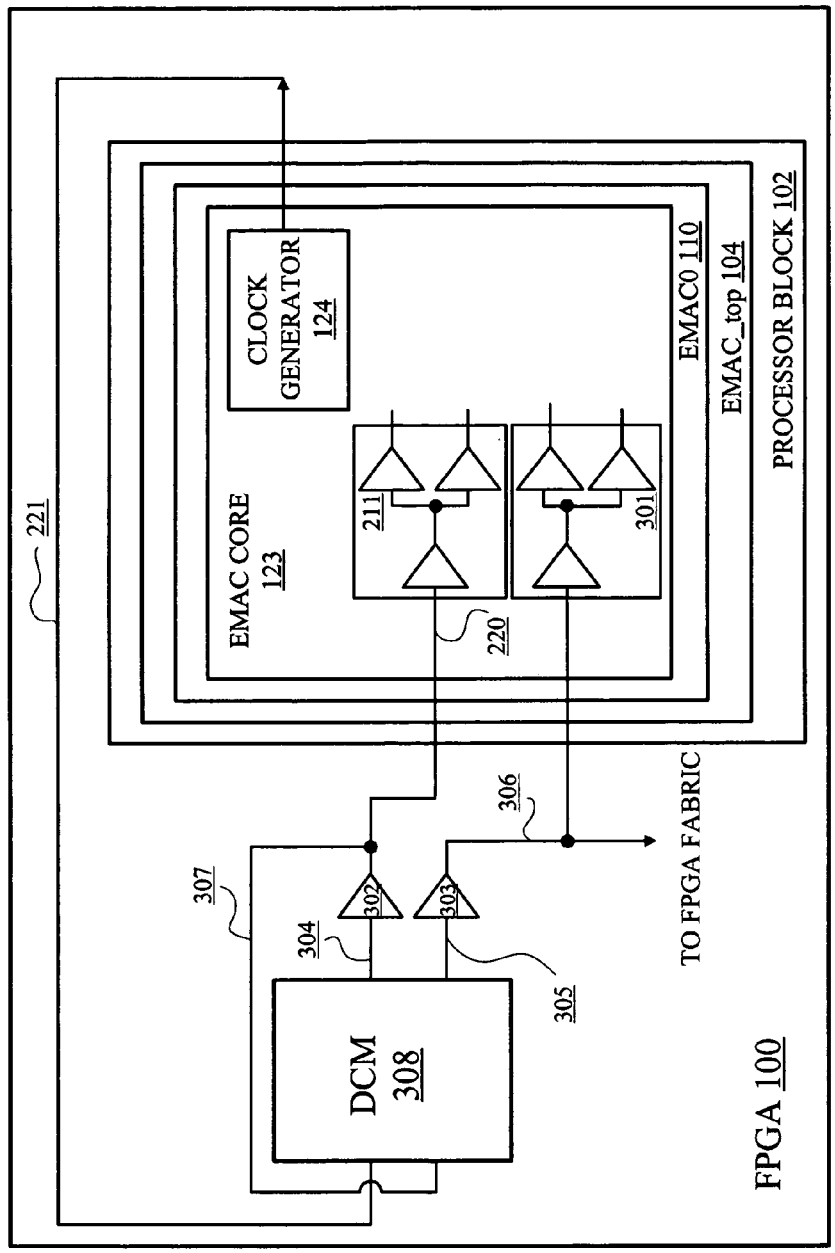
FIG. 3 is a block/schematic diagram depicting an exemplary embodiment of an FPGA configured for an overclocking mode.

FIG. 3 is a block/schematic diagram depicting an exemplary embodiment of FPGA 100 configured for an overclocking mode. In this exemplary embodiment, a digital clock manager ("DCM") 308 is coupled to clock-input trees 211 and 301 of EMAC core 123 and is configured to provide a divide by two clock signal 305. Clock signal 221 output from clock generator 124 is input to DCM 308. Output from DCM 308 is a divided by two clock signal 305 and an undivided or 1× clock signal 304 with respect to divided by two clock signal 305.

Responsive to EMAC 110 being in an overclocking mode, such as a 16-bit overclocking mode, DCM 308 in FPGA 100 is used to provide divided by two clock signal 305. Because a DCM is used, the phase between 1× clock signal 304 and divided by two clock signal 305 are phase aligned at the output of DCM 308. Clock signal 305 of FIG. 3 may be handled as was clock signal 221, described with reference to FIG. 2C, as the same principle in the above solution applies to the divided by two clock skew.

Clock signal 304 may be input to buffer 302, and clock signal 305 may be provided to buffer 303. Output of buffer 302 may be fed back as an input to DCM 308 and may be provided as clock signal 220 to clock-input tree 211. Output of buffer 303 may be provided as clock signal 306 to FPGA fabric 101 and to clock-input tree 301. Notably, separate clock trees may be used for handling clocks of different frequencies, for example where clock signal 304 is greater than or equal to 250 MHz and clock signal 305 is greater than or equal to 125 MHz. Recall, for this example that clock signal 304 is twice the frequency of clock signal 305.

Figure 3A:
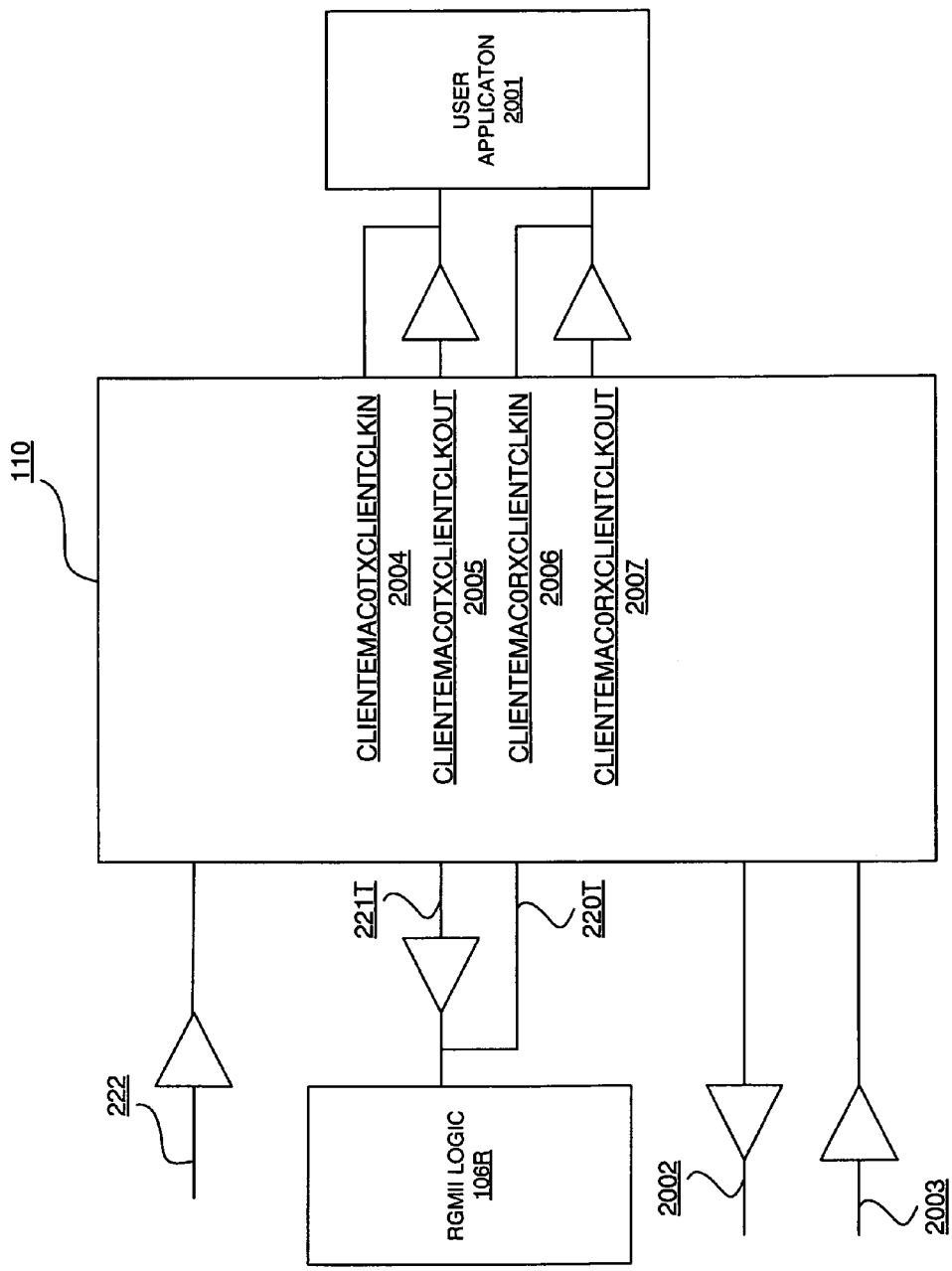
FIG. 3A is a simplified block diagram depicting an exemplary embodiment of clock management for a Media Independent Interface.

FIG. 3A is a simplified block diagram depicting an exemplary embodiment of clock management for an RGMII. Though an RGMII example is used, it should be understood that an MII or MGII may be used, depending on which mode of these three MII modes is selected. However, for compliance with an interface protocol, frequency of the output signal may be specified, as described below. EMAC 110 provides a client output transmit clock 221T for RGMII logic 106R and a buffered client input transmit clock 220T may be received. Clock output signal 2002 and clock input signal 2003, such as respective RGMII transmit and receive clock signals, may be any of a variety of frequencies as describe in additional detail below herein. Client EMAC transmit and receive input and output clocks 2004 through 2007 may be provided to a user design 2001 instantiated in programmable logic. For MII, clock frequencies for clock signals 2002 and 2003 are likewise selectable. However, for a GMII, while clock frequency of clock signal 2003 is selectable, frequency of clock signal 2002 is set to that called out in the GMII specification, such as 125 MHz, for a physical layer interface.

Host Interface

With renewed reference to FIG. 1, in embedded EMAC top 104, a host bus 118 is configured for backward compatibility with a soft EMAC core host interface. This backward compatibility allows users who have been using the soft EMAC core to use an embedded EMAC 110 without having to redesign the host interface of the soft EMAC core, thereby facilitating user migration.

Figures 1, 4:
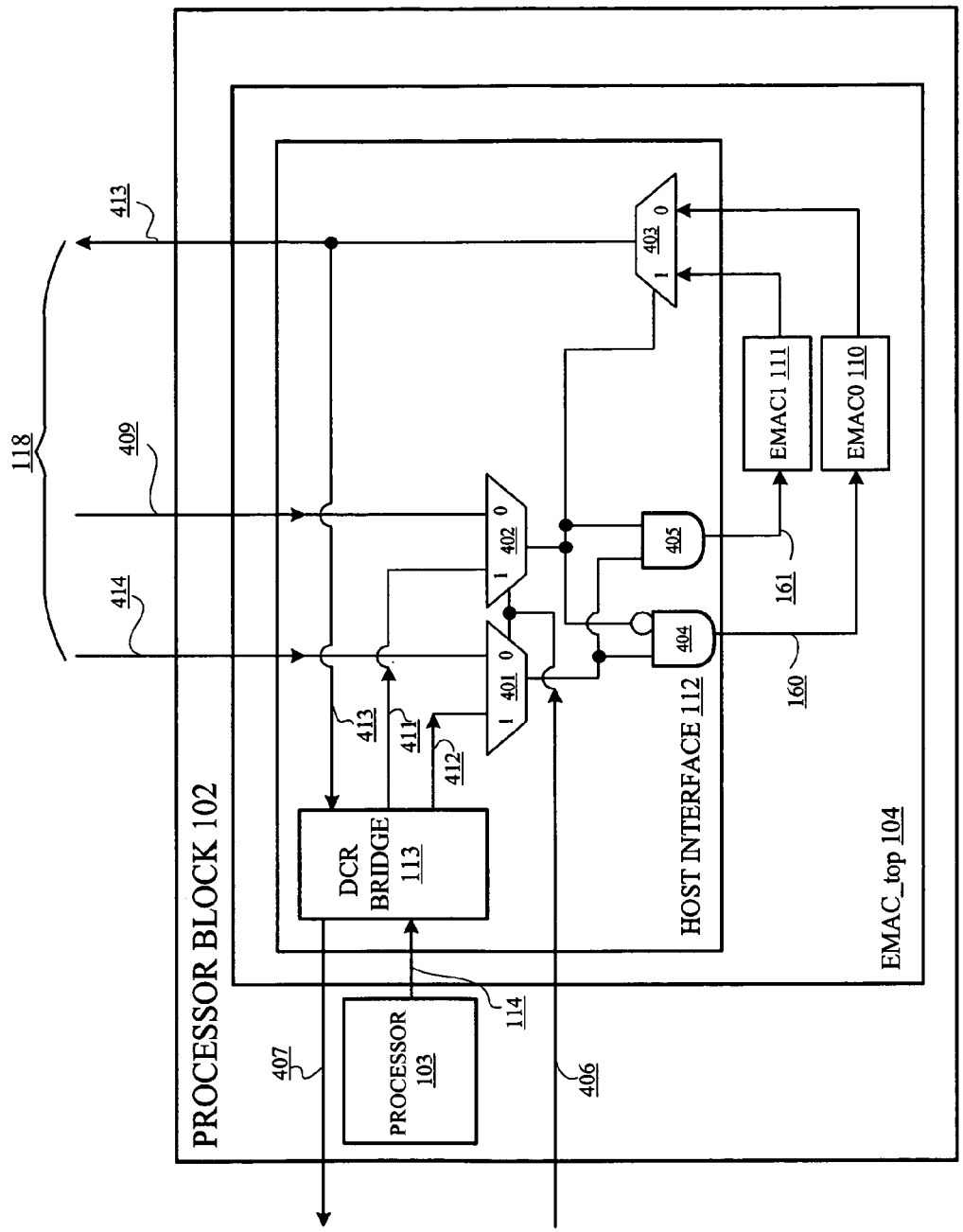
Figures 2, 4:
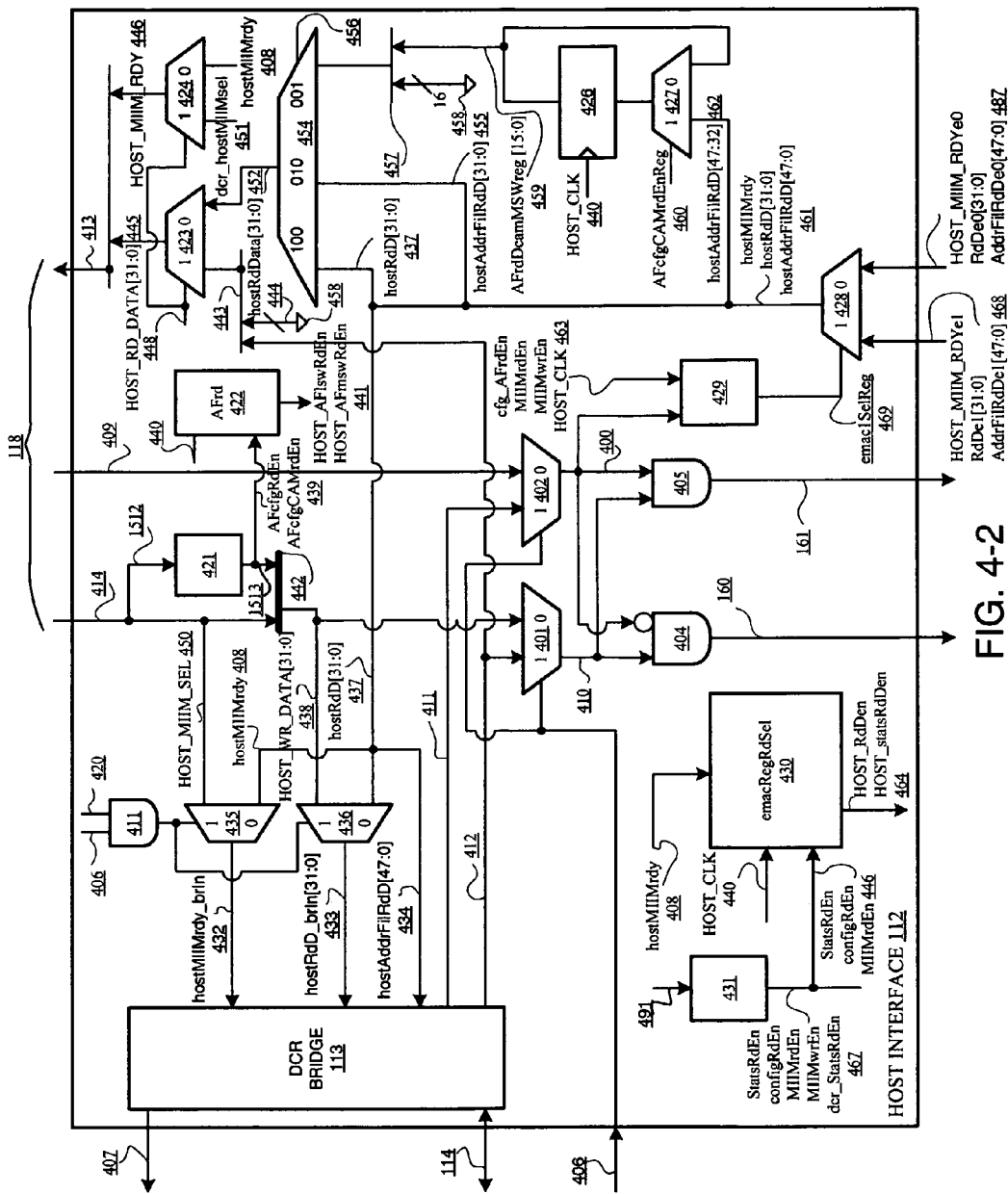
Figure 4:
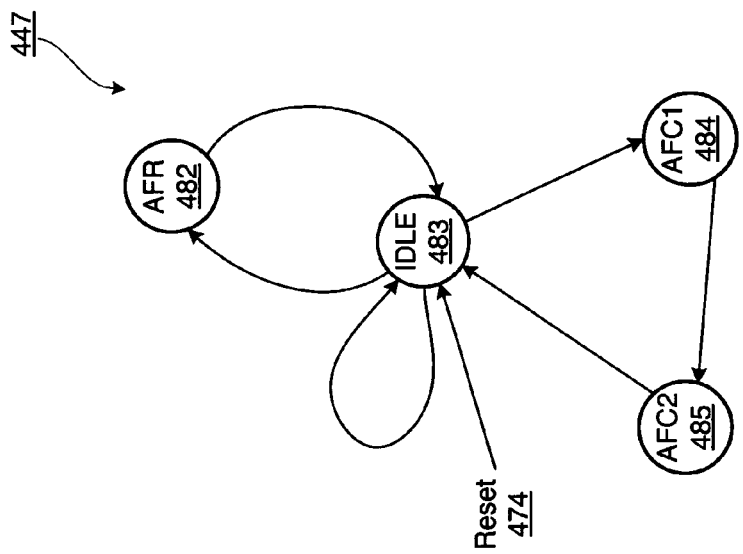
Figures 3, 4:
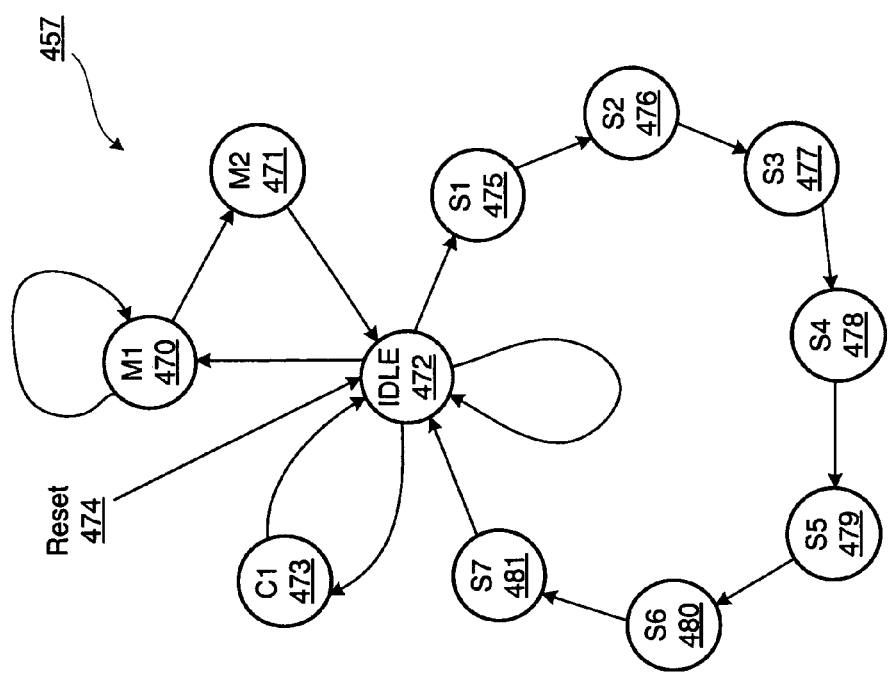

FIG. 4-1 is a high-level block/schematic diagram depicting an exemplary embodiment of a host interface 112. Host bus 118 allows for a host processor to be located in FPGA 100 or external to FPGA 100. In addition, in a PowerPC 405 ("PPC405") processor core implementation, a DCR bridge 113 is implemented internal to host interface 112, so that PPC405 processor 103 residing in the Processor block 102 can act as a host in managing EMAC 110 configuration registers via DCR bus 114. Implementing DCR bridge 113 in processor block 102 with area-efficient standard cells facilitates making available configurable logic resources in FPGA 100 for customer applications. In addition, DCR bridge 113 in processor block 102 provides an efficient way for processor 103 in processor block 102 to act as a host processor to access host registers in EMAC core 123 through DCR bus 114. Notably, DCR bridge may be internal or external to host interface 112.

In addition, a PPC405 implementation of processor 103, using DCR bridge 113, can read statistics registers implemented in FPGA fabric 101. When DCR bus 114 is not used, host interface 112 allows a user to manage EMAC host registers via a host bus 118. Additionally, host interface 112 includes logic for processor 103 to read, via DCR bus 114 or host bus 118, statistics registers, such as may be implemented in configurable logic for accumulation of statistics, located in FPGA fabric 101.

An input signal 406 to processor block 102 called "dcremacenable" is used to select the host bus type to use. Dcremacenable signal 406 is asserted to select DCR bus 114 for use as a host bus, and deasserted to select host bus 118 for use as a host bus. Dcremacenable signal 406 may be provided via a tie-off pin that can be tied to a logic value (high or low)

when FPGA 100 is configured. Notably, it should be understood that if an embedded processor other than a PPC405 core were implemented, then DCR bridge 113 and DCR bus 114 may be replaced with a bridge or hub and associated busing thereof for the type of processor embedded. For example, a Northbridge may be used for interfacing to an embedded Pentium processor from Intel of Santa Clara, Calif. Furthermore, no embedded processor may be present in FPGA 100, as processor 103 is not necessary for operation of EMAC 110. Tie-off pins are provided with FPGA 100, such that a user may set values to avoid the need for a processor. Tie-off pins may be used to configure FPGA 100 as a network device, such as a router, bridge, hub, and the like for example.

Furthermore, processor 103 may be used as a host processor and host bus 118 may be used in addition thereto. For example, there may be peripheral functions to be associated with EMAC 110 which peripheral functions could be instantiated in configurable logic of FPGA 100. If such peripheral functions employ register access of EMAC 110, such register access may be had via host bus 118. An example of such a peripheral function would be processing of statistics on network transmission. Another example of such a peripheral function would be address filtering in addition to that already provided with EMAC 110.

Host bus 118 is used to provide signals 414 and 409 to host interface 112 and to receive signal 413 from host interface 112. Dcermacenable signal 406 may be provided as a select signal to multiplexers 401 and 402. Input to logic high inputs of multiplexers 401 and 402 may include DCR selection information as between selecting one or both of EMACs 110 and 111. Outputs from multiplexers 401 and 402 may be buffered via AND gates ("buffers") 404 and 405 for providing to EMAC 110 and 111, respectively. However, only one EMAC 110 or EMAC 111 may communicate with a host device at a time, and thus outputs from EMAC 110 and 111 may be provided to multiplexer 403 for communicating via host bus 118. A select signal provided to multiplexer 403 may originate from the output of multiplexer 402.

FIG. 4-2 is a block/schematic diagram depicting an exemplary embodiment of host interface 112. Table 1 lists signal sets for FIG. 4-2. For purposes of clarity by way of example, bit lengths for an implementation are provided; however, the particular bit lengths need not be implemented, as other bit lengths may be used. Moreover, logic equations are described in Verilog Register Transfer Level ("RTL").

TABLE 1

| Signal Set | Signals |
| --- | --- |
| (1) | dcrClk, dcrABus[8:9], dcrWrite, dcrRead, dcrWrDBus[0:31], dcrAck, dcrRdDBus[0:31] |
| (2) | dcr_hostAddr[9:0], dcr_hostOpCode[1:0], dcr_hostMIIMsel, dcr_hostReq, dcr_hostWrData[31:0], dcr_AddrFilRd, dcr_AddrFilWr, dcr_AFcamWr, dcr_AFcamRd |
| (3) | HOST_ADDR[9:0], HOST_MIIM_SEL, HOST_OPCODE[1:0] |
| (4) | hostAddr[9:0], hostOpcode[1:0], hostMIIMsel, hostReq, hostWrData[31:0], hostAddrFilRd, hostAddrFilWr, hostAFcamRd |
| (5) | HOST_ADDRe0[9:0], HOST_OPCODEe0[1:0], HOST_MIIM_SELe0, HOST_REQe0, HOST_WR_DATAe0[31:0], HOST_AddrFilRdE0, HOST_AddrFilWrE0, host_AFcamRdE0 |
| (6) | HOST_ADDRe1[9:0], HOST_OPCODEe1[1:0], HOST_MIIM_SELe1, HOST_REQe1, HOST_WR_DATAe1[31:0], HOST_AddrFilRdE1, HOST_AddrFilWrE1, host_AFcamRdE1 |
| (7) | hostAddr[9:0], hostReq, hostMIIMsel, hostOpcode[1:0] |

TABLE 1-continued

| Signal Set | Signals |
| --- | --- |
| (8) | AFcfgRdEn, AFcfgWrEn, AFcfgCAMrdEn |
| (9) | {16'h0000, dcr_hostReq, dcr_hostOpcode[1:0], 2'b00, dcr_emac1Sel, dcr_hostAddr[9:0]} |
| (10) | (dcr_StatsRdEn & dcremacenable) |

Host interface 112 uses two clocks signals, namely, a DCR clock ("dcrClk") signal 516 (shown in FIG. 4-5A) and a host clock ("HOST_CLK") signal 440. The dcrClk signal 516 runs at the same clock frequency as the system clock for processor 103. DCR bridge 113 uses both dcrClk signal 516 and HOST_CLK signal 440. HOST_CLK signal 440 comes from a host device coupled to host bus 118 and is part of signal set (3). Signals 414 include signal set (3), HOST_CLK signal 440, a host request signal, and a host write data signal 438. HOST_CLK 440 is used to interface to host registers in EMAC core 123.

Signal set (1) is provided via DCR bus 114 to and from DCR bridge 113. From signal set (1), it should be understood that DCR bus 114 contains only two least significant address bits. This is because a central DCR address decoding unit is implemented in processor block 102 and DCR bridge 113 uses only four DCR registers in this exemplary implementation. The central DCR address decoding unit decodes the DCR address bus ("dcrABus[0:7]") signal from processor 103 and in conjunction with DCR read and DCR write signals generates DCR write or DCR read signals if the address is targeted to DCR bridge 113.

DCR bridge 113 converts the DCR commands in a dcrClk domain into host bus signals in a HOST_CLK domain for output, namely, DCR bridge output signals are dcr_emac1Sel 411 and signal set (2), generally referred to as signals 412. Dcremacenable signal 406 is provided as a control select input to multiplexers 401 and 402. Dcremacenable signal 406 is used to select which host bus to use, namely, either host bus 118 or DCR bus 114. The selected host bus signals are emac1Sel 411 and signal set (4), generally indicated as signals 412, namely, the outputs of multiplexers 402 and 401, respectively. Input to multiplexer 401 is signal set (2), which is also provided to bus 443. Other signals input multiplexer 401 are signals 414. Input to multiplexer 402 is dcr_emac1sel signal 411 and Host_emac1Sel signal 409. Notably, there is a one-to-one correspondence of same signal inputs between inputs to multiplexers 401 and 402 from DCR bridge 113 and host interface 118.

Responsive to emac1Sel signal 400 being a logic 1, host bus signals 410 are directed to EMAC 111 and directed to EMAC 110 responsive to emac1Sel signal 400 being a logic 0. In an exemplary implementation, signal emac1Sel 400 may be address bit [10] of host bus 118. Output 410 from multiplexer 401 is provided as input to buffers 404 and 405. Output 400 from multiplexer 402 is provided as input to buffer 405 and logic block 429, and inverted then provided as input to buffer 404. Signal set (5) is host bus signals output from buffer 404 to EMAC 110, and signal set (6) is host bus signals to output from buffer 405 to EMAC 111. Host bus 118 may be coupled to host interface logic, which logic is describe in additional detail in the above-referenced soft EMAC core.

Logic block 421 contains address decoding for address filter host registers read and write enable and address filter content addressable memory ("CAM") read enable. Notably, though the term CAM is used herein, an actual CAM may or may not be implemented. Storage for multicast addresses may be in the form of registers for example, namely, multicast address registers ("MARs"). Accordingly, the terms CAM and MAR should be considered interchangeable.

Signal set (3) includes inputs and signal set (8) includes outputs of logic block 421. Thus, only a portion signals 414 are provided to logic block 421. The address filter CAM write signal is the same signal as the host registers write signal, but the address filter CAM read signal uses a separate signal, AFcfgCAMrdEn of signals 439, because the CAM read is an added function to Address Filter read logic 422. The address decode and read enable or write enable signals for host address bus 118 are provided via host interface 112 because DCR bridge 113 generates those read enable or write enable signals, and symmetry is used for signals between DCR bridge 113 and host bus 118 signals.

Below is a code listing for an exemplary embodiment of address decode logic equations for address filter host registers read or write and CAM read enable for logic block 421, where the logic equations are in Verilog RTL:

assign AFcfgAddrDec = (HOST_ADDR[9] & HOST_ADDR[8] & HOST_ADDR[7] & ~HOST_ADDR[6] & ~HOST_ADDR[5]& ~HOST_ADDR[4]) | (HOST_ADDR[9] & HOST_ADDR[8] & ~HOST_ADDR[7] & ~HOST_ADDR[6]& ~HOST_ADDR[5] & HOST_ADDR[4]);

assign AFcfgRdEn = AFcfgAddrDec & (~HOST_MIIM_SEL & HOST_OPCODE[1]);

assign AFcfgWrEn = AFcfgAddrDec & (~HOST_MIIM_SEL & ~HOST_OPCODE[1]);

assign AFcfgCAMaddrDec = (HOST_ADDR[9] & HOST_ADDR[8] & HOST_ADDR[7]) & (~HOST_ADDR[6] & ~HOST_ADDR[5] & ~HOST_ADDR[4]) & (HOST_ADDR[3] & HOST_ADDR[2] & ~HOST_ADDR[1]) & ~HOST_ADDR[0];

assign AFcfgCAMrdEn = AFcfgCAMaddrDec & (~HOST_MIIM_SEL & ~HOST_OPCODE[1] & HOST_WR_DATA[23]);

Dcremacenable signal 406 and host statistics read data enable signal 420 are input to AND gate 411, the output of which is a control select input to multiplexers 435 and 436. Configuration address filter read enable, MIIM read enable, MIIM write enable, and host clock signals 463 are input to logic block 429 along with signal 400 to provide as output emac1 select register signal 469 as a control select to multiplexer 428. Dcremacenable signal 406 activates DCR bus access.

Logic block 429 uses decoded read command signals to generate emac1SelReg signal 469 to keep the read data return path open for the selected EMAC until another read command. This is used because each type of read returns data with different timing.

Below is a code listing for an exemplary embodiment of logic equations for logic block 429, where the logic equations are in Verilog RTL:

always @(posedge HOST_CLK)
  if (HOST_RESET)
    emac1SelReg <= 1'b0;
  else
    if (cfg_AFrdEn | MIIMrdEn | MIIMwrEn)
      emac1SelReg <= emac1Sel;
    else
      emac1SelReg <=emac1SelReg;

Input to multiplexer 428 are host MIIM ready EMAC1, read data EMAC1 [31:0] and address filter read data EMAC1 [47:0] signals 468, and host MIIM ready EMAC0, read data EMAC0 [31:0] and address filter read data EMAC0 [47:0] signals 487. Output of multiplexer 428 is host MIIM ready, host read data [31:0] and host address filter read data [47:0] signals 461. A portion of host address filter read data signal, namely, the last 16 bits, is provided as host address filter read data [47:32] signal 462 as an input to multiplexer 427. A portion of host address filter read data signal, namely, the first 32 bits, is provided as host address filter read data [31:0] signal 455 as an input to a port of multiplexer 454. Provided to another port of multiplexer 454 is host read data signal [31:0] 437. Host read data signal [31:0] 437 is provided to a logic low input port of multiplexer 436. Host MIIM ready signal 408 is provided to a logic low input port of multiplexer 435. Host address filter read data [47:0] signal 434 is provided as an input to DCR bridge 113. From signals 414, host MIIM select signal 450 is input to a logic high port of multiplexer 435, and host write data [31:0] signal 438 from bus 442 is input to a logic high port of multiplexer 436. Output from multiplexer 435 is host MIIM ready bridge input signal 432 and is provide to DCR bridge 113. Output from multiplexer 436 is host read data bridge input [31:0] signal 433 and is provide to DCR bridge 113.

Logic block 431 includes address decoding for host register read, statistics register read and MII Management ("MIIM") interface host register read. Signal set (7) lists inputs to logic block 431, generally indicated as signal 491. Outputs of logic block 431 are statistics read enable, configuration read enable, MIIM read enable, MIIM write enable, and DCR statistic read enable signals 467. EMAC register read select logic 430 receives statistics read enable, configuration read enable and MIIM read enable signals 446, as well as host clock signal 440 and host MIIM ready signal 408, and provides host read data enable and host statistic read data enable signals 464.

Notably, the different types of read signals are distinguished from one another because each type of read returns data with different timing.

Below is a code listing for an exemplary embodiment of address decode logic equations for logic block 431, where the logic equations are in Verilog RTL:

assign StatsReg = (hostAddr[9:4] == 6'b00_0000) |
  (hostAddr[9:4] == 6'b00_0001) |
  (hostAddr[9:4] == 6'b00_0010) |
  (hostAddr[9:4] == 6'b00_0100);

assign configReg =(hostAddr[9:8] ==2'b10) |(hostAddr[9:7]==3'b11_0);

assign StatsRdEn = StatsReg & ~hostMIIMsel & hostReq;

assign dcr_StatsRdEn = dcr_statAdrDecReg & ~hostMIIMsel & hostReq;

assign configRdEn = configReg & ~hostMIIMsel & hostOpcode[1];

assign MIIMrdEn = hostMIIMsel & hostOpcode[1] & ~hostOpcode[0] & hostReq;

assign MIIMwrEn = hostMIIMsel & ~hostOpcode[1] & hostOpcode[0] & hostReq;

With continuing reference to FIG. 4-2, emacRegRdSel logic block 430 generates signals to steer read data to the proper datapath. When a HOST_RdDen signal of signals 464 is asserted, the read data is from a host register in an embedded EMAC, either EMAC 110 or 111 in this example. When the HOST_statsRdDen signal is asserted, the read data is from a statistics register implemented in FPGA fabric 101.

FIG. 4-3 is state diagram depicting an exemplary embodiment of a state machine 457 for emacRegRdSel logic block 430. Responsive to reset signal 474 being asserted, state machine 457 goes to idle state 472.

Responsive to statistics read enable signal at a logic high state and configuration read enable signal and MIIM read enable signal being at a logical low state of signals 446, state machine 457 transitions from idle state 472 to state S1 475. All the states of state machine 457 for a host read data enable signal and a host statistics read data enable signal outputs 464 from emacRegRdSel logic block 430 are set forth below in Table 2.

State machine 457 transitions from idle state 472 to state C1 473 when statistics read enable signal and MII read enable signal are both at a logic low state and configuration read enable signal is at a logic high state. State machine 457 transitions from idle state 472 to state M1 470 responsive to statistics read enable signal and configuration read enable signal being at a logic low state and MIIM read enable signal may be at either a logic low or a logic high state for this transition to occur.

State machine 457 stays in state M1 470 responsive to host MIIM ready signal 408 not being asserted, and transitions from state M1 470 to state M2 471 responsive to host MIIM ready signal 408 being asserted. All other transitions occur responsive to host clock signal 440, namely, transitioning from state M2 471 to idle state 472, transitioning from state C1 473 to idle state 472, and transitions from state S1 475 to state S2 476 to state S-3 477 to state S4 478 to state S5 479 to state S6 480 to state S7 481 and back to idle state 472.

In Table 2 are state machine 457 outputs for signals 464 for each of the states in FIG. 4-3.

TABLE 2

| State | HOST_RdDen | HOST_statsRdDen |
|---|---|---|
| IDLE | 0 | 0 |
| S1 | 0 | 0 |
| S2 | 0 | 0 |
| S3 | 0 | 0 |
| S4 | 0 | 0 |
| S5 | 0 | 0 |
| S6 | 1 | 1 |
| S7 | 1 | 1 |
| C1 | 1 | 0 |
| M1 | 1 | 0 |
| M2 | 1 | 0 |

Returning to FIG. 4-2, address filter read logic block ("AFrd") 422 generates read datapath control signals 441, namely, host address filter least significant word read enable ("HOST_AFlswRdEn") signal and host address filter most significant word read enable ("HOST_AFmswRdEn") signal, for reading CAM data in address filter 129. In an embodiment, CAM data is 48 bits long. Address filter read logic block 422 is clock responsive to host clock signal 440. Output from logic block 421, namely, address filter configuration read enable and address filter configuration CAM read enable signals 439, are input to address filter read logic block 422.

Responsive to HOST_AFlswRdEn being asserted, a CAM read data [31:0] signal is output to a read bus to host bus 118, namely, HOST_RD_DATA[31:0] 445. In the next host clock 440 cycle, HOST_AFmswRdEn is asserted, and read data [47:32] is output to HOST_RD_DATA[15:0] of host read data bus 445. This outputting the least-significant-word first followed in the next host clock cycle by the most-significant-word is for consistency with reading statistic registers. For this, the read data from hostAddrFilRdD [47:32] 462 is registered for one host clock cycle delay in outputting. This may be done by providing an address filter configuration CAM read enable register signal 460 as a control select input to multiplexer 427 having host address filter read data signal [47:32] 462 as one set of logic high data inputs and feeding back address filter read data CAM most-significant-word register ("AFrdDcamMSWreg[15:0]") signal 459 as a set of logic low data inputs to multiplexer 427. Output from multiplexer 427 is provided to register 426. Register 426 is clocked responsive to host clock signal 440. Output of register 426 is AFrdDcamMSWreg[15:0] signal 459.

FIG. 4-4 is a state diagram depicting an exemplary embodiment of a state machine 447 for address filter read logic block 422. State machine 447 transitions to idle state 483 responsive to reset signal 474. From idle state 483, state machine 447 transitions to address filter read state 482 responsive to address filter configuration read enable signal of signals 439 being asserted. From address filter read state 482, state machine 447 transitions back to idle state 483 responsive to the next host clock cycle. State machine 447 transitions from idle state 483 to address filter control state 1 484 responsive to address filter configuration CAM read enable signal of signals 439 being asserted. From address filter CAM state 1 484, state machine 447 transitions to address filter CAM state 2 485 responsive to a next host clock cycle. From address filter CAM state 2 485, state machine 447 transitions back to idle state 483 responsive to a subsequent host clock cycle. State machine 447 stays in idle state 483 if neither of signals 439 are asserted.

In Table 3 are state machine 447 outputs for signals 441 for each of the states in FIG. 4-4.

TABLE 3

| State | HOST_AFlswRdEn | HOST_AFmswRdEn |
|---|---|---|
| IDLE | 0 | 0 |
| AFR | 1 | 0 |
| AFC1 | 1 | 0 |
| AFC2 | 0 | 1 |

Read data ("RdDe#[31:0]") and address filter read data ("AddrFilRdDe#[47:0]"), where # is a 0 or 1 respectively for EMAC 110 and EMAC 111, are provided to multiplexer 428, along with MIIM read done signal ("HOST_MIIM_RDY#"), where # is a 0 or 1 respectively for EMAC 110 and EMAC 111. Multiplexer 428 output is selected responsive to emac1SelReg signal 469. Thus, RdDe0[31:0] contains the read data from the EMAC0 host registers and AddrFilRdDe0 [47:0] contains the read data from the EMAC0 address filter 129, and RdDe1[31:0] contains the read data from the EMAC1 host registers and AddrFilRdDe1[47:0] contains the read data from the EMAC1 address filter.

Responsive to emac1SelReg signal 469 being at a logic high state, the read data set from EMAC1 is selected, and responsive to emac1SelReg signal 469 being at a logic low state, the read data set from EMAC0 is selected.

AFcfgCAMrdEnReg signal 460 is the registered version of the AFcfgCAMrdEn signal of signals 439. In an implementation, because read data bus 445 of host bus 118 is only 32 bits wide, hostAddrFilRdD[47:32] 462 is registered and output in the next host clock cycle. Again, for a data set, the least significant word is output first and immediately followed by the most significant word of the data set on the following host clock cycle so that the read timing for an address filter, such as address filter 129, is consistent with the read timing of statistics registers.

When embedded processor 103 is used as a host processor, host bus 118 is not used for communicating with a host processor. Hence, host bus 118 I/O pins may be re-used in a different way to read statistics registers implemented in FPGA fabric 101. This re-use of I/O pins facilitates interfacing FPGA fabric 101 to ASIC and other embedded logic in processor block 102 using the limited number of I/O pins available in processor block 102.

Data signals 437 and 455 are input to multiplexer 454 along with signals from bus 457, namely, 16 bits of padding coupled to ground 458 or other fixed logic low value and 16 bits from signal 459. Output from multiplexer 454 is selected responsive to a three bit wide control select input from host read data enable, host address filter least significant word read enable and host address filter most significant word read enable signals 456. Host read data [31:0] signal 452 output from multiplexer 454 is input to a logic low port of multiplexer 423. Signal set (10) generally indicated as signal 448 is provided as a control select input to multiplexers 423 and 424. Signal 412 in addition to logic zero padding 444 provided to bus 443 is provided to a logic high input port of multiplexer 423. Input to a logic high port of multiplexer 424 is select signal 451, and input to a logic low port of multiplexer 424 is ready signal 408. Output from multiplexer 423 is host read data [31:0] signal 445, and output from multiplexer 424 is host MIIM ready signal 446. Outputs from multiplexers 423 and 424 may be bussed outputs 413 of host bus 118.

DCR bridge 113 translates DCR commands into host read signals, namely, signal set (9) and dcr_hostMIIMsel 451, for output to statistics registers. Signal set (9) uses output pins for HOST_RD_DATA[31:0] 455 and dcr_hostMIIMsel 451 uses the output pin for HOST_MIIM_RDY 446 for read commands output instead of returning read data and a MIIM read done signal, respectively.

In an exemplary implementation, bit assignments on HOST_RD_DATA[31:0] 445 for translated DCR read command output signals for statistics registers read and HOST_MIIM_RDY 446 output pins usage are:
HOST_RD_DATA [31:16] = 16'h0000
[15] = HOST_REQ
[14:13] = HOST_OPCODE[1:0]
[12:11] = 2'b00
[10] = HOST_emac1Sel
[9:0]= HOST_ADDR[9:0]; and
HOST_MIIM_RDY = used as HOST_MIIM_SEL.

Statistics read data and read done signals are returned via input pins HOST_WR_DATA[31:0] 438 and HOST_MIIM_SEL signal 450, respectively. In an exemplary implementation, HOST_WR_DATA[31:0] 438 and HOST_MIIM_SEL signal 450 input pins usage for statistics register read via DCR bridge 113 are:
HOST_WR_DATA[31:0] = used as HOST_RD_DATA [31:0]; and
HOST_MIIM_SEL = used as HOST_MIIM_RDY.

Thus, it should be appreciated that pins for signals 445 and 446 are used for read busing of host configuration registers and for write busing of statistic registers. Notably, these pins for signals 445 and 446 do not need to be used just for statistics registers, but may be used to access any registers instantiated in FPGA fabric 101.

For example, by re-using processor block 102 I/O pins, PPC405 processor can act as a host processor to perform all the management functions as a host processor embedded in FPGA 100 or external to FPGA 100. When DCR bus 114 is not used as a host bus, host bus 118 may be used to access host registers in EMAC core 123. Again, host bus 118 allows a host processor to reside in FPGA 100 or be external to FPGA 100.

DCR Bridge

Figures 4, 5, 5A:
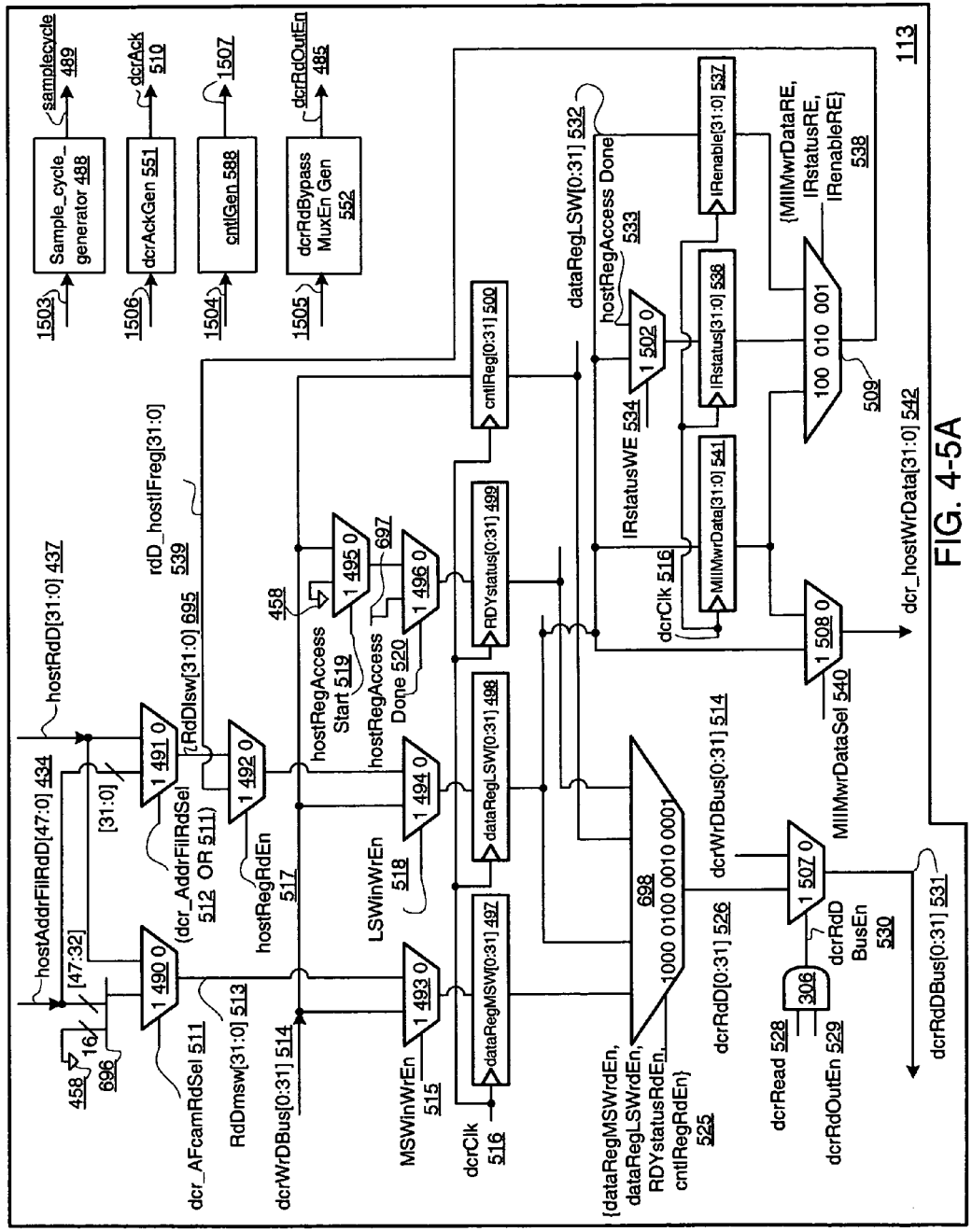

FIG. 4-5A is a block/schematic diagram depicting an exemplary embodiment of DCR bridge 113. DCR 113 translates PPC405 processor 103 commands into host bus 118 signals for processor 103 to operate as a host processor in managing host registers of EMACs 110, 111 and read statistics from statistics registers implemented in FPGA fabric 101. Table 4 lists signal sets for DCR bridge 113.

TABLE 4

| Signal Set | Signals |
| --- | --- |
| (11) | dcrClk, HOST_CLK, HOST_RESETreg, HOST_RESET |
| (12) | dcrClk, HOST_RESET, dcrRdEn_ack, dcrWrEn_ack |
| (13) | dcrClk, HOST_CLK, HOST_RESET, cntlRegWrEn, dataRegLSW[23:0], cntlReg[15:0], hostMIMrdy, samplecycle |
| (14) | dcr_emac1sel, dcr_hostOpCode[1:0], dcr_hostMIIMsel, dcr_hostReq, dcr_AddrFilRd, dcr_AddrFilWr, dcr_AddrFilRdSel, dcr_hostAddr[9:0], dRegMSWwe_eRd, dRegLSWwe_eRd, MIIMwrDataWE, MIIMwrDataRE, IRstatusWE, IRstatusRE, IRenableWE, IRenableRE, MIIMwrDataSel, configWr, configWrDone, configRd, configRdDone, AddrFilWr, AddrFilWrDone, AddrFilRd, AddrFilRdDone, MIIMwr, MIIMwrDone, MIIMrd, MIIMrdDone, StatsRd, StatsRdDone, dRegLSWwe_cfg, dRegLSWwe_Stats, dRegMSWwe_Stats, dRegLSWwe_miim, dRegMSWwe_AF, dRegLSWwe_AF, dcr_AFcamRd, dcr_AFcamRdSel, dcr_AFcamWr, AFcamRdDone, AFcamWrDone |
| (15) | dcrClk, HOST_RESET, dcrRdEn_ack, dcrRdEn_neg |

Host address filter read data signal 434, which in an implementation may be a 48-bit wide signal, and host read data signal 437, which in an implementation may be a 32-bit wide signal, are part of a host interface 118. A portion of bits of read data signal 434, such as bits [47:32], may be provided to bus 696, and other bits, such as 16 other bit lines coupled to ground 458, may be provided to bus 696 to provide padding for a bus width, such as a 32-bit width.

Bus 696 may be coupled to a logic high input port of multiplexer 490. Another portion of bits of read data signal 434, such as bits [31:0], may be input to a logic high input port of multiplexer 491. Read data signal 437 may be input to respective logic low input ports of multiplexers 490 and 491.

A DCR address filter CAM read select signal 511 may be provided as an input signal to multiplexer 490 to select as between inputs to provide read data MSW signal 513, which may be a 32-bit wide signal, as an output. Select signal 511 and a DCR address filter read select signal 512 may be logically ORed to provide a control select input to multiplexer 491 to provide a read data LSW signal 695, which may be a 32-bit wide data signal.

MSW output from multiplexer 490 may be input to a logic low port of multiplexer 493. LSW output from multiplexer 491 may be provided to a logic low input port of multiplexer 492. Input to a logic high port of multiplexer 492 may be a read data host interface ("IF") register signal 539, which may be a 32-bit wide signal and which may be obtained from output of multiplexer 509. A host register read enable signal 517 may be provided as a control select signal to multiplexer 492 to provide an output therefrom to a logic low input port of multiplexer 494.

DCR write data bus 514, which may be a 32-bit wide data bus, may be provided to respective logic high input ports of multiplexers 493 and 494, and as an input to control register 500 and to a logic low input port of multiplexer 495. A logic high input port of multiplexer 495 may be coupled to ground 458, and a host register access start signal 519 may be provided as a control select input to multiplexer 495 to provide an output therefrom to a logic low input port of multiplexer 496. A logic high input port of multiplexer 496 may be coupled to a logic high voltage level 697, and a host register access done signal 520 may be provided as a control select input to multiplexer 496.

A MSW input write enable signal 515 may be input as a control select signal to multiplexer 493, and a LSW input write enable signal 518 may be input as a control select signal to multiplexer 494. Output from multiplexer 493 is input to MSW data register 497. Output from multiplexer 494 is input to LSW data register 498. Output from multiplexer 496 is input to ready status register 499.

Registers 497 through 500 may each be 32-bit wide registers clocked responsive to DCR clock signal 516. Outputs of registers 497 through 500 are provided to multiplexer 698, which is coupled to receive select signals 525, where select signals 525 include a data register MSW read enable signal, a data register LSW read enable signal, a ready status read enable signal, and a control register read enable signal for respectively selecting input from registers 497 through 500 for output from multiplexer 698. Output from multiplexer 698 is DCR read data signal 526, which may be a 32-bit wide signal.

To provide a bypass mode, read data signal 526 may be input to a logic high input port of multiplexer 507 and input to a logic low input port of multiplexer 507 may be DCR write data bus 514. A DCR read signal 528 and a DCR read output enable signal 529 may be ANDed by AND gate 306, the output from which may be provided as a control select signal, namely DCR read data bus enable signal 530, to multiplexer 507. Output of multiplexer 507 is DCR read data bus 531, which may be a 32-bit wide data bus.

Output from LSW data register 498 is LSW data register signal 532, which may be 32-bits wide and which may be input to a logic high input port of multiplexer 502, MIIM write data register 541, and interrupt request enable register 537. Host register access done signal 533 may be input to a logic low input port of multiplexer 502, and an interrupt request status write enable signal 534 may be provided as a control select input to multiplexer 502. Output of multiplexer 502 is provided to interrupt request status register 536. Registers 536, 537, and 541 may each be 32-bits wide and clocked responsive to DCR clock signal 516.

Output from registers 541, 536, and 537 are provided to multiplexer 509. Control select signals 538, namely a MIIM write data read enable signal, an interrupt request status read enable signal, and an interrupt request enable read enable signal for respectively selecting an input from registers 541, 536 and 537 inputs, are provided to multiplexer 509 to provide as output read data host IF register signal 539.

Output from LSW data register 498 and MIIM write data register 541 are respectively provided to a logic high input port and a logic low input port of multiplexer 508. An MIIM write data select signal 540 is provided as a control select signal input to multiplexer 508 to provide DCR/host write data signal 542, which may be a 32-bit wide signal.

Accordingly, it should be appreciated that host read data or host address filter read data may be obtained from a host interface 118 and converted by bridge 113 to DCR read or write data, namely read data bus 531 or DCR/host write data signal 542. Moreover, DCR write data may be provided to bridge 113 and converted to host write data, namely DCR/host write data signal 542. Moreover, DCR bridge 113 may be in a bypass mode, where DCR write data bus 514 is output or converted to DCR read data bus 531.

Figure 5A:
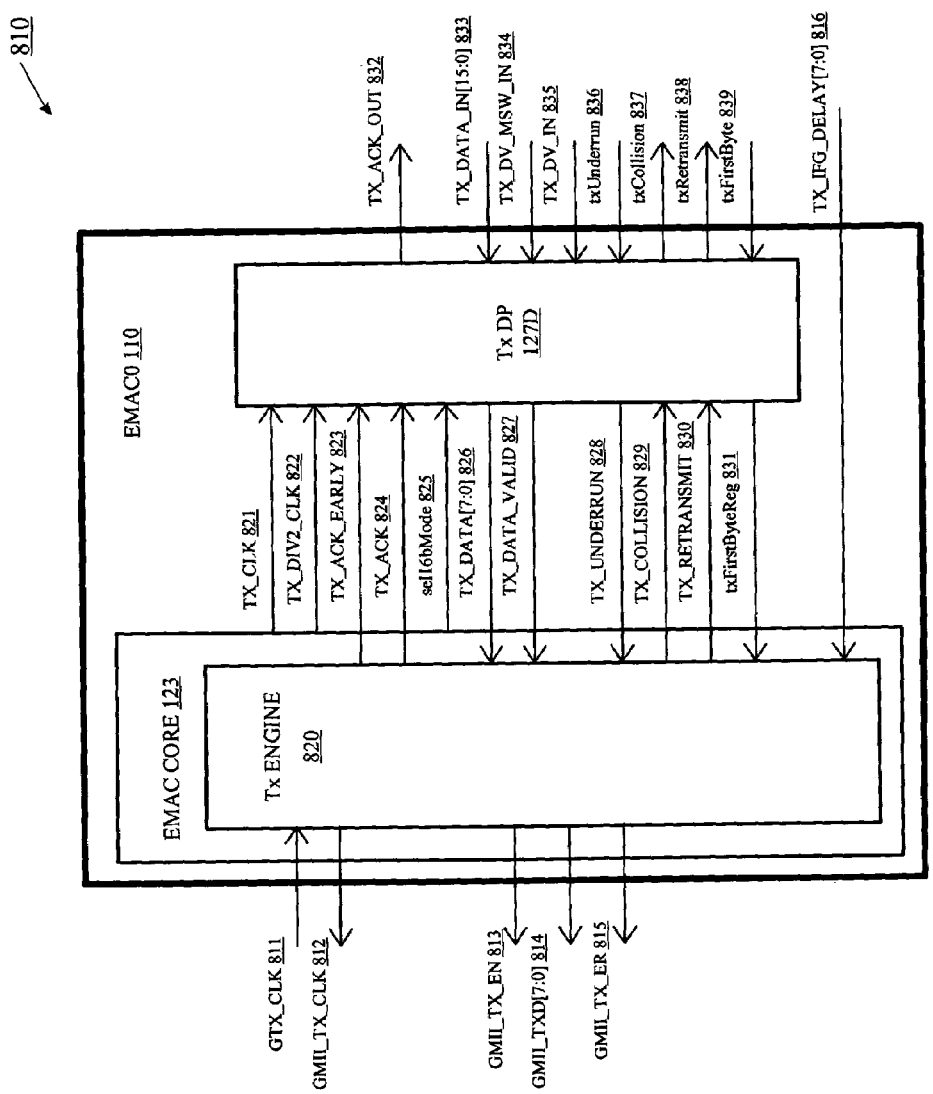
Figure 5B:
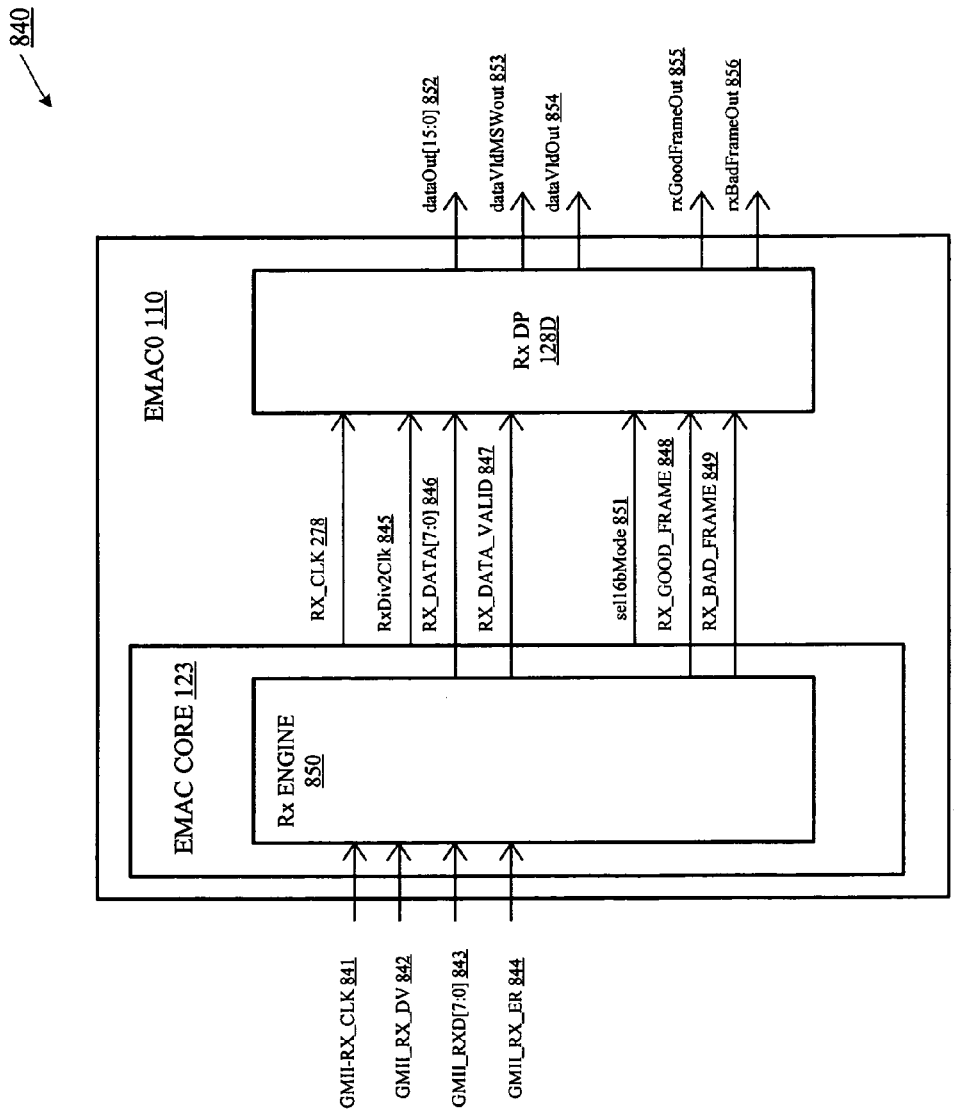

FIG. 4-5B is a table diagram depicting an exemplary embodiment of DCR address and bit assignments for DCR bridge 113. In this exemplary implementation, DCR bridge 113 uses four DCR registers 497 through 500 of FIG. 4-5A occupying four consecutive DCR addresses 523. Default values 521 and read or write capability 524 of DCR registers 497 through 500 are also listed. In an implementation, each of registers 497 through 500 is clocked responsive to DCR clock signal 516, and each of registers 497 through 500 has a 32 bit wide [0:31] output.

With simultaneous reference to FIGS. 4-5A and 4-5B, DCR bridge 113 is further described. With respect to bits [0:15] of a ready status DCR register ("RDYstatus") 499, this register is a read-only register, though it is possible to write to this register for functional verification. With respect to bit [21] of DCR control register ("cntlReg") 500, in an exemplary implementation emac1Sel may be bit [10] of host bus 118 address bits, where a logic 0 is for EMAC0 and a logic 1 is for EMAC1.

DCR most-significant word data register ("dataRegMSW") 497 is used in address filter register reads where return data contains a threshold number of bits, such as 48 bits for example. An example usage is a read of a unicast address register or one of the four multicast addresses in CAM. Again, CAM is not limited to memory, but may be registers such as MARs. In this exemplary implementation, dataRegMSW 497 receives the most significant read data bits [47:32] of host address filter read data [47:0] 434.

In this exemplary implementation, dataRegMSW 497 is used in reading of statistics registers because the statistics registers are 64 bits wide. The most significant word of the statistics register (e.g., bits [63:32]) may be stored in dataRegMSW 497. DataRegMSW 497 facilitates consistent software programming, namely, when PPC405 processor 103 issues a host register read command, host interface 112 deposits the read data to DCR data registers, and then PPC405 processor 103 may issue a DCR read command to dataRegMSW 497 to bring the read data into a general-purpose register (GPR) of processor 103.

A DCR least significant word data register ("dataRegLSW") 498 contains the least significant word, such as for example 32 bits of read or write data. Write data goes through dataRegLSW 498, and in an exemplary implementation, dataRegLSW 498 is programmed with write data before cntlReg 500 is programmed with a write command.

Processor 103 commands for host register accesses may be written to cntlReg 500. Responsive to cntlReg 500 being programmed, host interface 112 may start to take action for a host register transaction. Hence, for a host register write, the sequence of programming in an implementation may be to put write data into dataRegLSW 498 first before programming cntlReg 500.

RDYstatus register 499 contains EMAC host register read or write transaction status. Processor 103 may poll RDYstatus register 499 to determine whether an EMAC host register read or write is complete before it issues another EMAC host register access command, as DCR bridge 113 in this exemplary implementation is configured not to accept another DCR command from PPC405 processor 103 until an EMAC host register read or write that is in progress completes. In the instance of MIIM host register read or write, it may take multiple HOST_CLK signal 440 cycles for the EMAC MII data input/output ("MDIO") interface to serially shift in or out the read or write data. Furthermore, the MDIO clock ("MDC") frequency may be a fraction of HOST_CLK signal 440 frequency. MDC frequency may be less than approximately 2.5 MHz.

PPC405 processor 103 is configured to time-out and simply execute another instruction if a DCR device does not assert a DCR acknowledge within 64 dcrClk signal 516 clock cycles. Hence, PPC405 processor 103 assumes that a DCR instruction is executed even though the instruction is still in progress or waiting. This leads to incorrect outcome when the presumed executed instruction's result is used.

In addition to DCR registers 497, 498, 499 and 500, host interface 112 may use memory-mapped registers to assist in EMAC host register read or write transfers and thereby avoiding having to use more DCR registers.

Table 5 lists an exemplary embodiment of a memory map for host interface memory-mapped registers and EMAC embedded host registers. Groups of registers, addresses for each group, and a description for each address are listed. The memory map of host registers is for when DCR bus 114 is used as a host bus for host register access.

TABLE 5

| Group | Address | Description |
|---|---|---|
| EMAC0 | 0x000-0x044 | statistics registers |
|  | 0x045-0x1FF | reserved |
|  | 0x200-0x37F | EMAC core host registers |
|  | 0x380-0x390 | address filter registers |
| host interface | 0x3A0-0x3FC | host interface memory mapped registers |
| EMAC1 | 0x400-0x444 | statistics registers |
|  | 0x445-0x5FF | reserved |
|  | 0x600-0x77F | EMAC core host registers |
|  | 0x780-0x790 | address filter registers |

EMAC 110, EMAC 111 and host interface 112 are listed as the groups having memory mapped or embedded registers. EMACs 110 and 111 include addresses for memory-mapped statistics registers, embedded EMAC core host registers and memory mapped address filter registers. Host interface 112 includes memory-mapped registers. Notably, responsive to host bus 118 being used for host register access, memory-mapped host interface registers are not used because DCR bridge 113 is not used.

In this exemplary implementation, interrupt request status register 536, interrupt request enable register 537, MIIM write data register 541 are all configured for 32 bit widths and are all clocked responsive to DCR clock signal 516. MIIM control register ("MIIMcntl") is a virtual register, which is configured to provide a decoded MIIM output address to the MDIO interface. Table 6 lists an exemplary embodiment of memory address assignments for host interface memory-mapped registers.

TABLE 6

| Memory Address | Host Interface Register Names | Description |
|---|---|---|
| 0x3A0 | IRstatus | Interrupt request status register |
| 0x3A4 | IRenable | Interrupt request enable |
| 0x3A8 | — | Reserved |
| 0x3AC | — | Reserved |
| 0x3B0 | MIIMwrData | Holds MIIM write data |
| 0x3B4 | MIIMcntl | Address decode to output MIIM address to MDIO |
| 0x3BC-0x3FC | — | Reserved |

Figure 5C:
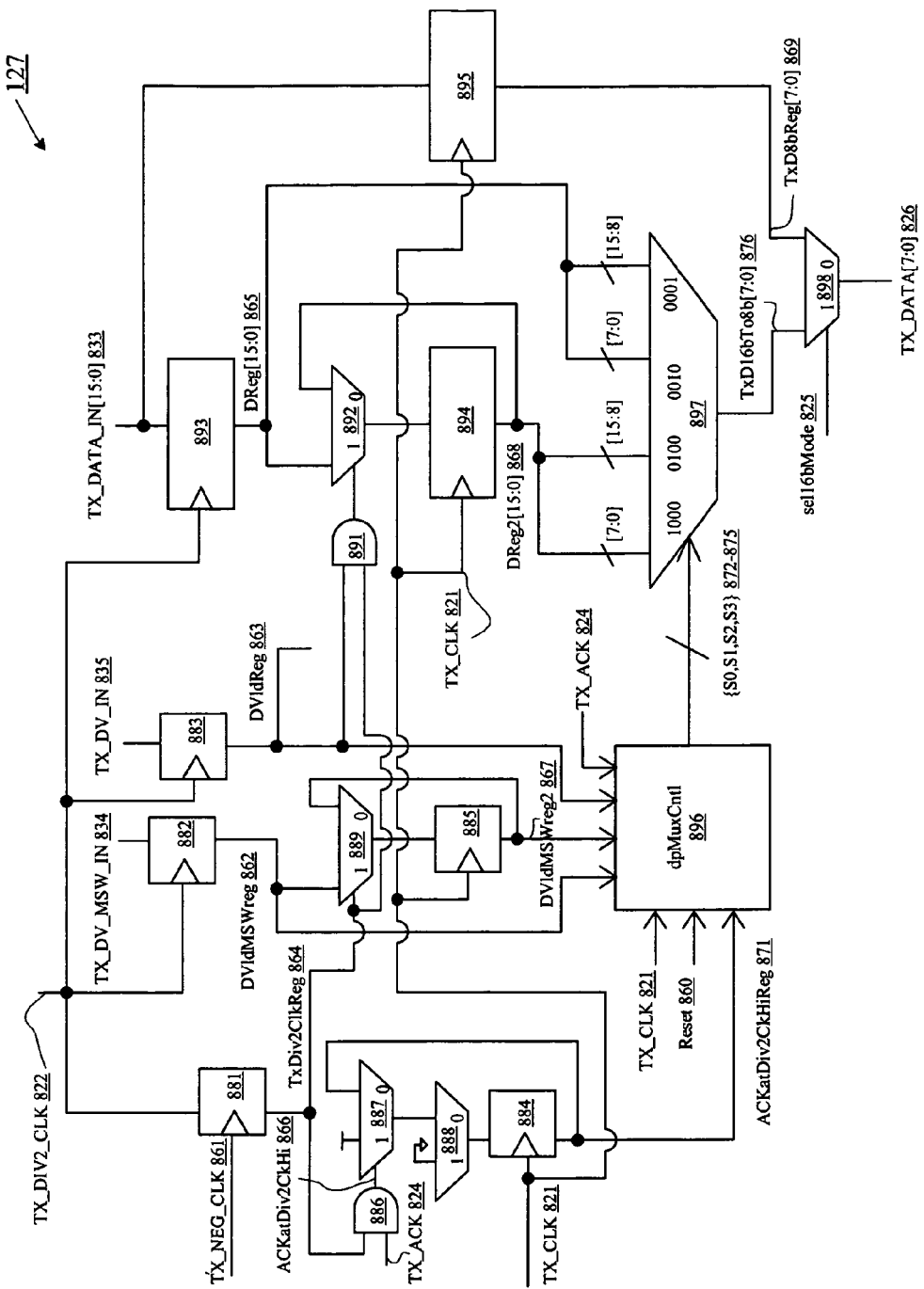

FIG. 4-5C is a table diagram listing an exemplary embodiment of definitions for memory-mapped registers. MIIMcntl register is not listed in FIG. 4-5C because it is not physically implemented; only its address is decoded to determine initiations of an MDIO register access.

Each of registers 536, 537 and 541 has a read and write function. Bit assignments 505 and default values are listed in FIG. 4-5C. Host interface registers, such as IRstatus register 536 and IRenable register 537, are implemented so that a user may alternately choose to use an interrupt as a means to inform processor 103 that a read or write 504 to an EMAC host register is completed.

When any bit 505 of IRstatus register 536 is set, DCR host completed interrupt request and DCR host done interrupt ("dcrhostdoneir") signal 407 (shown in FIG. 4-2) is asserted to raise an interrupt to processor 103, such as when an EMAC register access has completed. This facilitates processor 103 to process instructions, other than EMAC host read or write instructions, following the interrupt without having to spend time polling RDYstatus register 499 to find out when an EMAC host register read or write completes. This may be useful in a read or write to MIIM registers because MDC frequency is conventionally low compared to system clock frequency of processor 103 and conventionally approximately a hundred processor instructions may be executed in the time that it takes a MIIM register read or write to complete.

MIIM write data ("MIIMwrData") register 541 is used to hold MIIM write data temporarily before it is output from EMAC core 123 for a MIIM register write. MIIMwrData register 541 allows DCR dataRegLSW 522 to be reused to reduce the number of DCR registers used and to facilitate software programming consistency.

Table 7 lists an exemplary embodiment of a memory map for address filter registers.

TABLE 7

| Memory Address | Address Filter Register Name | Description in Verilog Notation | Default Value | Read/Write |
|---|---|---|---|---|
| 0x380 | UnicastAddrW0 | Unicast Address [31:0] | 0x0000_0000 | R/W |
| 0x384 | UnicastAddrW1 | {16'h0000, UnicastAddress [47:32]} | 0x0000_0000 | R/W |
| 0x388 | AddrTABLEConfigW0 | CAM data [31:0] | 0x0000_0000 | R/W |

TABLE 7-continued

| Memory Address | Address Filter Register Name | Description in Verilog Notation | Default Value | Read/Write |
|---|---|---|---|---|
| 0x38C | AddrTABLEConfigW1 | {8'h00, CAMrnw, 5'h00, CAMaddress[1:0], CAMdata[47:32]} | 0x0000_0000 | R/W |
| 0x390 | General Config | {Promisicuous Mode bit, 31'h0000_0000} | 0x0000_0000 | R/W |

In an implementation, an address filter block contains a four-entry CAM/MAR for multicast address matching. As described below in additional detail, host interface 112 does not directly read or write to the CAM or MARs. Instead, the CAM/MAR data, CAM/MAR address and read/write bit is written to address filter registers, namely, read configuration address table and write configuration address table, to read or write CAM/MAR entries.

In DCR bridge 113, DCR acknowledge generator ("dcrAckGen") block 551 generates DCR acknowledge ("dcrAck") 510 for a DCR access to host interface 112. DCR acknowledge 510 is generated by dcrAckGen 551 responsive to input 1506, namely, signal set (12) of Table 4.

Figures 4, 5, 6, 7:
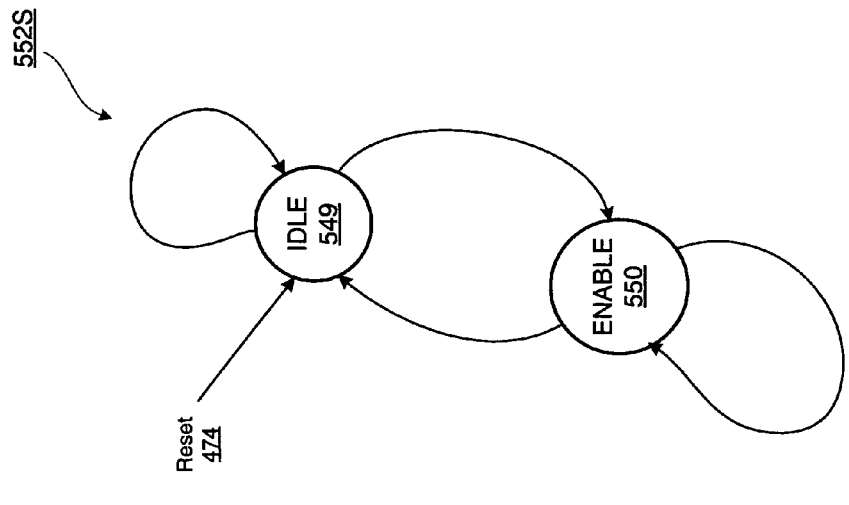
Figures 4, 5, 6:
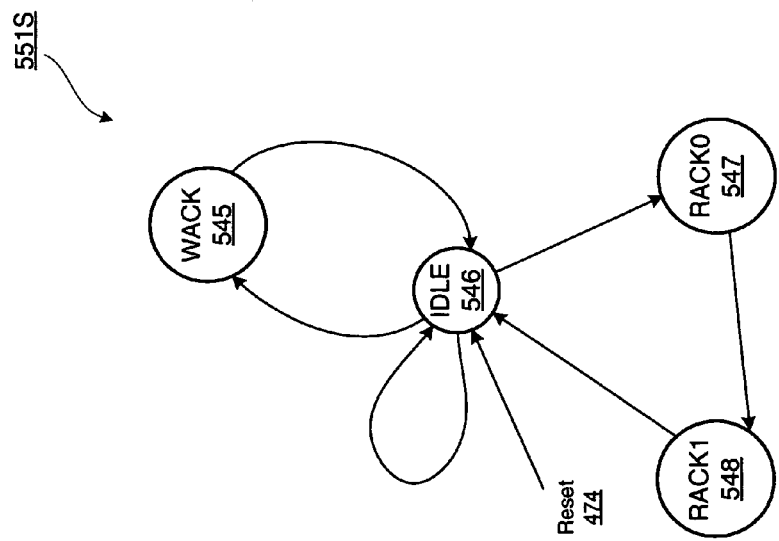

FIG. 4-6 is a state diagram depicting an exemplary embodiment of a state machine 551S of dcrAckGen 551. State machine 551S is reset responsive to reset signal 474, which places state machine 551S in idle state 546. State machine 551S transitions from idle state 546 to write acknowledge state 545 responsive to DCR write enable acknowledge signal ("dcrWrEn_ack") of signals 1506 being asserted. After which, state machine 551S from write acknowledge state 545 transitions back to idle state 546 at completion of an acknowledgment of a write to DCR registers.

Responsive to DCR read enable acknowledgment ("dcrRdEn_ack") signal of signals 1506 being asserted, state machine 551S transitions from idle state 546 to read acknowledge state zero 547. From read acknowledge state zero 547, state machine 551S transitions to read acknowledge state one 548 responsive to a next clock cycle of DCR clock signal 516. From read acknowledge state one 548, state machine 551S transitions to idle state 546 responsive to a next clock cycle of DCR clock signal 516.

State machine 551S stays in idle state 546 if neither DCR write enable acknowledgment signal nor DCR read enable acknowledgment signal are asserted. Output of state machine 551S, namely, dcrAck signal 510, is a logic 0 while in idle state 546 or read acknowledge zero state 547. In read acknowledgement one state 548 or write acknowledge state 545, dcrAck signal 510 is a logic 1.

FIG. 4-7 is a state diagram depicting an exemplary embodiment of a state machine 552S of DCR read bypass multiplexer enable ("dcrRdBypassMuxEn") generator 552. Input signals 1505 to dcrRdBypassMuxEn generator 552 are listed as signal set (15) in Table 4.

State machine 552S is reset responsive to reset signal 474, which puts state machine 552S in idle state 549. From idle state 549, state machine 552S outputs a logic zero for DCR read output enable signal 485. State machine 552S stays in idle state 549 for DCR read enable acknowledgment signal not being asserted. However, for state machine 552S receiving an asserted DCR read enable acknowledgment signal, state machine 552S transitions to enable state 550. Output of state machine 552S is a logic one for DCR read output enable signal 485 for enable state 550. State machine 552S stays in enable state 550 if DCR read enable inverted ("dcrRdEn_neg") signal is not asserted. If, however, DCR read enable inverted signal is asserted, state machine 552S transitions from enable state 550 to idle state 549.

Referring again to FIG. 4-5A, a control signal, namely, DCR read output enable ("dcrRdOutEn") signal 485, is generated by dcrRdBypassMuxEn generator 552 responsive to signals 1505, namely, signal set (15) of Table 4, for reading from DCR registers. When dcrRdOutEn signal 485 is not asserted, input to DCR bus 114 is bypassed to output of DCR bus 114 in accordance with a DCR specification for a PPC405. Control generator ("cntlGen") block 588 generates control signals 1507, namely, signal set (14) of Table 4, for reading and writing to DCR registers and host interface memory mapped registers responsive to input signals 1504, namely, signal set (13) of Table 4.

FIG. 4-8 is a block diagram depicting exemplary embodiments of logic blocks of control generator block 588 for generating control signals for reading from or writing to DCR bridge 113 to host bus 160 or 161. FIG. 4-9 is a block diagram depicting exemplary embodiments of logic blocks of control generator block 588 for generating control signals for reading or writing data from or to host bus 160 or 161 into DCR bridge 113. Simultaneous reference is made to FIGS. 4-5A, 4-8 and 4-9. Notably, due to differences in read or write timing, such as from or to a configuration register, MIIM register, statistics register, address filter configuration register or address filter CAM, separate controllers implemented with state machines may be used as indicated in this exemplary embodiment.

Control generator host interface logic block 421 includes a DCR address decoder and logic for qualifying read and write control signals. FIGS. 4-33A and 4-33B is a code listing depicting an exemplary embodiment of logic block 421, with logic equations in Verilog RTL. Logic block 421 provides output signals 1513, namely, signal set (4) of Table 1, in response to input signals 1512, namely, signal set (3) of Table 1. FIG. 4-34 is a code listing depicting an exemplary embodiment of main bus control ("busCntlMain") block 553, with logic equations in Verilog RTL. Main bus control block 553 provides output signals 1511, namely, signals from signal set (2) of Table 1, in response to input signals 1510, namely, signals from signal set (1) of Table 1.

Exemplary embodiments of state machines for configuration read/write bus controller ("configRWbusCntl") 554, MIIM read/write bus controller ("MIIMrwBusCntl") 555, statistics read bus controller ("StatsRbusCntl") 556, address filter read/write bus controller ("AFrwBusCntl") 557, and address filter content addressable memory read/write bus controller ("AFcamRWbusCntl") 558 are illustratively shown in FIGS. 4-10, 4-11, 4-12, 4-13, and 4-14, respectively.

Inputs to each controller 554 through 558 include host clock signal 440 and reset signal 474. Other inputs to controller 554 are configuration read ("configRd") signal 559 and configuration write ("configWr") signal 560. Outputs from controller 554 are opcode configuration ("Optcode cfg[1:0]") signals 564, host request configuration ("Req_cfg") signal 565, MIIM select configuration ("MIIMsel_cfg") signal 566, and DCR address enable configuration ("dcrAddEn_cfg") signal 567.

Other inputs to controller 555 include MIIM read ("MIIMrd") signal 576 and MIIM write ("MIIMwr") signal 577. Outputs from controller 555 include MIIM opcode ("Opcode_miim[1:0]") signals 580, host request MIIM ("Req_miim") signal 581, MIIM select MII ("MIIMsel_mii") signal 582, MIIM write data select ("MIIMwrDataSel") signal 583, and DCR address enable MIIM ("dcrAddrEn_miim") signal 589.

Another input to controller 556 is statistics read ("StatsRd") signal 561. Outputs from controller 556 include statistics opcode ("Opcode_Stats[1:0]") signals 568, request statistics ("Req_Stats") signal 569, MIIM select statistics ("MIIMsel_Stats") signal 570, and DCR address enable statistics ("dcrAddrEn_Stats") signal 571.

Other inputs to controller 557 include address filter read ("AddrFilRd") signal 578 and address filter write ("AddrFilWr") signal 579. Outputs from controller 557 include DCR address filter read ("dcr_AddrFilRd") signal 584, DCR address filter read select ("dcr_AddrFilRdSel") signal 585, DCR address filter write ("dcr_AddrFilWr") signal 586, and DCR address enable address filter ("dcr_AddrEn_AF") signal 587.

Other inputs to controller 558 include CAM read ("camRd") signal 562 and CAM write ("camWr") signal 563. Outputs from controller 558 include DCR address filter CAM read ("dcr_AFcamRd") signal 572, DCR address filter CAM read select ("dcr_AFcamRdSel") signal 573, DCR address filter CAM write ("dcr_AFcamWr") signal 574, and DCR address enable address filter CAM ("dcr_AddrEn_AFcam") signal 575. Again, MAR may be substituted for CAM in these signal descriptions.

Read data received controller ("rdDrecvCntl") 591 has a state machine that starts the reading process for each of read type. Configuration read/write controller ("configRWcntl") 592, statistics read controller ("StatsRcntl") 594, MIIM read/write controller ("MIIMrwCntl") 593, address filter read/write controller ("AddrFilRWcntl") 595, and address filter CAM read/write controller ("AFcamRWcntl") 596 each include a state machine for each type of read. Exemplary embodiments of state machines for configuration read/write controller ("configRWcntl") 592, statistics read controller ("StatsRcntl") 594, MIIM read/write controller ("MIIMrwCntl") 593, address filter read/write controller ("AddrFilRWcntl") 595, and address filter CAM read/write controller ("AFcamRWcntl") 596 are illustratively shown in FIGS. 4-16, 4-17, 4-18, 4-19, and 4-20, respectively.

Outputs 1515, namely, signals from signal set (2) from Table 1, from read data received controller 591 are provided responsive to inputs 1514, namely, signals from signal set (1) from Table 1, to read data received controller 591.

Inputs to each controller 592 through 596 include host clock ("hostClk") signal 440 and reset ("Reset") signal 474. Other inputs to controller 592 include configuration read receive ("configRdR") signal 597 and configuration write receive ("configWrR") signal 598. Outputs from controller 592 include data register most significant word write enable configuration ("dRegMSWwe_cfg") signal 602, data register least significant word write enable configuration ("dRegLSWwe_cfg") signal 603, configuration read done ("configRdDone") signal 604, and configuration write done ("configWrDone") signal 605.

Other inputs to controller 593 include MIIM read receive ("MIIMrdR") signal 613, MIIM write receive ("MIIMwrR") signal 590 and MIIM ready ("MIIM_rdy") signal 614. Outputs from controller 593 include data register most significant word write enable MIIM ("dRegMSWwe_miim") signal 617, data register least significant word write enable MIIM ("dRegLSWwe_miim") signal 618, MIIM read done ("MIIMrdDone") signal 619, and MIIM write done ("MIIMwrDone") signal 620. Another input to controller 594 is statistics read receive ("StatsRdR") signal 599. Outputs from controller 594 are data register most significant word write enable statistics ("dRegMSWwe_Stats") signal 606, data register least significant word write enable statistics ("dRegLSWwe_Stats") signal 607, and statistics read done ("StatsRdDone") signal 608.

Other inputs to controller 595 include address filter read receive ("AddrFilRdR") signal 615 and address filter write receive ("AddrFilWrR") signal 616. Outputs from controller 595 include data register most significant word write enable address filter ("dRegMSWwe_AF") signal 621, data register least significant word write enable address filter ("dRegLSWwe_AF") signal 622, address filter read done ("AddrFilRdDone") signal 623, and address filter write done ("AddrFilWrDone") signal 624.

Other inputs to controller 596 include CAM read receive ("camRdR") signal 600 and CAM write receive ("camWrR") signal 601. Outputs from controller 596 include data register most significant word write enable address filter CAM ("dRegMSWwe_AFcam") signal 609, data register least significant word address filter CAM ("dRegLSWwe_AFcam") signal 610, address filter CAM read done ("AFcamRdDone") signal 611, and address filter CAM write done ("AFcamWrDone") signal 612.

Returning to FIG. 4-5A, sample cycle generator block 488 generates a sample cycle signal 489 in response to input signals 1503, namely, signal set (11) from Table 4. Sample cycle signal 489 notifies DCR bridge 113 as to when to sample read data from a host clock signal 440 domain.

FIG. 4-10 is a state diagram depicting an exemplary embodiment of a state machine 554S of configuration read/write bus controller 554. State machine 554S is reset responsive to reset signal 474, which places state machine 554S in idle state 630. State machine 554S transitions from idle state 630 to configuration read ("ConfigRead") state 631 responsive to configuration read signal 559 being asserted. After which, state machine 554S from configuration read state 631 transitions back to idle state 630 at a completion of a read to EMAC configuration registers.

Responsive to configuration write signal 560 being asserted, state machine 554S transitions from idle state 630 to configuration write ("ConfigWrite") state 632. From configuration write state 632 state machine 554S transitions back to idle state 630 at a completion of a write to DCR registers.

State machine 554S stays in idle state 630 if neither configuration read signal 559 nor configuration write signal 560 is asserted. All outputs of state machine 554S, such as opcode configuration signals 564, host request configuration signal 565, MIIM select configuration signal 566, and OCR address enable configuration signal 567, are logic 0 in idle state 630. Outputs opcode configuration signals 564 and DCR address enable configuration signal 567 are logic {1,0} and logic 1, respectively, in configuration read state 631, and are respectively logic {0,0} and logic 1 in configuration write state 632. Host request configuration signal 565 and MIIM select configuration signal 566 outputs are both logic 0 in configuration read state 631 and in configuration write state 632.

Opcode configuration signal 564 is a 2-bit wide signal, host request configuration signal 565, MIIM select configuration signal 566, and DCR address enable configuration signal 567 are 1-bit wide signals. States, namely, idle state 630, configuration read state 631 and configuration write state 632 of state machine 554S, for signal outputs 564 through 567 of configuration read/write bus controller 554 are set forth below in Table 8. Table 8 lists state machine 554S status of output signals for each of the states in FIG. 4-10.

TABLE 8

|  | Opcode_cfg[1:0] | Req_cfg | MIIMsel_cfg | dcrAddrEn_cfg |
|---|---|---|---|---|
| IDLE | 00 | 0 | 0 | 0 |
| Config Read | 10 | 0 | 0 | 1 |
| CinfigWrite | 00 | 0 | 0 | 1 |

FIG. 4-11 is a state diagram depicting an exemplary embodiment of a state machine 555S of MIIM read/write bus controller 555. State machine 555S is reset responsive to reset signal 474, which places state machine 555S in idle state 633. State machine 555S transitions from idle state 633 to MIIM read 1 state 634 responsive to MIIM read signal 576 being asserted. On a next clock cycle of host clock signal 440, state machine 555S from MIIM read 1 state 634 transitions to MIIM read 2 state 635 for a completion of a read to MIIM registers. State machine 555S transitions from MIIM read 2 state 635 back to idle state 633 responsive to MIIM ready signal 614 being asserted, namely, indicating completion of this read. State machine 55S stays in MIIM read 2 state 635 if MIIM ready signal 614 is not asserted.

Responsive to MIIM write signal 577 being asserted, state machine 555S transitions from idle state 633 to MIIM write 1 state 636. From MIIM write 1 state 636 state machine 555S transitions to MIIM write 2 state 637 on a next clock cycle of host clock signal 440. State machine 555S transitions from MIIM write 2 state 637 back to idle state 633 responsive to MIIM ready signal 614 being asserted, namely, indication a completion of this write to MIIM registers. State machine 555S stays in MIIM write 2 state 637 if MIIM ready signal 614 is not asserted.

State machine 555S stays in idle state 633 if neither MIIM read signal 576 nor MIIM write signal 577 are asserted. Outputs of state machine 555S, such as MIIM opcode signals 580, host request MIIM signal 581, MIIM select MII signal 582, MIIM write data select signal 583, and DCR address enable MIIM signal 589 are logic 0 in idle state 633. Outputs MIIM opcode signals 580 are logic {1,0}, and host request MIIM signal 581, MIIM select MII signal 582 and DCR address enable MIIM signal 589 are logic 1, and output MIIM write data select signal 583 is a logic 0 in MIIM read 1 state 634.

In MIIM read 2 state 635 output MIIM select MII signal 582 is a logic 1 and outputs MIIM opcode signals 580, host request MIIM signal 581, MIIM write data select signal 583, and DCR address enable MIIM signal 589 are all logic 0. In MIIM write 1 state 636 outputs 580 are {0,1} and outputs 581 through 583 and 589 are logic 1. In MIIM write 2 state 637 output MIIM select MII signal 582 is a logic 1 and outputs MIIM opcode signals 580, host request MIIM signal 581, MIIM write data select signal 583, and DCR address enable MIIM signal 589 are all logic 0.

Outputs MIIM opcode signal 580 is a 2-bit wide signal, outputs host request MIIM signal 581, MIIM select MII signal 582, MIIM write data select signal 583, and DCR address enable MIIM signal 589 are all 1-bit wide signals. States, namely, idle state 633, MIIM read 1 state 634, MIIM read 2 state 635, MIIM write 1 state 636, and MIIM write 2 state 637, of state machine 555S for signal outputs 580 through 583 and 589 of MIIM read/write bus controller 555 are set forth below in Table 9. Table 9 lists state machine 555S status of output signals for each of the states in FIG. 4-11.

TABLE 9

|  | Opcode_miim[1:0] | Req_miim | MIIMsel_miim | MIIMwrDataSel | dcrAddrEn_miim |
|---|---|---|---|---|---|
| IDLE | 00 | 0 | 0 | 0 | 0 |
| MIIMread1 | 10 | 1 | 1 | 0 | 1 |
| MIIMread2 | 00 | 0 | 1 | 0 | 0 |
| MIIMwrite1 | 01 | 1 | 1 | 1 | 1 |
| MIIMwrite1 | 00 | 0 | 1 | 0 | 0 |

FIG. 4-12 is a state diagram depicting an exemplary embodiment of a state machine 556S of statistics read bus controller 556. State machine 556S is reset responsive to reset signal 474, which places state machine 556S in idle state 638. State machine 556S transitions from idle state 638 to statistics read ("StatsRead") state 639 responsive to statistics read signal 561 being asserted. After which, state machine 556S from statistics read state 639 transitions back to idle state 638 at a completion of a read from external FPGA-based statistics registers.

State machine 556S stays in idle state 638 if no statistics read signal 561 is asserted. Outputs of state machine 556S, such as statistics opcode signals 568, request statistics signal 569, MIIM select statistics signal 570, and DCR address enable statistics signal 571, are logic 0 in idle state 630. Outputs request statistics signal 569 and DCR address enable statistics signal 571 are both logic 1 and outputs statistics opcode signals 568 and MIIM select statistics signal 570 are both logic 0 in statistics read state 639.

Outputs statistics opcode signal 568 is a 2-bit wide signal, outputs request statistics signal 569, MIIM select statistics signal 570, and DCR address enable statistics signal 571 are 1-bit wide signals. States, namely, idle state 638 and statistics read state 639 of state machine 556S, for signal outputs 568 through 571 of statistics read bus controller 556 are set forth below in Table 10. Table 10 lists state machine 556S status of output signals for each of the states in FIG. 4-12.

TABLE 10

| | Opcode_Stats[1:0] | Req_Stats | MIIMsel_Stats | dcrAddrEn_Stats |
|---|---|---|---|---|
| IDLE | 00 | 0 | 0 | 0 |
| StatsRead | 00 | 1 | 0 | 1 |

FIG. 4-13 is a state diagram depicting an exemplary embodiment of a state machine 557S of address filter read/write bus controller 557. State machine 557S is reset responsive to reset signal 474, which places state machine 557S in idle state 640. State machine 557S transitions from idle state 640 to address filter read 1 ("AFread1") state 641 responsive to address filter read signal 578 being asserted. On a next clock cycle of host clock signal 440, state machine 557S transitions from address filter read 1 state 641 to address filter read 2 ("AFread2") state 642 for completion of a read to address filter registers. State machine 557S transitions from address filter read 2 state 642 back to idle state 640 at a completion of this read to address filter registers.

Responsive to address filter write signal 579 being asserted, state machine 557S transitions from idle state 640 to address filter write ("AFwrite") state 643. After which, state machine 557S from address filter write state 643 transitions back to idle state 640 at a completion of a write to address filter registers.

State machine 557S stays in idle state 640 if neither address filter read signal 578 nor address filter write signal 579 is asserted. Outputs of state machine 557S, such as DCR address filter read signal 584, DCR address filter read select signal 585, DCR address filter write signal 586, and DCR address enable address filter signal 587, are logic 0 in idle state 640.

In address filter read 1 state 641, DCR address filter read signal 584 and DCR address enable address filter signal 587 are both logic 1, and DCR address filter read select signal 585 and DCR address filter write signal 586 are both logic 0. In address filter read 2 state 642, output DCR address filter read select signal 585 is a logic 1 and DCR address filter read signal 584, DCR address filter write signal 586, and DCR address enable address filter signal 587 are all logic 0. In address filter write state 643, DCR address filter read signal 584 and DCR address filter read select signal 585 are both logic 0, and DCR address filter write signal 586 and DCR address enable address filter signal 587 are both logic 1.

Outputs of state machine 557S, namely, DCR address filter read signal 584, DCR address filter read select signal 585, DCR address filter write signal 586, and DCR address enable address filter signal 587, are 1-bit wide signals. States, namely, address filter read 1 state 641, address filter read 2 state 642, and address filter write state 643, of state machine 557S for signal outputs 584 through 587 of address filter read/write bus controller 557 are set forth below in Table 11. Table 11 lists state machine 557S status of output signals for each of the states in FIG. 4-13.

TABLE 11

| | dcr_AddrFilRd | dcr_AddrFilRdSel | dcr_AddrFilWr | dcrAddrEn_AF |
|---|---|---|---|---|
| IDLE | 0 | 0 | 0 | 0 |
| AFread1 | 1 | 0 | 0 | 1 |
| AFread2 | 0 | 1 | 0 | 0 |
| AFwrite | 0 | 0 | 1 | 1 |

FIG. 4-14 is a state diagram depicting an exemplary embodiment of a state machine 558S of address filter content addressable memory read/write bus controller 558. State machine 558S is reset responsive to reset signal 474, which places state machine 558S in idle state 644. State machine 558S transitions from idle state 644 to address filter content addressable memory read 1 ("AFcamRd1") state 645 responsive to CAM read signal 562 being asserted. On a next clock cycle of host clock signal 440, state machine 558S from AFcam read 1 state 645 transitions to AFcam read 2 ("AFcamRd2") state 646 for completion of a read to address filter CAM registers. State machine 558S transitions from AFcamRd2 state 646 back to idle state 644 at a completion of this read to address filter CAM registers.

Responsive to CAM write signal 563 being asserted, state machine 558S transitions from idle state 644 to AFcam write ("AFcamWr") state 647. After which, state machine 558S from AFcamWr state 647 transitions back to idle state 644 at a completion of a write to address filter CAM registers.

State machine 558S stays in idle state 644 if neither CAM read signal 562 nor CAM write signal 563 is asserted. Outputs of state machine 558S, such as DCR address filter CAM read signal 572, DCR address filter CAM read select signal 573, DCR address filter CAM write signal 574, and DCR address enable address filter CAM signal 575 are logic 0 in idle state 644.

In AFcam read 1 state 645, DCR address filter CAM read signal 572 and DCR address enable address filter CAM signal 575 are both logic 1, and DCR address filter CAM read select signal 573 and DCR address filter CAM write signal 574 are both logic 0. In AFcamRd2 state 646, DCR address filter CAM read select signal 573 is a logic 1, and DCR address filter CAM read signal 572, DCR address filter CAM write signal 574, and DCR address enable address filter CAM signal 575 are all logic 0. In AFcamWr state 647, DCR address filter CAM read signal 572 and DCR address filter CAM read select signal 573 are both logic 0, and DCR address filter CAM write signal 574 and DCR address enable address filter CAM signal 575 are both logic 1.

Outputs of state machine 558S, namely, DCR address filter CAM read signal 572, DCR address filter CAM read select signal 573, DCR address filter CAM write signal 574, and DCR address enable address filter CAM signal 575, are 1-bit wide signals. States, namely, AFcamRd1 state 645, AFcamRd2 state 646, and AFcamWr state 647, of state machine 558S for signal outputs 572 through 575 of address filter content addressable memory read/write bus controller 558 are set forth below in Table 12. Table 12 lists state machine 558S status of output signals for each of the states in FIG. 4-14.

TABLE 12

| | dcr_AFcamRd | dcr_AFcamRdSel | dcr_AFcamWr | dcrAddrEn_AFcam |
|---|---|---|---|---|
| IDLE | 0 | 0 | 0 | 0 |
| AFcamRd1 | 1 | 0 | 0 | 1 |

TABLE 12-continued

| | dcr_AFcamRd | dcr_AFcamRdSel | dcr_AFcamWr | dcrAddrEn_AFcam |
|---|---|---|---|---|
| AFcamRd2 | 0 | 1 | 0 | 0 |
| AFcamWr | 0 | 0 | 1 | 1 |

FIG. 4-15 is a state diagram depicting an exemplary embodiment of a state machine 591S of read data received controller 591. State machine 591S is reset responsive to reset signal 474, which places state machine 591S in idle state 648.

State machine 591S stays in idle state 648 if neither a host register read ("hostRegRd") signal, a host register write ("hostRegWr") signal, a content addressable memory read ("camRd") signal, nor a content addressable memory write ("camWr") signal of signals 1514 is asserted.

State machine 591S transitions from idle state 648 to start read data received ("startRdDrecv") state 649 responsive to a host register read signal of signals 1514 being asserted. After which, state machine 591S from start read data received state 649 transitions back to idle state 648 at a completion of initialization to receive read data from registers.

State machine 591S transitions from idle state 648 to start write done ("startWrDone") state 650 responsive to either a host register write signal or a content addressable memory write signal of signals 1514 being asserted. After which, state machine 591S from start write done state 650 transitions back to idle state 648 at a completion of a write to host registers.

State machine 591S transitions from idle state 648 to start content addressable memory read data received ("startCAMrdDrecv") state 651 responsive to a content addressable memory read signal of signals 1514 being asserted. After which, state machine 591S from start content addressable memory read data received state 651 transitions back to idle state 648 at a completion of initialization to receive read data from CAM registers.

Table 13 lists state machine 591S status of output signals for each of the states in FIG. 4-15.

TABLE 13

| State/Output | Idle 648 | startRdDrecv 649 | startWrDone 650 | startCAMRdDrecv 651 |
|---|---|---|---|---|
| MIImrdR | 0 | MIImrdReg | 0 | 0 |
| StatsRdR | 0 | StatsRdReg | 0 | 0 |
| configRdR | 0 | configRdReg | 0 | 0 |
| AddrFilRdR | 0 | AddrFilRdReg | 0 | 0 |
| MIImwrR | 0 | 0 | MIImwrReg | 0 |
| configWrR | 0 | 0 | configWrReg | 0 |
| AddrFilWrR | 0 | 0 | AddrFilWrReg | 0 |
| camRdR | 0 | 0 | 0 | camRdReg |
| camWrR | 0 | 0 | camWrReg | 0 |

In idle state 648, all outputs of state machine 591S are logic 0. In start read of data received state 649, status of MIImwrR, configWrR, AddrFilWrR, camRdR, and camWrR output signals of state machine 591S are all logic zero, and status of MIImrdR, StatsRdR, configRdR, and AddrFilRdR output signals of state machine 591S are respectively the status or content of their associated register, namely, MIImrdReg, StatsRdReg, configRdReg, and AddrFilRdReg, respectively.

In start write done state 650, status of MIImwrR, configWrR, AddrFilWrR, and camWrR output signals of state machine 591S are respectively the status or content of their associated register, namely, MIImwrReg, configWrReg, AddrFilWrReg, and camWrReg, respectively, and status of MIImrdR, StatsRdR, configRdR, AddrFilRdR, and camRdR output signals of state machine 591S are all logic 0. In start CAM read of data received state 651, all outputs of state machine 591S are logic 0, except for camRdR output which is the status or content of its respective register, namely, camRdReg.

FIG. 4-16 is a state diagram depicting an exemplary embodiment of a state machine 592S of configuration read/write controller 592. State machine 592S is reset responsive to reset signal 474, which places state machine 592S in idle state 652. State machine 592S transitions from idle state 652 to configuration read 1 ("ConfigRd1") state 653 responsive to configuration read receive signal 597 being asserted. After which, state machine 592S from configuration read 1 state 653 transitions back to idle state 652 at a completion of this read to host configuration registers.

Responsive to configuration write reset signal 598 being asserted, state machine 592S transitions from idle state 652 to configuration write 1 ("ConfigWr1") state 654. From configuration write 1 state 654 state machine 592S transitions back to idle state 652 at a completion of this write to host configuration registers.

State machine 592S stays in idle state 652 if neither configuration read receive signal 597 nor configuration write receive signal 598 is asserted. Outputs of state machine 592S, such as data register most significant word write enable configuration signal 602, data register least significant word write enable configuration signal 603, configuration read done signal 604, and configuration write done signal 605, are logic 0 in idle state 652.

Data register most significant word write enable configuration signal 602 is a logic 0 in both configuration read 1 state 653 and configuration write 1 state 654. In configuration read 1 state 653, data register least significant word write enable configuration signal 603 and configuration read done signal 604 are both logic 1, and output configuration write done signal 605 is a logic 0. In configuration write 1 state 654, data register most significant word write enable configuration signal 602, data register least significant word write enable configuration signal 603, and configuration read done signal 604 are all logic 0 and output configuration write done signal 605 is a logic 1.

Output signals of state machine 592S, namely, outputs 602 through 605 are 1-bit wide signals. States, namely, idle state 652, configuration read 1 state 653 and configuration write 1 state 654, are set forth below in Table 14. Table 14 lists state machine 592S status of output signals for each of the states in FIG. 4-16.

TABLE 14

| | dRegMSWwe_Cf | dRegLSWwe_cfg | configRdDone | configWrDone |
|---|---|---|---|---|
| IDLE | 0 | 0 | 0 | 0 |
| ConfigRd1 | 0 | 1 | 1 | 0 |
| CinfigWr1 | 0 | 0 | 0 | 1 |

FIG. 4-17 is a state diagram depicting an exemplary embodiment of a state machine 594S of statistics read controller 594. State machine 594S is reset responsive to reset signal 474, which places state machine 594S in idle state 655. State machine 594S stays in idle state 655 if statistics read ready signal 599 is not asserted.

State machine 594S transitions from idle state 655 to statistics read 1 ("Sr1") state 656 responsive to statistics read ready signal 599 being asserted. For each clock cycle of host clock signal 440 after state machine 594S is in statistics read 1 state 656, state machine 594S transitions to a next state. For example, from statistics read 1 state 656, state machine 594S transitions to statistics read 2 ("Sr2") state 657. From statistics read 2 state 657 state machine 594S transitions to statistics read 3 ("Sr3") state 658. From statistics read 3 state 658 state machine 594S transitions to statistics read 4 ("Sr4") state 659. From statistics read 4 state 659 state machine 594S transitions to statistics read 5 ("Sr5") state 660. From statistics read 5 state 660 state machine 594S transitions to statistics read 6 ("Sr6") state 661. From statistics read 6 state 661 state machine 594S transitions to statistics read 7 ("Sr7") state 662 for completion of a read to statistics registers. State machine 594S from statistics read 7 state 662 transitions back to idle state 655 at a completion of this read to statistics registers.

All outputs of state machine 594S, such as data register most significant word write enable statistics signal 606, data register least significant word write enable statistics signal 607, and statistics read done signal 608 are logic 0 in idle state 630. Outputs 606 through 608 of state machine 594S are all logic 0 in statistics read 1 state 656 through statistics read 5 state 660. Data register most significant word write enable statistics signal 606 and statistics read done signal 608 outputs are logic 0, and data register least significant word write enable statistics signal 607 output is a logic 1, in statistics read 6 state 661. Data register most significant word write enable statistics signal 606 and statistics read done signal 608 outputs are logic 1, and data register least significant word write enable statistics signal 607 output is a logic 0, in statistics read 7 state 662.

Outputs 606 through 608 of state machine 594S are all 1-bit wide signals. States, namely, states 656 through 662, of state machine 594S for signal outputs 606 through 608 of statistics read controller 594 are set forth below in Table 15. Table 15 lists state machine 594S status of output signals for each of the states in FIG. 4-17.

TABLE 15

|  | dRegMSWwe_Stats | dRegLSWwe_Stats | StatsRdDone |
|---|---|---|---|
| IDLE | 0 | 0 | 0 |
| Sr1 | 0 | 0 | 0 |
| Sr2 | 0 | 0 | 0 |
| Sr3 | 0 | 0 | 0 |
| Sr4 | 0 | 0 | 0 |
| Sr5 | 0 | 0 | 0 |
| Sr6 | 0 | 1 | 0 |
| Sr7 | 1 | 0 | 1 |

FIG. 4-18 is a state diagram depicting an exemplary embodiment of a state machine 593S of MIIM read/write controller 593. State machine 593S is reset responsive to reset signal 474, which places state machine 593S in idle state 663. State machine 593S stays in idle state 663 if neither of MIIM read receive signal 613 nor MIIM write ready signal 590 is asserted.

State machine 593S transitions from idle state 663 to MIIM read 1 ("MIIMr1") state 664 responsive to MIIM read receive signal 613 being asserted. State machine 593S stays in MIIM read 1 state 664 if MIIM ready signal 614 is not asserted. State machine 593S transitions from MIIM read 1 state 664 to MIIM read 2 ("MIIMr2") state 665 responsive to MIIM ready signal 614 being asserted. State machine 593S transitions from MIIM read 2 state 665 back to idle state 663 for a completion of this read receive from MIIM registers.

State machine 593S transitions from idle state 663 to MIIM write 1 ("MIIMw1") state 667 responsive to MIIM write ready signal 590 being asserted. State machine 593S stays in MIIM write 1 state 667 if MIIM ready signal 614 is not asserted. State machine 593S transitions from MIIM write 1 state 667 to MIIM write 2 ("MIIMw2") state 668 responsive to MIIM ready signal 614 being asserted. State machine 593S transitions from MIIM write 2 state 668 back to idle state 663 for a completion of this write to MIIM registers.

Outputs of state machine 593S, such as data register most significant word write enable MIIM signal 617, data register least significant word write enable MIIM signal 618, MIIM read done signal 619, and MIIM write done signal 620 are logic 0 in idle state 663, in MIIMr1 state 664 and in MIIMw1 state 667.

Data register least significant word write enable MIIM signal 618 and MIIM read done signal 619 outputs are logic 1, and data register most significant word write enable MIIM signal 617 and MIIM write done signal 620 outputs are logic 0, in MIIM read 2 state 665. Data register most significant word write enable MIIM signal 617, data register least significant word write enable MIIM signal 618 and MIIM read done signal 619 outputs are logic 0, and MIIM write done signal 620 output is logic 1, in MIIM write 2 state 668.

Outputs 617 through 620 of state machine 593S are 1-bit wide signals. States of state machine 593S for signal outputs 617 through 620 of MIIM read/write controller 593 are set forth below in Table 15. Table 15 lists state machine 593S status of output signals for each of the states in FIG. 4-18.

TABLE 15

|  | dRegMSWwe_miim | dRegLSWwe_miim | MIIMrd-Done | MIIMwr-Done |
|---|---|---|---|---|
| IDLE | 0 | 0 | 0 | 0 |
| MIIMr1 | 0 | 0 | 0 | 0 |
| MIIMr2 | 0 | 1 | 1 | 0 |
| MIIMw1 | 0 | 0 | 0 | 0 |
| MIIMw2 | 0 | 0 | 0 | 1 |

FIG. 4-19 is a state diagram depicting an exemplary embodiment of a state machine 595S of address filter read/write controller 595. State machine 595S is reset responsive to reset signal 474, which places state machine 595S in idle state 669. State machine 595S transitions from idle state 669 to address filter read 1 ("AddrFilRd1") state 670 responsive to address filter read receive signal 615 being asserted. After which, state machine 595S from address filter read 1 state 670 transitions back to idle state 669 at a completion of a read to address filter registers.

Responsive to address filter write ready signal 616 being asserted, state machine 595S transitions from idle state 669 to address filter write 1 ("AddrFilWr1") state 671. From address filter write 1 state 671 state machine 595S transitions back to idle state 669 at a completion of a write to address filter registers.

State machine 595S stays in idle state 669 if neither address filter read receive signal 615 nor address filter write ready signal 616 is asserted. Outputs of state machine 595S, such as data register most significant word write enable address filter signal 621, data register least significant word write enable address filter signal 622, address filter read done signal 623, and address filter write done signal 624, are logic 0 in idle state 669.

Data register most significant word write enable address filter signal 621 and address filter write done signal 624 outputs are both logic 0, and data register least significant word write enable address filter signal 622 and address filter read done signal 623 outputs are both logic 1, in AddrFilRd1 state 670. Data register most significant word write enable address filter signal 621, data register least significant word write enable address filter signal 622 and address filter read done signal 623 outputs are all logic 0, and address filter write done signal 624 output is logic 1, in AddrFilWr1 state 671.

Outputs of state machine 595S, namely, outputs 621 through 624 are 1-bit wide signals. States, namely, idle state 669, address filter read 1 state 670 and address filter write 1 state 671, are set forth below in Table 16. Table 16 lists state machine 595S status of output signals for each of the states in FIG. 4-19.

TABLE 16

|  | dReg-MSWwe_AF | dReg-LSWwe_AF | AddrFilRd-Done | AddrFilWr-Done |
|---|---|---|---|---|
| IDLE | 0 | 0 | 0 | 0 |
| AddrFilRd1 | 0 | 1 | 1 | 0 |
| AddrFilWr1 | 0 | 0 | 0 | 1 |

FIG. 4-20 is a state diagram depicting an exemplary embodiment of a state machine 596S of address filter CAM read/write controller 596. State machine 596S is reset responsive to reset signal 474, which places state machine 596S in idle state 672. State machine 596S transitions from idle state 672 to address filter content addressable memory read 1 ("AFcamRd1") state 673 responsive to CAM read receive signal 600 being asserted. State machine 596S from AFcamRd1 state 673 transitions back to idle state 672 at a completion of this read to CAM registers.

State machine 596S transitions from idle state 672 to address filter content addressable memory write 1 ("AFcamWr1") state 674 responsive to CAM write ready signal 601 being asserted. On the next clock cycle of host clock signal 440, state machine 596S transitions from AFcamWr1 state 674 to address filter content addressable memory write 2 ("AFcamWr") state 675 for a write to CAM registers. State machine 596S transitions from AFcamWr2 state 675 back to idle state 672 at a completion of this write to CAM registers.

State machine 596S stays in idle state 672 if neither CAM read receive signal 600 nor CAM write ready signal 601 is asserted. Outputs of state machine 596S, such as data register most significant word write enable address filter CAM signal 609, data register least significant word address filter CAM signal 610, address filter CAM read done signal 611, and address filter CAM write done signal 612, are logic 0 in idle state 672 and in AFcamWr1 state 674.

Data register most significant word write enable address filter CAM signal 609, data register least significant word address filter CAM signal 610, and address filter CAM read done signal 611 outputs are all logic 1, and address filter CAM write done signal 612 output is a logic 0, in AFcamRd1 state 673. Data register most significant word write enable address filter CAM signal 609, data register least significant word address filter CAM signal 610, and address filter CAM read done signal 611 outputs are all logic 0, and output address filter CAM write done signal 612 is a logic 1, in AFcamWr2 state 675.

Outputs of state machine 596S, namely, outputs 609 through 612 are 1-bit wide signals. States, namely, states 673 through 675, of state machine 596S for signal outputs 609 through 612 of address filter CAM read/write controller 596 are set forth below in Table 17. Table 17 lists state machine 596S status of output signals for each of the states in FIG. 4-20.

TABLE 17

|  | dReg-MSWwe_AFcam | dRegLSWwe_AFcam | AFcamRd-Done | AFcamWr-Done |
|---|---|---|---|---|
| IDLE | 0 | 0 | 0 | 0 |
| AFcamRd1 | 1 | 1 | 1 | 0 |
| AFcamWr1 | 0 | 0 | 0 | 0 |

FIGS. 4-21A through 4-21C are timing diagrams for respective exemplary instances of generation of a sample cycle pulse 489. In FIG. 4-21A, host clock signal 440 has a period which is three times longer than the period of DCR clock signal 516. A sample cycle pulse 544A is generated responsive to each falling edge of host clock signal 440, or generally at one-half the period of host clock signal 440.

In FIG. 4-21B, host clock signal 440 has a period which is four times longer than the period of DCR clock signal 516. A sample cycle pulse 544B is generated responsive to the first falling edge of DCR clock signal 516 immediately following a falling edge of host clock signal 440.

In FIG. 4-21C, host clock signal 440 has a period which is five times longer than the period of DCR clock signal 516. A sample cycle pulse 544C is generated responsive to the first falling edge of DCR clock signal 516 immediately after a first rising edge of DCR clock signal 516 that immediately follows a falling edge of host clock signal 440.

Accordingly, it should be appreciated that by bridging DCR registers with a finite state machine, which may be broken up into several finite state machines, several DCR registers may be mapped to a significantly larger address space, such as control registers. Moreover, DCR bridge emulates a set of signals, namely, platform independent host interface signals, for access to such control registers. In other words, DCR bridge 113 maps a small register address space, such as four DCR registers, to a significantly larger register address space, such as control and status registers of EMAC 110, and mapping the significantly larger address space to the small register address space.

Register Access

EMAC core host registers, address filter registers, statistic registers, and MIIM registers may be accessed. The description that follows is for EMAC0 host registers; however, the same description applies to EMAC1 host registers.

As mentioned above, an access to EMAC host register may take several dcrClk signal 516 cycles, because a system clock of processor 103 may run at a higher frequency than host clock signal 440. As a result, a polling or interrupt may be used to ensure that an EMAC register access is completed before processor 103 issues another host interface access.

Some of the EMAC0 core host registers are Receive Configuration Word 0, Receive Configuration Word 1, Transmit Configuration, Flow Control Configuration and Management Configuration. From an exemplary flow for one of these registers, flows for all read/write access to EMAC0 core host registers will be understood. Additionally, continuing the example of PPC405 for processor 103, it will be assumed that access is to Device Control Registers ("DCRs").

FIG. 4-22 is a flow diagram depicting an exemplary embodiment of a receive configuration word register read access flow 700. At 701, a read command and read address for EMAC0 core host register is set up. This may be for a DCR control register, such as control register 500 of FIG. 4-5A. A read bit may be registered, as well as the read address, for this set up. At 702, a DCR write to the DCR control register is done to instruct host interface 112 to execute the read command. In other words, the write to the DCR control register is done to read the EMAC0 core host register.

At 703, polling or waiting for an interrupt is done by processor 103 for confirmation of completion of the read. At 704, host interface 112 deposits the data read in a data register. In an implementation, the least significant word is read first, and thus read data is deposited into DCR dataRegLSW 498. A DCR read may be done from dataRegLSW 498 to retrieve the read data deposited.

FIG. 4-23 is a flow diagram depicting an exemplary embodiment of a receive configuration word register write access flow 710. At 711, write data to the EMAC core host register is set up. The write data may be set up for dataRegLSW 498.

At 712, the write command address for the EMAC core host register is set up. The write bit and write command address may be registered in Register File register for this set up. At 713, write data is put in a data register, such as DCR dataRegLSW 498. At 714, a write command is issued from processor 103 to host interface 112 to do a DCR write to control register 500 to instruct host interface 112 to write the data in dataRegLSW 498 into an EMAC core host register. Note that the write data may be written into dataRegLSW 498 before writing a command to control register 500. At 715, processor 103 polls or waits for an interrupt for another host interface instruction.

Statistics registers may be implemented in the FPGA fabric 101. However, host interface 112 has logic as described above used to read the statistics registers. The statistics registers may be read only.

FIG. 4-24 is a flow diagram depicting an exemplary embodiment of a multicast frames received okay register read flow ("statistics register read flow") 720. To read statistics registers, at 721 a set up for a read command and a statistics register address is done. This set up may be done for control register 500 with registering a read bit and a statistics register address.

At 722, a DCR write to cntlReg 500 is done to instruct host interface 112 to start a statistics register read. This may be done by issuing a read command from processor 103 to host interface 112.

At 723, polling or waiting for an interrupt may be done by processor 103 to determine if a read has been completed in response to the read command issued. Host interface 112 gets data read from the statistics register addressed and puts such data in data registers, such as in dataRegMSW 497 and dataRegLSW 498 in executing a read command. At 724, DCR bridge 113 reads from dataRegMSW 497 to obtain the most significant word of the read data, and at 725, DCR bridge 113 reads from dataRegLSW 498 to obtain the least significant word of the read data.

FIG. 4-25 is a flow diagram depicting an exemplary embodiment of a MIIM register read flow 730. At 731, a physical layer address and a register address are set up and written into a data register, such as into DCR dataRegLSW 498. At 732, a host register read enable bit is set, such as to a logic 0, and a MIIM control address is set up.

At 733, a DCR write to control register 500 is done thereby initiating a read of the MIIM register addressed. At 734, processor 103 polls the DCR RDYstatus register 499 or waits for an interrupt to determine whether the read has completed. When the data read completes, host interface 112 deposits the read data in dataRegLSW 498. Processor 103 may then do a DCR read on dataRegLSW 498 to get the MIIM register read data.

FIG. 4-26 is a flow diagram depicting an exemplary embodiment of a MIIM register write flow 740. At 741, MIIM write data is set up.

At 743, a Register File register is set up for writing thereto. A host write enable bit is set, such as to logic 1, and an address for MIIM write data register 541 is set.

At 744, MIIM data is written to a DCR data register, such as dataRegLSW 498. At 745, the data from dataRegLSW 498 is transferred to host memory-mapped MIIMwrData register 541 by doing a DCR write to cntlReg 500 with the host write enable bit and MIIMwrData register address set.

At 746, a physical layer device address and a register address are set up. At 747, the physical layer device address and the register address are written into DCR dataRegLSW 498. At 748, a write to DCR cntlReg 500 is done with host write enable bit set and MIIM control register address set to start a host interface write to MIIMwrData register 541. At 749, processor 103 polls the DCR RDYstatus register 499 or waits for an interrupt for another host interface instruction.

Reads and writes to address filter registers for a unicast address register and general configuration registers are the same steps as reads and writes to EMAC core host registers, and thus such reads and writes are not repeated. However, reads and writes to address filter CAM is slightly different.

FIG. 4-27 is a flow diagram depicting an exemplary embodiment of a host interface CAM entry read flow 760. At 761, CAM read/write bit is set, such as to a logic 1; a CAM address is set. At 761, a CAM data field is cleared, such as to "0". At 762, the CAM read/write and address bits are registered by a DCR write to dataRegLSW 498. At 763, a host register write enable bit is set, and a read configuration address table address is set.

At 764, a DCR write to cntlReg 500 is done. This write initiates a read of a host interface CAM entry, namely, a read of a register associated with the read configuration address table address. Responsive to the read initiated, host interface 112 deposits CAM entry read data, such as for CAM entry 1, upper bits in DCR dataRegMSW 497 and deposits CAM entry read data lower bits in DCR dataRegLSW 498. At 765, processor 103 polls the DCR RDYstatus register 499 or waits for an interrupt for completion of the read of the host interface CAM entry.

To obtain deposited read data, at 766 processor 103 issues a DCR read of dataRegMSW 497 and dataRegLSW 498 to get the CAM entry data. This may be done in two steps, where for example upper bits from dataRegMSW 497 are obtained first, and then lower bits from dataRegLSW 498 are obtained. Again, though the term CAM is used, it should be appreciated that it may be replaced with MAR throughout herein.

FIG. 4-28 is a flow diagram depicting an exemplary embodiment of a host interface CAM entry write flow 770. At 771, CAM data is set up and obtained. At 772, a DCR write to dataRegLSW 498 with the CAM data is done. At 773, a write to a write configuration address table is set up.

At 774, a host register write enable bit is set and an address to the write configuration address table is set up. At 775, a DCR write to cntlReg 500 is done with the EMAC host register write enable bit set, such as to a logic 1, and an address field set to the write configuration address table address. This commands host interface 112 to write CAM data from DCR dataRegLSW 498 into an address filter register, namely, the write configuration address table register associated with the write configuration address table address.

At 776, a CAM read/write bit is cleared, such as set to logic 0, and a CAM address field is set, such as to logic 1 for CAM entry 1. At 777, CAM data remaining is set up. At 778, a DCR write is done to place CAM write enable, CAM address and CAM data remaining into dataRegLSW 498.

At 779, a write to the read configuration address table is set up. At 780, the host register enable bit is set and a read configuration address table address is set up. At 781, a DCR write to cntlReg 500 is done with EMAC host register write enable bit set, such as to logic 1, and an address field set to the read configuration address table. This DCR write to cntlReg 500 commands host interface 112 to put the write data in dataRegLSW 498 into the CAM entry, such as CAM entry 1, which in this example may be a register associated with the read configuration address table address.

FIG. 4-29 is a block diagram depicting an exemplary embodiment of host interface CAM entry read flow 760. Host interface 112 includes DCR registers 751. Notably, in this exemplary implementation four DCR registers 497 through 500, as previously described, are used. A user's software program causes information to be loaded into dataRegLSW 498 as generally indicated by arrow 726. A user's program causes information to be loaded into cntlReg 500 as generally indicated by arrow 727. Once information is written into DCR registers 498 and 500, as previously described, hardware writes content of dataRegLSW 498 into register 718 of host interface registers 705. As previously mentioned, register 718 is a register associated with an address table configuration entry. Responsive to a CAM read/write bit and CAM address bits written into register 718, CAM 706 deposits CAM data 716 into dataRegMSW 497 and deposits CAM data 717 into dataRegLSW 498, as respectively generally indicated with arrows 728 and 729.

FIG. 4-30 is a block diagram depicting an exemplary embodiment of host interface CAM entry write flow 770. Information is written into dataRegLSW 498 by a user's software program, as generally indicated with arrow 737. Information is written into cntlReg 500 by a user's software program, as generally indicated with arrow 738. Contents of dataRegLSW 498 is written into register 750 of host interface registers 705, as generally indicated with arrow 739. Register 750 is associated with a configuration address table, as previously described.

Information is again written into dataRegLSW 498 by a user's software program, as generally indicated with arrow 737, and information is again written into cntlReg 500 by a user's software program, as generally indicated with arrow 738. Hardware writes dataRegLSW 498 content into register 718 of host interface registers 705, as generally indicated with arrow 767. Register 718 is associated with a configuration address table, as previously described. Responsive to a CAM read/write bit and CAM address bits written into register 718, hardware writes content from register 718 into location 716 of CAM 706, as generally indicated with arrow 768, and writes content from register 750 into location 717 of CAM 706, as generally indicated with arrow 769.

In both FIGS. 4-29 and 4-30, some numerical examples have been provided for purposes of clarity by way of example. For example, CAM 706 is illustratively shown as a 48 bit wide memory that is four entries deep; address locations for five host interface registers 705 are illustratively shown; and four DCR registers 751 having two-bit addresses are illustratively shown. However, it should be understood that other bit values, addresses, and numbers of registers/memory size may be used. Furthermore, though a CAM 706 is described, it should be understood that CAM functionality may be provided with circuits other than memory, such as registers and comparators.

FIG. 4-31 is a high-level block diagram depicting an exemplary embodiment of host interface 112 coupled to a physical layer device 119D. Physical layer device 119D includes MIIM registers 754. Data and control information are provided to data least significant word register 498 and control register 500 of DCR registers 751, as generally respectively indicated by arrows 755 and 756. This data and control information may be provided by a user software program. This may be done one time for initialization of host interface 112.

After data is provided to data register least significant word 498 as generally indicated by arrow 755 and control information is provided to control register 500 as generally indicated by arrow 756, data may be transferred from data least significant word register 498 to management configuration register 759 of host interface registers 705, as generally indicated by arrow 757. Host interface 112 writes data from data register least significant word 498 into management configuration register 759.

Data and control information is again provided to data least significant word register 498 and control register 500 of DCR registers 751, as generally respectively indicated by arrows 755 and 756. Again, this may be done by a user software program, though not for initialization this time.

After control information is passed to control register 500 in this second instance, host interface 112 captures MIIM read data in data register least significant word 498 responsive to physical layer device 119D asserting host MIIM ready signal 408. This capturing of data is generally indicated by arrow 758 where data from a register of MIIM registers 754 is transferred to data least significant word register 498. Notably, a physical layer device may be located internal or external to a programmable logic device in which an EMAC, such as EMAC 110, is located.

FIG. 4-32 is a high-level block diagram depicting an exemplary embodiment of interfacing between host interface 112 and physical layer device 119D for a write to an EMAC 110 or 111. Data and control information are provided to data least significant word register 498 and control register 500 as respectively indicated by arrows 792 and 793. This may be done once for initialization of host interface 112, and may be done by a user software program.

After control information is written to control register 500, as generally indicated by arrow 793, host interface 112 writes data from data least significant word register 498 to management configuration register 759 as generally indicated by arrow 791.

On a second iteration of writing data to data register least significant word 498 and control information to control register 500 by a user software, host interface 112 initiates a write of data in data least significant word register 498 to MIIM write data register 752, as generally indicated with arrow 795.

On a third iteration of writing data to data register least significant word 498 and control information to control register 500 by user software, host interface 112 initiates a write of data in MIIM write data register 752 to a register of MIIM registers 754, as generally indicated with arrow 794. This write may be provided to physical layer device 119D via an MDIO interface.

Client Interface

Returning to FIG. 1, by providing an embedded EMAC, clock frequency may be increased to higher than approximately 125 MHz with an implementation employing standard cells in processor block 102. In an implementation, EMAC 110 may be clocked at approximately twice the clock frequency ("overclocking") than that of supporting logic in FPGA 100, so that EMAC 110 is capable of approximately a doubling of data rate output to enhance data throughput.

In an implementation, supporting logic in FPGA 100 is run at approximately 125 MHz because it is the clock frequency that FPGA fabric 101 supports, and thus existing supporting logic does not have to be extensively redesigned for migration to an FPGA 100 having one or more embedded EMACs. For purposes of clarity by way of example and not limitation, it will be assumed that supporting logic in FPGA 100 is operated at half the clock frequency of embedded EMAC 110, other than at the boundaries between EMAC 110 and FPGA fabric 101. Accordingly, width of client interfaces 127 and 128 is doubled, for example from an 8 bit width to a 16 bit width, to compensate for the slower clock frequency of FPGA fabric 101 to maintain enhanced data throughput of EMAC 110.

To maintain backward compatibility, datapath widths of client interfaces 127 and 128 may be selectable, such as for example to be 8 bits, when both EMAC 110 and a user design instantiated in FPGA fabric 101 ("the client") are running at the same clock frequency, such as for example approximately 125 MHz. Selection of datapath width of client interfaces 127 and 128 may be independently controlled by input pins to processor block 102 for each receive and transmit direction, because transmit and receive may run independently from one another and thus may operate at different frequencies.

Mode select signals may be provided to FPGA fabric 101 via input tie-off pins of processor block 102. Input tie-off pins could be tied to a particular value when an FPGA is configured or could be varied if they are controlled by FPGA logic.

Client Interface—Transmit-Side

FIG. 5A is a high-level block diagram depicting an exemplary embodiment of a transmit-side ("Tx") client interface 810. Client interface 810 includes EMAC0 110. EMAC0 110 includes EMAC core 123 and Tx datapath 127D, namely Tx client interface 127 of FIG. 1A. EMAC core 123 includes Tx engine 820. A Tx clock signal 821 and a divided version thereof, namely Tx divided clock signal 822, are provided from EMAC core 123 to transmit client interface 127 (e.g., Tx DP 127D). Other signals provided from EMAC core 123 to transmit client interface 127 include a select mode signal 825, which may be for selecting a 16 bit mode for example.

It should be understood that configurable logic of FPGA 100 may operate even maximally at a frequency which is substantially less than that achievable by an EMAC 110 embedded in FPGA 100. For example, configurable logic of FPGA 100 may have a maximum frequency of operation of approximately 125 MHz, and embedded EMAC 110 may have a maximum frequency of operation of approximately twice or greater than that of FPGA 100. Thus, by having a wider data width for configurable logic, frequency of operation of embedded EMAC 110 may be greater than that of configurable logic. However, embedded EMAC 110 may also be used for communication to networks, backplanes or other media outside of FPGA 100. Embedded EMAC 110 may be capable of data rates greater than 1.25 Gigabits per second, which is greater than the current Ethernet standard, namely, approximately 1.0 Gigabits per second. Accordingly, for example, FPGA 100 may be coupled to another medium, such as a backplane, to operate at non-standard data rates, such as in excess of 1.25 Gigabits per second. Thus, transmit and receive client interfaces described herein should not be considered as only being coupled for communication with configurable logic of FPGA 100, but may be used for communication external to FPGA 100, including communication at non-standard data rates.

From Tx engine 820, transmit collision signal 829 and transmit retransmit signal 830 are provided to Tx client interface 127 (e.g., Tx DP 127D). Transmit client interface 127 is configured to provide transmit collision signal 837 and transmit retransmit signal 838 responsive to transmit collision signal 829 and transmit retransmit signal 830 respectively. A transmit collision signal is to indicate a collision on a medium, and a retransmit signal is to indicate a frame to retransmit owing to aborting transmission of the frame due to the collision.

Transmit client interface 127 is configured to provide transmit acknowledge output signal 832 responsive to transmit acknowledge signals 823 and 824. A transmit acknowledge signal is a handshake signal, which for example may be asserted after an EMAC accepts a first byte of data of a transmitted frame. Data, such as from FPGA fabric 101, to be transmitted, may be provided to transmit client interface 127 via transmit data input signal 833, transmit data valid signal most significant word input signal 834, and transmit data valid input signal 835. Additionally, transmit underrun signal 836 may be asserted by a client to force an EMAC to insert an error code to corrupt the then current frame and then fall back to an idle transmission state. For example, an aborted transfer can occur if a first-in, first-out buffer stack ("FIFO") coupled to a client interface empties before a frame is completely transmitted.

Transmit client interface 127 is configured to provide transmit underrun signal 828 responsive to transmit engine 820 responsive to transmit underrun signal 836. Transmit client interface 127 is configured to provide transmit data valid signal 827 to transmit engine 820 responsive to transmit data valid signals 834 and 835. Transmit client interface 127 is configured to provide transmit data signal 826 to transmit engine 820 responsive to transmit data input signal 833. Tx client interface 127 generates TX_DATA_VALID signal 827 to indicate to EMAC core 123 that data input to Tx engine 820 is valid.

In an implementation, transmit data input signal 833 may actually be 16 signals, namely a 16 bit wide input, where transmit client interface 127 is configured to relay such data to transmit engine 820 via transmit data signal 826 and a fraction of such input data width, such as for example transmit data signal 826 may be an 8 bit wide signal. Accordingly, it should be appreciated that FPGA fabric 101 may operate at a slower frequency that EMAC 110, thereby allowing EMAC 110 to have a higher data throughput though processing data in a width that is less than the input data width.

A transmit inter-frame gap ("IFG") delay signal 816 may be provided from FPGA fabric 101 to transmit engine 820 for adjustment of delay between frames. Such a signal may be a plurality of signals for a particular bit width, such as for example an 8 bit width.

Transmit engine 820 may be configured for a Media Independent Interface ("MII") and in particular a Gigabit MII ("GMII"). For purposes of clarity by way of example and not limitation, it will be assumed that Tx engine 820 is configured for a GMII. A Gigabit transmit clock signal 811 is provided to transmit engine 820 from a user. Responsive to clock signal 811, transmit engine 820 is configured to provide GMII transmit clock signal 812. Transmit engine 820 is further configured to provide GMII transmit enable signal 813, GMII transmit data signal 814, and GMII transmit error signal 815. GMII transmit data signal 814 is responsive to transmit data signal 826, and in an implementation may have the same bit width, such as 8 signals for an 8 bit wide output.

Tx client interface 810 may convert txFirstByte signal 839 and txUnderrun 836 from TX_DIV2_CLK 822 clock domain to TX_CLK 821 clock domain, and convert TX_COLLISION signal 829 and TX_RETRANSMIT 830 from TX_CLK 821 clock domain to TX_DIV2_CLK 822 clock domain when EMAC is operating in 16-bit mode. Tx first byte signal 839 may be asserted when a first byte of a frame is transmitted via Tx client interface 127.

FIG. 5C is a schematic diagram depicting an exemplary embodiment of a transmit-side client interface client interface 127 (e.g., Tx DP 127D). Transmit divide by two clock signal 822 is provided as clock signal input to registers 882, 883, and 893. Transmit clock signal 821 is provided as a clock input to registers 884, 885, 894, and 895. An inverted version of transmit clock signal 821, namely transmit inverted clock signal 861, is provided as clock input to register 881.

Data input to register 881 is transmit divide by two clock signal 822. Data input to register 882 is transmit data valid most significant word input signal 834. Data input to register 883 is transmit data valid input signal 833. Data input to registers 893 and 895 is transmit data input signal 883, which for example may be a 16 bit wide input. Output of register 881 is transmit divide by two clock registered signal 864, which is provided as input to AND gate 886 and AND gate 891, and is provided as a control select input to multiplexer 889. Output of register 882 is data valid most significant word registered signal 862, which is provided as an input to datapath multiplexer controller 896 and to a logic high input of multiplexer 889. Output of register 883 is data valid registered signal 863, which is provided as an input to datapath multiplexer controller 896 and to AND gate 891.

Output of AND gate 891 is a control select signal input to multiplexer 892. Output of register 893 is registered data signal 865 which may be a 16 bit wide output. Data registered signal 865 is provided to a logic high input of multiplexer 892 and to multiplexer 897. Data registered signal 865 may be divided for inputting to multiplexer 897 in an implementation directed to specific designated binary input ports. Output of data register 895 is provided to a logic low level input of multiplexer 898 and is transmit data 8 bit mode registered signal 869. Output of multiplexer 892 is provided to register 894.

Output of register 894 is fed back to a logic low state input of multiplexer 892 and is data registered two signal 868, which may be a 16 bit wide data signal in an implementation. Data registered two signal 868 is provided as data input to multiplexer 897. In an implementation, data registered two signal 868 may be divided in half, with one half going to one binary logic designation of multiplexer 897 and the other half going to a different binary designation input of multiplexer 897. Output from datapath multiplexer controller 896 is select signals, such as select signals S0, S1, S2, S3, respectively referenced as signal 872-875, which are provided as input to multiplexer 897. Thus, for example, signal S3 may be used for selecting data bits [15:8] input to port 0001 of multiplexer 897. Continuing this exemplary implementation, each select signal 872 through 875 would be for selecting a different portion of either data registered signal 865 or 868 for output from multiplexer 897.

Output from multiplexer 897 is transmit data 16 bit mode to 8 bit mode signal 876. Accordingly, in an implementation, data width of transmit data 16 bit mode to 8 bit mode signal 867 would be an 8 bit wide signal which may be provided to a logic high input of multiplexer 898. Select 16 bit mode signal 825 may be provided as a control select signal to multiplexer 898. The other input to multiplexer 898, namely transmit data 8 bit mode registered signal 869, is provided to a logic low input of multiplexer 898.

Either of inputs 876 or 869 may be selected responsive to select mode signal 825 to provide transmit data signal 826, which in an implementation would be an 8 bit wide data output. Another input to AND gate 886 is transmit acknowledge signal 824, and output from AND gate 886 is acknowledged at divide by two clock signal being logic high 866, which is provided as a control select input to multiplexer 887. Another input to multiplexer 887 may be tied to a logic high state. Output of multiplexer 887 is provided as an input, such as a logic zero input to multiplexer 888. Another input to multiplexer 888 may be tied to a logic low state. Output of multiplexer 888 may be provided as data input to register 884. Output of multiplexer 889 is provided to data register 885, the output of which is data valid most significant word registered two signal 867, which is provided as an input to datapath multiplexer controller 896 and fed back as a data input to multiplexer 889.

Data valid inputs TX_DV_MSW_IN 834 and TX_DV_IN 835 and data input TX_DATA_IN[15:0] 833 from FPGA fabric 101 may be registered immediately responsive to TX_DIV2_CLK 822 in Tx client interface 810 to facilitate timing in a design instantiated in FPGA fabric 101. Sel16bMode signal 825 is for selecting a data width mode, for example such as whether a Tx client interface is operating in a 16-bit mode or 8-bit mode.

A datapath multiplexer controller ("dpMuxCntl") 896 generates datapath control signals S0, S1, S2, and S3 872 through 875, respectively, to appropriately convert for example a 16-bit wide data input to 8-bit wide data output, such as TX_DATA[7:0] 826, to Tx Engine 820 of EMAC core 123.

Tx client interface 810 may have to handle a number, for example four, instances of input data. In an instance, TX_ACK 824 is asserted while TX_DIV2_CLK 822 is at a logic high level, and transmit data is an even number of bytes. In another instance, TX_ACK 824 is asserted while TX_DIV2_CLK 822 is at a logic high level, and transmit data is an odd number of bytes. In yet another instance, TX_ACK 824 is asserted while TX_DIV2_CLK 822 is at a logic low level, and transmit data is an even number of bytes. And in still yet another instance, TX_ACK 824 is asserted while TX_DIV2_CLK 822 is at a logic low level, and transmit data is an odd number of bytes.

An acknowledge ("ACKatDiv2CkHiReg") signal 871 is asserted when TX_DIV2_CLK signal 822 is registered at a logic high level. Acknowledge signal 871 may be used to determine when TX_ACK 824 is asserted with respect to phase of TX_DIV2_CLK 822.

Figure 5D:
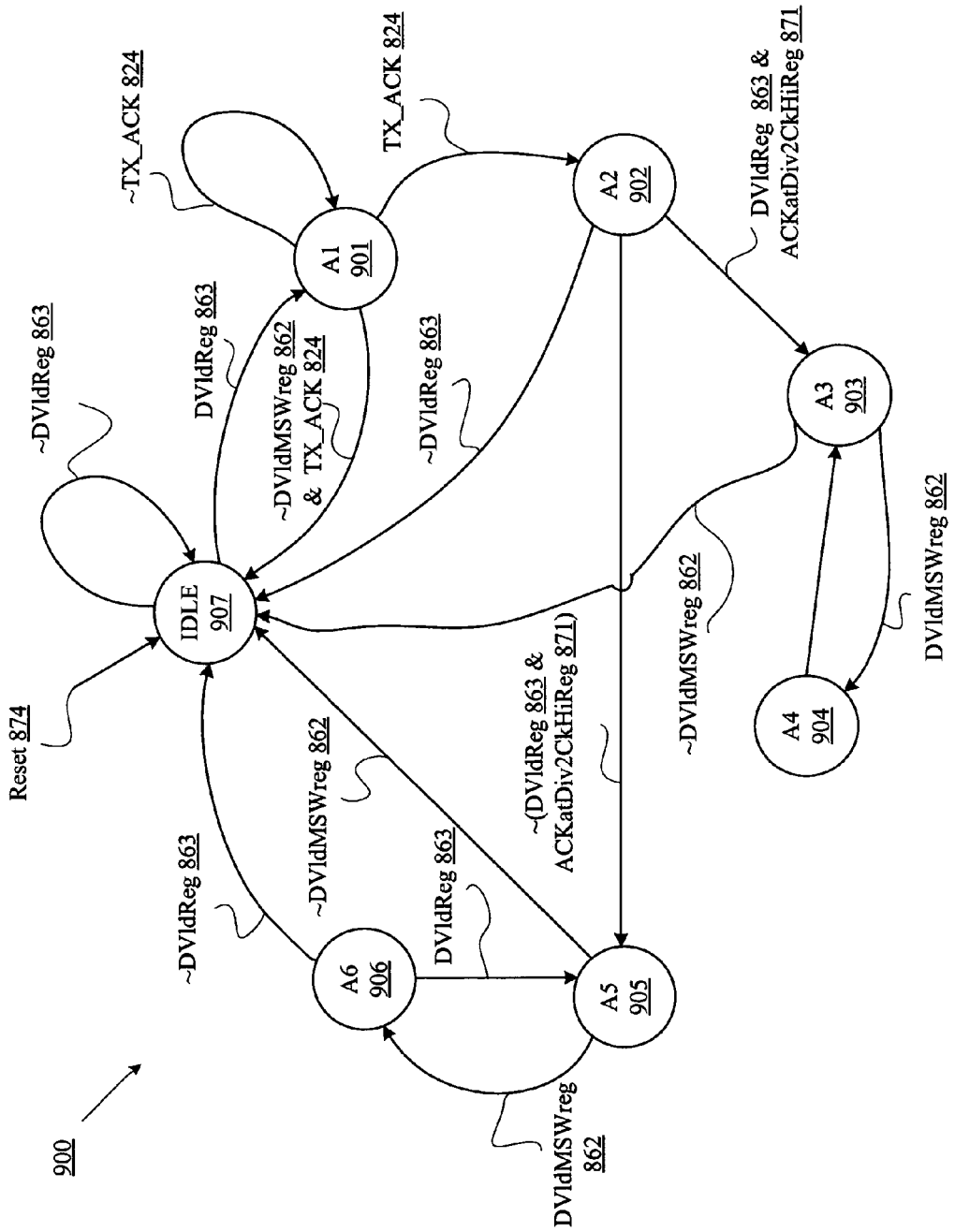
FIG. 5D is a state diagram depicting an exemplary embodiment of a state machine for a datapath multiplexer controller block.

FIG. 5D is a state diagram depicting an exemplary embodiment of a state machine 900 for dpMuxCntl block 896. State machine 900 is reset responsive to reset signal 874, which places state machine 900 in an idle state 907. State machine 900 stays in idle state 907 until a data valid register ("DVldReg") signal 863 is asserted.

State machine 900 transitions from idle state 907 to an odd octet transmission state A1 901 responsive to signal DVldReg 863 being asserted. State machine stays in A1 state 901 until Tx_Ack signal 824 is asserted. If only one data octet is being transmitted, if a data valid most significant word register ("DVldMSWreg") signal 862 is not asserted and Tx_Ack signal 824 is asserted, state machine 900 transitions from state A1 901 back to idle state 907. If two or more data octets are transmitted, DVldMSWreg signal 862 may be maintained in an asserted state when Tx_Ack signal 824 is asserted causing state machine 900 to transition from state A1 901 to an even octet transmission state A2 902. State machine 900 transitions from state A2 902 back to idle state 907, if DVldReg signal 863 is deasserted.

If ACKatDiv2CkHiReg signal 871 is asserted while DVldReg signal 863 is being asserted, state machine 900 transitions from state A2 902 to an odd octet transmission state A3 903. Notably, Tx_Ack signal 824 is asserted while Tx_Div2_Clk signal 822 is in a logic high state for this transition. If DVldMSWreg signal 862 is deasserted at this juncture meaning that the current transmission is done, state machine 900 transitions from state A3 903 back to idle state 907.

If DVldMSWreg signal 862 is still asserted, providing an even number of data octets is being transmitted, state machine 900 transitions from state A3 903 to an even octet transmission state A4 904. If DVldMSWreg signal 862 is then deasserted, state machine 900 transitions from state A4 904 back to odd octet transmission state A3 903.

If both DVldReg signal 863 and ACKatDiv2CkHiReg signal 871 are not asserted while state machine 900 is in state A2 902, and Tx_Ack signal 824 is asserted while Tx_Div2_Clk signal 822 is in a logic low state, state machine 900 transitions from state A2 902 to an odd octet transmission state A5 905. If DVldMSWreg signal 862 is deasserted, providing this transmission of an odd number of data octets is done, state machine 900 transitions from state A5 905 back to idle state 907. If DVldMSWreg signal 862 is asserted for transmission of an even number of data octets, state machine 900 transitions from state A5 905 to an even octet transmission state A6 906.

If DVldReg signal 863 is asserted for transmission of an odd number of data octets, state machine 900 transitions from state A6 906 back to state A5 905. If DVldReg signal 863 is deasserted, providing this transmission of an even number of data octets is done, state machine 900 transitions from state A6 906 back to idle state 907.

All four outputs of state machine 900, such as outputs S0 through S3, are logic 0 in idle state 907. Output S0 is a logic 1 and outputs S1 through S3 are all logic 0 in both states A1 901 and A5 905. Output S1 is a logic 1 and outputs S0, S2, and S3 are all logic 0 in both states A2 902 and A6 906. Output S2 is a logic 1 and outputs S0, S1, and S3 are all logic 0 in state A3 903. Output S3 is a logic 1 and outputs S0 through S2 are all logic 0 in state A4 904.

Outputs of state machine 900, namely, outputs S0 through S4, are 1-bit wide signals. States, namely, states A1 901 through A6 906, of state machine 900 for signal outputs S0 through S3 of dpMuxCntl block 896 are set forth below in Table 18. Table 18 lists state machine 900 status for output signals for each of the states in FIG. 5D.

TABLE 18

|       | S0 | S1 | S2 | S3 |
|-------|----|----|----|----|
| IDLE  | 0  | 0  | 0  | 0  |
| A1    | 1  | 0  | 0  | 0  |
| A2    | 0  | 1  | 0  | 0  |
| A3    | 0  | 0  | 1  | 0  |
| A4    | 0  | 0  | 0  | 1  |
| A5    | 1  | 0  | 0  | 0  |
| A6    | 0  | 1  | 0  | 0  |

Figure 5E:
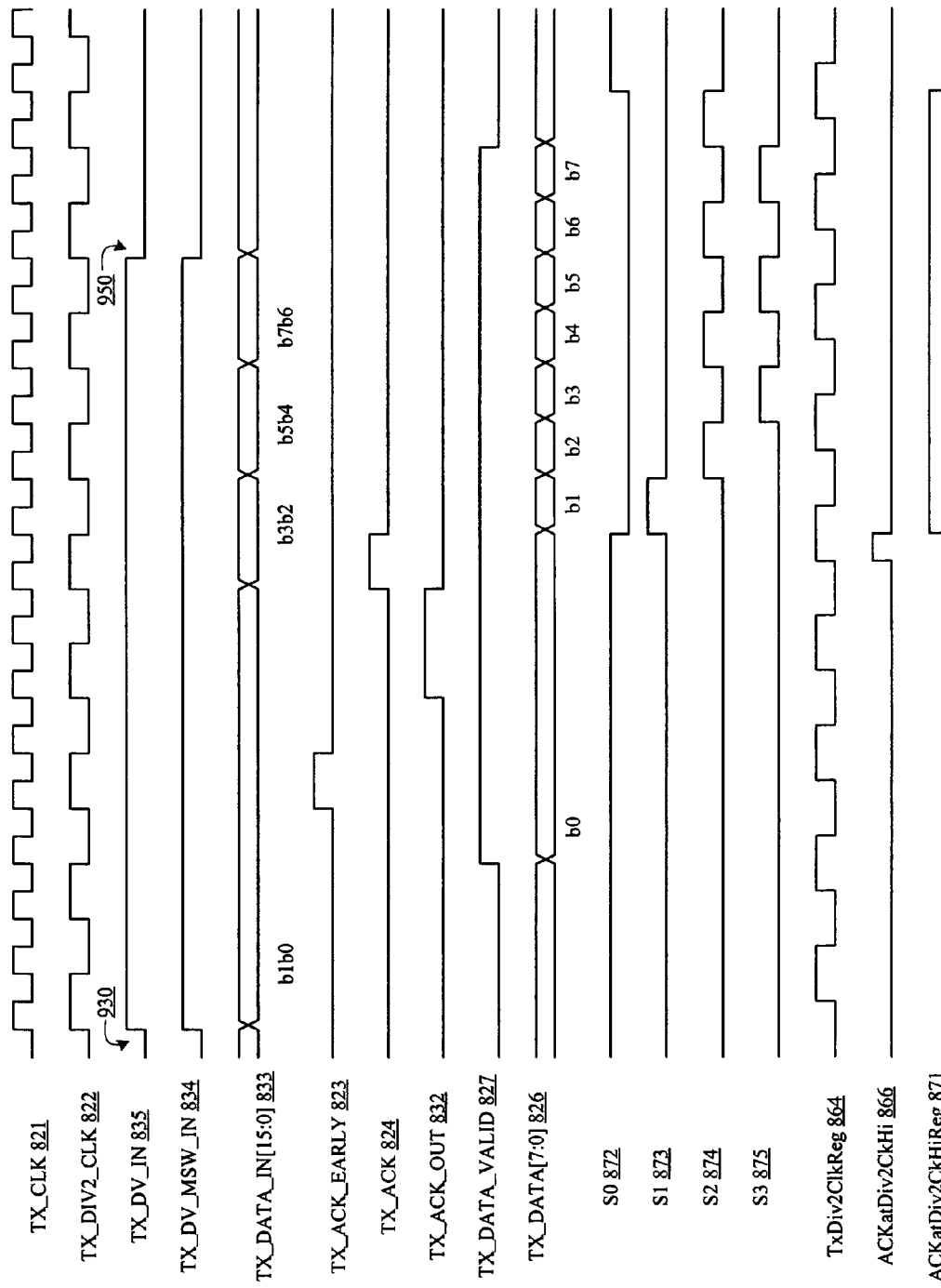
FIGS. 5E, 5F, 5G and 5H are respective output timing diagrams of exemplary embodiments of either even or odd transmit data byte lengths for when a transmit datapath is in an 16-bit mode.
Figure 5F:
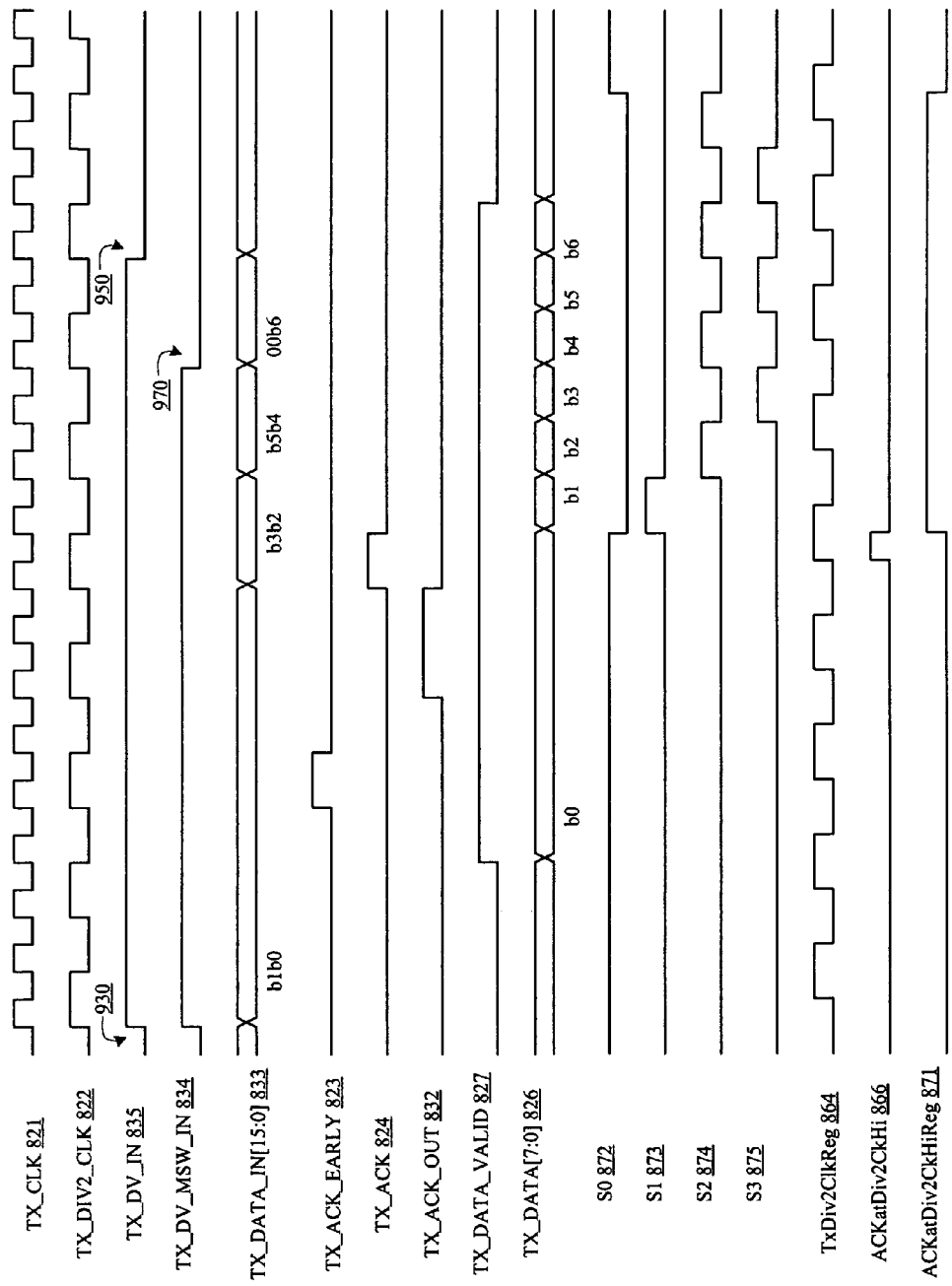
Figure 5G:
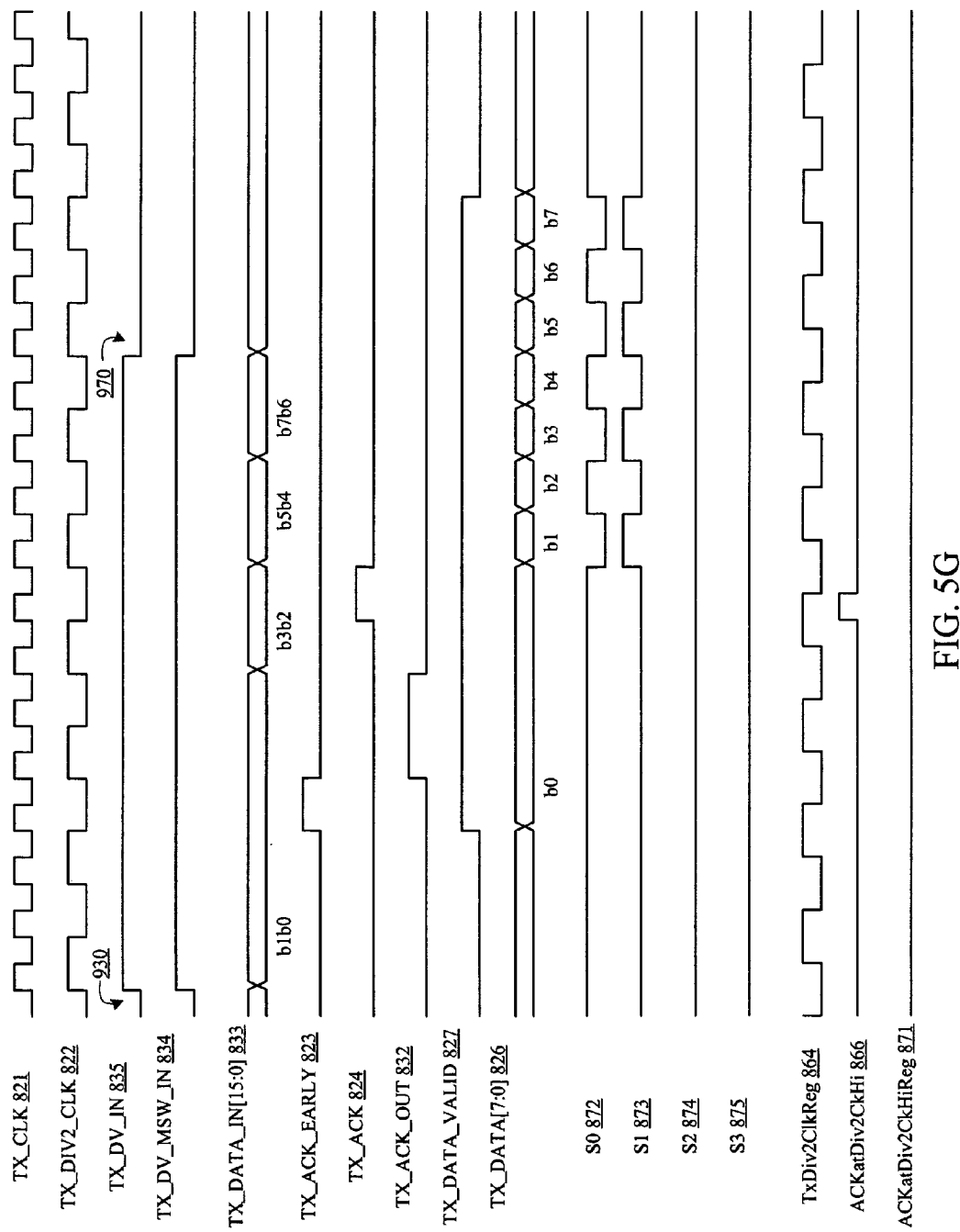
Figure 5H:
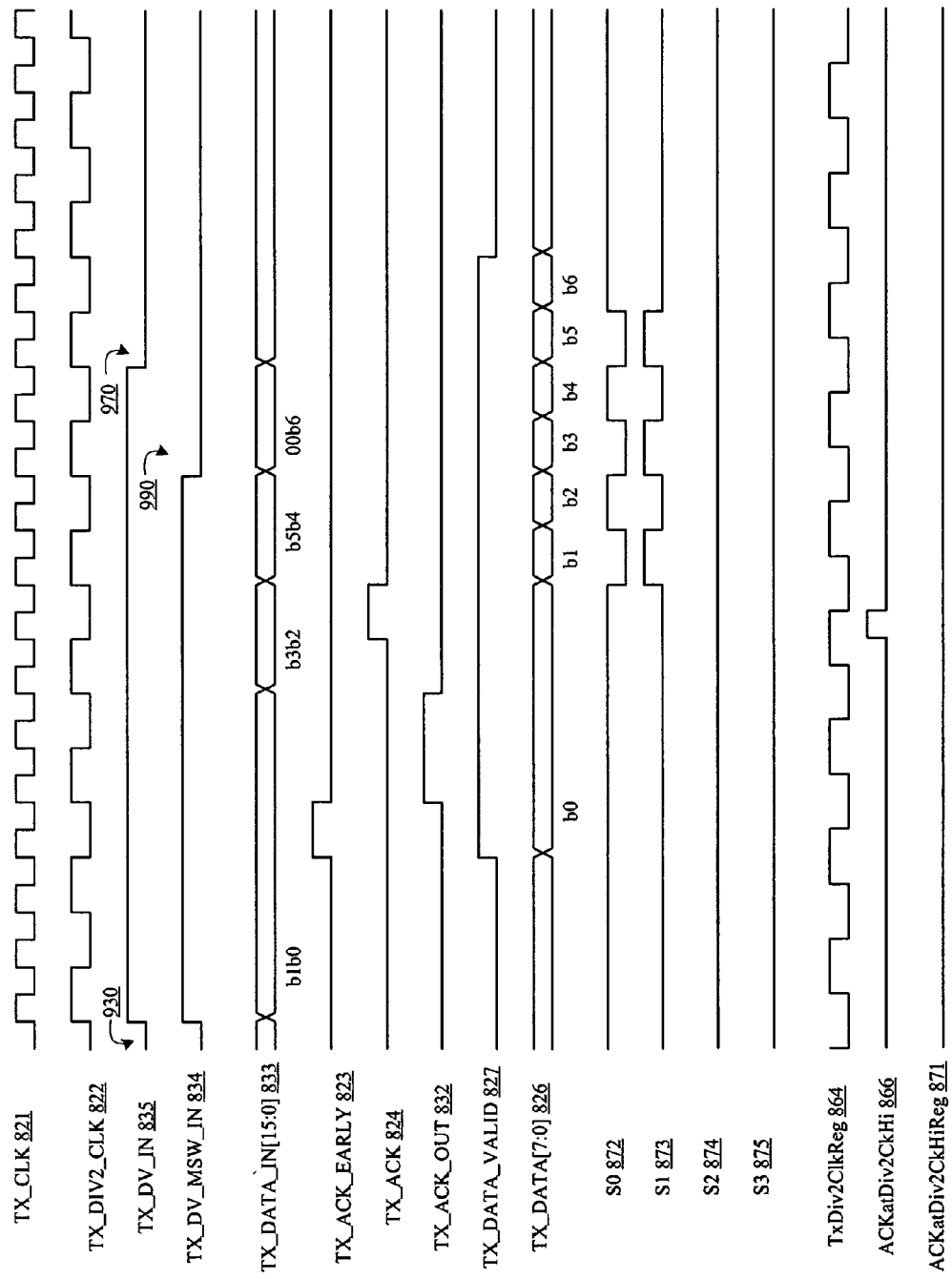
Figure 5I:
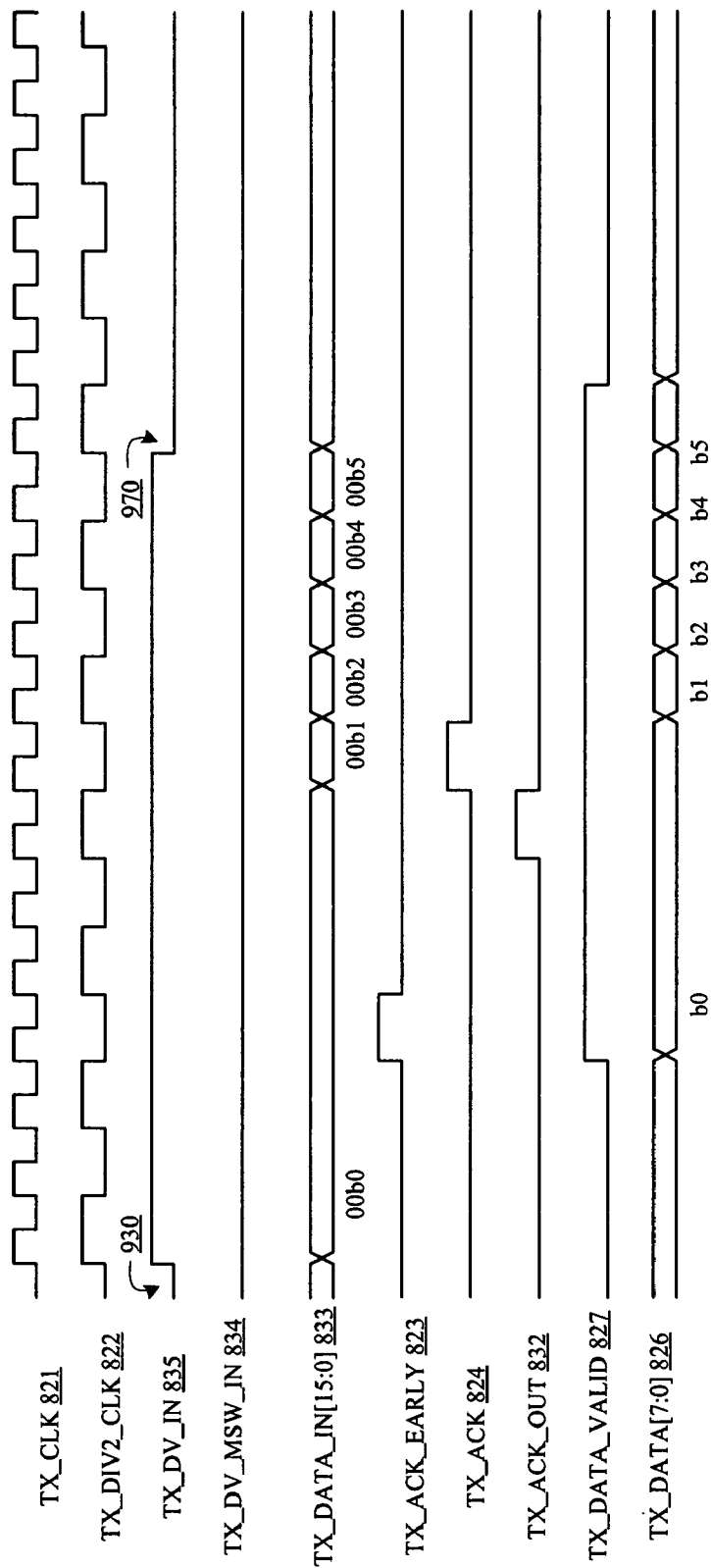
FIG. 5I is an output timing diagram depicting an exemplary embodiment of a bypass mode for when a transmit datapath is in an 8-bit mode.
Figures 1, 5J:
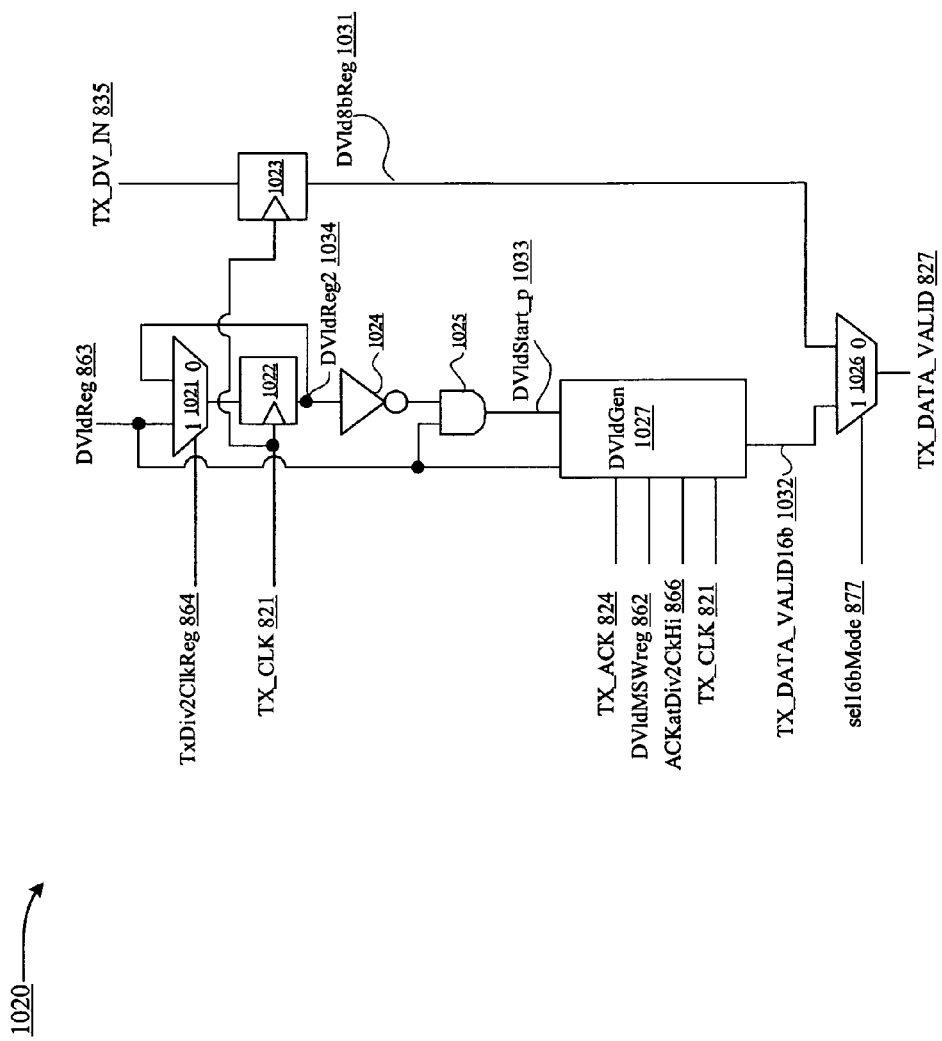
Figures 2, 5J:
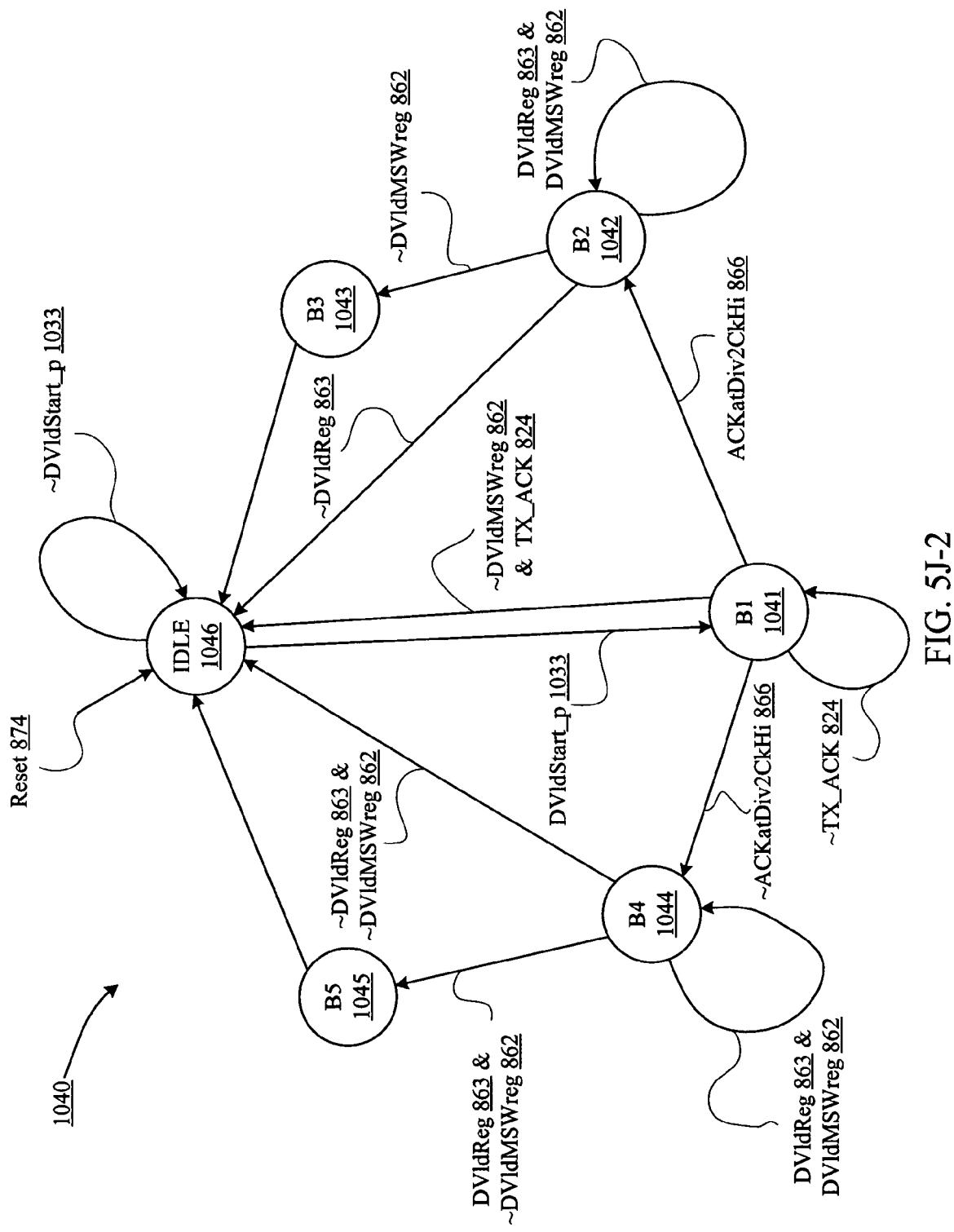

FIG. 5J-1 is a schematic diagram depicting an exemplary embodiment of a transmit data valid generator 1020. Transmit data valid generator 1020 receives data valid registered signal 863 to a logic high input of multiplexer 1021 and to data valid generator 1027. Output of multiplexer 1021 is provided to register 1022 which is clocked responsive to transmit clock signal 821. Output of register 1022 is data valid registered two signal 1034 which is provided to an input of inverter 1024 and to a logic low input of multiplexer 1021.

Multiplexer 1021 is provided a registered clock signal, namely transmit divide by two clock registered signal 864, as a control select signal input. Data valid registered signal 863 is provided to an input of AND gate 1025 along with the output of inverter 1024 to provide data valid start pulse signal 1033. Data valid start pulse signal 1033 is provided as an input to data valid generator 1027. Other inputs to data valid generator 1027 are transmit acknowledge signal 824, data valid most significant word registered signal 862, and acknowledge at a logic high state of divide by two clock signal 866.

Data valid generator 1027 is clocked responsive to an inputted transmit clock signal 821. Output of data valid generator 1027 is transmit data valid signal 1032 for a 16 bit data width mode. This transmit data valid for 16 bit data width mode signal 1032 is provided as an input to a logic high input of multiplexer 1026. Transmit data valid input signal 835 is provided to register 1023 which is clocked responsive to transmit clock signal 821. Output of register 1023 is data valid 8 bit wide mode registered signal 1031. Data valid 8 bit wide mode registered signal 1031 is provided to a logic low input of multiplexer 1026. Select 16 bit mode signal 877 is provided as a control select input to multiplexer 1026 to select as between the above-mentioned inputs to provide transmit data valid signal 827 as an output.

FIG. 5J-2 is a state diagram depicting an exemplary embodiment of a state machine 1040 for data valid generator 1027. State machine 1040 is reset responsive to reset signal 874, which places state machine 1040 in an idle state 1046. State machine 1040 stays in idle state 1046 until a data valid start pulse ("DVldStart_p") signal 1033 is asserted.

If DVldStart_p signal 1033 is asserted, state machine 1040 transitions from idle state 1046 to a first data octet state B1 1041. State machine 1040 stays in state B1 1041 until TX_ACK signal 824 is asserted. If TX_ACK signal 824 is asserted while DVldMSWreg signal 862 is not asserted for only one data octet being transmitted, state machine 1040 transitions from state B1 1041 back to idle state 1046.

If ACKatDiv2CkHi signal 866 is asserted, state machine 1040 transitions from state B1 1041 to state B2 1042. State machine 1040 stays in state B2 1042 if DVldReg signal 863 and DVldMSWreg signal 862 are both asserted for continued data input for the then current transmission. If DVldReg signal 863 is deasserted for an even number of data octets being transmitted, state machine 1040 transitions from state B2 1042 back to idle state 1046. If DVldMSWreg signal 862 is deasserted for an odd number of data octets being transmitted, state machine 1040 transitions from state B2 1042 to state B3 1043. From state B3 1043 state machine 1040 transitions back to idle state 1046 at a completion of the then current transmission.

If, while in state B1 1044, ACKatDiv2CkHi signal 866 is deasserted, state machine 1040 transitions from state B1 1041 to state B4 1044. State machine 1040 stays in state B4 1044 if DVldReg signal 863 and DVldMSWreg signal 862 are both asserted for continued data input for the then current transmission. If DVldReg signal 863 and DVldMSWreg signal 862 are both deasserted for an even number of data octets being transmitted, state machine 1040 transitions from state B4 1044 back to idle state 1046. If DVldMSWreg signal 862 is asserted while DVldMSWreg signal 862 is deasserted for an odd number of data octets being transmitted, state machine 1040 transitions from state B4 1044 to state B5 1045. From state B5 1045 state machine 1040 transitions back to idle state 1046 at a completion of the then current transmission.

The output of state machine 1040, which is output TX_DATA_VALID signal 827, is a logic 0 in idle state 1040 and in states B3 1043, B4 1044, and B5 1045. Output TX_DATA_VALID signal 827 is a logic 1 or a logic 0, namely, the content of a data valid register ("DVldReg"), in state B1 1041 and in state B2 1042.

The output of state machine 1040, namely, output TX_DATA_VALID signal 827, is a 1-bit wide signal. States, namely, states B1 1041 through B5 1045, of state machine 1040 for output TX_DATA_VALID signal 827 are set forth below in Table 19. Table 19 lists state machine 1040 status for TX_DATA_VALID signal 827 for each of the states in FIG. 5J-2.

TABLE 19

|  | TX_DATA_VALID |
| --- | --- |
| IDLE | 0 |
| B1 | DVldReg |
| B2 | DVldReg |
| B3 | 0 |
| B4 | 0 |
| B5 | 0 |

FIGS. 5E, 5F, 5G and 5H are respective output timing diagrams of exemplary embodiments of either even or odd transmit data byte lengths for when transmit client interface 127 is in an 16-bit mode. In FIG. 5E, TX_ACK signal 824 is asserted when TX_DIV2_CLK signal 822 is generally at a logic high level and TX_DATA[7:0] signal 826 has an even number of bytes. Notably, TX_DV_IN signal 835 and TX_DV_MSW_IN signal 834 are generally asserted, raised to a logic high level, at 930 and de-asserted, lowered to a logic low level, at 950.

In FIG. 5F, TX_ACK signal 824 is asserted when TX_DIV2_CLK signal 822 is generally at a logic high level and TX_DATA[7:0] signal 826 has an odd number of bytes. Notably, TX_DV_IN signal 835 and TX_DV_MSW_IN signal 834 are generally asserted at 930, but TX_DV_MSW_IN signal 834 is de-asserted at 970 prior to TX_DV_IN signal 835 which is de-asserted at 950.

In FIG. 5G, TX_ACK signal 824 is asserted when TX_DIV2_CLK signal 822 is generally at a logic low level and TX_DATA[7:0] signal 826 has an even number of bytes. Notably, TX_DV_IN signal 835 and TX_DV_MSW_IN signal 834 are generally asserted at 930 and de-asserted at 970.

In FIG. 5H, TX_ACK signal 824 is asserted when TX_DIV2_CLK signal 822 is generally at a logic low level and TX_DATA[7:0] signal 826 has an odd number of bytes. Notably, TX_DV_IN signal 835 and TX_DV_MSW_IN signal 834 are generally asserted at 930, but TX_DV_MSW_IN signal 834 is de-asserted at 990 prior to TX_DV_IN signal 835 which is de-asserted at 970.

FIG. 5I is an output timing diagram depicting an exemplary embodiment of a bypass mode for when transmit client interface 127 is in an 8-bit mode. In a bypass mode, TX_DV_MSW_IN signal 834 is maintained de-asserted, and TX_DV_IN signal 835 is asserted generally at 930 and de-asserted generally at 970. In this example, TX_DATA[7:0} signal 826 has an even number of bytes, though an odd number of bytes may be used in bypass mode.

Client Interface—Receive Side

FIG. 5B is a high-level block diagram depicting an exemplary embodiment of a receive-side ("Rx") client interface 840. Rx client interface 840 includes EMAC0 110. EMAC0 110 includes EMAC core 123 and Rx client datapath 128D, namely Rx client interface 128 of FIG. 1A. EMAC core 123 includes Rx engine 850. GMII receive clock signal 841 is provided to Rx engine 850 along with GMII Rx data valid signal 842, GMII Rx data signal 843, and GMII Rx error signal 844.

In an implementation, GMII Rx data signal 843 may be an 8 bit wide signal or signals to provide an 8 bit wide input. EMAC core 123 is configured to provide Rx clock signal 278 responsive to GMII Rx clock signal 841. EMAC core 123 provides Rx clock signal 278 to Rx client interface 128. Additionally, EMAC core 123 may be configured to provide a divided version of Rx clock signal 278, such as Rx divided by two clock signal 845 to Rx client interface 128.

Rx engine 850 is configured to provide Rx data signal 846 and Rx data valid signal 847 responsive to GMII Rx data signal 843 and GMII Rx data valid signal 842, respectively. Rx engine 850 is further configured to provide Rx good frame signal 848 and Rx bad frame signal 849 to Rx client interface 128. Rx data signal 846 and Rx data valid signal 847 are provided from Rx engine 850 to Rx client interface 128. EMAC core 123 is configured to provide a select mode signal 851 to Rx client interface 128. Select mode signal 851 may in an implementation be for selecting a 16 bit wide mode for data processing.

Rx client interface 128 (e.g., Rx DP 128D) is configured to provide data output signal 852 responsive to Rx data signal 846. In an implementation, Rx data signal 843 and Rx data signal 846 may each be 8 bits wide and data output signal 852 may be a 16 bit wide signal, namely, 16 signals provided in parallel to provide the 16 bit wide output.

Rx client interface 128 is configured to provide data valid most significant word output signal 853 and data valid output signal 854 responsive to Rx data signal 846 and Rx data valid signal 847. Rx client interface 128 is configured to provide Rx good frame output signal 855 and Rx bad frame output signal 856 responsive to Rx good frame signal 848 and Rx bad frame signal 849, respectively. Rx client interface 128 converts RX_GOOD_FRAME and RX_BAD_FRAME signals 848 and 849 from an RX_CLK signal 841 domain to an RxDiv2Clk signal 845 domain. A good frame signal may be asserted after the last byte of data is received to indicate reception of a compliant frame. A bad frame signal may be asserted after the last byte of data is received to indicate reception of a non-compliant frame.

Rx client interface 128 obtains RX_DATA_VALID 847 and RX_DATA[7:0] 846 from a physical layer interface, such as for an Ethernet. In an implementation, this data signaling may be at a frequency up to approximately 250 MHz when an overclocking or a 16-bit mode is used. By registering upon receipt RX_DATA_VALID 847 and RX_DATA[7:0] 846 in Rx client interface 128, design timing is simplified. In an implementation, Rx client interface 128 may assemble two data octets for output to FPGA fabric 101 in 16-bit increments so that FPGA fabric 101 can be run at half of the clock frequency of incoming data while maintaining data throughput.

Figure 5K:
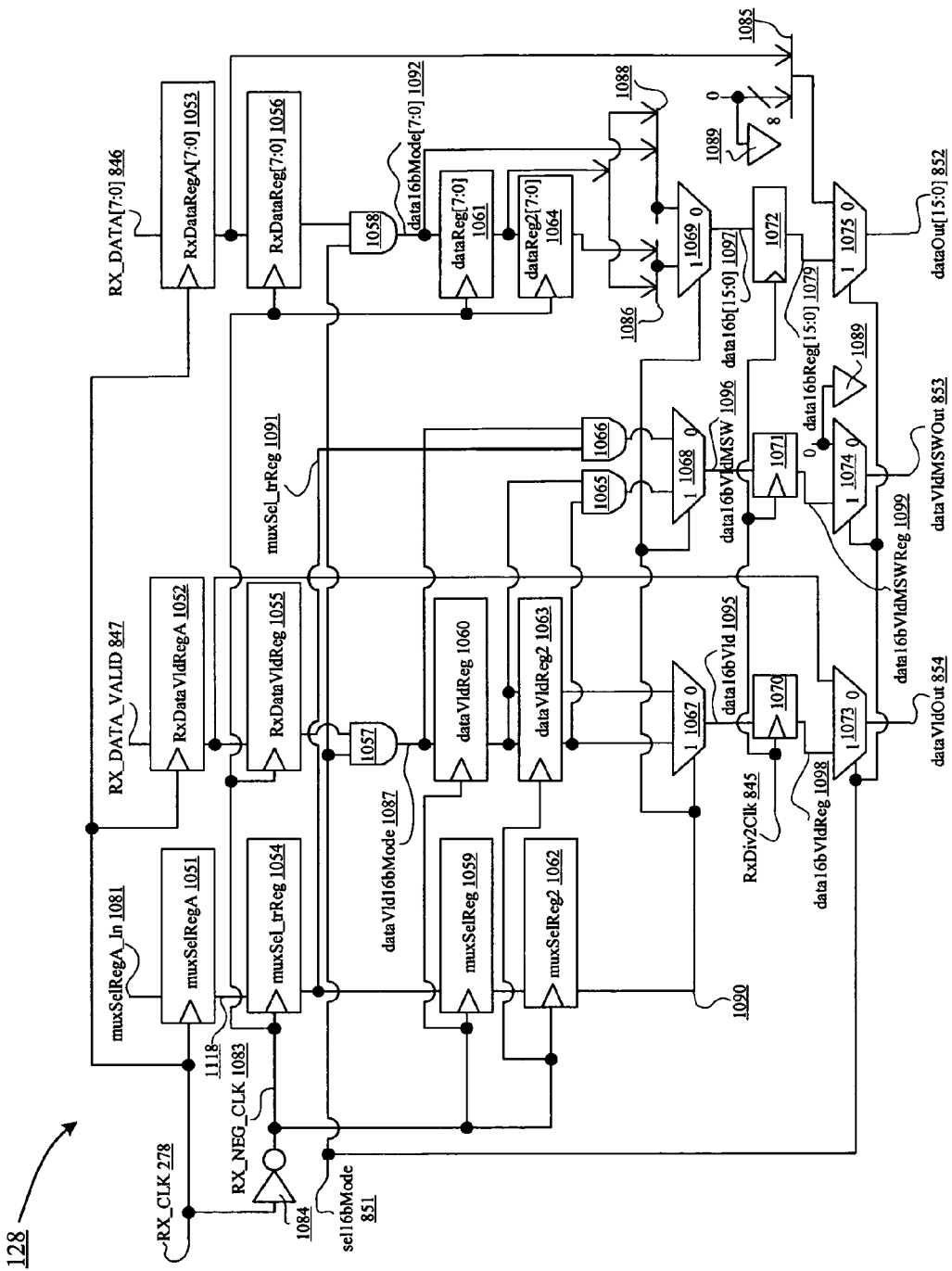
FIG. 5K is a schematic diagram depicting an exemplary embodiment of an Rx client interface.

FIG. 5K is a schematic diagram depicting an exemplary embodiment of an Rx client interface 128 (e.g., Rx DP 128D). Rx client interface 128 outputs two data valid signals, namely dataVldOut 854 and dataVldMSWout 853 to indicate validity of assembled data, such as the two data octets in the above example. Sel16bMode signal 851 indicates whether the Rx client interface 128 is used a particular mode, such as in a 16-bit or an 8-bit mode. Rx client interface 128 processes instances of input data where RX_DATA_VALID 847 is asserted, such as for a received frame having even or odd number of data octets. Example embodiments of receive output timing are described below.

In FIG. 5K, receive clock signal 278 is provided as a clock input to multiplexer select register A 1051, receive data valid register A 1052, and receive data register A 1053. Data input to multiplexer select register A 1051 is multiplexer select register A input signals 1081, which are described below in additional detail. Receive data valid signal 847 is provided as data input to receive data valid register A 1052. Receive data signal 846 is provided as data input to register 1053.

Receive clock signal 278 is provided as an input to inverter 1084, the output of which is receive inverted clock signal 1083. Receive inverted clock signal 1083 is provided as a clock input to multiplexer select register 1054, receive data valid register 1055, receive data register 1056, multiplexer select register 1059, data valid register 1060, data register 1061, multiplexer select register two 1062, data valid register two 1063, and data register two 1064. Output of multiplexer select register A 1051 is provided as data input to multiplexer select register 1054.

Output of receive data valid register A 1052 is provided to data input of receive data valid register 1055 and to a logic low input port of multiplexer 1073. Output of receive data register A 1053 is provided as data input to receive data register 1056. Notably, registers 1053 and 1056 may represent multiple registers for processing eight-bit width of data. Moreover, output of receive data register A 1053 is provided to bus 1085. Another eight-bit wide input coupled to ground 1089 is provided to bus 1085 to create a sixteen-bit wide bus output coupled to a logic low input port of multiplexer 1075.

Output of multiplexer select register 1054 is provided as data input to multiplexer select register 1059. Output of receive data valid register 1055 is provided to an input port of AND gate 1057. Output of receive data register 1056 is provided to an input of AND gate 1058. Initially, select sixteen-bit mode signal 851 is provided as inputs to AND gates 1057 and 1058. Output of AND gate 1057 is data valid sixteen-bit mode signal 1087. Output of AND gate 1058 is data sixteen-bit mode signal 1092. Output of AND gate 1057 is provided as a data input to data valid register 1060 and to an input of AND gate 1066. Output of AND gate 1058 is provided to data register 1061 and to bus 1088.

Output of multiplexer select register 1059 is provided as data input to multiplexer select register two 1062. Out of data valid register 1060 is provided to data input of data valid register two 1063, to a logic low input port of multiplexer 1067, and to an input port of AND gate 1065. In addition to data valid sixteen-bit mode signal 1087 provided to an input port of AND gate 1066, multiplexer select register signal 1091 is provided as another input to AND gate 1066.

Output of data register 1061 is provided to data register two 1064 and to buses 1088 and 1086. Output of data register two 1064 is provided to bus 1086. Accordingly, data register output from register 1061 in combination with data sixteen-bit mode signal 1092, provides a sixteen-bit wide input bus to a logic low port of multiplexer 1069. Moreover, data register output from register 1064, in combination with the output from register 1061, provided to bus 1068 provides a sixteen-bit wide input bus to a logic high port of multiplexer 1069.

Multiplexer select register two 1062 output is provided as a control select signal input to multiplexers 1061, 1068, and 1069 to select between logic low and logic high input ports for output respectively from such multiplexers. Output of multiplexer select register two 1062 is multiplexer select register two signal 1090. Output from data valid register two 1063 is provided to a logic high input port of multiplexer 1067 and to an input of AND gate 1065. Output from AND gate 1065 is provided to a logic high input port of multiplexer 1068. Output of AND gate 1066 is provided to a logic low input port of multiplexer 1068.

Output of multiplexer 1067 is data sixteen-bit valid signal 1095, and is provided as data input to register 1070. Output from multiplexer 1068 is provided as data input to register 1071 and is data sixteen-bit valid most significant word signal 1096. Output from multiplexer 1069 is data sixteen-bit signal 1097, which is provided as a data input to register 1072.

Registers 1070, 1071, and 1072 are clocked responsive to receive divided by two clock signal 845. Output of register 1070 is data sixteen-bit valid register signal 1098 which is provided to a logic high input port of multiplexer 1073. Output of register 1071, namely 16-bit data valid MSW register signal 1099, is provided to a logic high input port of multiplexer 1074. A logic low input port of multiplexer 1074 is coupled to ground 1089. Output of register 1072 is data sixteen-bit register signal 1079, which is provided a logic high input port of multiplexer 1075. Output from bus 1085 is provided to a logic low input port of multiplexer 1075. Multiplexers 1073, 1074, and 1075 are provided select sixteen-bit mode signal 851 as a control select input. Output of multiplexer 1073 is data valid output signal 854. Output of multiplexer 1074 is data valid most significant word output signal 853. Output of multiplexer 1075 is data output signal 852.

Figure 5L:
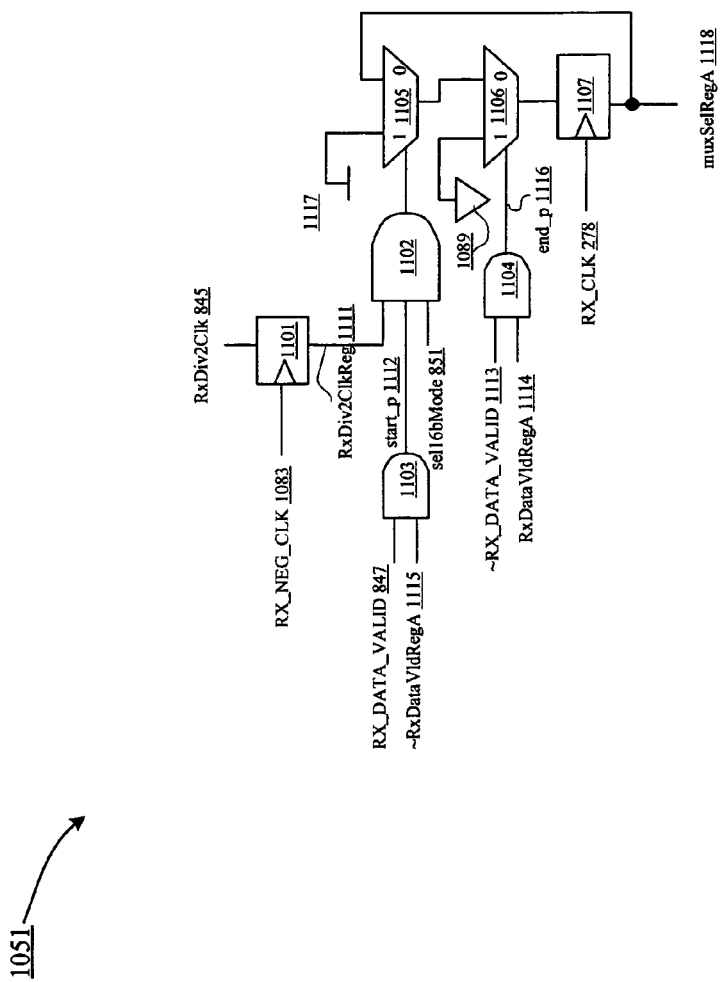
FIG. 5L is a schematic diagram depicting an exemplary embodiment of a circuit implementation of multiplexer select register.

FIG. 5L is a schematic diagram depicting an exemplary embodiment of a circuit implementation of multiplexer select register A 1051. Receive divide by two clock signal 854 is provided as a data input to register 1101. Notably, registers as described herein may be implemented with flip-flops. Moreover, such flip-flops may have resets, which reset signals are not shown for purposes of clarity. Register 1101 is clocked responsive to receive inverted clock signal 1083.

Output of register 1101 is receive divide by two clock register signal 1111, which is input to AND gate 1102. Receive data valid signal 847 and inverted receive data valid register A signal 1115 are provided as inputs to AND gate 1103. Notably, inverted receive data valid register A signal 1115 may be data output of receive data valid register A 1052. Output of AND gate 1103 is start pulse signal 1112, which is provided as an input to AND gate 1102. Another input to AND gate 1102 is select sixteen-bit mode signal 851. Output of AND gate 1102 is provided as a control select input to multiplexer 1105.

A logic high input port of multiplexer 1105 is coupled to a logic high bias voltage 1117. A logic low input port of multiplexer 1105 is coupled to receive a feedback output, namely multiplexer select register A output signal 1118. Output of multiplexer 1105 is provided to a logic low input port of multiplexer 1106. A logic high input port of multiplexer 1106 is coupled to a logic low bias, such as ground 1089.

An inverted receive data valid signal 1113 and receive data valid register A signal 1114, which may be data output of receive data valid register A 1052 of FIG. 5K, are input to AND gate 1104. Output of AND gate 1104 is end pulse signal 1116 which is provided as a control select input to multiplexer 1106. Output of multiplexer 1106 is provided as a data input to register 1107. Register 1107 is clocked responsive to receive clock signal 278. Output of register 1107 is multiplexer select register A signal 1118.

Figure 5M:
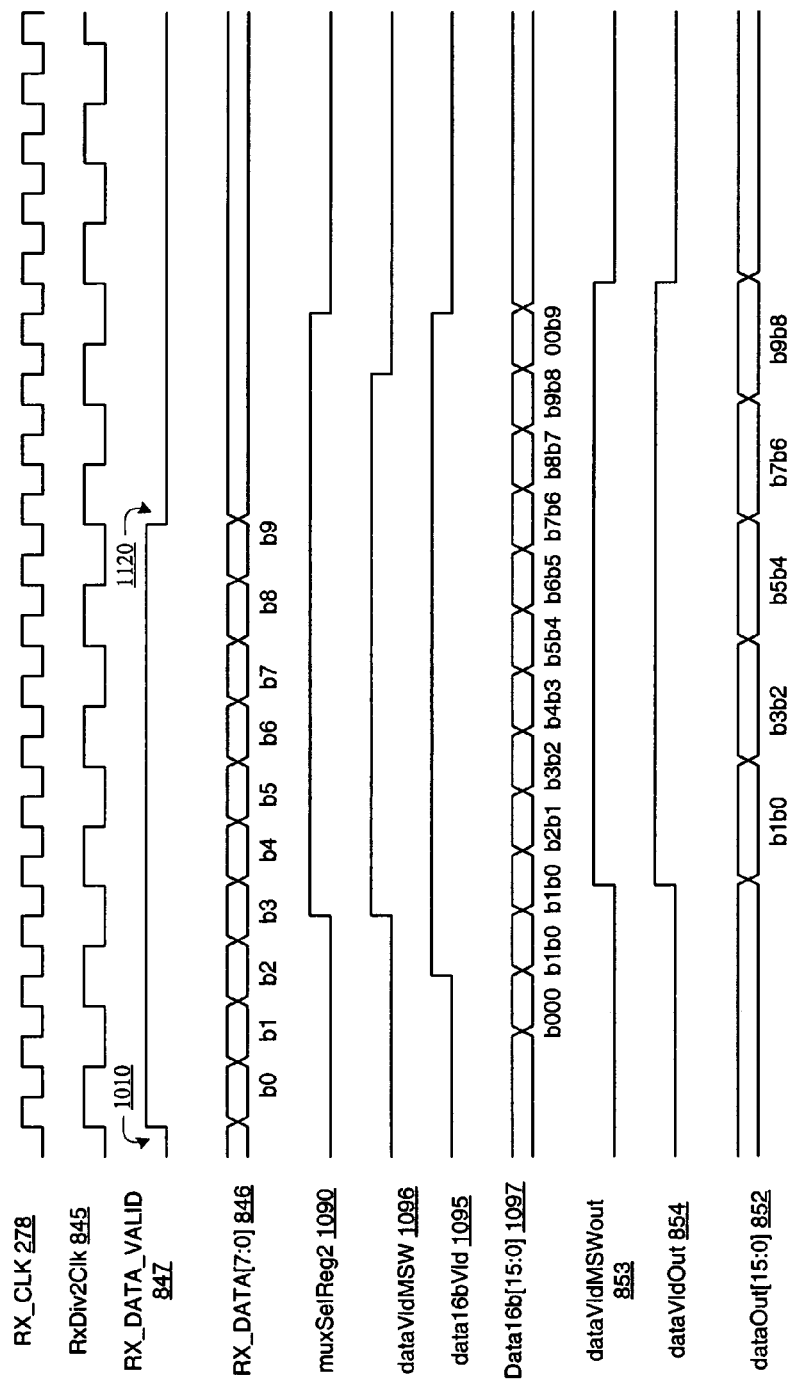

FIGS. 5M, 5N, 5O and 5P are respective output timing diagrams of exemplary embodiments of either even or odd receive data byte lengths for when receive client interface 128 is in an 16-bit mode. In FIG. 5M, RX_DATA_VALID signal 847 is generally asserted when RxDiv2Clk signal 845 is generally at a logic high level and RX_DATA[7:0] signal 846 has an even number of bytes. Notably, RX_DATA VALID signal 847 is generally asserted at 1010 and maintained at the logic high level for reception of all data bytes of RX_DATA[7:0] signal 846, after which RX_DATA VALID signal 847 is de-asserted after/during reception of the last data byte generally at 1120.

Figure 5N:
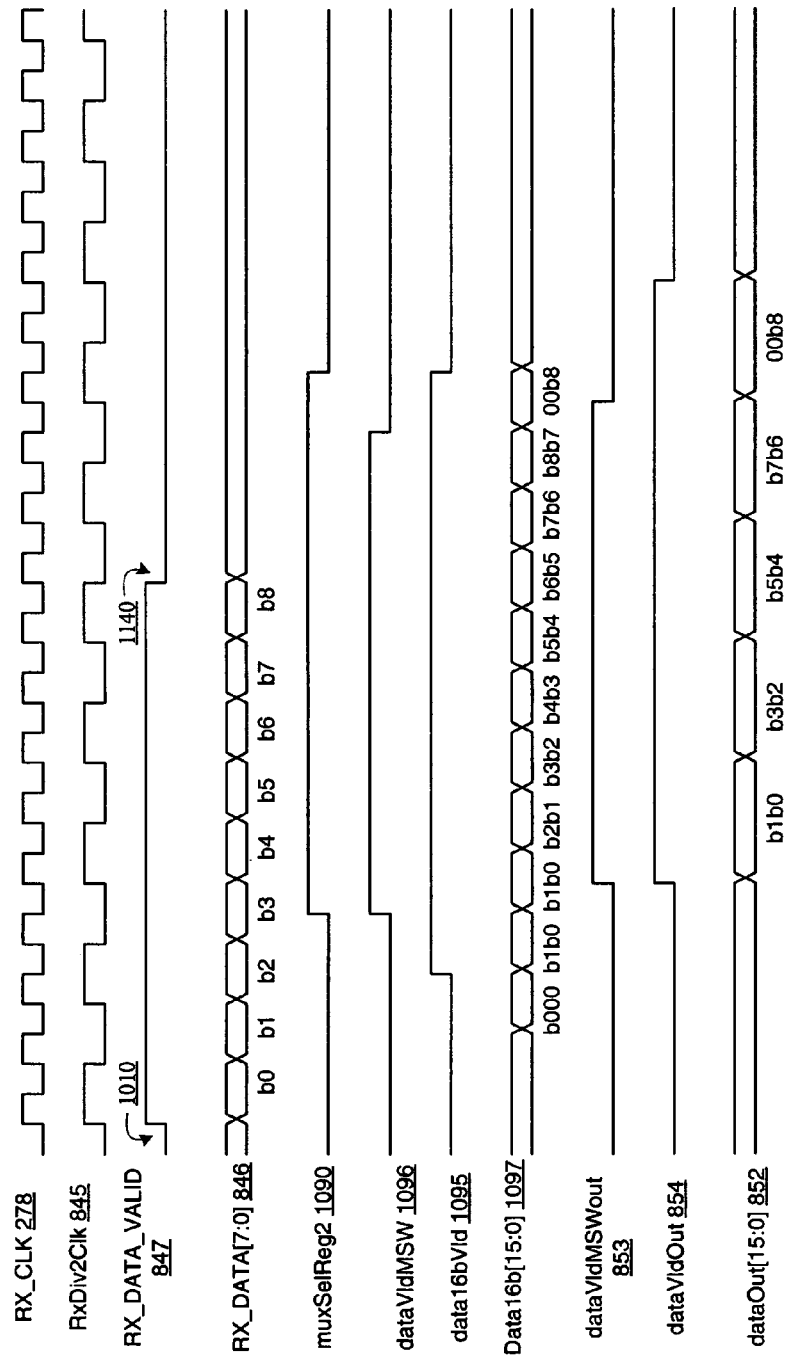
Figure 50:
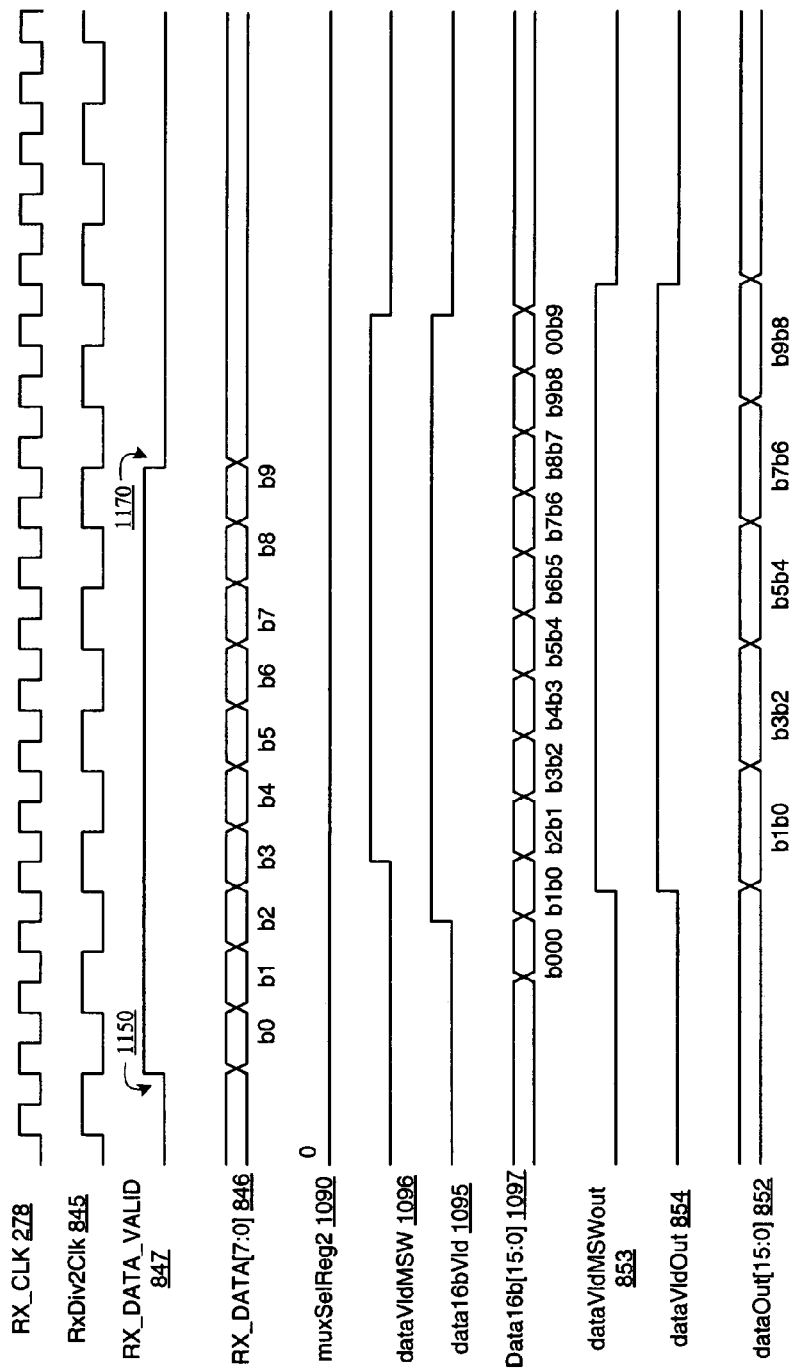

In FIG. 5N, RX_DATA_VALID signal 847 is generally asserted when RxDiv2Clk signal 845 is generally at a logic high level and RX_DATA[7:0] signal 846 has an odd number of bytes. Notably, RX_DATA VALID signal 847 is generally asserted at 1010 and maintained at the logic high level for reception of all data bytes of RX_DATA[7:0] signal 846, after which RX_DATA VALID signal 847 is de-asserted after/during reception of the last data byte generally at 1140.

FIG. 5O, RX_DATA_VALID signal 847 is asserted when RxDiv2Clk signal 845 is generally at a logic low level and RX_DATA[7:0] signal 846 has an even number of bytes. Notably, RX_DATA VALID signal 847 is generally asserted at 1150 and maintained at the logic high level for reception of all data bytes of RX_DATA[7:0] signal 846, after which RX_DATA VALID signal 847 is de-asserted after/during reception of the last data byte generally at 1170.

Figure 5P:
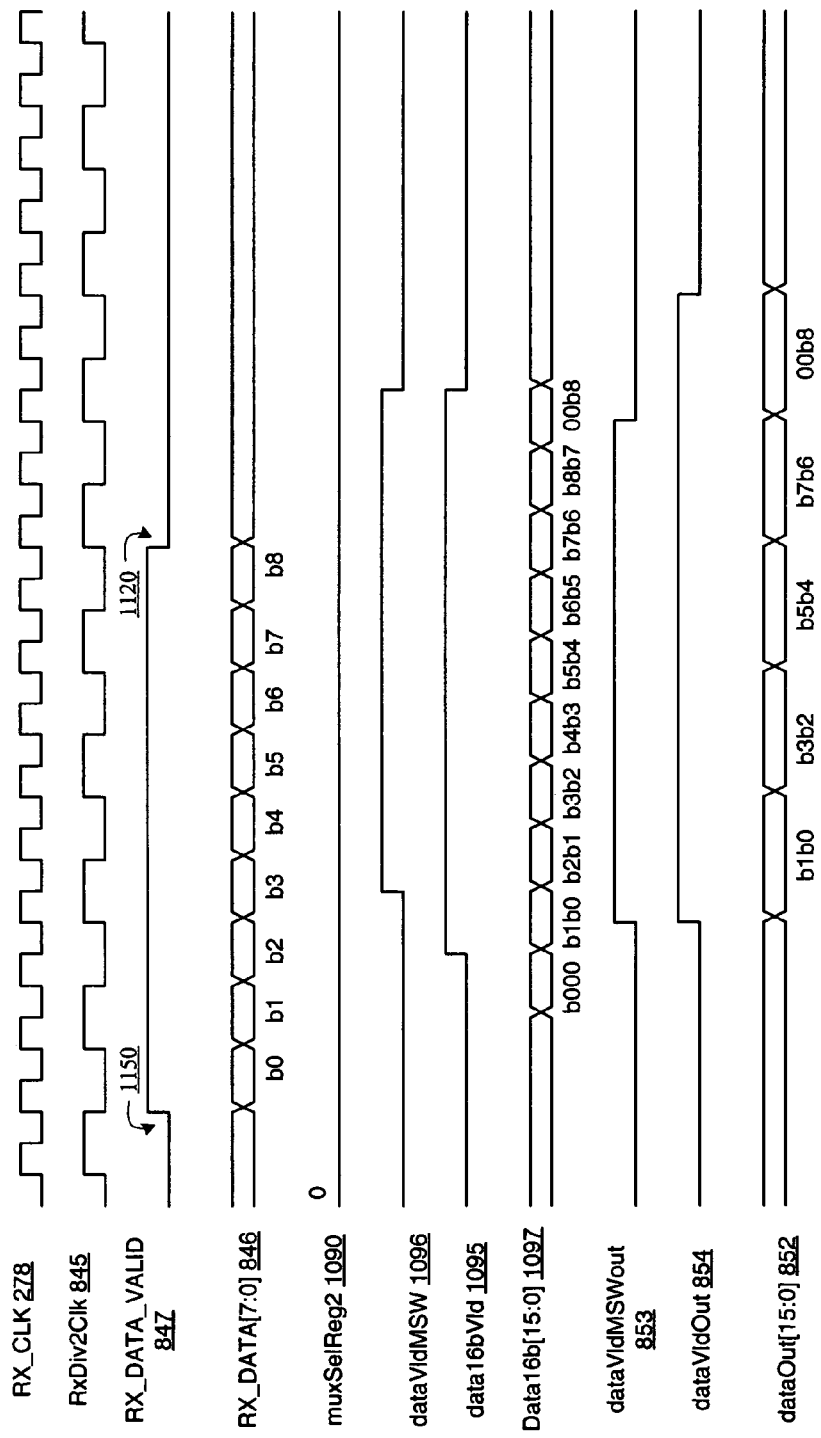

In FIG. 5P, RX_DATA_VALID signal 847 is asserted when RxDiv2Clk signal 845 is generally at a logic low level and RX_DATA[7:0] signal 846 has an odd number of bytes. Notably, RX_DATA VALID signal 847 is generally asserted at 1150 and maintained at the logic high level for reception of all data bytes of RX_DATA[7:0] signal 846, after which RX_DATA VALID signal 847 is de-asserted after/during reception of the last data byte generally at 1120.

Figure 5Q:
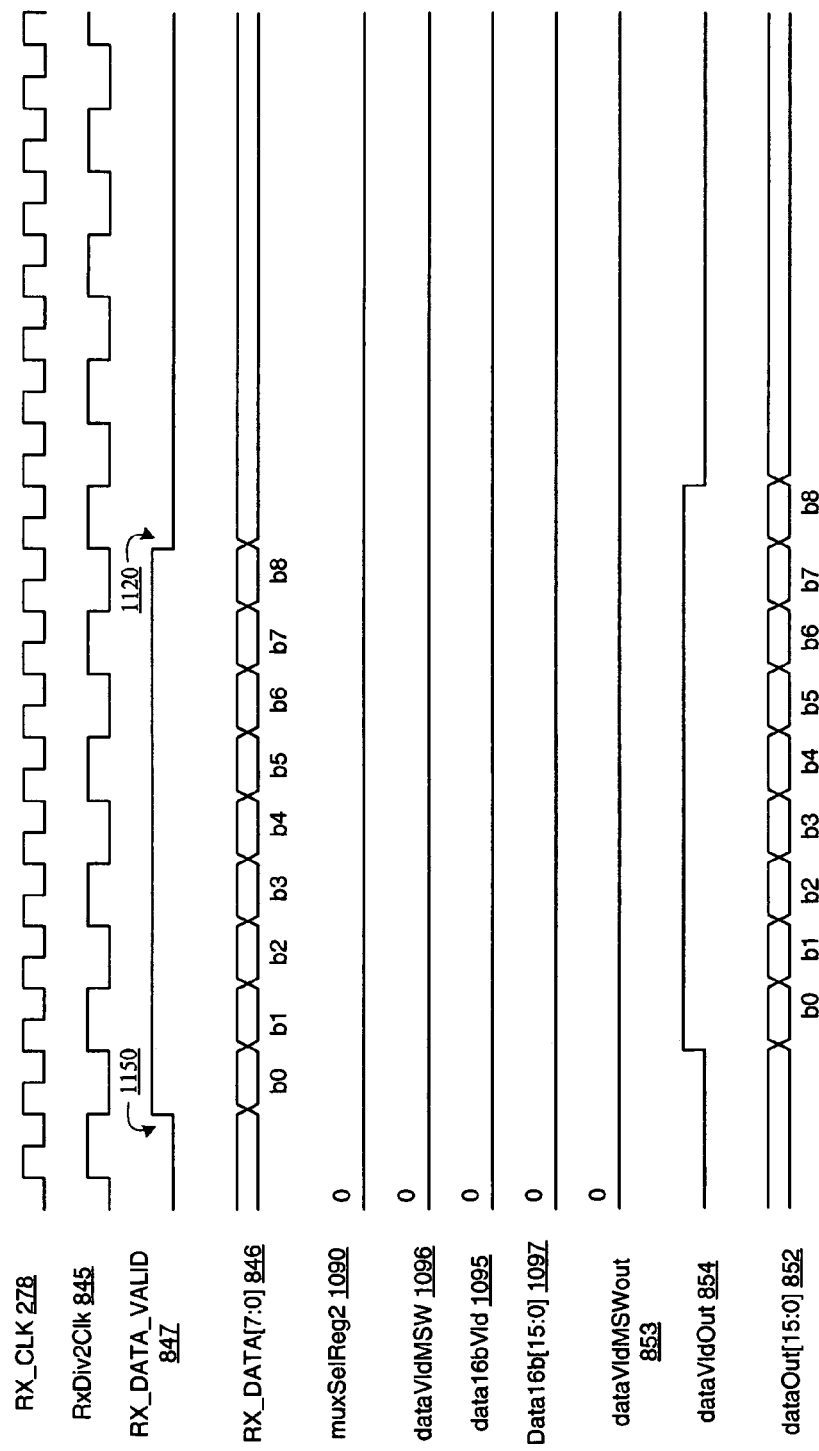
FIG. 5Q is an output timing diagram depicting an exemplary embodiment of a bypass mode for when a receive datapath is in an 8-bit mode.
Figure 6:
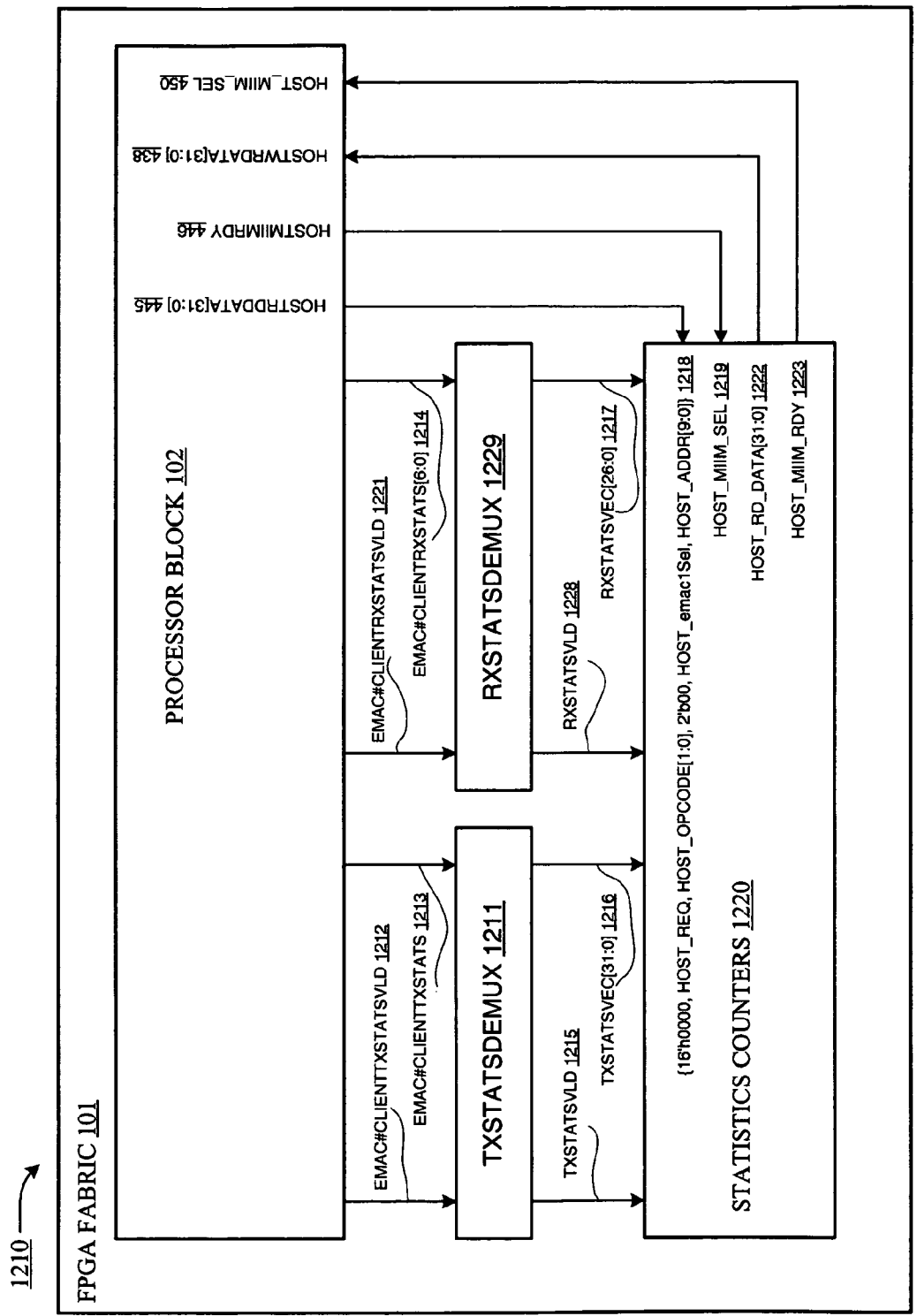

FIG. 5Q is an output timing diagram depicting an exemplary embodiment of a bypass mode for when receive client interface 128 is in an 8-bit mode. In a bypass mode, RX_DATA VALID signal 847 is generally asserted at 1150 and maintained at the logic high level for reception of all data bytes of RX_DATA[7:0] signal 846, after which RX_DATA VALID signal 847 is de-asserted after/during reception of the last data byte generally at 1120. Both assertion and de-assertion of RX_DATA VALID signal 847 generally occur while RxDiv2Clk signal 845 is either at a logic low level or at a logic high level. In this example, RX_DATA[7:0} signal 846 has an odd number of bytes, though an even number of bytes may be used in bypass mode. Furthermore, notably, signals 853, 1090, 1095, 1096, and 1197 are not used in this bypass mode, i.e., maintained de-asserted.

It should be understood that each transmit and receive data pathway may be configured for a bit width, such as for example 8 or 16 bits wide, with each such pathway being synchronous to a clock, respectively such as a TX_CLK or a RX_CLK, for independent full-duplex operation.

Physical Layer Interface

Returning to FIG. 1, EMAC 110 can be configured to interface to MII/GMII/MGT physical layer ("PHY") interfaces. Because EMAC 110 uses one and only one PHY interface 119 in operation at a time, all I/O pins for each of PHY interfaces 119 are not used simultaneously. At the same time, processor block 102 has a finite number of I/O pins available due to routing channel requirements in FPGA 100, and thus I/O pins are shared with between processor 103 and other functional blocks in Processor block 102.

Because processor block 102 has limited number of I/O pins available at the ASIC Processor block-FPGA fabric boundary, FPGA fabric 101 may use FPGA cells to interface to the ASIC/processor block 102 for routing connectivity to ASIC/Processor block 102. These FPGA cells are for interfacing processor block 102 to FPGA fabric 101, namely connecting processor block I/O ports to FPGA fabric routing. FPGA termination cell width determines the number of I/O pins possible. As a result, for EMAC 110 to support PHY interfaces 119, PHY I/O pins are re-used ("pin muxing") for each PHY interface 119.

Pin muxing reduces the number of I/O pins employed by each EMAC 110 and EMAC 111 by 39 pins each. With a total reduction of 78 I/O pins in PHY interfaces 119, along with output pin reductions in statistics interfaces 116, two EMACs 110 and 111 may be implemented in processor block 102 where before there would only be room for one EMAC.

An example implementation for output pin muxing for processor block 102 in a Verilog RTL logic equation listing is:

EMAC_phyRgmii[7:0] = TIE_configVec[70] ?
{RGMII_TXD_FALLING[3:0], RGMII_TXD_RISING [3:0]}: GMII_TXD[7:0];

EMAC_phyTxEn = TIE_configVec[70] ? RGMII_TX_CTL_RISING: GMII_TX_EN;

EMAC_phyTxEr = TIE_configVec[70] ? RGMII_TX_CTL_FALLING: GMII_TX_ER;

EMAC_phyTxD[7:0] = (TIE_configVec[68] | TIE_configVec[69]) ? TXDATA[7:0] : EMAC_phyRgmii[7:0];

TIE_configVec[68] = CORE_HAS_GPCS

TIE_configVec[69] = CORE_HAS_SGMII

TIE_configVec[70]=CORE_HAS_RGMII

An implementation of this example may result in a reduction of 18 output pins.

An example implementation for input pin muxing for processor block 102 in a Verilog RTL logic equation listing is:

| | |
|---|---|
| GMI_RX_CLK = | PHY_emacRxClk; |
| GMII_RX_CLK = | PHY_emacRxClk; |
| GMII_COL = | PHY_emacCol; |
| TXRUNDISP = | PHY_emacCol; |
| GMII_RXD[7:0] = | PHY_emacRxD[7:0]; |
| RGMII_RXD_FALLING[3:0] = | PHY_emacRxD[7:4]; |
| RGMII_RXD_RISING[3:0] = | PHY_emacRxD[3:0]; |
| RXDATA[7:0] = | PHY_emacRxD[7:0]; |
| GMII_RX_DV = | PHY_emacRxDV; |
| RGMII_RX_CTL_RISING = | PHY_emacRxDV; |
| RXREALIGN = | PHY_emacRxDV; |
| GMII_RX_ER = | PHY_emacRxEr; |
| RGMII_RX_CTL_FALLING = | PHY_emacRxEr; |

An implementation of this example may result in a reduction of 21 input pins.

Statistics Interface

Figure 7A:
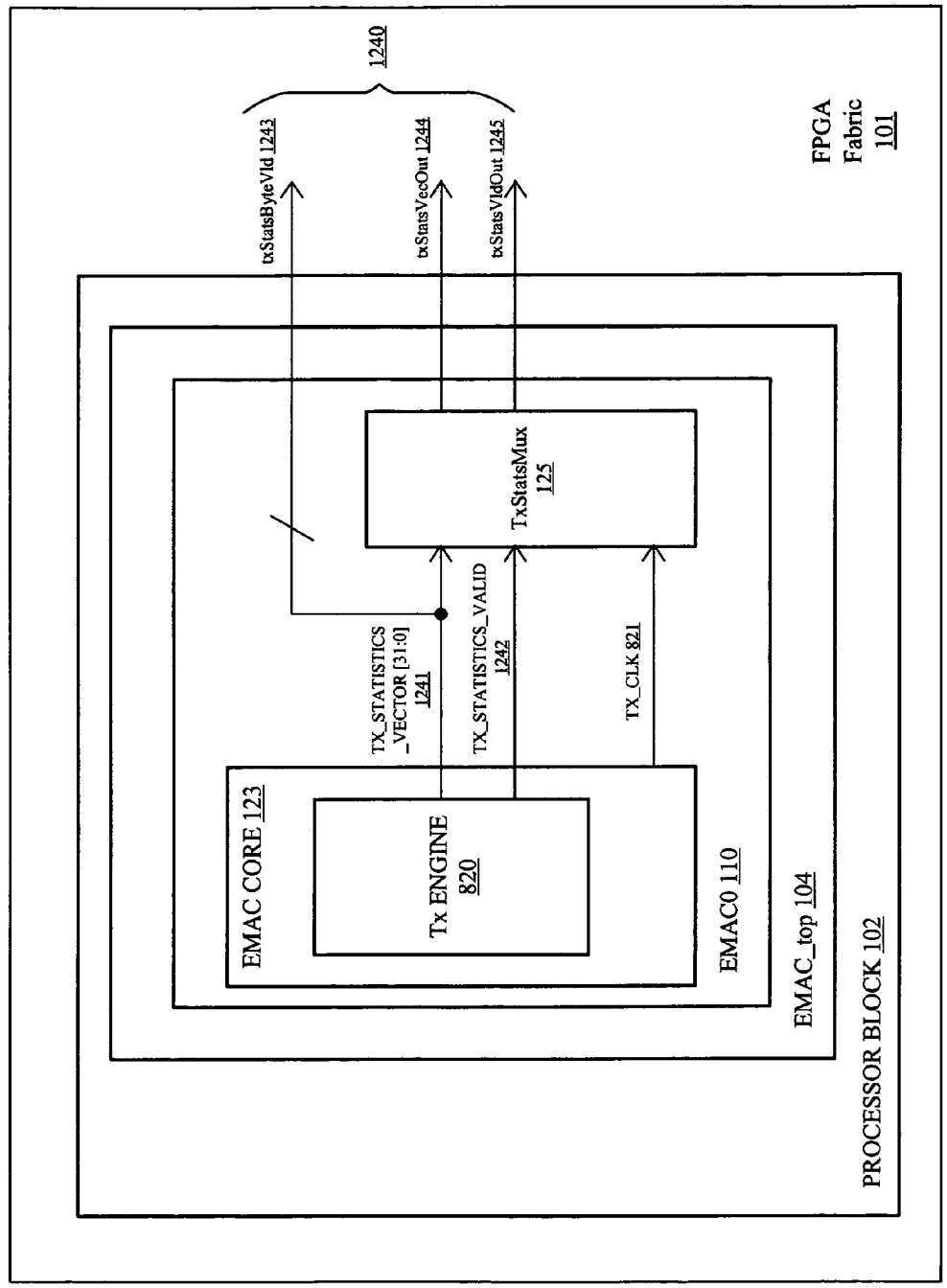
FIG. 7A is a high-level block diagram depicting an exemplary embodiment of a Tx statistics interface.

FIG. 7A is a high-level block diagram depicting an exemplary embodiment of a transmit-side ("Tx") of a statistics interface 1240, which forms a portion of statistics interface 116 of FIG. 1. From transmit engine 820, transmit statistics vector signal 1241 is provided to transmit statistics multiplexer 125. For purposes of clarity by way of example, it will be assumed that transmit statistics vector signal 1241 is a thirty-two-bit wide signal, though other bit widths may be used. For example, transmit statistics vector 1241 may be a thirty-two-bit wide vector which is provided to transmit statistics multiplexer 125. A portion of transmit statistics vector 1241 may be siphoned off to provide transmit statistics byte valid signal 1243. For example, the thirtieth bit of transmit statistics vector 1241 may be used to provide transmit statistics byte valid signal 1243.

Transmit engine 820 provides transmit statistics valid signal 1242 to transmit statistics multiplexer 125. A transmit clock signal 821 is provided from EMAC core 123 to transmit statistics multiplexer 125. Outputs from transmit statistics multiplexer 125 are transmit statistics vector output 1244 and transmit statistics valid output 1245. Outputs 1244 and 1245 from a portion of transmit-side statistics interface 1240.

EMAC 110 generates statistics for data traffic responsive to transmitting and receiving each Ethernet frame. At the end of each such frame, EMAC 110 outputs associated transmit and receive statistics vectors to logic configured and FPGA fabric 101 or subsequent collection and processing of such data traffic. In FIG. 6 there is an example implementation of logic instantiated in FPGA fabric for collection and processing of data traffic.

FIG. 6 is a high-level block diagram depicting an exemplary embodiment of EMAC 110 statistics registers, which may be read via a DCR bus. As previously mentioned, processor block 102 is a region isolated for embedded circuitry within FPGA fabric 101. However, processor block 102 may be external to FPGA fabric 101, though access to FPGA fabric 101 is part of implementing embedded circuitry within processor block 102. EMAC client transmit statistics valid signal 1212 is provided via statistics interface 116 from processor block 102. EMAC client Tx statistics valid signal 1212 may be for EMAC 110 or EMAC 111, where a number sign ("#") as indicated in the drawing is for either a zero or a one to designate one of the two EMACs.

EMAC client transmit statistics signal 1213 is provided from processor block 102 via statistics interface 116. Signals 1212 and 1213 are provided to transmit statistics de-multiplexer 1211 which is instantiated in configurable logic of FPGA fabric 101. Output of transmit statistics de-multiplexer 1211 is transmit statistics valid signal 1215 and transmit statistics vector signal 1216, which in an exemplary implementation may be a thirty-two-bit wide vector signal.

Signals 1215 and 1216 are provided to a statistics processing unit 1220, such as a plurality of statistics counters 1220. Statistics counters 1220 may be instantiated in configurable logic of FPGA fabric 101. EMAC client receive statistics valid signal 1221 is provided from processor block 102 via statistics interface 116. EMAC client receive statistics signal 1214, which in an exemplary implementation may be a seven-bit wide signal, is provided from processor block 102 via statistics interface 116.

Receive statistics de-multiplexer 1229 receives signals 1221 and 1214. Receive statistics de-multiplexer 1229 is instantiated in configurable logic of FPGA fabric 101. Output from receive statistics de-multiplexer 1229 is receive statistics valid signal 1228 and receive statistics vector signal 1217. In an exemplary implementation, receive statistics vector signal 1217 may be a twenty-seven-bit wide signal. Signals 1228 and 1217 are provided to statistics processing unit, which may be implemented as a plurality of statistics counters 1220 instantiated in configurable logic of FPGA fabric 101.

Host MIIM ready signal 1223 is output from statistics counter 1220 responsive to processor 103 (shown in FIG. 1) read via signals 1218. Host MIIM ready signal 1223 is output to processor block 102 via host bus 118 (shown in FIG. 1), where it may be received as host MIIM select signal 450. Host read data signal 1222, which in an exemplary implementation may be a thirty-two-bit wide signal, is output from statistics counter 1220 responsive to processor 103 (shown in FIG. 1) read via signals 1218. Host read data signal 1222 is received to processor block 102 via host bus 118 (shown in FIG. 1) as host write data signal 438.

Output from host interface 112 from processor block 102 is host read data signal 445 and host MIIM ready signal 446. Host MIIM ready signal 446 is received by statistics counter 1220 as HOST MIIM select signal 1219. Host read data signal 445 is received by counter 1220 and broken up into signals 1218. Signals 1218 may in an exemplary implementation include a sixteen-bit hex signal, a host request signal, a two-bit wide host opcode signal, a two-bit binary signal, a host EMAC select signal, and a ten-bit wide host address signal. Signals to and from statistics counters 1220 are provided to and from host interface 112.

Returning to FIG. 7A, because processor block 102 has a limited number of I/O pins available, EMACs 110 and 111 output statistics vectors in a small number of bits for each transmit or receive clock cycle. For example, statistics interface 116 may output seven bits per receive clock cycle. The example of seven bits is selected as an inter-frame gap delay may be as small as four receive clock cycles, and thus a subsequently received frame may be substantially short, i.e., a packet that contains no data. Transmission of a receive statistics vector to logic instantiated in FPGA fabric 101 thus can be completed in four receive clock cycles to provide sufficient time for statistics processing units instantiated in FPGA fabric 101 to accumulate receive statistics provided via statistics interface 116.

For example for a transmit statistics vector, statistics output may be one bit per transmit clock cycle. A one bit per transmit clock cycle was selected as an example because a transmit side does not have the same restriction as the receive side. As mentioned with reference to FIG. 6, de-multiplexers are instantiated in FPGA fabric 101 to de-multiplex statistics bit output from statistics interface 116.

Notably, multiplexing and de-multiplexing of statistics output introduces time delays before statistics vectors may be processed by a statistics collection unit instantiated in FPGA fabric 101. However, because such statistics collection unit need not be synchronized to the received or transmitted frame that generated the statistics, statistics accumulation proceeds independently from a transmit or receive frame. Statistics processing is configured to complete before a next statistics output such that the next statistics output may be processed.

Continuing the above example, multiplexing of a statistics vector reduces transmit statistics interface from thirty-two output pins to one output pin and reduces receive statistics interface from twenty-seven output pins to seven output pins. Accordingly, a total reduction of fifty-one output pins in implementation may be obtained for each EMAC statistics interface 116. The I/O pin reduction for implementation of PHY interfaces 119 as well as the reduction of output pins for statistics interfaces 116 facilitates integrating more than one EMAC, such as EMACs 110 and 111, within processor block 102.

Figure 7B:
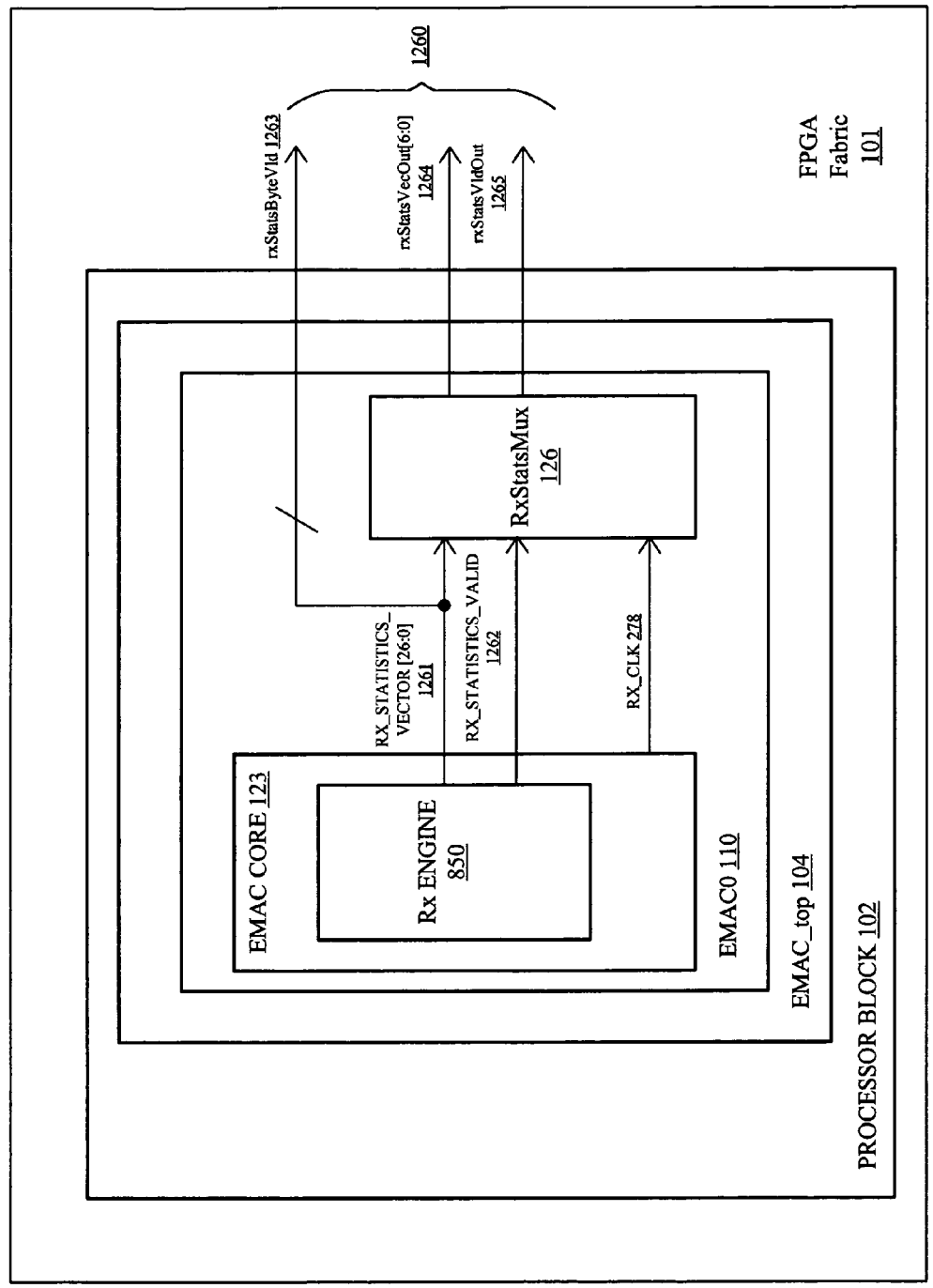
FIG. 7B is a high-level block diagram depicting an exemplary embodiment of a receive-side statistics interface.

FIG. 7B is a high-level block diagram depicting an exemplary embodiment of a receive-side statistics interface 1260. Receive engine 850 provides receive statistics vector signal 1261 to receive statistics multiplexer 126. For purposes of clarity by way of example and not limitation, it will be assumed that receive statistics vector 1261 is a twenty-seven-bit wide signal which is provided to receive statistics multiplexer 126, though other bit widths may be used. A portion of receive statistics vector signal 1261 may be used to provide receive statistics byte valid signal 1263. For example, the twenty-second bit of receive statistics vector signal 1261 may be used to provide receive statistics byte valid signal 1263.

Receive engine 850 outputs receive statistics vector 1261 and receive statistics valid signal 1262. Receive statistics valid signal 1262 is provided to receive statistics multiplexer 126. A portion of receive statistics vector 1261 is provided to receive statistics multiplexer 126, and one bit of receive statistics vector 1261 is provided to receive-side statistics interface 1260 as receive statistics byte valid signal 1263. In an implementation, receive statistics byte valid signal 1263 may be a single bit wide signal such as the twenty-second bit of receive statistics vector signal 1261, where all the bits, such as bits zero through twenty-six of receive statistics vector signal 1261 may be provided to receive statistics multiplexer 126.

Receive statistics multiplexer 126 may be clocked responsive to receive clock signal 278 from EMAC core 123. Output from receive statistics multiplexer 126 is receive statistics vector output signal 1264 and receive statistics valid output signal 1265. Receive statistics vector output signal 1264 in an implementation may be a 7-bit wide signal.

Figure 7C:
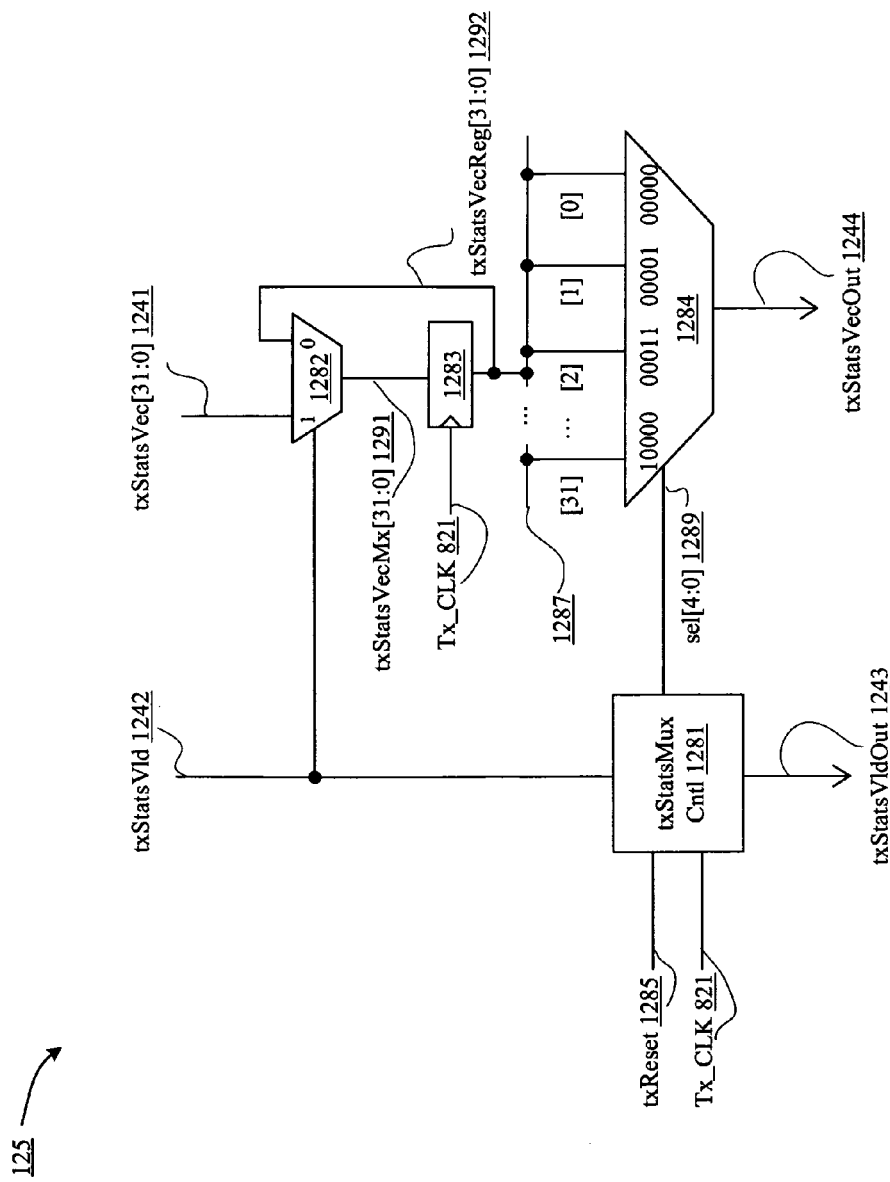
FIG. 7C is a block/schematic diagram depicting an exemplary embodiment of a transmit statistics multiplexer.

FIG. 7C is a block/schematic diagram depicting an exemplary embodiment of transmit statistics multiplexer 125. Transmit statistics vector signal 1241 is input to a logic high port of multiplexer 1282. Transmit statistics valid signal 1242 is provided as a control signal input to multiplexer 1282 to select as between high and low logic level ports, and is provided to transmit statistics multiplexer controller 1281. Other inputs to transmit statistics multiplexer controller 1281 are transmit reset signal 1285 and transmit clock signal 821.

Output from transmit statistics multiplexer controller 1281 is select signal 1289, which for example may be a five-bit wide select signal, which is provided as a control select input to multiplexer 1284. Output from transmit statistics multiplexer controller 1281 is transmit statistics valid output signal 1243.

Output of multiplexer 1282 is transmit statistics vector multiplex signal 1291, which in continuing the above example may be a thirty-two-bit wide output. Output of multiplexer 1282 is provided to register 1283 which is clocked responsive to transmit clock signal 821. Output of register 1283 is provided to bus 1287. Continuing the above example, bus 1287 may be a thirty-two-bit wide bus for providing respective inputs, such as thirty-two respective inputs to multiplexer 1284. Any of such thirty-two inputs to multiplexer 1284 may be selected responsive to a five-bit wide select signal 1289 for output as transmit statistics vector output signal 1244. All output of register 1283 is fed back to multiplexer 1282 for input on a logic low port thereof. For example, this feedback may be thought of transmit statistics vector registered signal 1292, which may be a thirty-two bit wide signal.

Figure 7D:
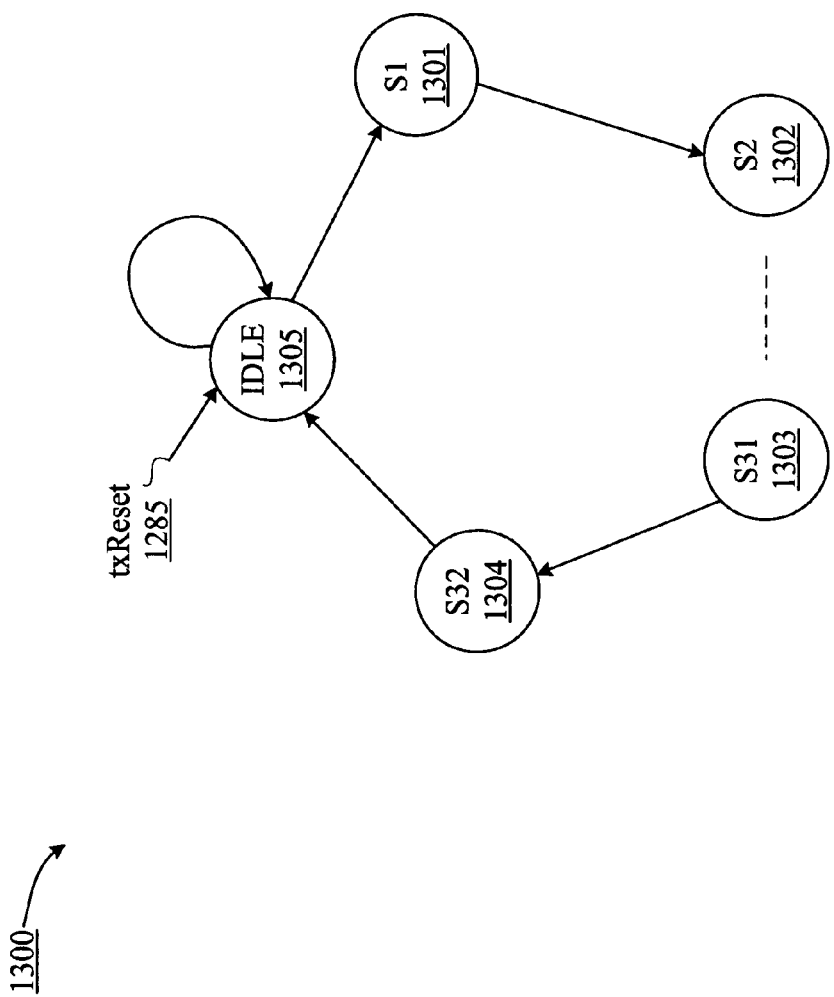
FIG. 7D is a state diagram depicting an exemplary embodiment of a state machine for a transmit statistics multiplexer controller.

FIG. 7D is a state diagram depicting an exemplary embodiment of a state machine 1300 for transmit statistics multiplexer controller 1281 of FIG. 7C. State machine 1300 is put into idle state 1305 responsive to transmit reset signal 1285 being asserted. State machine 1300 stays in idle state 1305 responsive to transmit statistics valid signal 1242 not being asserted. Notably, while in idle state 1305, state machine 1300 outputs, namely transmit statistics valid output signal 1243 and select signal 1289 are respectively logic 0 and logic 00000 in the above-described exemplary implementation. If, however, transmit statistics valid signal 1242 is asserted, state machine 1300 transitions from idle state 1305 to state S1 1301.

State machine 1300 in state S1 1301 has transmit statistics valid output signal 1243 equal to a logic 1 and select signal 1289 equal to 00000 in the above-described exemplary implementation. State machine 1300 in state S2, which transitions from state S1 to S2 responsive to the next clock cycle of transmit clock 821, has outputs of transmit statistics valid output signal 1243 equal to a logic 1 and select signal 1289 equal to 00001 in the above-described exemplary implementation.

Accordingly, for each subsequent transmit clock signal 821 cycle, state machine 1300 proceeds to subsequent states incrementing select signal 1289. Skipping ahead to the last two states for the exemplary implementation, at state S31 1303, transmit statistics valid output signal will be a logic 1 and select signal 1289 will be a 10001. On the next clock cycle of transmit clock 821, state machine 1300 will transition from state S31 1303 to state S32 1304 where transmit statistics valid output signal 1243 will be logic 1 and select signal 1289 will be a 10000 for the above-described exemplary implementation. After all bits on bus 1287 of FIG. 7C have been incrementally selected for transmit statistics vector output signal 1244, on the next transmit clock signal 821 cycle, state machine 1300 will transition from state S32 1304 back to idle state 1305.

FIG. 7E is a timing diagram depicting an exemplary embodiment of timing for transmit side statistics interface 1240 of FIG. 7A. Generally at 1287, transmit statistics valid signal 1242 is pulsed. In response, transmit statistics vector 1241 information is passed to transmit statistics vector output 1244 one bit at a time because transmit statistics valid output signal 1245 is asserted responsive to pulsing of transmit statistics valid signal 1242. Bits 1288 associated with a transmit statistics vector are provided via transmit statistics vector output signal 1244 while transmit statistics valid output signal 1245 is asserted, as was described with reference to state machine 1300 of FIG. 7D.

Figure 7F:
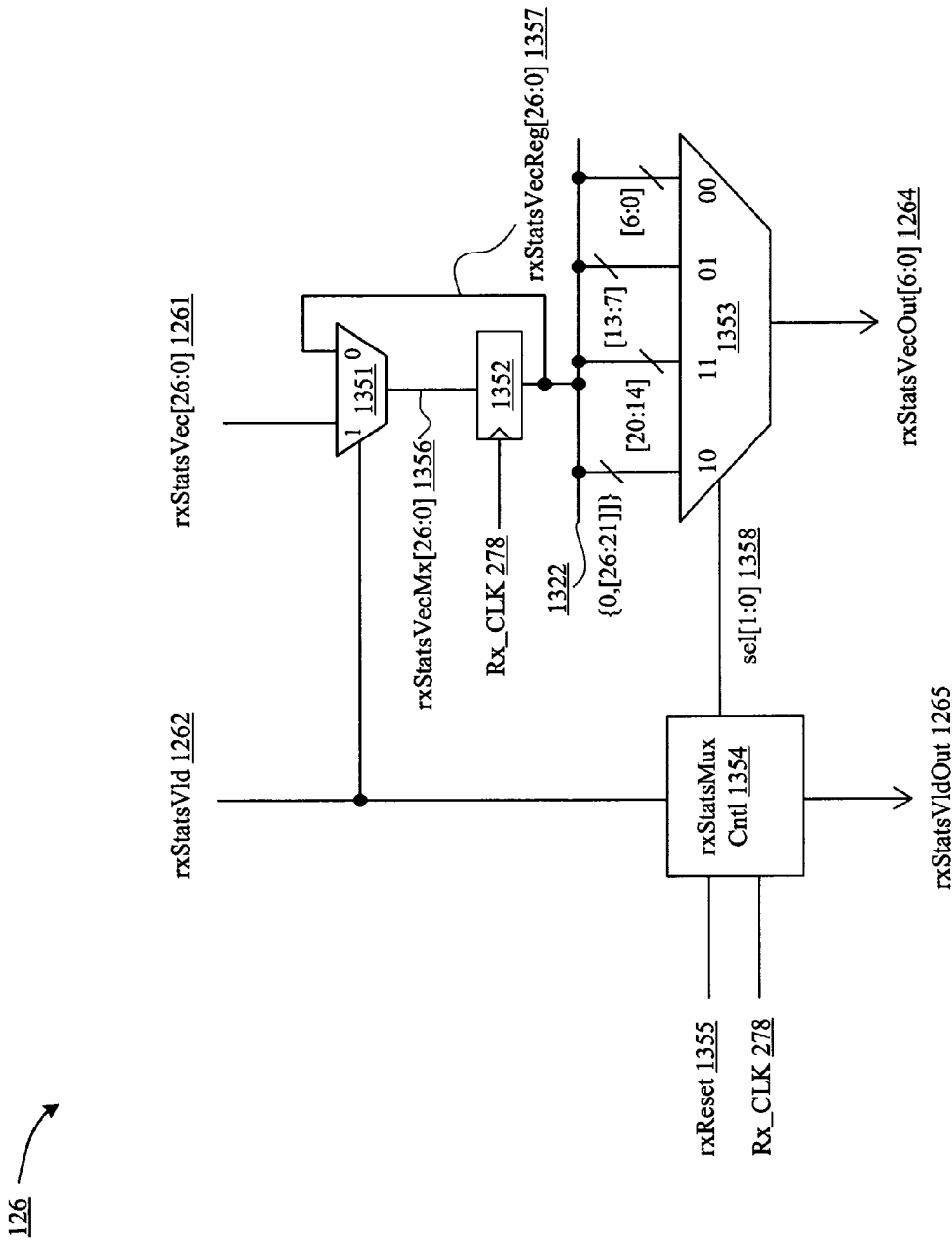
FIG. 7F is a block/schematic diagram depicting an exemplary embodiment of a receive statistics multiplexer.

FIG. 7F is a block/schematic diagram depicting an exemplary embodiment of receive statistics multiplexer 126. Receive statistics valid signal 1262 is provided as a control select input to multiplexer 1351 and to receive statistics multiplexer controller 1354. Provided to a logic high input port of multiplexer 1351 is receive statistics vector signal 1261, which in the above exemplary implementation is a twenty-seven bit wide signal. Other inputs to receive statistics multiplexer controller 1354 are receive reset signal 1355 and receive clock signal 278. Outputs from receive statistics multiplexer controller 1354 include select signal 1358 and receive statistics valid output signal 1265. In an exemplary implementation, select signal 1358 is a two-bit wide signal for selecting one of four input port groupings of multiplexer 1353 for output.

Output of multiplexer 1351 is receive statistics vector multiplex signal 1356, which in an exemplary implementation is a twenty-seven-bit wide signal. Receive statistics vector multiplex signal 1356 is provided to register 1352, which registers are clocked via receive clock signal 278. Output of register 1352 is provided to bus 1322 and fed back to a logic low input port of multiplexer 1351. Output of register 1352 is receive statistics vector registered signal 1357, which in the exemplary implementation is a twenty-seven-bit wide signal. Continuing the above example, the twenty-seven bits output from register 1352 may be grouped as bits zero through six, seven through thirteen, fourteen through twenty, and twenty-one through twenty-six and then recycling of bit zero. Select signal 1358 selects one of these groupings for output from multiplexer 1353, and then select signal 1358 is incremented to select another group, and so on and so forth. In this manner, output of multiplexer 1353 is Rx statistics vector output signal 1264, which may be a seven-bit-wide output signal in an exemplary implementation.

Figure 7G:
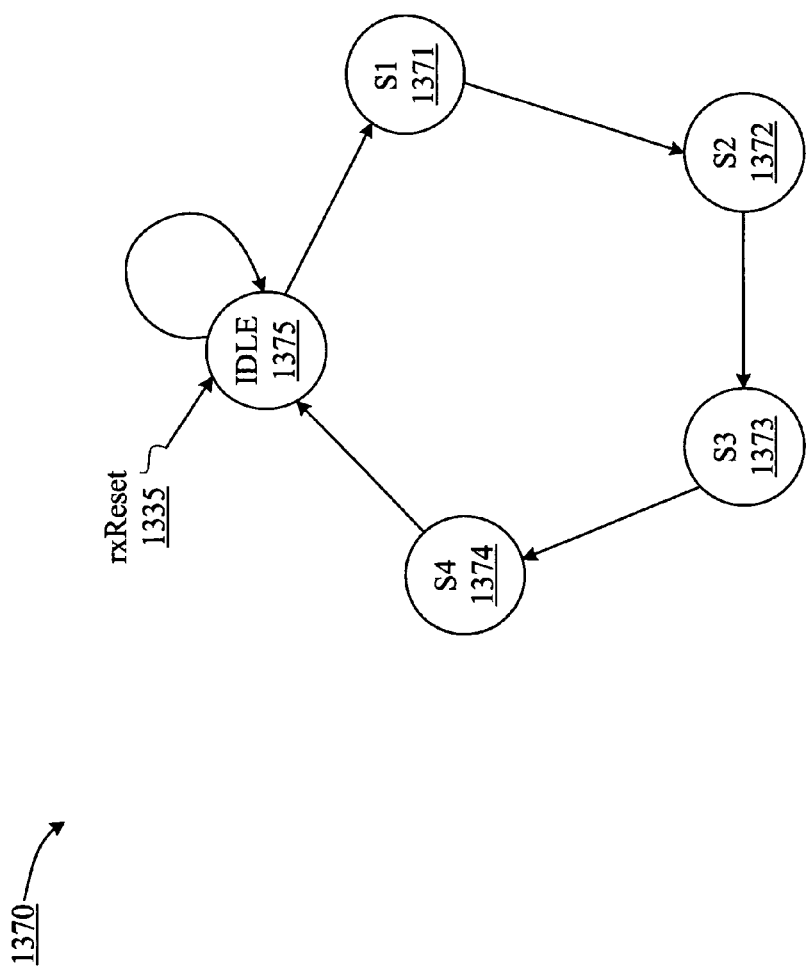
FIG. 7G is a state diagram depicting an exemplary embodiment of a state machine for a receive statistics multiplexer controller.
Figure 8:
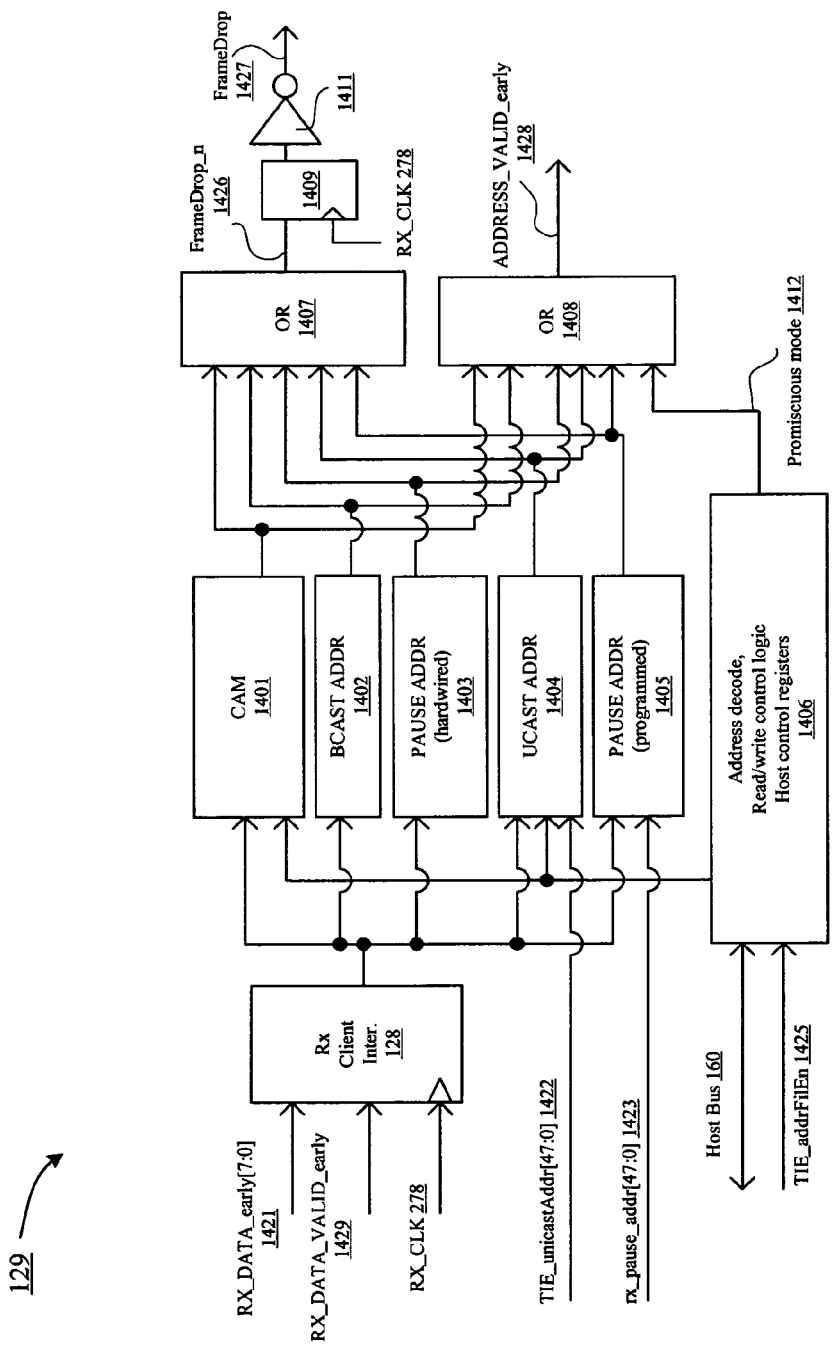
Figure 9:
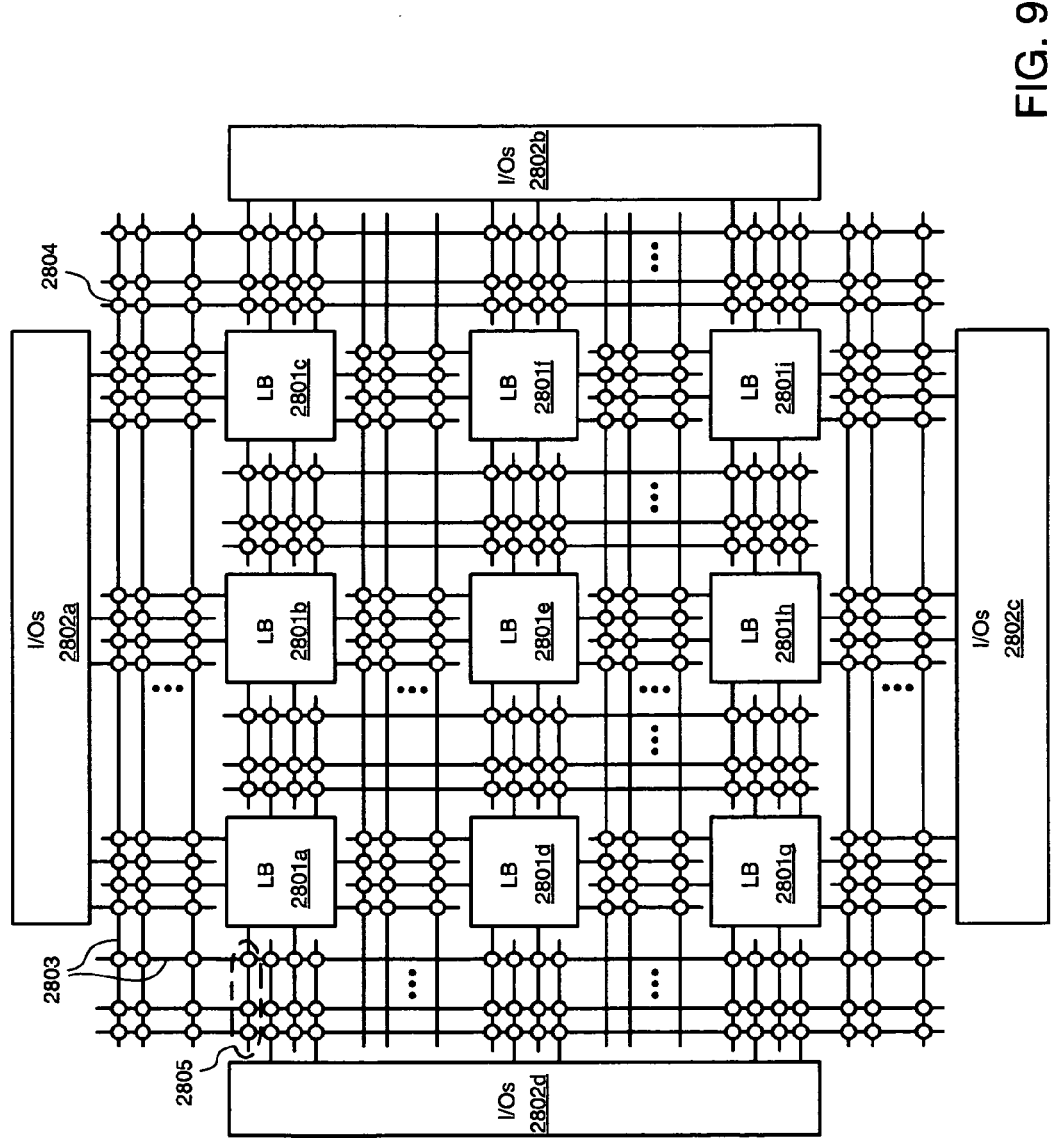

FIG. 7G is a state diagram depicting an exemplary embodiment of a state machine 1370 for receive statistics multiplexer controller 1354 of FIG. 7F. Responsive to assertion of receive reset signal 1335, state machine 1370 is put in idle state 1375. State machine 1370 stays in idle state 1375 until receive statistics valid signal 1262 is asserted. In other words, state machine 1370 stays in idle state 1375 responsive to the non-assertion of receive statistics valid signal 1262.

Responsive to assertion of receive statistics valid signal 1262, state machine 1370 transitions from idle state 1375 to state S1 1371. Outputs of state machine 1370, namely receive statistics valid output signal 1265 and select signal 1358, in state S1 1371 respectively are a logic 1 and a logic 00. On a subsequent receive clock signal 1278 cycle, state machine 1370 transitions from state S1 1371 to state S2 1372. Accordingly, receive statistics valid output signal 1265 is maintained at a logic 1 level, and select signal 1358 is incremented to a 01 to select the next grouping of seven bits for output from multiplexer 1353 for receive statistics vector output signal 1264. From state S2 1372, state machine 1370 responsive to the next receive clock signal 278 cycle transitions to state S3 1373.

In state S3 1373, state machine 1370's outputs are a logic 1 and a logic 11 for receive statistics valid output signal 1265 and select signal 1358, respectively. On the next receive clock signal 278 cycle, state machine 1370 transitions from state S3 1373 to state S4 1374. In state S4 1374, outputs of state machine 1370 are a logic 1 and a logic 10 for receive statistics valid output signal 1265 and select signal 1358, respectively. On the next receive clock signal 278 cycle, state machine 1370 transitions from S4 1374 back to idle state 1375.

FIG. 7H is a timing diagram depicting an exemplary embodiment of timing for receive statistics multiplexer 126 of FIG. 7B. Receive statistics valid signal 1262 is pulsed generally at 1381, and in response, receive statistics vector output signal 1264 will be passed data and receive statistics valid output signal 1265 will be held at a logic high state generally through 1383 for data 1384. Receive statistics vector signal 1261 generally at 1382 provides data for receive statistics vector output signal 1264. Notably, each portion of data 1384, which in this example there are four respective portions of data 1384, is provided on each clock cycle of receive clock signal 278 after pulsing receive statistics valid signal 1262.

Address Filter

Figures 4, 5, 6, 7, 8:
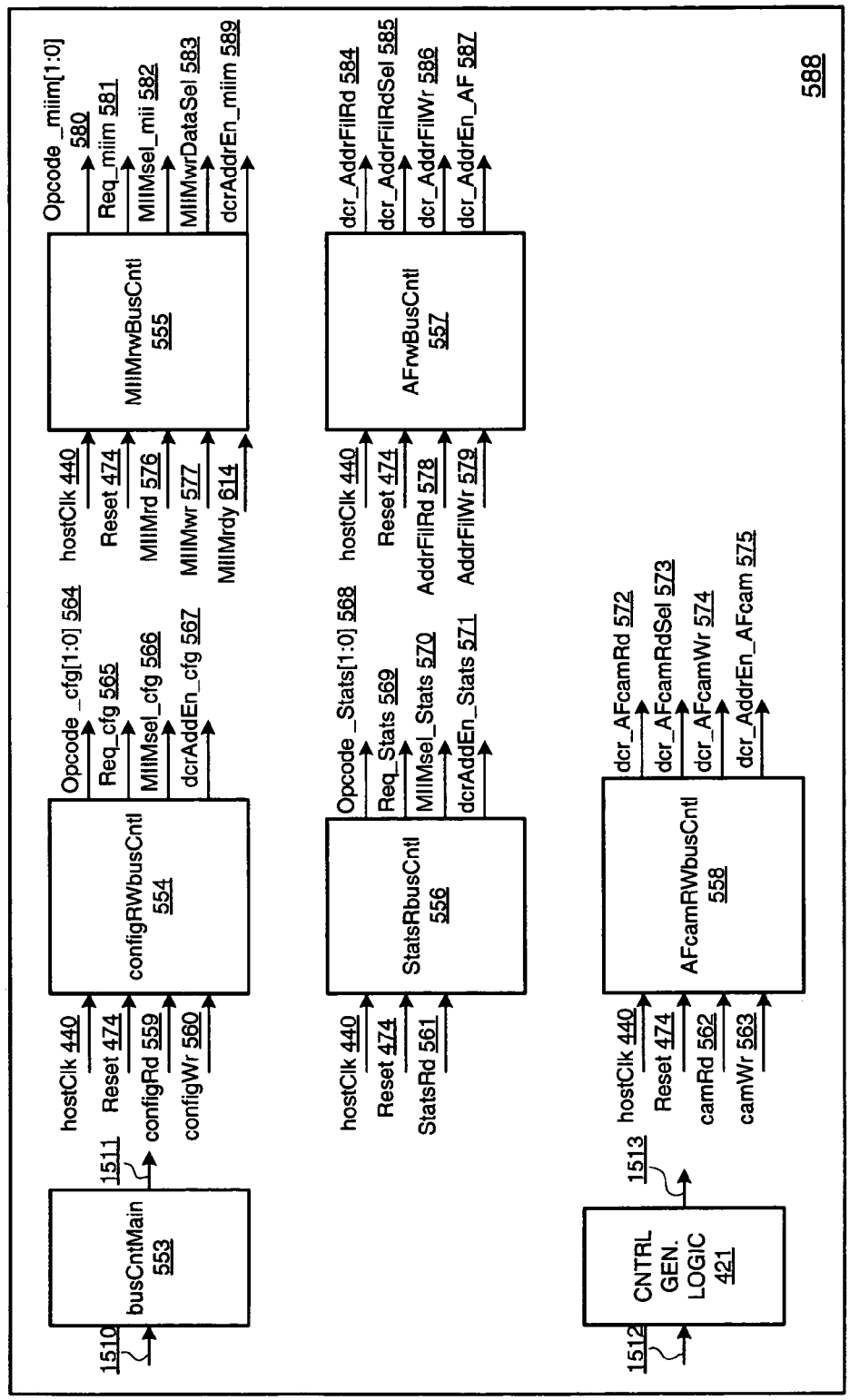

FIG. 8 is a high-level block diagram depicting an exemplary embodiment of address filter 129 of FIG. 1. Receive data early signal 1421, which in an exemplary implementation may be an eight-bit wide signal, along with receive data valid early signal 1429, are provided to receive client interface 128. Output of receive client interface 128 is provided to CAM 1401, broadcast address module 1402, pause address module 1403, unicast address module 1404, and pause address module 1405. Pause address module 1403 is a factory setting, which may be hard-wired or programmed, whereas pause address module 1405 is configured for inputting an address by a user. Notably, a pause address may be asserted, for example by a client circuit instantiated in configurable logic of FPGA fabric 101, to transmit a pause frame.

Provided to unicast address module 1404 is TIE unicast address signal 1422, which in an exemplary implementation may be a forty-eight-bit wide address signal. Provided to pause address module 1405 is receive pause address signal 1423, which in an exemplary implementation may be a forty-eight-bit wide address signal. As mentioned above, CAM 1401 may be implemented as a plurality of registers with comparison logic, though a CAM may be used.

Address decode, read/write control logic and host control registers ("decode/control circuitry") 1406 is coupled to CAM 1401 and unicast address module 1404. Output from decode/control circuitry 1406 is provided to CAM 1401 and unicast address module 1404. Decode/control circuitry 1406 may be coupled to host bus 160. Notably, DCR bus input to decode/control circuitry 1406 may be provided via host bus 160 or bidirectional communication with a processor external to processor block 102.

TIE address filter enable signal 1425 may be provided to decode/control circuitry 1406 to provide padding for multicast and unicast addresses. Recall that CAM 1401 is for providing unicast addressing. Output from CAM 1401, broadcast address module 1402, pause address module 1403, unicast address module 1404, and pause address module 1405 are provided to respective OR trees 1407 and 1408.

A mode that accepts any destination address, what is commonly known as "promiscuous mode", may be invoked responsive to promiscuous mode signal 1412, which is provided from decode/control circuitry 1406 to OR tree 1408. Output of OR tree 1408 is address valid early signal 1428. Output from OR tree 1407 is provided as frame drop inverted signal 1426, which signal is provided as a data input to register 1409. Register 1409 is clocked responsive to receive clock signal 278. Data output of register 1409 is provided as an input to inverter 1411, the output of which is frame drop signal 1427.

Frame data is passed to a client through the Rx data/control client interface. If address filter 129 is activated, only frames having an address matching an address in address filter 129 are passed to the client. Frames with non-matching addresses are dropped, which dropping is indicated to the client via frame drop signal 1427 being asserted. Notably, when promiscuous mode is invoked, address filter 129 is disabled for filtering addresses though frame drop signal 1427 may still be asserted.

Receive pause address signal 1423 may be obtained from embedded EMAC host registers. For example, EMAC host register may include a receive configuration word one register, which in an exemplary implementation may support storing a 32-bit wide address, and a receive configuration word zero register, which in an exemplary implementation may support storing a 16-bit wide address to determine if an incoming destination address matches a stored address for purposes of rejecting or accepting the incoming received frame.

Host bus 160 may include a version of host bus 118 signals and address filter access signals, as listed for example as signal set (5) in Table 1. For example, host bus 160 may include a host clock signal 440, a host address signal, a host write enable signal, a host read enable signal of signals 464, a host write data signal, a host address filter CAM read signal, an internal MGT host reset signal, and address filter read data signal 434 or 468, 487. In an exemplary implementation, a host address signal may be a ten-bit wide signal; a host read/write data signal may be a thirty-two-bit wide signal; and an address filter read data signal may be a forty-eight-bid wide signal.

Each hard core EMAC contains a receive address filter. Address filtering is for rejecting any incoming receive frame that does not have an acceptable destination address. When a packet is rejected, the packet's data is not passed to client.

In this exemplary embodiment, there is programmable unicast destination address matching via unicast address module 1404, programmable multicast address matching via CAM 1401, broadcast address recognition via broadcast address module 1402, an optional/programmable pass-through mode with address filter 129 disabled via pause address module 1405, and pause control frame address recognition via pause address module 1403. When address filtering is activated, address filter 129 may have unicast address matching, multi-cast address matching with CAM, broadcast address recognition, pause control frame address recognition and programmable pause frame address matching all activated.

Address filter 129 can be programmed to promiscuous mode to accept all incoming frames. In an exemplary implementation, CAM 1401 contains four entries for multicast address matching though fewer or more entries may be used and CAM size may be adjusted accordingly. Notably, a broadcast address and a pause control address are fixed to respective predefined values for broadcast address module 1402 and pause address module 1403.

Having an embedded ASIC block 102 in an FPGA, facilitates implementation of tie-off pins. A tie-off pin may be used to provide TIE address filter enable signal 1425 to activate or deactivate address filtering. TIE_addrFilEn signal 1425 can be programmed when the FPGA is configured. For example, when TIE_addrFilEn signal 1425 is tied to logic high, address filtering is active. A host processor may overwrite this tie-off value by programming a new value through host bus 118 (shown in FIG. 1) as coupled to host bus 160. Notably, processor 103 may change tie-off pin values via a write to address filter 129 via DCR bus 114 and host interface 112.

Additionally, tie-off pins may be used to provide a particular unicast address for address filter matching, such as via TIE unicast address signal 1422. This allows address filter 129 to start functioning without having to program a unicast address through host bus 160. To change a unicast address, a host processor can program in a new unicast address through host bus 160.

TIE unicast Addr[47:0] signal 1422 provides a unicast address that can be programmed into address filter 129 via tie-off pins when the FPGA is configured. Notably, processor 103 may change tie-off pin values via a write to address filter 129 via DCR bus 114 and host interface 112.

Again, tie-off pins may be set to a value when the FPGA is configured, and thus use of these tie-off pins allows address filter 129 to start functioning with a unicast address and with address filtering activated or deactivated without any management action from a host processor. Accordingly, address filter 129 may start functioning with a unicast address or in a promiscuous mode without the need for host processor intervention. In an exemplary implementation, address filter 129 may be implemented with standard layout cells in ASIC block 102 to provide an efficient implementation compared to implementation in FPGA programmable logic, thereby resulting in increasing FPGA resource availability for instantiation of a user design.

Address filter 129 makes use of the early versions of pipelined received data valid and data signals, namely RX_DATA_VALID_early 1429 and RX_DATA_early[7:0] 1421, so address filter 129 has time to compare a received destination address with an addresses stored in address filter 129 and so EMAC core 123 host registers, namely Receive Configuration Word 0[31:0] and Receive Configuration Word 1 [15:0], have time to determine whether to accept or reject an incoming receive frame.

Frame drop signal 1427 indicates to a receive-side of client interface 117 to reject an incoming frame. ADDRESS_ VALID_early signal 1428 indicates to EMAC core 123 to pass an incoming frame to a receive-side of client interface 117.

FPGAs

Figures 4, 5, 6, 7, 8, 9:
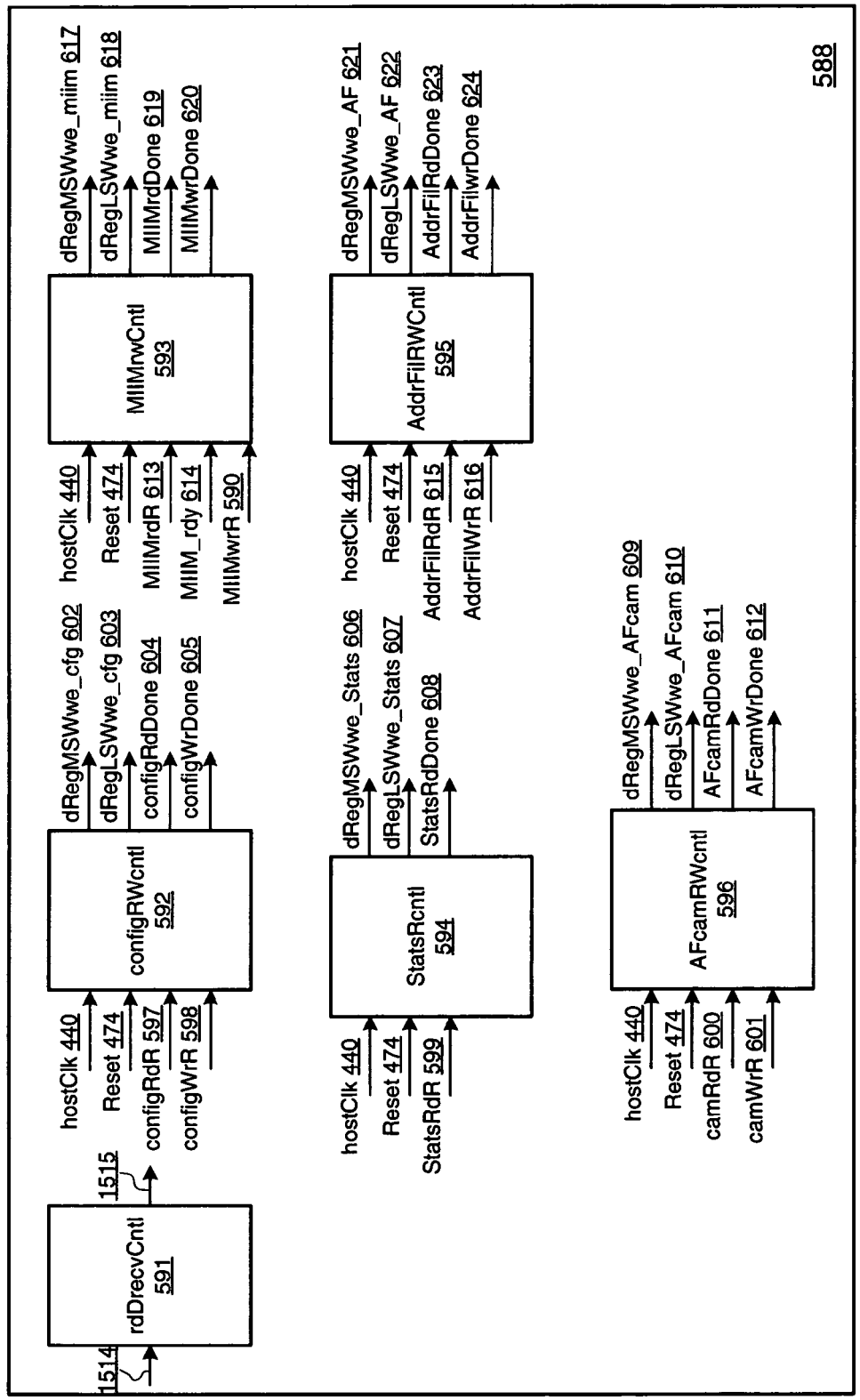
Figures 4, 5, 6, 7, 8, 9, 10, 11:
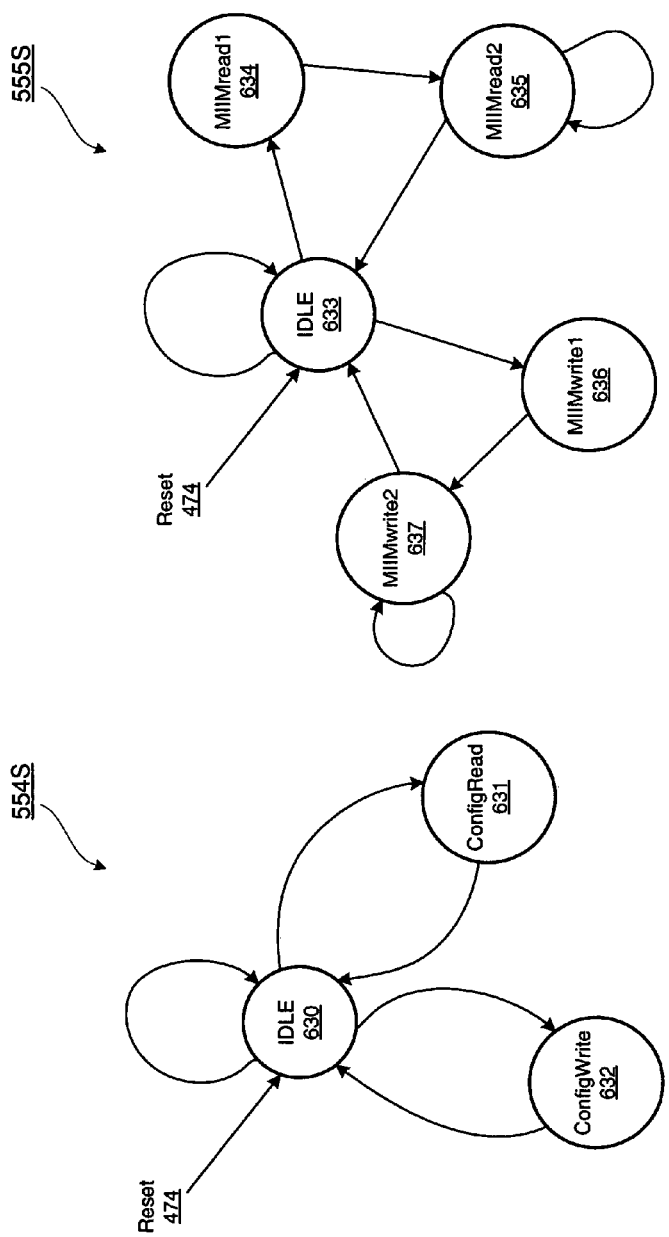
Figures 4, 5, 6, 7, 8, 9, 10, 11, 12, 13:
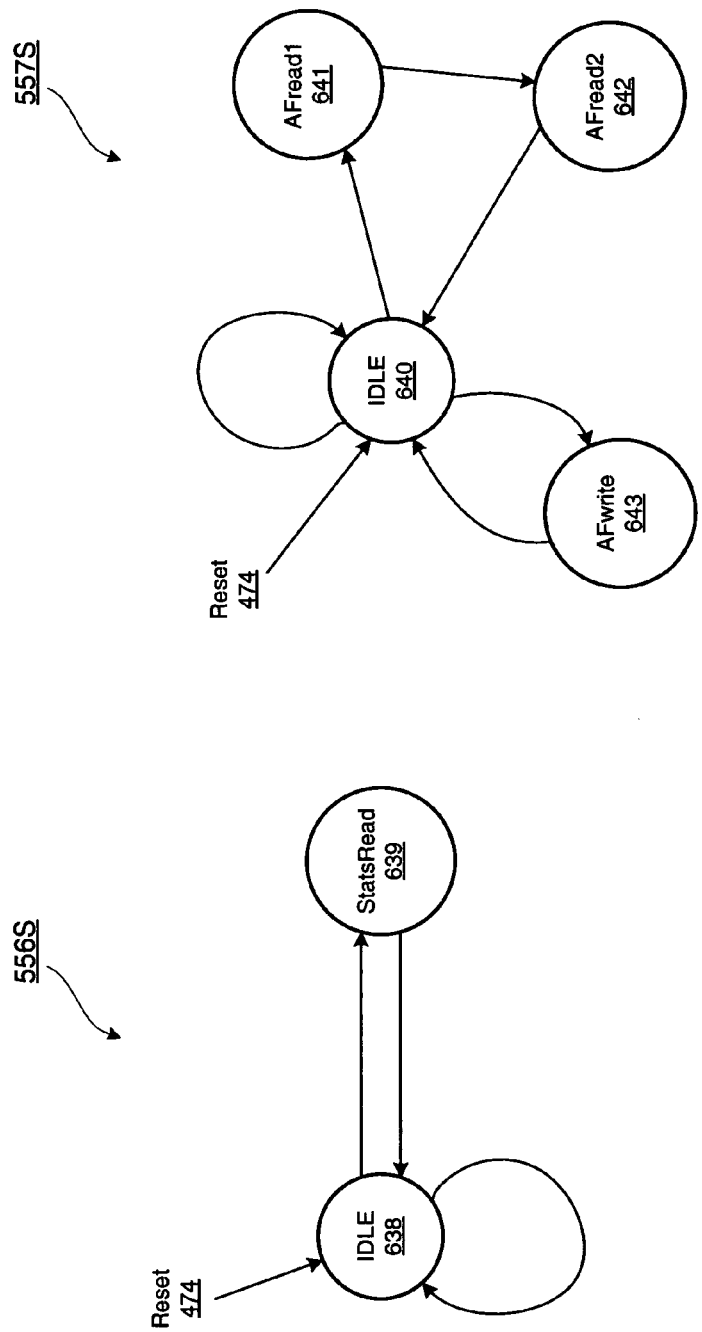
Figures 4, 5, 6, 7, 8, 9, 10, 11, 12, 13, 14, 15:
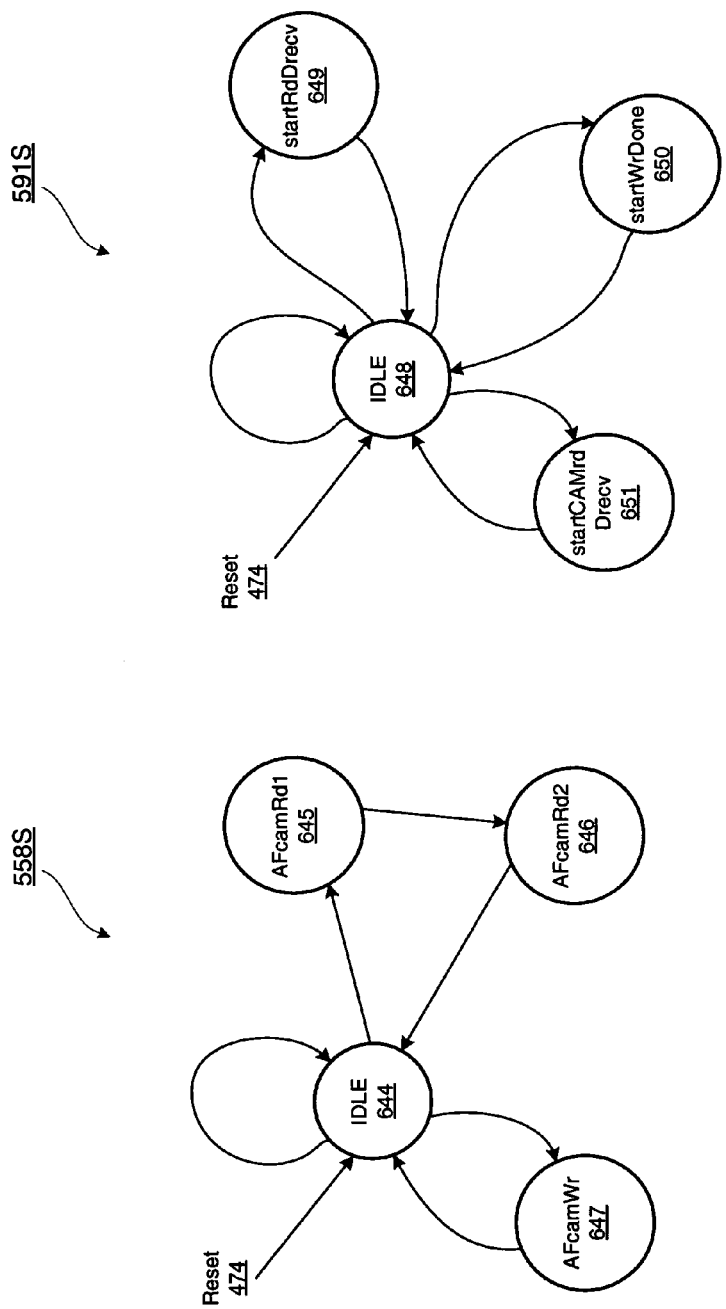
Figures 4, 5, 6, 7, 8, 9, 10, 11, 12, 13, 14, 15, 16, 17:
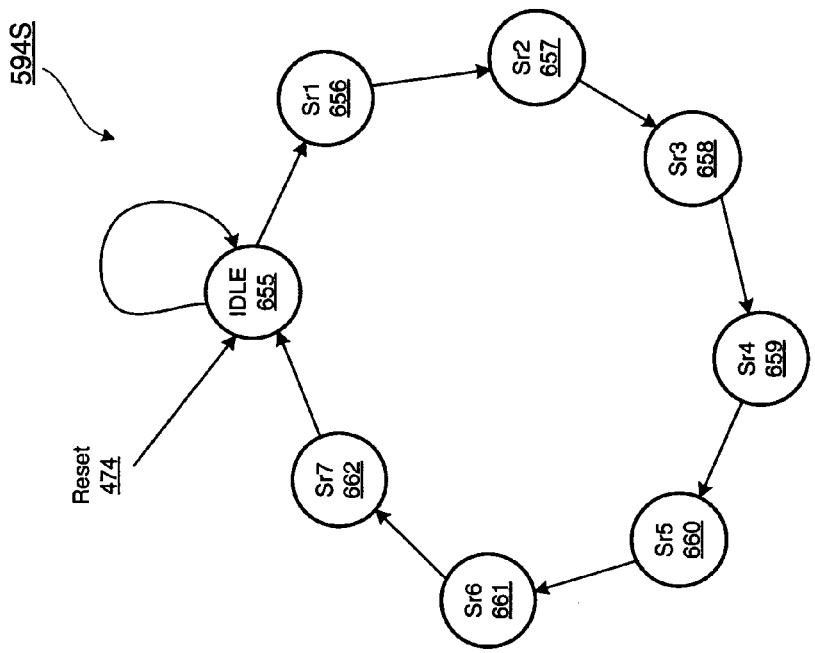
Figures 4, 5, 6, 7, 8, 9, 10, 11, 12, 13, 14, 15, 16:
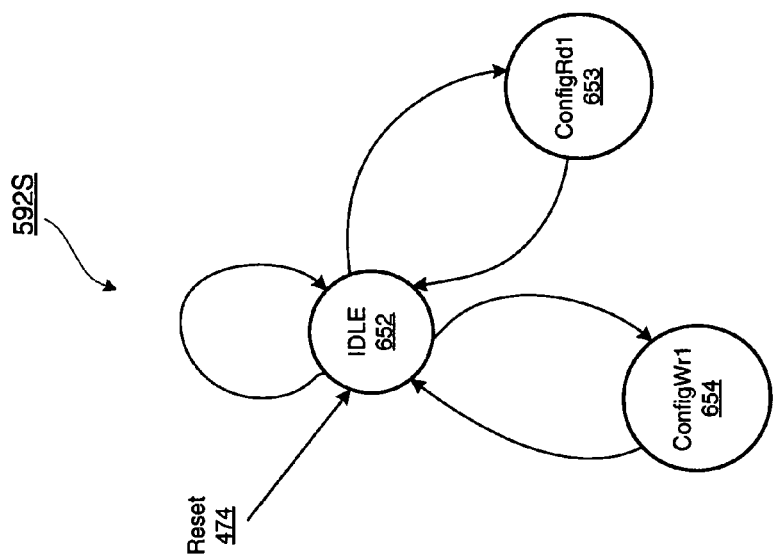
Figures 4, 5, 6, 7, 8, 9, 10, 11, 12, 13, 14, 15, 16, 17, 18:
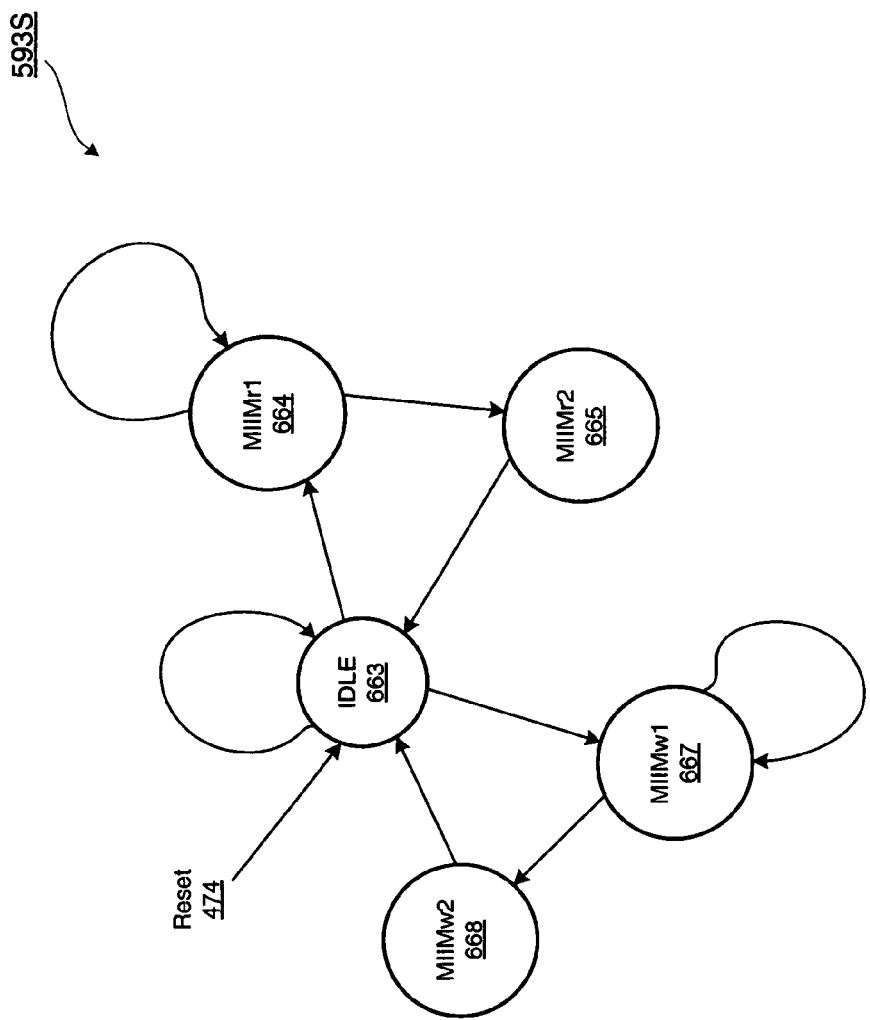
Figures 4, 5, 6, 7, 8, 9, 10, 11, 12, 13, 14, 15, 16, 17, 18, 19, 20:
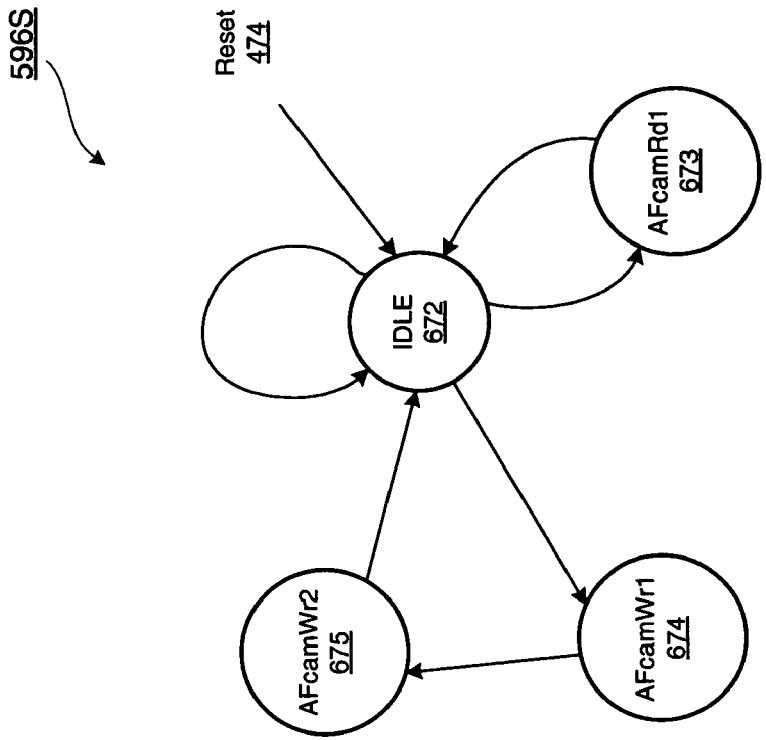
Figures 4, 5, 6, 7, 8, 9, 10, 11, 12, 13, 14, 15, 16, 17, 18, 19:
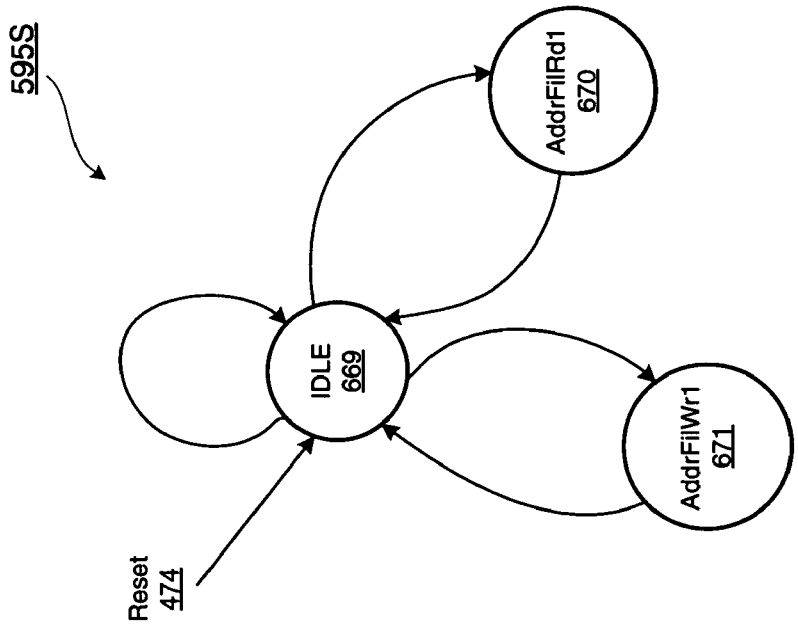
Figures 4, 5, 6, 7, 8, 9, 10, 11, 12, 13, 14, 15, 16, 17, 18, 19, 20, 21, 22, 23:
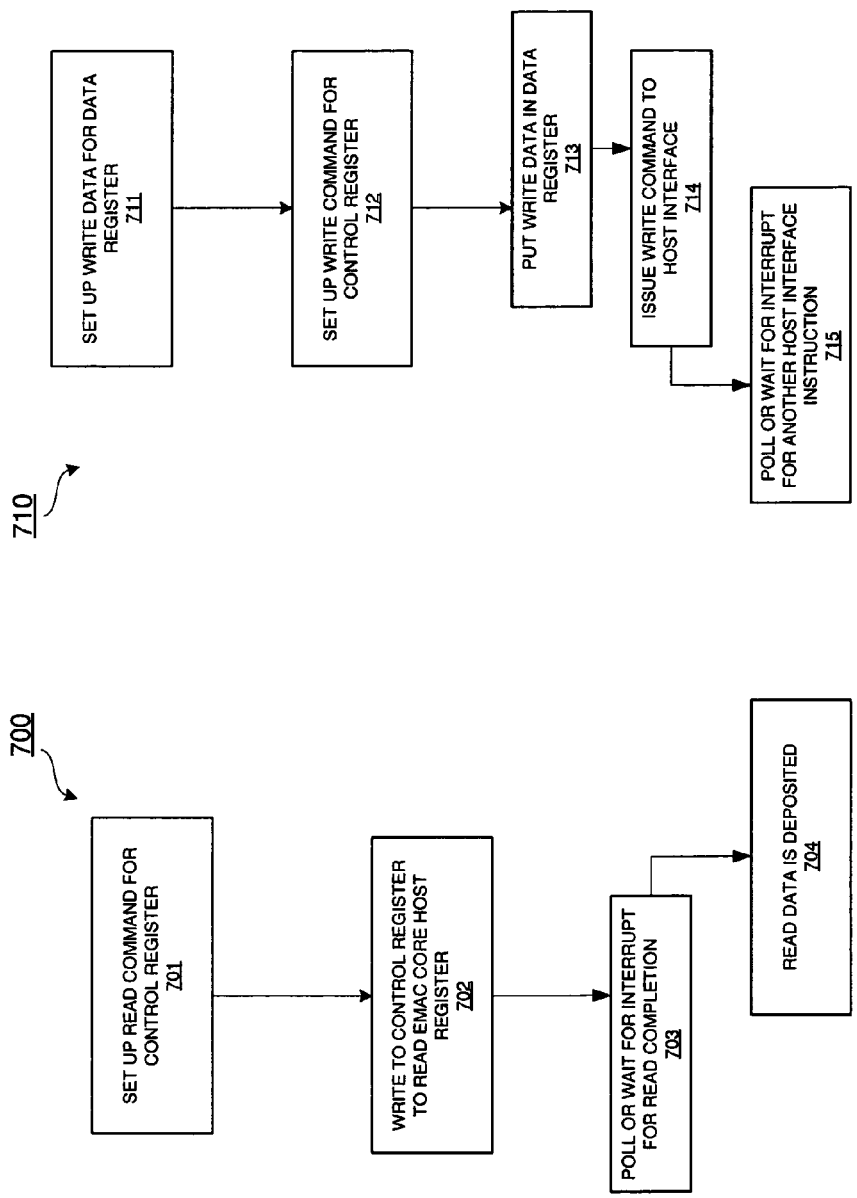
Figures 4, 5, 6, 7, 8, 9, 10, 11, 12, 13, 14, 15, 16, 17, 18, 19, 20, 21, 22, 23, 24, 25:
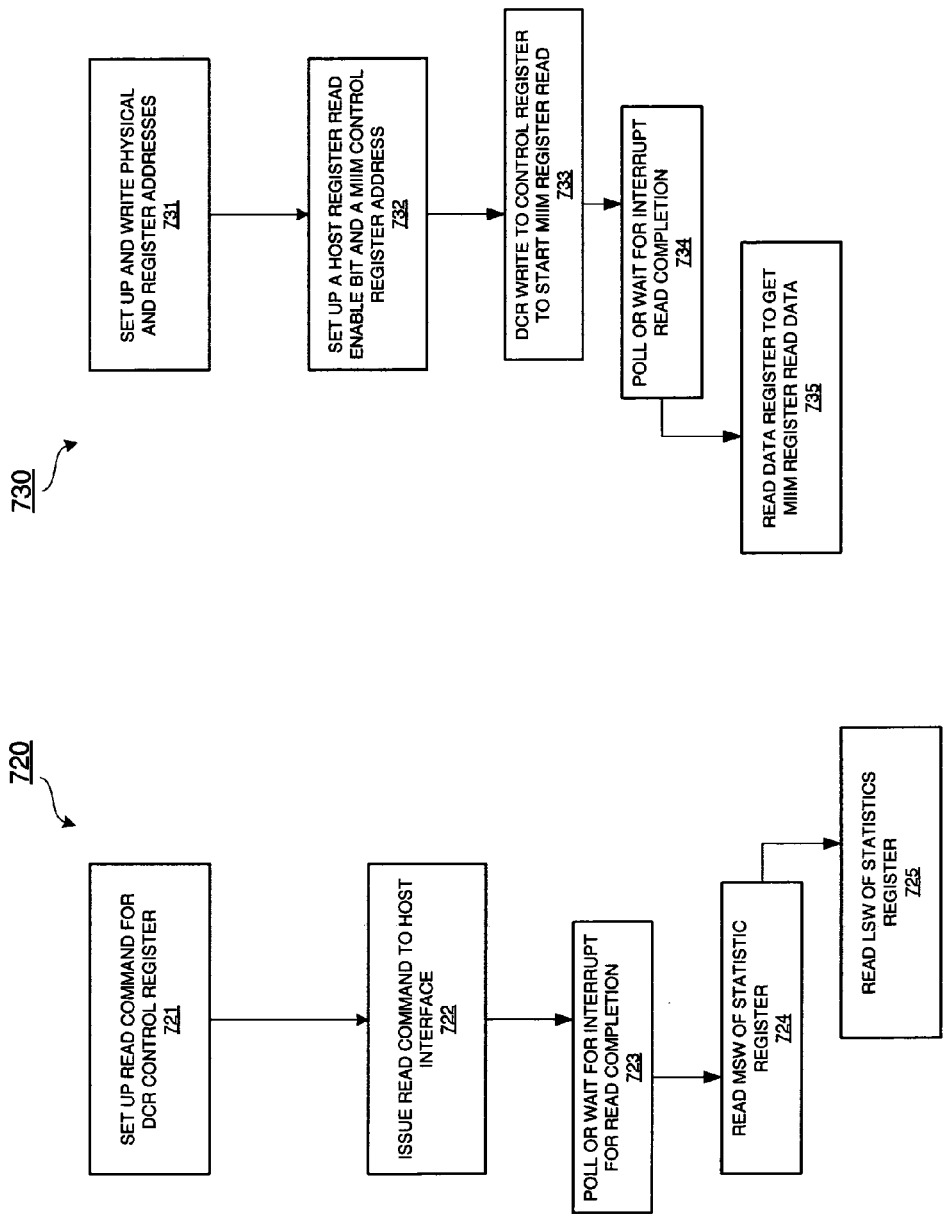
Figures 4, 5, 6, 7, 8, 9, 10, 11, 12, 13, 14, 15, 16, 17, 18, 19, 20, 21, 22, 23, 24, 25, 26:
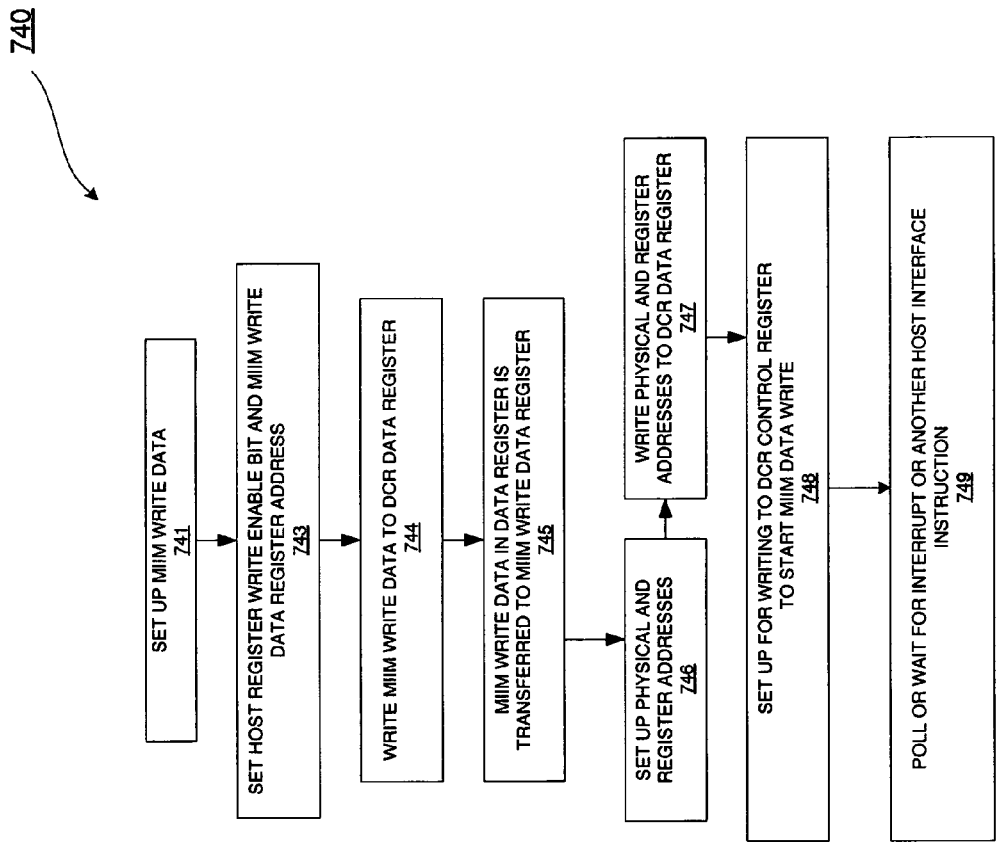
Figures 4, 5, 6, 7, 8, 9, 10, 11, 12, 13, 14, 15, 16, 17, 18, 19, 20, 21, 22, 23, 24, 25, 26, 27:
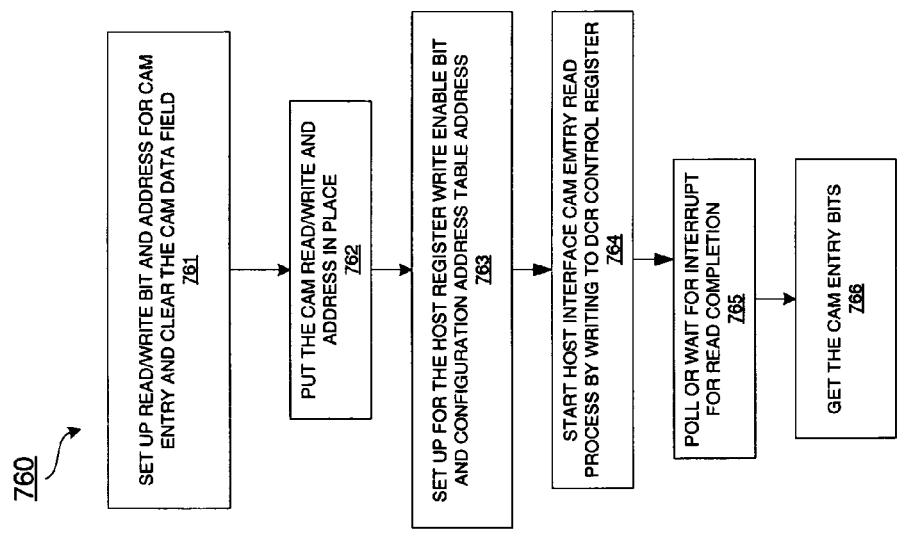
Figures 4, 5, 6, 7, 8, 9, 10, 11, 12, 13, 14, 15, 16, 17, 18, 19, 20, 21, 22, 23, 24, 25, 26, 27, 28:
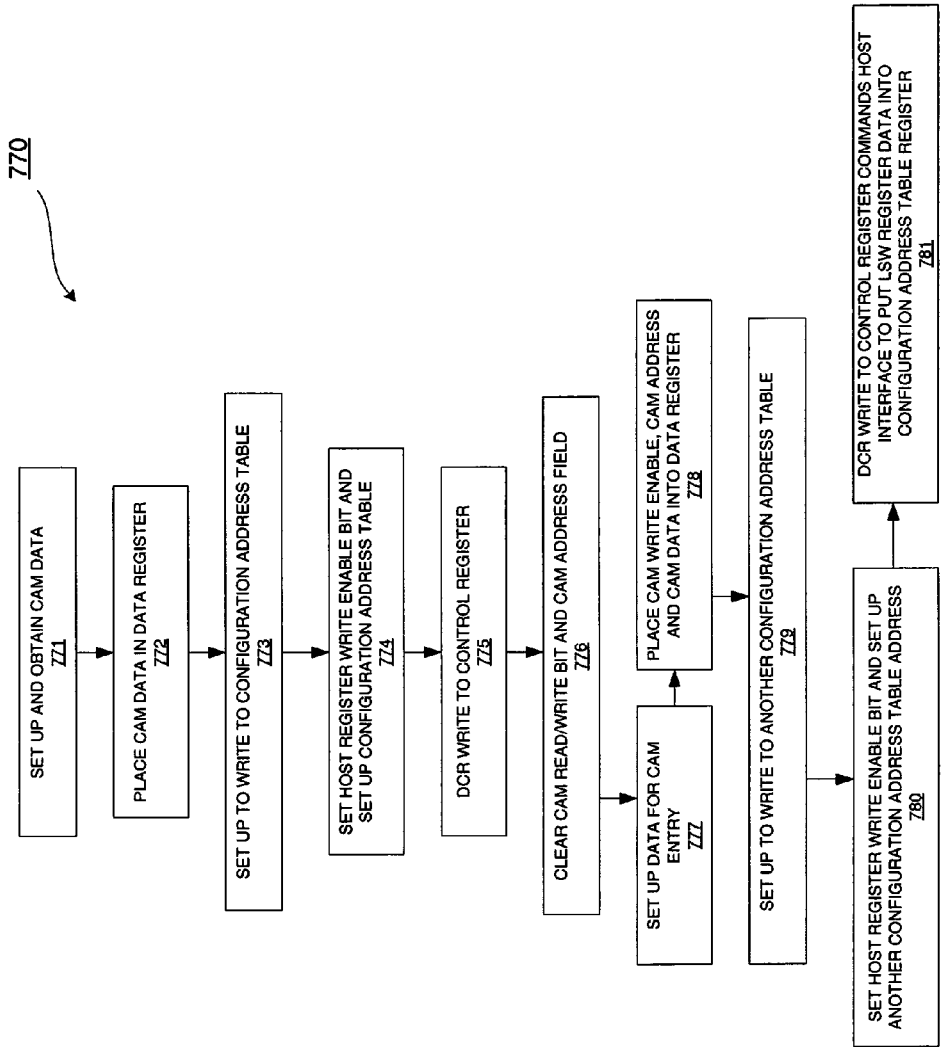
Figures 4, 5, 6, 7, 8, 9, 10, 11, 12, 13, 14, 15, 16, 17, 18, 19, 20, 21, 22, 23, 24, 25, 26, 27, 28, 29:
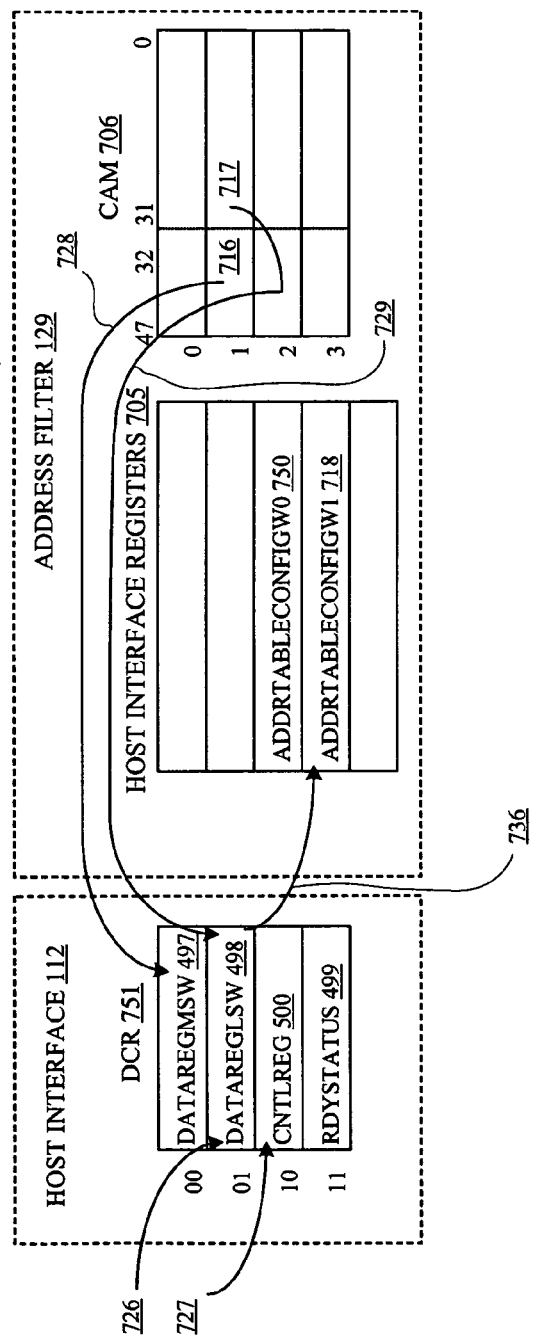
Figures 4, 5, 6, 7, 8, 9, 10, 11, 12, 13, 14, 15, 16, 17, 18, 19, 20, 21, 22, 23, 24, 25, 26, 27, 28, 29, 30:
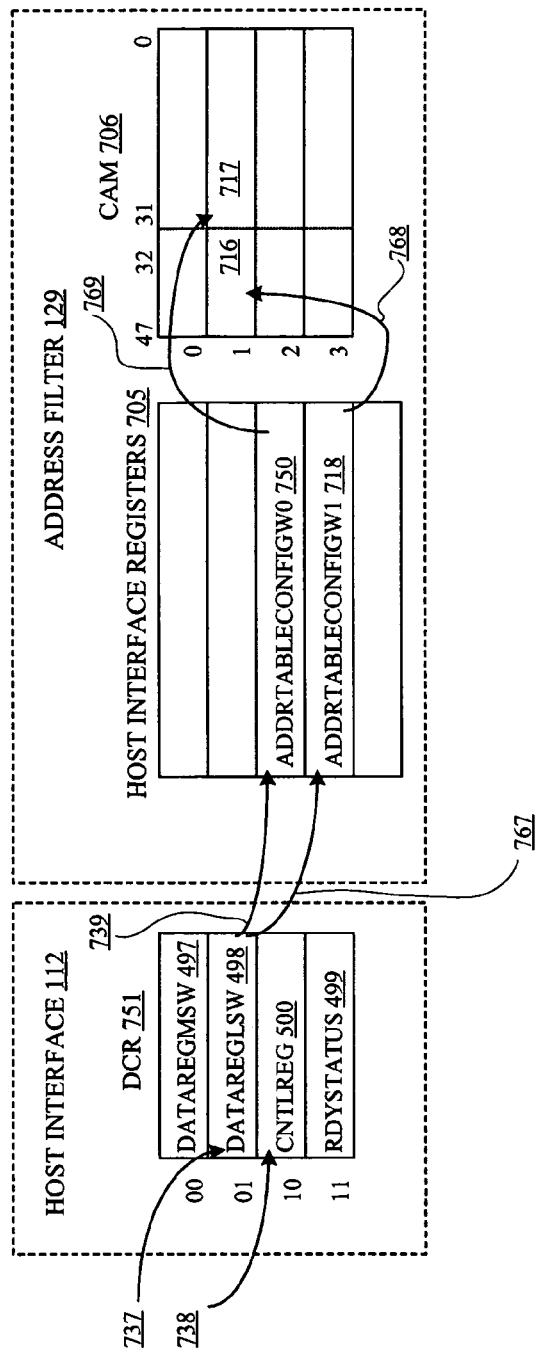
Figures 4, 5, 6, 7, 8, 9, 10, 11, 12, 13, 14, 15, 16, 17, 18, 19, 20, 21, 22, 23, 24, 25, 26, 27, 28, 29, 30, 31:
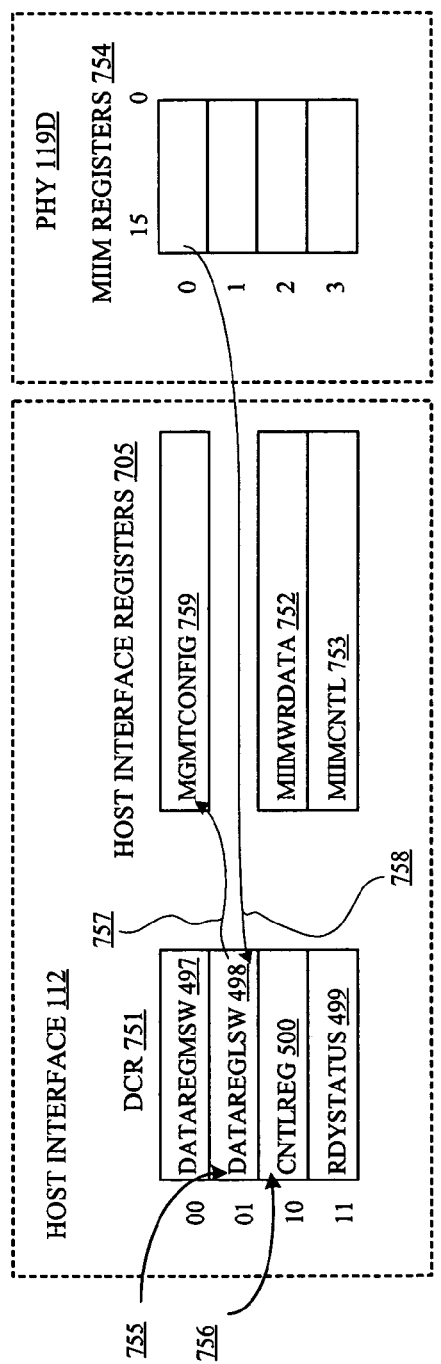
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32:
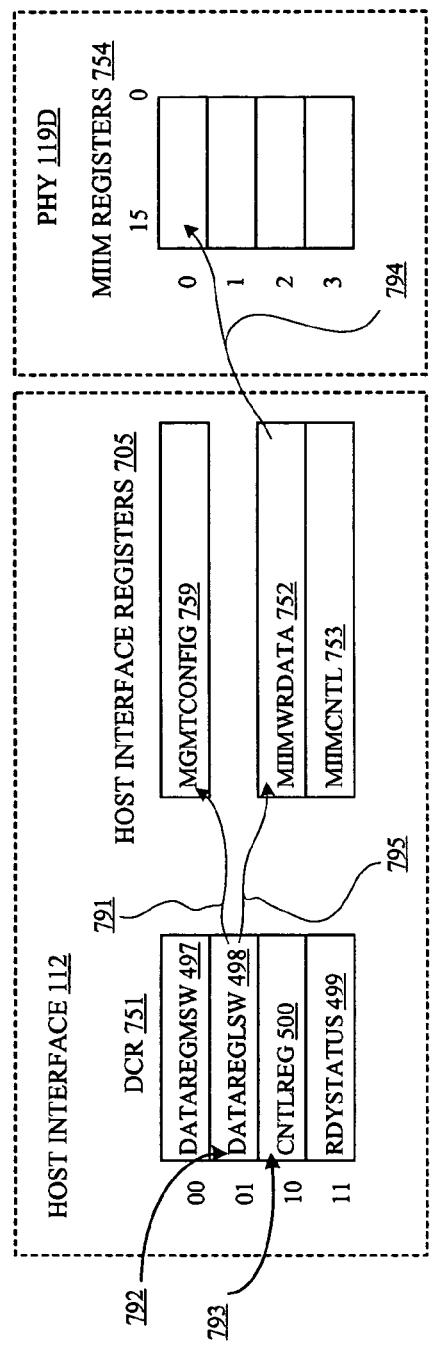

Below are some examples of FPGAs in which EMACs 110 and 111 may be implemented. FIG. 9 is a simplified illustration of an exemplary FPGA. The FPGA of FIG. 9 includes an array of configurable logic blocks (LBs 2801a-2801i) and programmable input/output blocks (I/Os 2802a-2802d). The LBs and I/O blocks are interconnected by a programmable interconnect structure that includes a large number of interconnect lines 2803 interconnected by programmable interconnect points (PIPs 2804, shown as small circles in FIG. 9). PIPs are often coupled into groups (e.g., group 2805) that implement multiplexer circuits selecting one of several interconnect lines to provide a signal to a destination interconnect line or logic block. Some FPGAs also include additional logic blocks with special purposes, e.g., DLLs, RAM, and so forth.

One such FPGA, the Xilinx Virtex® FPGA, is described in detail in pages 3-75 through 3-96 of the Xilinx 2000 Data Book entitled "The Programmable Logic Data Book 2000" (hereinafter referred to as "the Xilinx Data Book"), published April, 2000, available from Xilinx, Inc., 2100 Logic Drive, San Jose, Calif. 95124, which pages are incorporated herein by reference. (Xilinx, Inc., owner of the copyright, has no objection to copying these and other pages referenced herein but otherwise reserves all copyright rights whatsoever.) Young et al. further describe the interconnect structure of the Virtex FPGA in U.S. Pat. No. 5,914,616, issued Jun. 22, 1999 and entitled "FPGA Repeatable Interconnect Structure with Hierarchical Interconnect Lines", which is incorporated herein by reference in its entirety.

One such FPGA, the Xilinx Virtex®-II FPGA, is described in detail in pages 33-75 of the "Virtex-II Platform FPGA Handbook", published December, 2000, available from Xilinx, Inc., 2100 Logic Drive, San Jose, Calif. 95124, which pages are incorporated herein by reference.

One such FPGA, the Xilinx Virtex-II Pro™ FPGA, is described in detail in pages 19-71 of the "Virtex-II Pro Platform FPGA Handbook", published Oct. 14, 2002 and available from Xilinx, Inc., 2100 Logic Drive, San Jose, Calif. 95124, which pages are incorporated herein by reference.

As FPGA designs increase in complexity, they reach a point at which the designer cannot deal with the entire design at the gate level. Where once a typical FPGA design comprised perhaps 5,000 gates, FPGA designs with over 100,000 gates are now common. To deal with this complexity, circuits are typically partitioned into smaller circuits that are more easily handled. Often, these smaller circuits are divided into yet smaller circuits, imposing on the design a multi-level hierarchy of logical blocks.

Libraries of predeveloped blocks of logic have been developed that can be included in an FPGA design. Such library modules include, for example, adders, multipliers, filters, and other arithmetic and DSP functions from which complex designs can be readily constructed. The use of predeveloped logic blocks permits faster design cycles, by eliminating the redesign of duplicated circuits. Further, such blocks are typically well tested, thereby making it easier to develop a reliable complex design.

Some FPGAs, such as the Virtex FGPA, can be programmed to incorporate blocks with pre-designed functionalities, i.e., "cores". A core can include a predetermined set of configuration bits that program the FPGA to perform one or more functions. Alternatively, a core can include source code or schematics that describe the logic and connectivity of a design. Typical cores can provide, but are not limited to, digital signal processing functions, memories, storage elements, and math functions. Some cores include an optimally floorplanned layout targeted to a specific family of FPGAs. Cores can also be parameterizable, i.e., allowing the user to enter parameters to activate or change certain core functionality.

As noted above, advanced FPGAs can include several different types of programmable logic blocks in the array. For example, FIG. 10 illustrates an FPGA architecture 2900 that includes a large number of different programmable tiles including multi-gigabit transceivers (MGTs 2901), configurable logic blocks (CLBs 2902), random access memory blocks (BRAMs 2903), input/output blocks (IOBs 2904), configuration and clocking logic (CONFIG/CLOCKS 2905), digital signal processing blocks (DSPs 2906), specialized input/output blocks (I/O 2907) (e.g., configuration ports and clock ports), and other programmable logic 2908 such as digital clock managers, analog-to-digital converters, system monitoring logic, and so forth. Some FPGAs also include dedicated processor blocks (PROC 2910).

In some FPGAs, each programmable tile includes a programmable interconnect element (INT 2911) having standardized connections to and from a corresponding interconnect element in each adjacent tile. Therefore, the programmable interconnect elements taken together implement the programmable interconnect structure for the illustrated FPGA. The programmable interconnect element (INT 2911) also includes the connections to and from the programmable logic element within the same tile, as shown by the examples included at the top of FIG. 10.

For example, a CLB 2902 can include a configurable logic element (CLE 2912) that can be programmed to implement user logic plus a single programmable interconnect element (INT 2911). A BRAM 2903 can include a BRAM logic element (BRL 2913) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 2906 can include a DSP logic element (DSPL 2914) in addition to an appropriate number of programmable interconnect elements. An IOB 2904 can include, for example, two instances of an input/output logic element (IOL 2915) in addition to one instance of the programmable interconnect element (INT 2911). As will be clear to those of skill in the art, the actual I/O pads connected, for example, to the I/O logic element 2915 are manufactured using metal layered above the various illustrated logic blocks, and typically are not confined to the area of the input/output logic element 2915.

In the pictured embodiment, a columnar area near the center of the die (shown shaded in FIG. 10) is used for configuration, clock, and other control logic. Horizontal areas 2909 extending from this column are used to distribute the clocks and configuration signals across the breadth of the FPGA.

Some FPGAs utilizing the architecture illustrated in FIG. 10 include additional logic blocks that disrupt the regular columnar structure making up a large part of the FPGA. The additional logic blocks can be programmable blocks and/or dedicated logic. For example, the processor block PROC 2910 shown in FIG. 10 spans several columns of CLBs and BRAMs.

Note that FIG. 10 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 10 are purely exemplary. For example, in an actual FPGA more than one adjacent column of CLBs is typically included wherever the CLBs appear, to facilitate the efficient implementation of user logic.

While FPGA examples have been used to illustrate some embodiments of the present invention, the scope of the present invention is not limited to FPGAs. Other embodiments include other types of PLDs besides FPGAs. Further embodiments include an IC having programmable logic or programmable interconnections or both coupled to an embedded EMAC. Hence the IC, for some embodiments of the present invention, may not be what is called an FPGA, but may have circuits with some or all functions the same as or similar to an FPGA that are coupled to the embedded EMAC.

Notably, program(s) of the program product defines functions of embodiments in accordance with one or more aspects of the invention and can be contained on a variety of signal-bearing media, such as computer-readable media having code, which include, but are not limited to: (i) information permanently stored on non-writable storage media (e.g., read-only memory devices within a computer such as CD- ROM or DVD-RAM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of one or more aspects of the invention represent embodiments of the invention.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners. Headings are provided merely for organizational clarity and are not intended in anyway to limit the scope of the disclosure under them.

The invention claimed is:

1. A statistics interface for a media access controller, comprising:
    a media access controller core including a receive engine, the receive engine configured to provide a receive statistics vector associated with receive traffic provided via the media access controller, the receive engine configured to provide a receive statistics valid signal associated with the receive statistics vector, the receive engine configured to output the receive statistics vector within an inter-frame gap over a number of receive clock cycles, wherein a portion of the receive statistics vector is provided with each clock cycle of the receive clock cycles; and
    a receive statistics multiplexer circuit coupled to receive the receive statistics vector and the receive statistics valid signal and configured to provide a receive statistics vector output and a receive statistics valid output respectively responsive thereto, and comprising:
        a receive statistics multiplexer controller configured to provide control select signaling responsive to the receive statistics valid output and the receive clock signal;
        a first multiplexer coupled to receive the control select signaling to select a portion of the receive statistics vector output for output; and
        a register clocked responsive to the receive clock signal and coupled to receive the receive statistics vector output and provide the receive statistics vector output to the first multiplexer.

2. The statistics interface, according to claim 1, wherein the receive statistics multiplexer circuit comprises a second multiplexer coupled to receive the receive statistics vector output to a first data input port and coupled to receive the receive statistics valid output as a control select input, the second multiplexer having an output coupled to the register, the register coupled to provide a portion of the receive statistics vector output to a second data input port of the second multiplexer.

3. The statistics interface, according to claim 1, wherein the receive statistics multiplexer circuit is coupled to a receive statistics accumulator circuit instantiated in the programmably configurable logic of the programmable logic device, the receive statistics accumulator circuit including a receive statistics demultiplexer and receive statistics counters.

4. The statistics interface, according to claim 1, wherein the receive statistics multiplexer circuit is coupled to receive a receive clock signal from the media access controller core.

5. The statistics interface, according to claim 4, wherein the receive statistics multiplexer circuit is coupled to programmably configurable logic of a programmable logic device.

6. The statistics interface, according to claim 5, wherein the receive statistics multiplexer circuit is hardwired in an application specific circuit block of the programmable logic device.

7. The statistics interface, according to claim 6, wherein the programmable logic device is a Field Programmable Gate Array.

8. The statistics interface, according to claim 7, wherein the media access controller core is for an Ethernet media access controller.

9. The statistics interface, according to claim 8, further comprising:
    the media access controller core including a transmit engine, the transmit engine configured to provide a transmit statistics vector associated with transmit traffic provided via the media access controller, the transmit engine configured to provide a transmit statistics valid signal associated with the transmit statistics vector; and
    a transmit statistics multiplexer circuit coupled to receive the transmit statistics vector and the transmit statistics valid signal and configured to provide a transmit statistics vector output and a transmit statistics valid output respectively responsive thereto.

10. The statistics interface, according to claim 9, wherein the transmit statistics multiplexer circuit is coupled to receive a transmit clock signal from the media access controller core.

11. The statistics interface, according to claim 10, wherein the transmit statistics multiplexer circuit is coupled to programmably configurable logic of a programmable logic device.

12. The statistics interface, according to claim 11, wherein the transmit statistics multiplexer circuit is hardwired in an application specific circuit block of the programmable logic device.

13. The statistics interface, according to claim 11, wherein the transmit statistics multiplexer circuit comprises a transmit statistics multiplexer controller configured to provide control select signaling responsive to the transmit statistics valid output and the transmit clock signal.

14. The statistics interface, according to claim 13, wherein the transmit statistics multiplexer circuit comprises a first multiplexer coupled to receive the control select signaling to select a portion of the transmit statistics vector output for output.

15. The statistics interface, according to claim 14, wherein the transmit statistics multiplexer circuit comprises a register clocked responsive to the transmit clock signal and coupled to receive the transmit statistics vector output and provide the transmit statistics vector output to the first multiplexer.

16. The statistics interface, according to claim 15, wherein the transmit statistics multiplexer circuit comprises a second multiplexer coupled to receive the transmit statistics vector output to a first data input port and coupled to receive the transmit statistics valid output as a control select input, the second multiplexer having an output coupled to the register, the register coupled to provide a portion of the transmit statistics vector output to a second data input port of the second multiplexer.

17. The statistics interface, according to claim 15, wherein the transmit statistics multiplexer circuit is coupled to a transmit statistics accumulator circuit instantiated in the programmably configurable logic of the programmable logic device, the transmit statistics accumulator circuit including a transmit statistics demultiplexer and transmit statistics counters.

* * * * *